United States Patent [19]

Nogle

[11] Patent Number: 4,871,887
[45] Date of Patent: Oct. 3, 1989

[54] FLUID-ACTUATED PRESSURE SWITCH FOR AN AUTOMATIC TRANSMISSION

[75] Inventor: Thomas D. Nogle, Troy, Mich.

[73] Assignee: Chrysler Motors Corporation, Highland Park, Mich.

[21] Appl. No.: 188,605

[22] Filed: Apr. 29, 1988

[51] Int. Cl.⁴ .............................. H01H 35/34
[52] U.S. Cl. .................. 200/83 R; 200/83 N; 200/302.1
[58] Field of Search .................. 200/81 R, 84 R, 211, 200/213, 302.1, 83 R, 83 Q, 83 N, 83 A, 83 B, 83 W; 340/626; 91/1; 92/5 R

[56] References Cited

U.S. PATENT DOCUMENTS

| | | |
|---|---|---|
| 2,796,963 | 6/1957 | Harter . |
| 2,899,953 | 8/1959 | Morris . |
| 3,521,652 | 7/1970 | Reeks . |
| 3,527,328 | 9/1970 | Maurice . |
| 3,876,028 | 4/1975 | Asano et al. . |
| 4,038,506 | 7/1977 | Filip .................. 200/83 B |
| 4,148,230 | 4/1979 | Kodama et al. . |
| 4,283,970 | 8/1981 | Vukovich . |
| 4,291,860 | 9/1981 | Bauer . |
| 4,320,781 | 3/1982 | Bouvet . |
| 4,345,489 | 8/1982 | Muller et al. . |
| 4,352,372 | 10/1982 | Kolze . |
| 4,390,158 | 6/1983 | Lang . |
| 4,393,994 | 7/1983 | Rieck . |
| 4,394,962 | 7/1983 | Wilber . |
| 4,403,741 | 9/1983 | Moriya et al. . |
| 4,411,406 | 10/1983 | Inada et al. . |
| 4,527,678 | 7/1985 | Pierce et al. . |
| 4,584,906 | 4/1986 | Nagaoka et al. . |
| 4,636,598 | 1/1987 | Suzuki .............................. 200/83 N |
| 4,637,281 | 1/1987 | Vanselous . |
| 4,644,116 | 2/1987 | Miyakawa ..................... 200/83 R |
| 4,667,540 | 5/1987 | Yagi . |
| 4,711,138 | 12/1987 | Miura et al. . |

FOREIGN PATENT DOCUMENTS 0016519  2/1980  European Pat. Off. .......... 200/83 N Primary Examiner—Gerald P. Tolin
Attorney, Agent, or Firm—Mark P. Calcaterra

[57] ABSTRACT

A fluid-actuated pressure switch for a four-speed automatic transmission system having a diaphragm to prevent fluid contamination of the electrical switch contacts and features a leakage path which eliminates air trapped within the fluid.

3 Claims, 97 Drawing Sheets

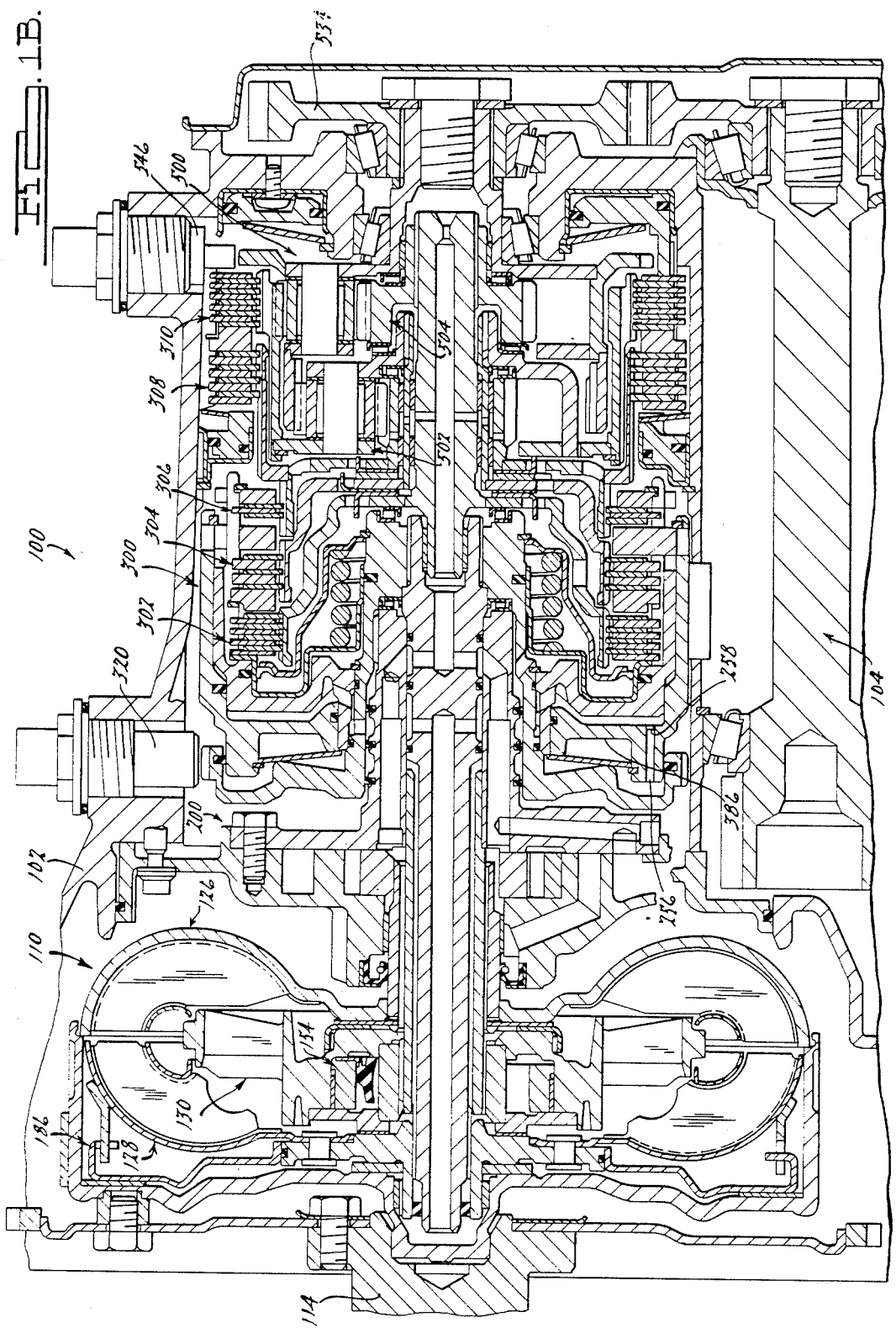

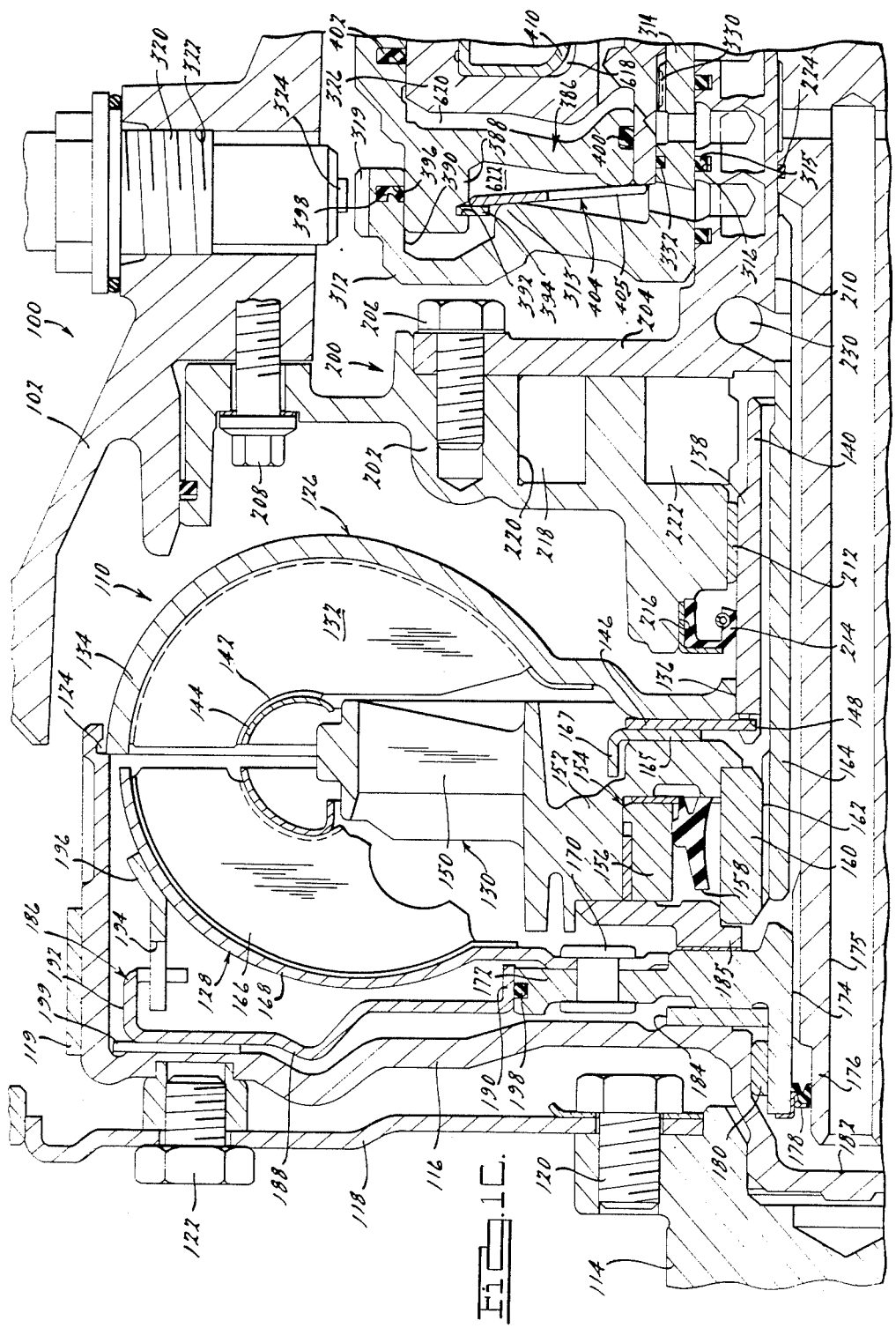

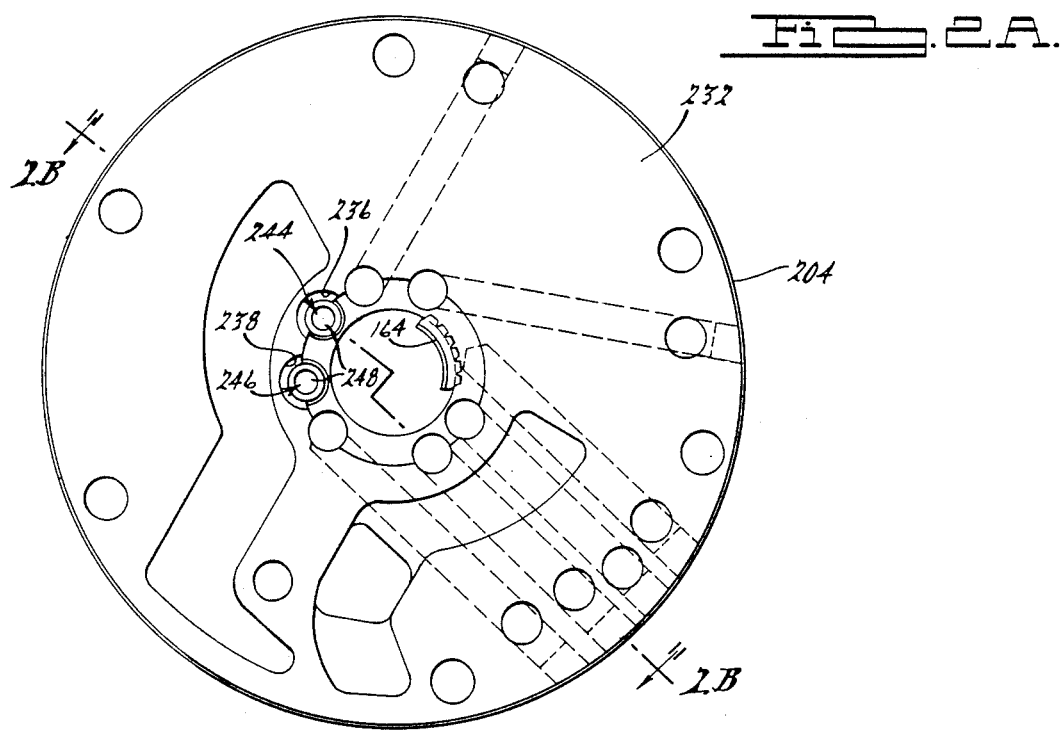
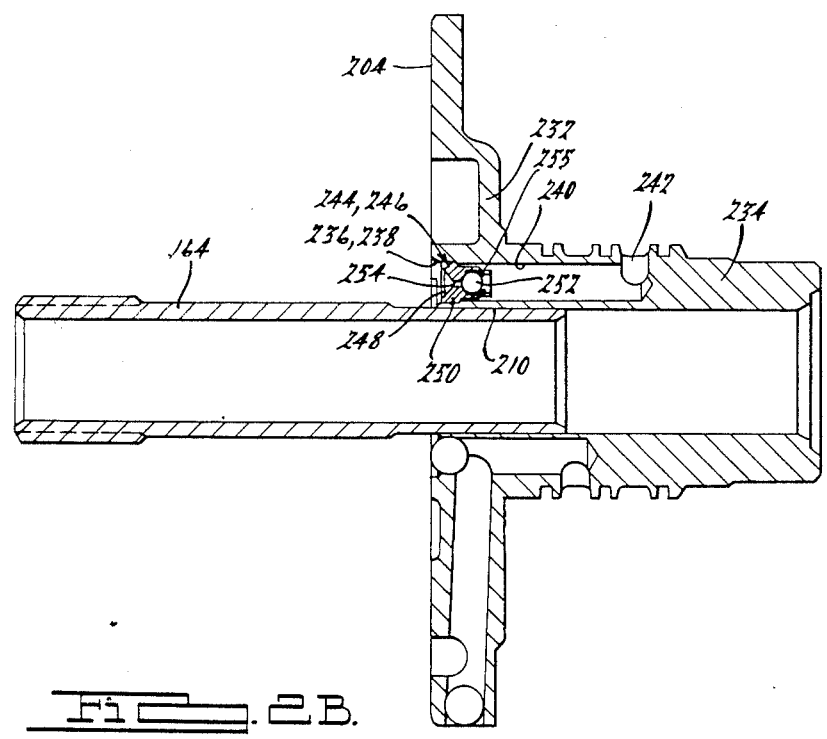

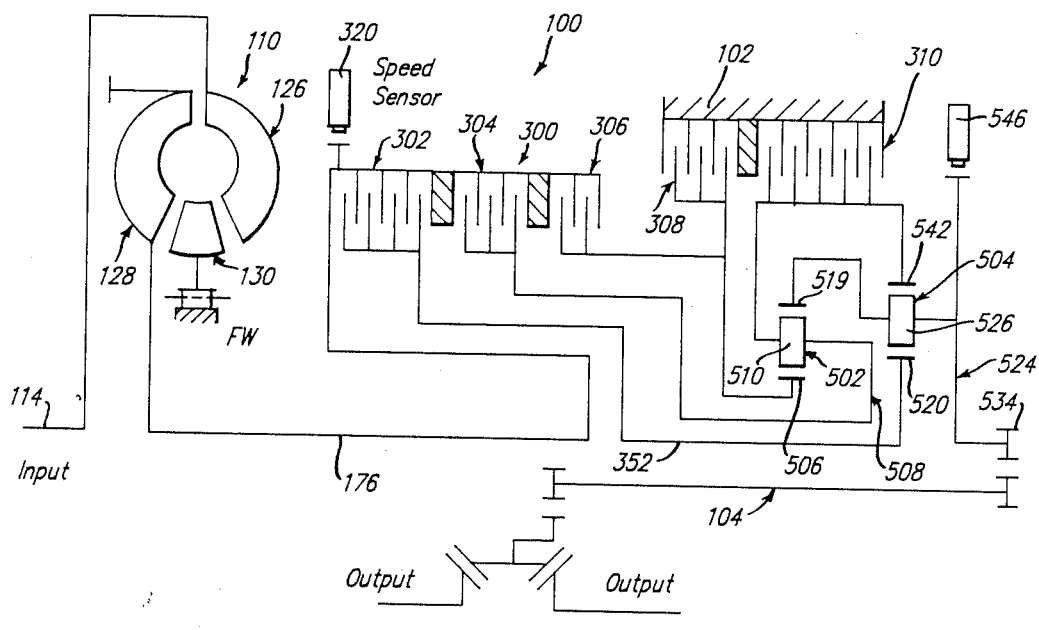
FIG. 1E.
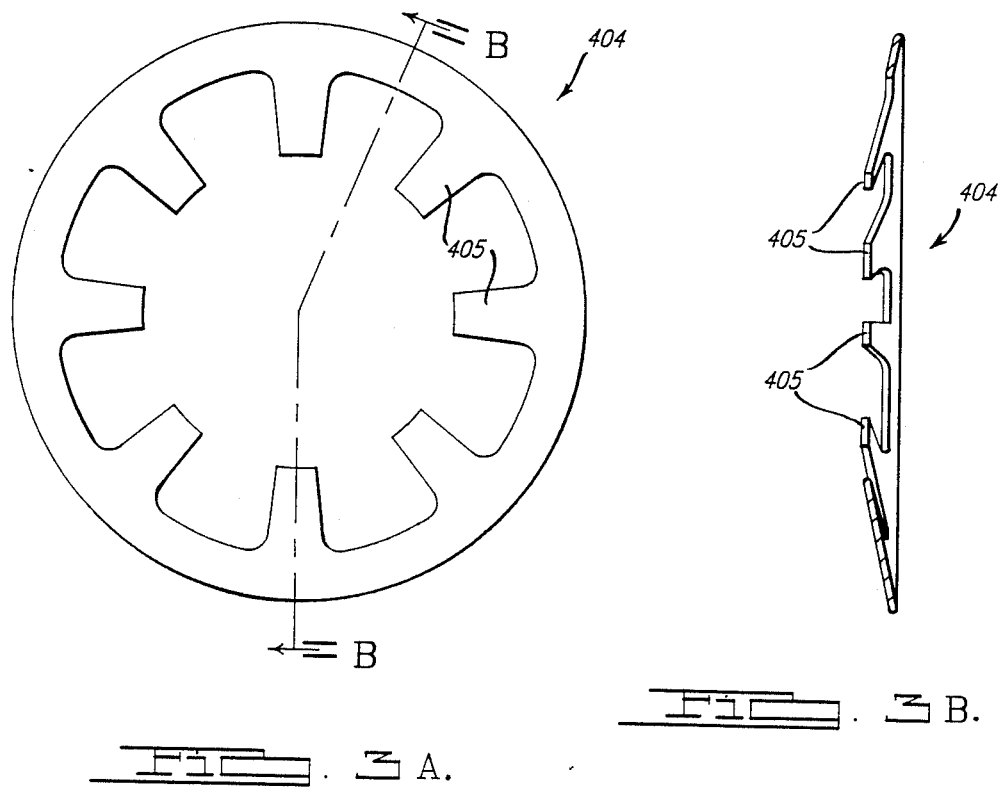
FIG. 3A.
FIG. 3B.

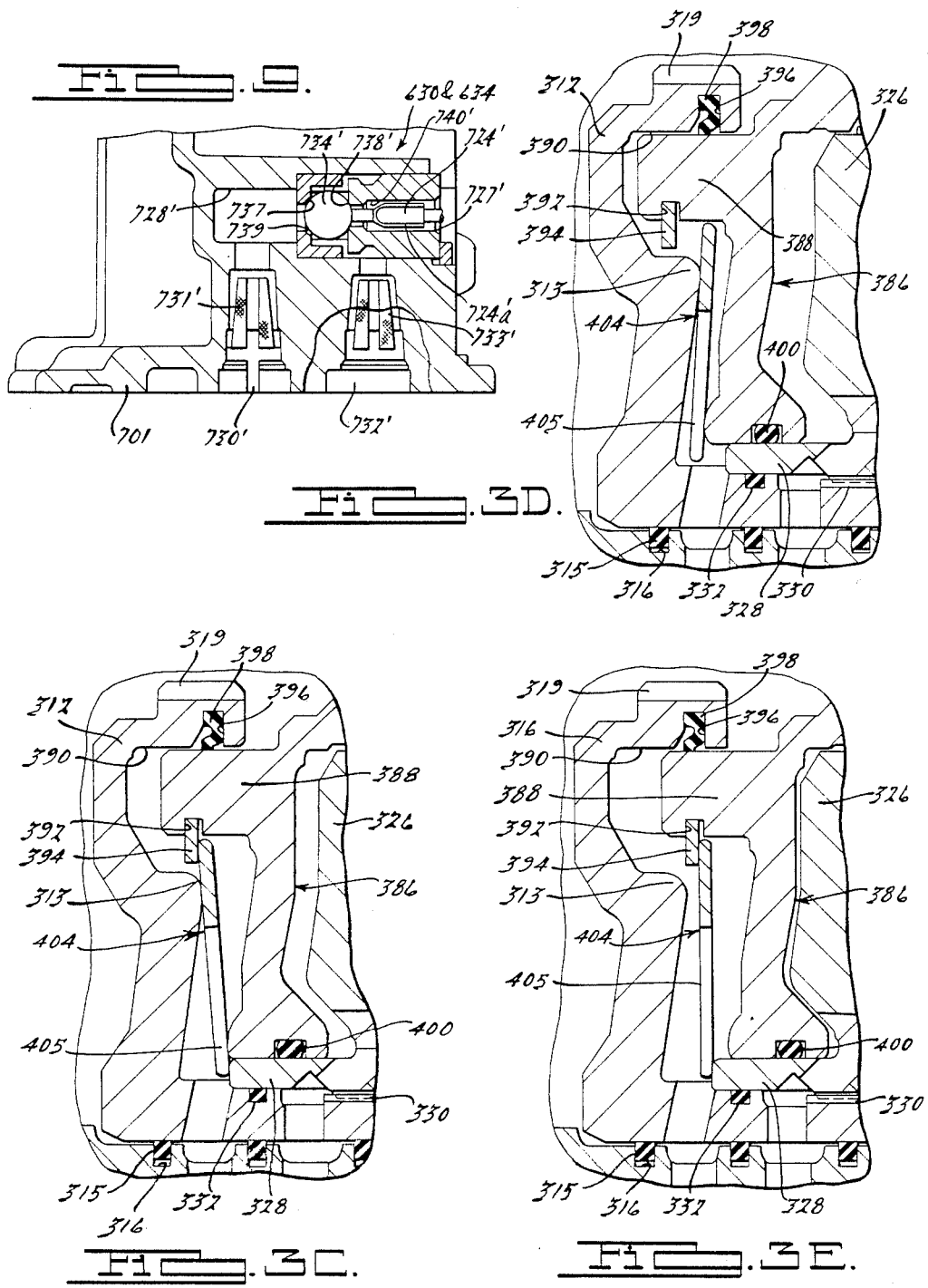

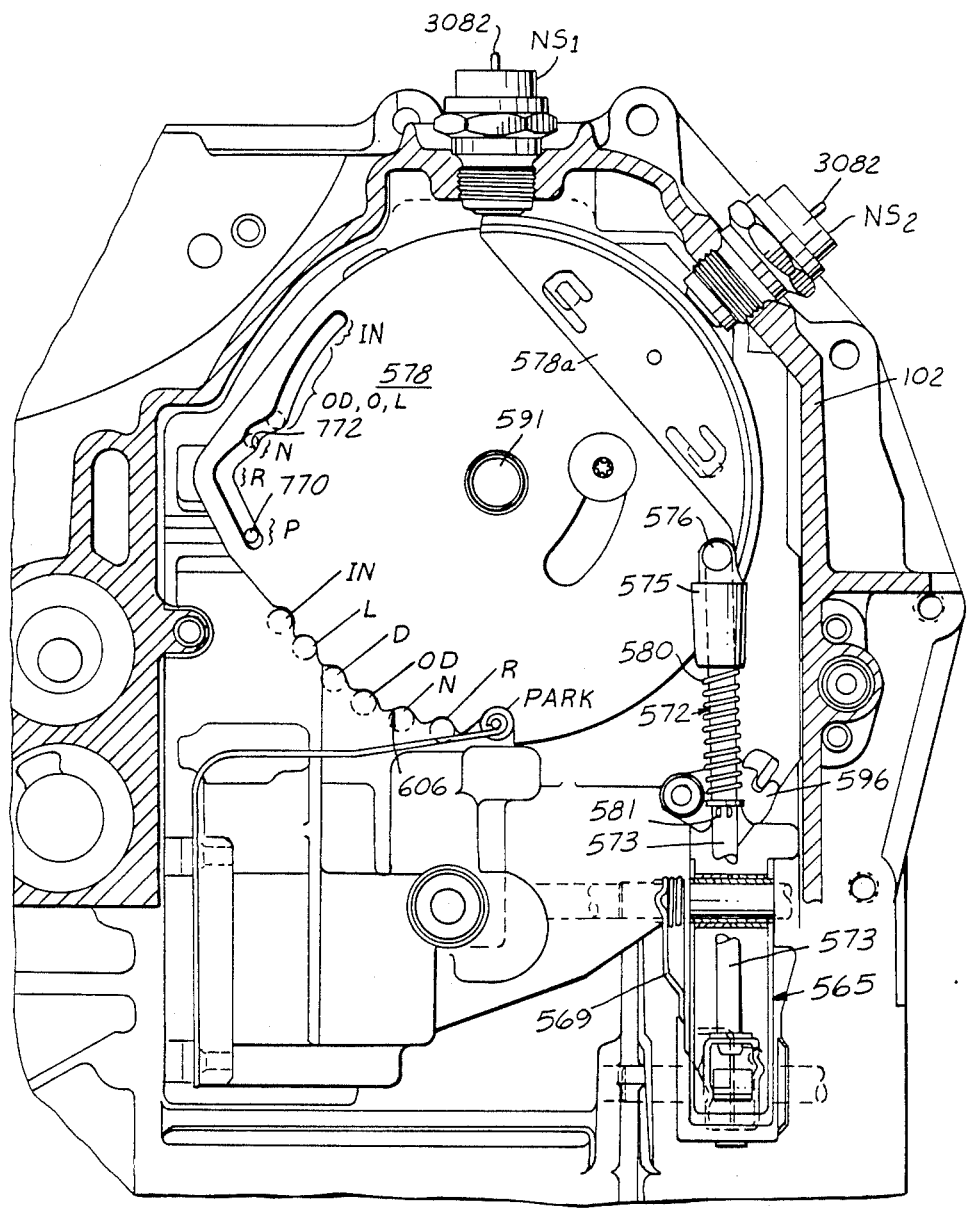

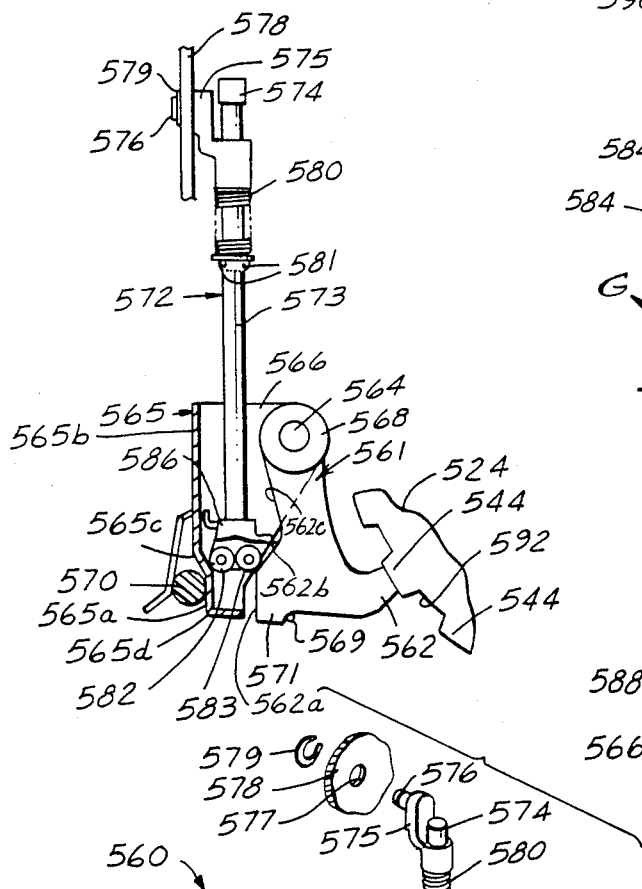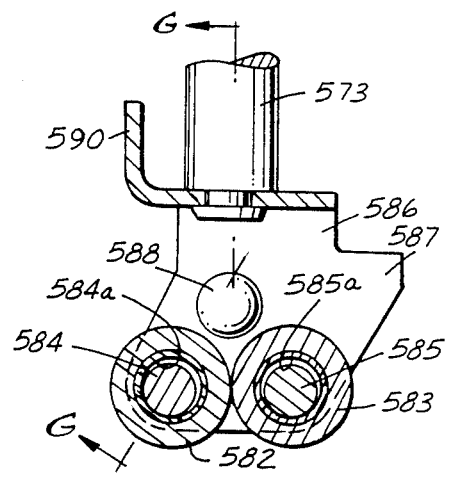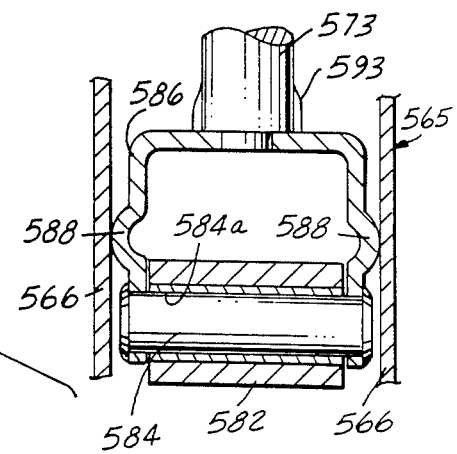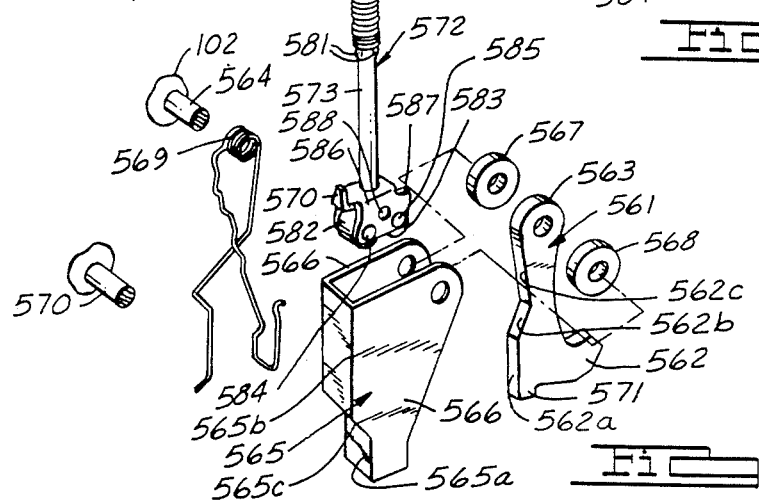

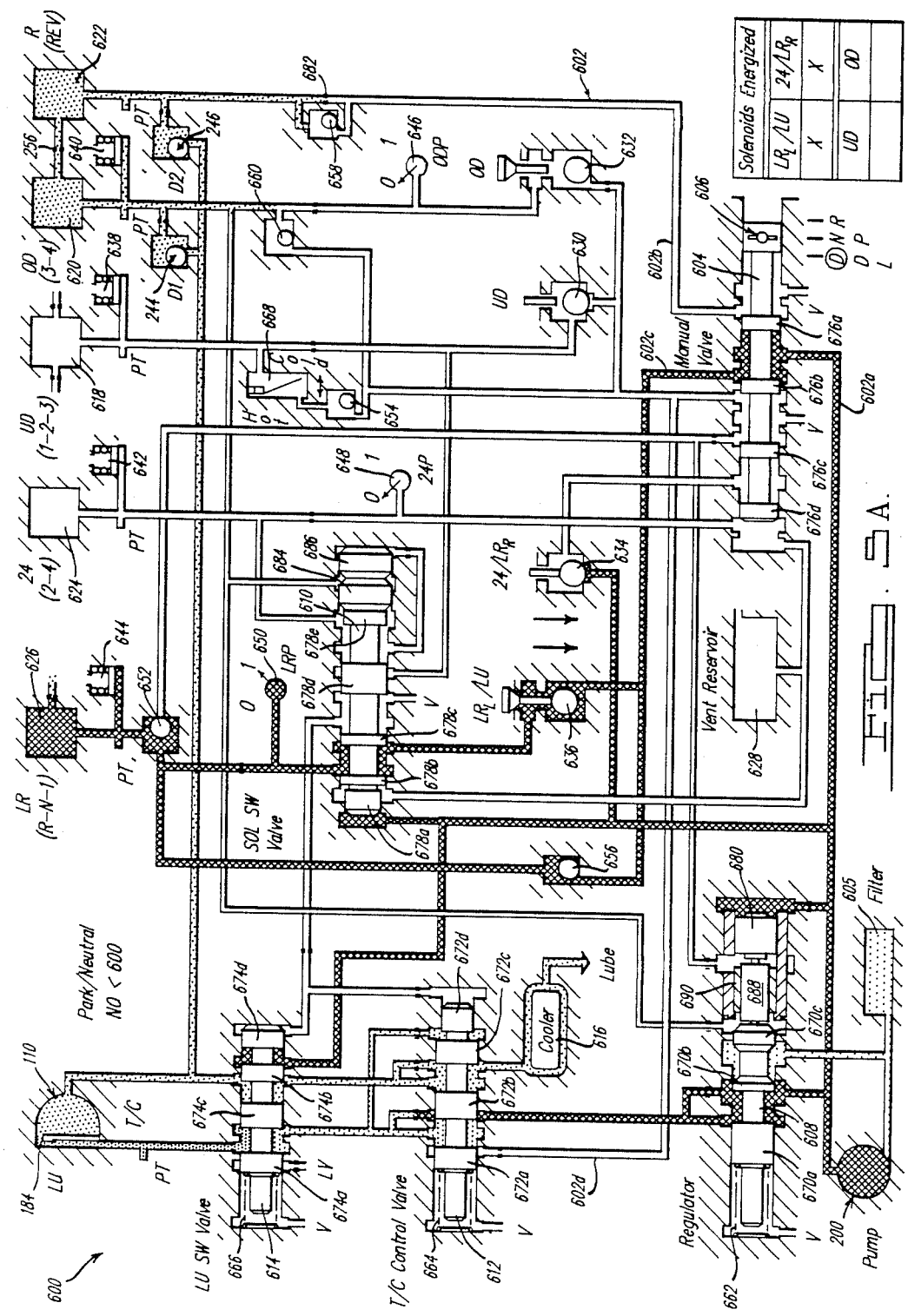

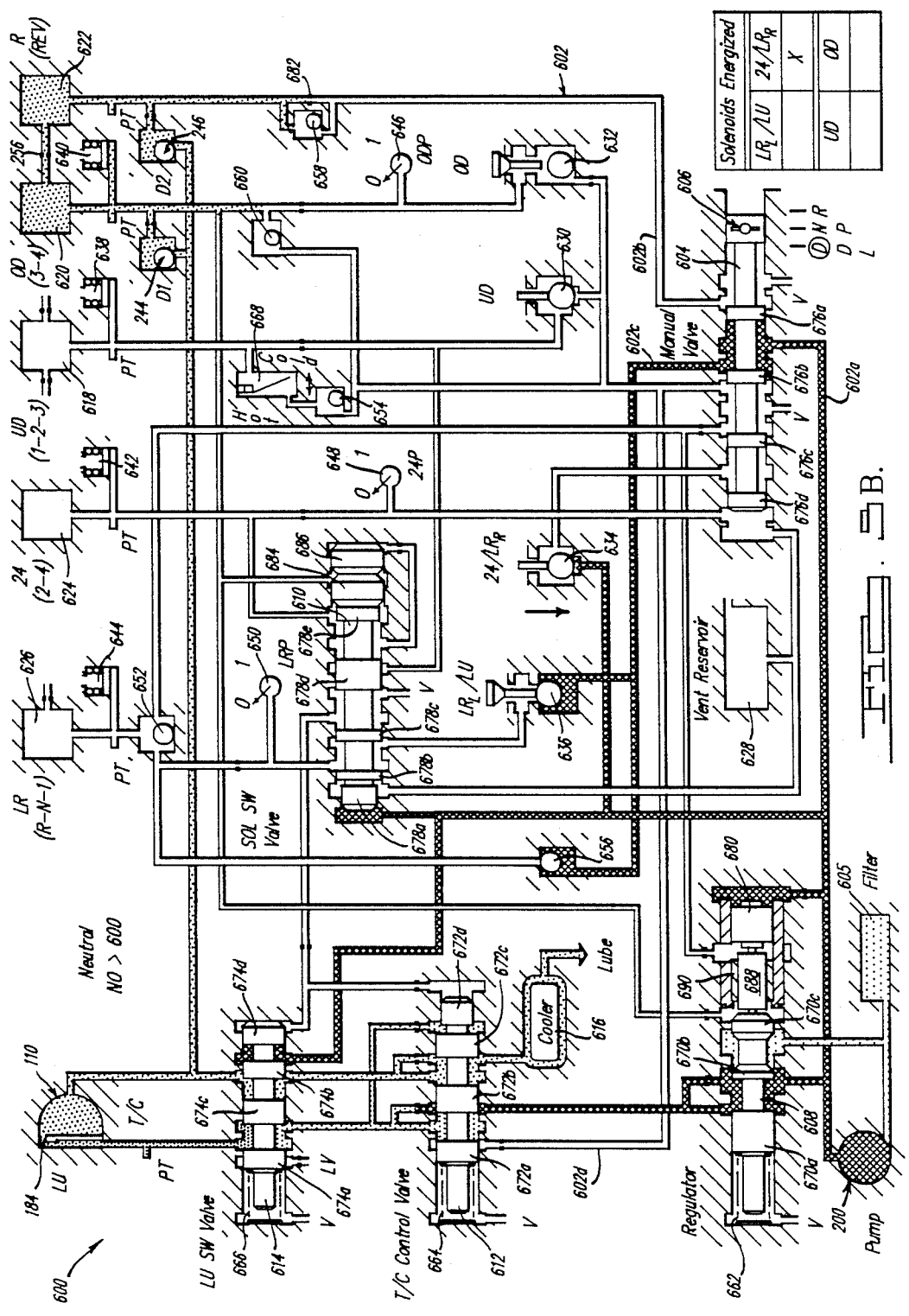

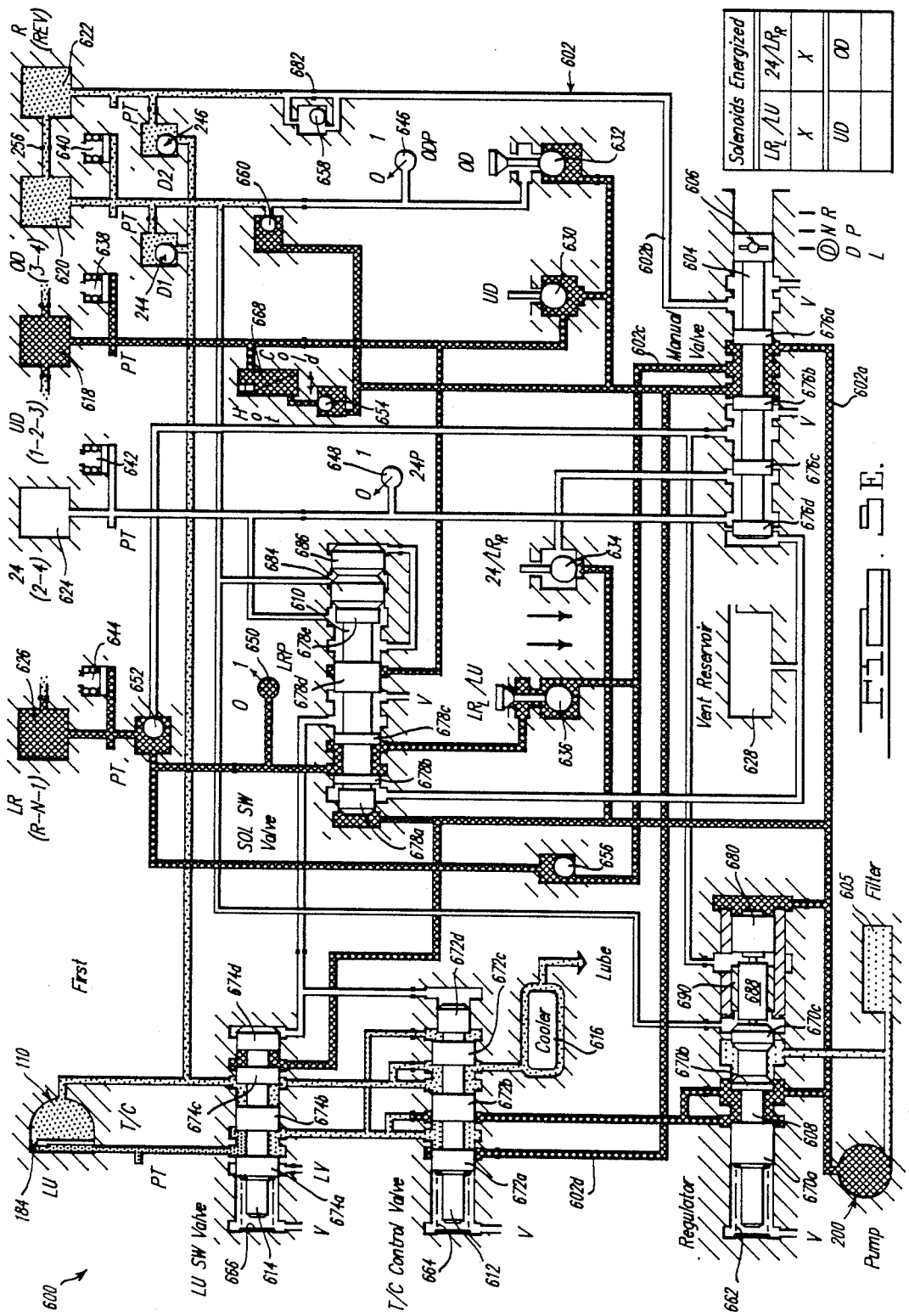

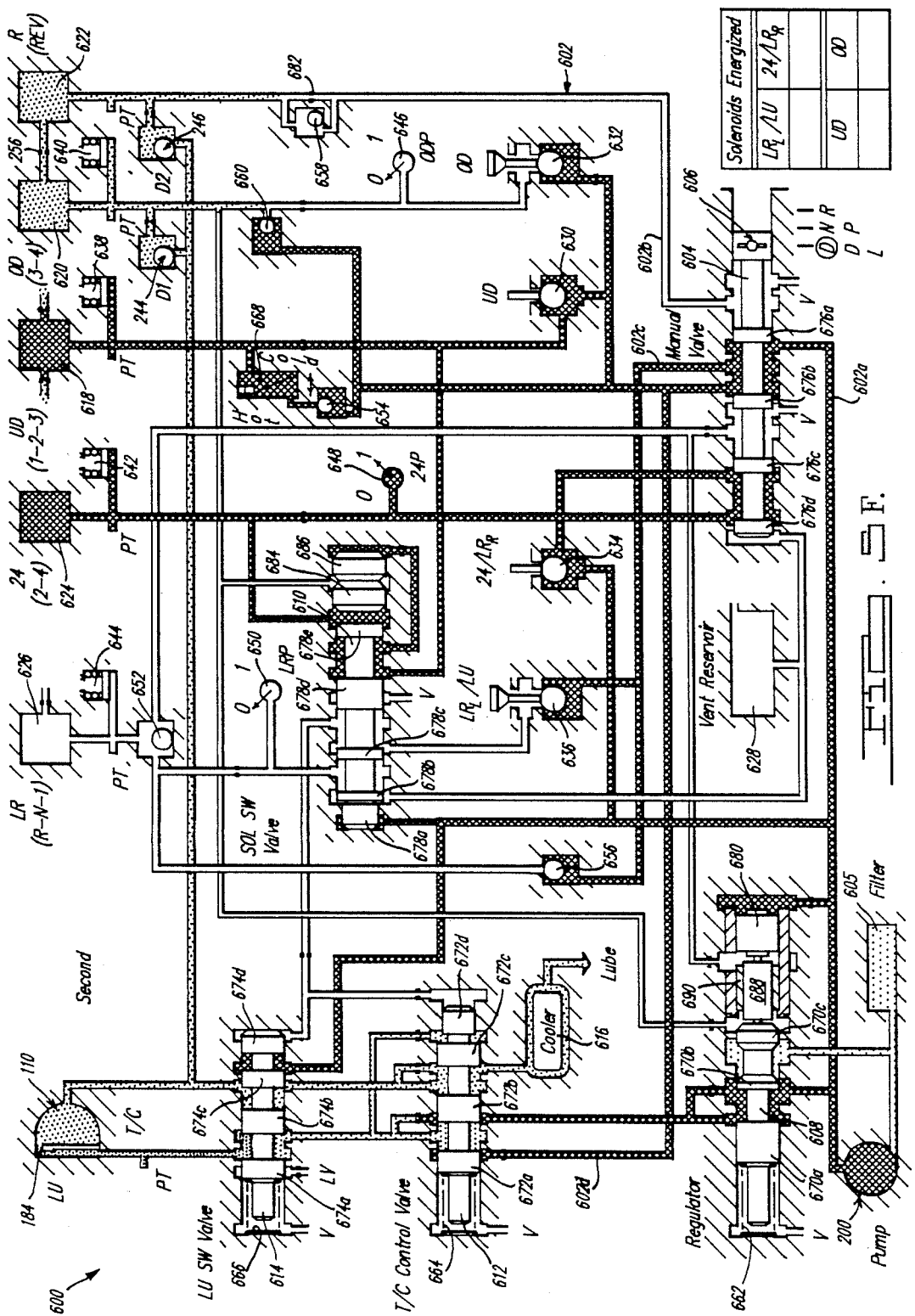

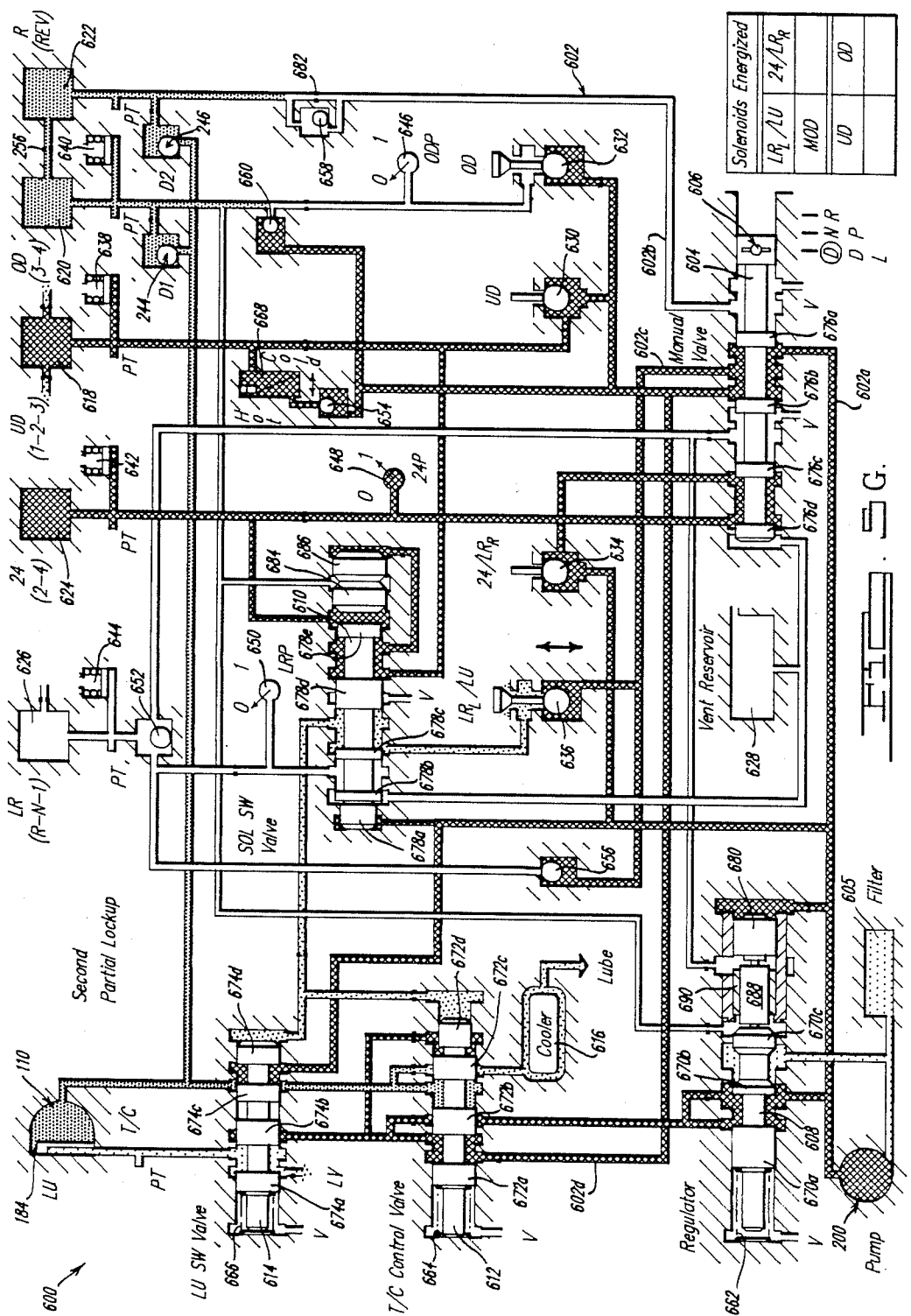

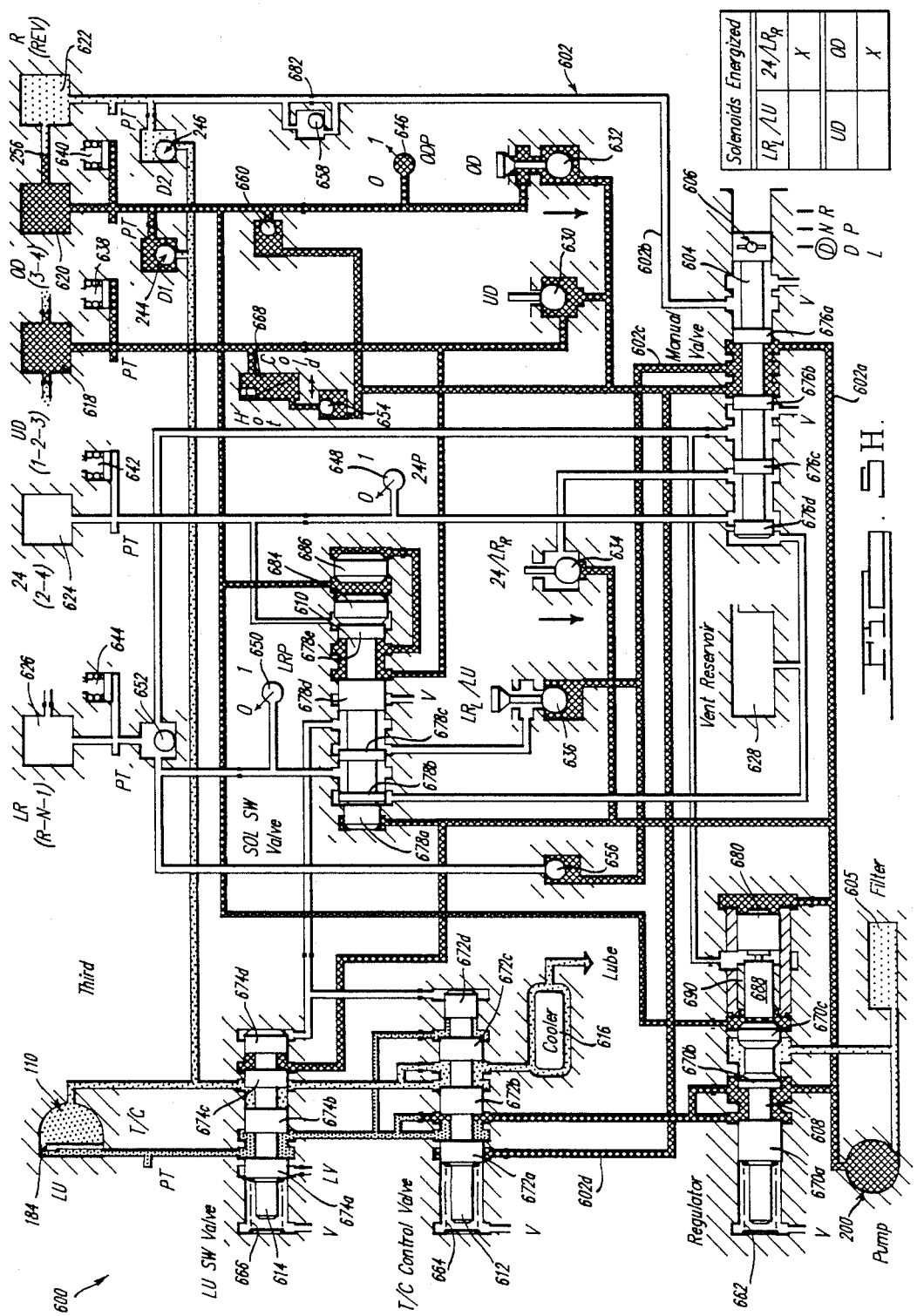

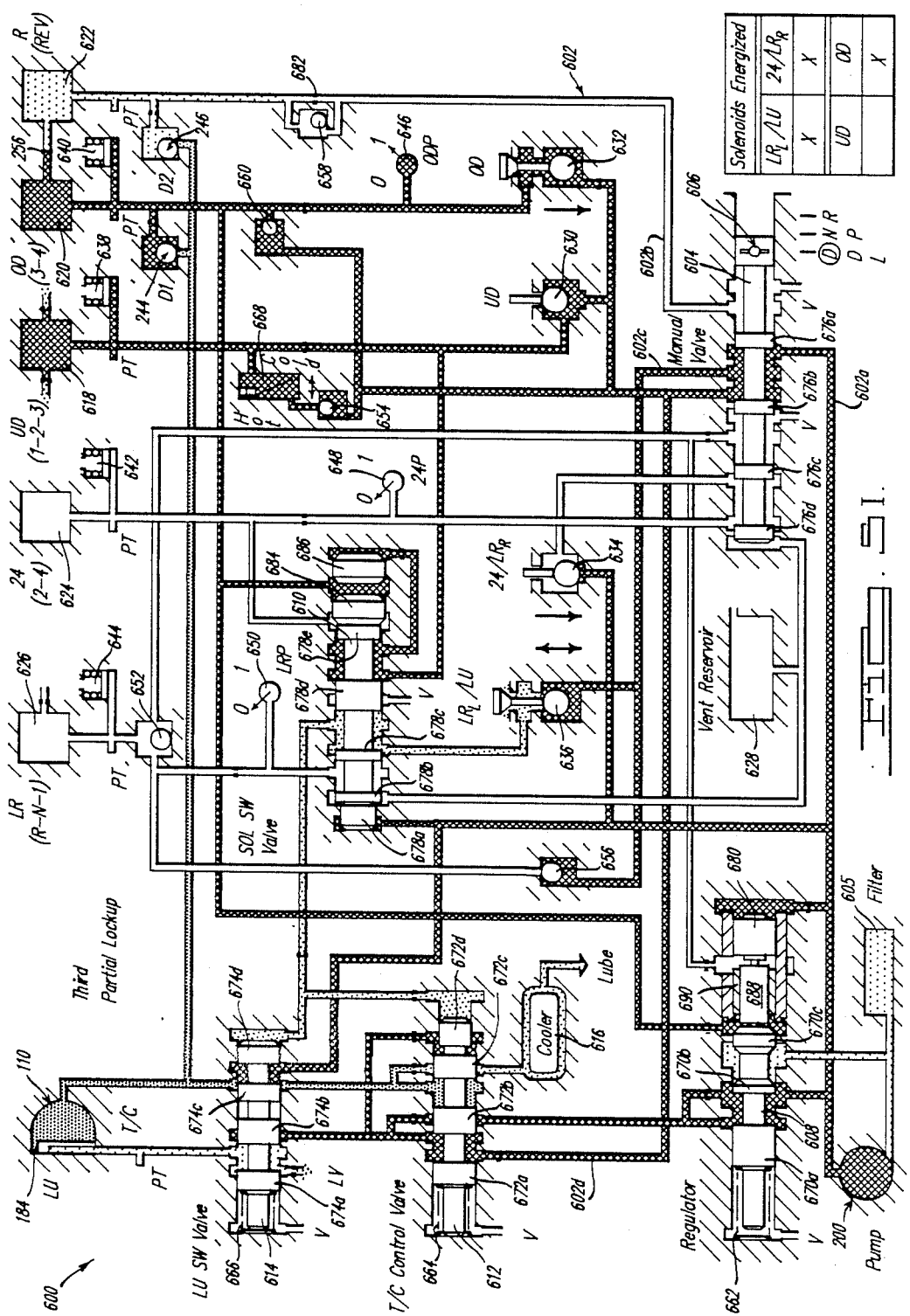

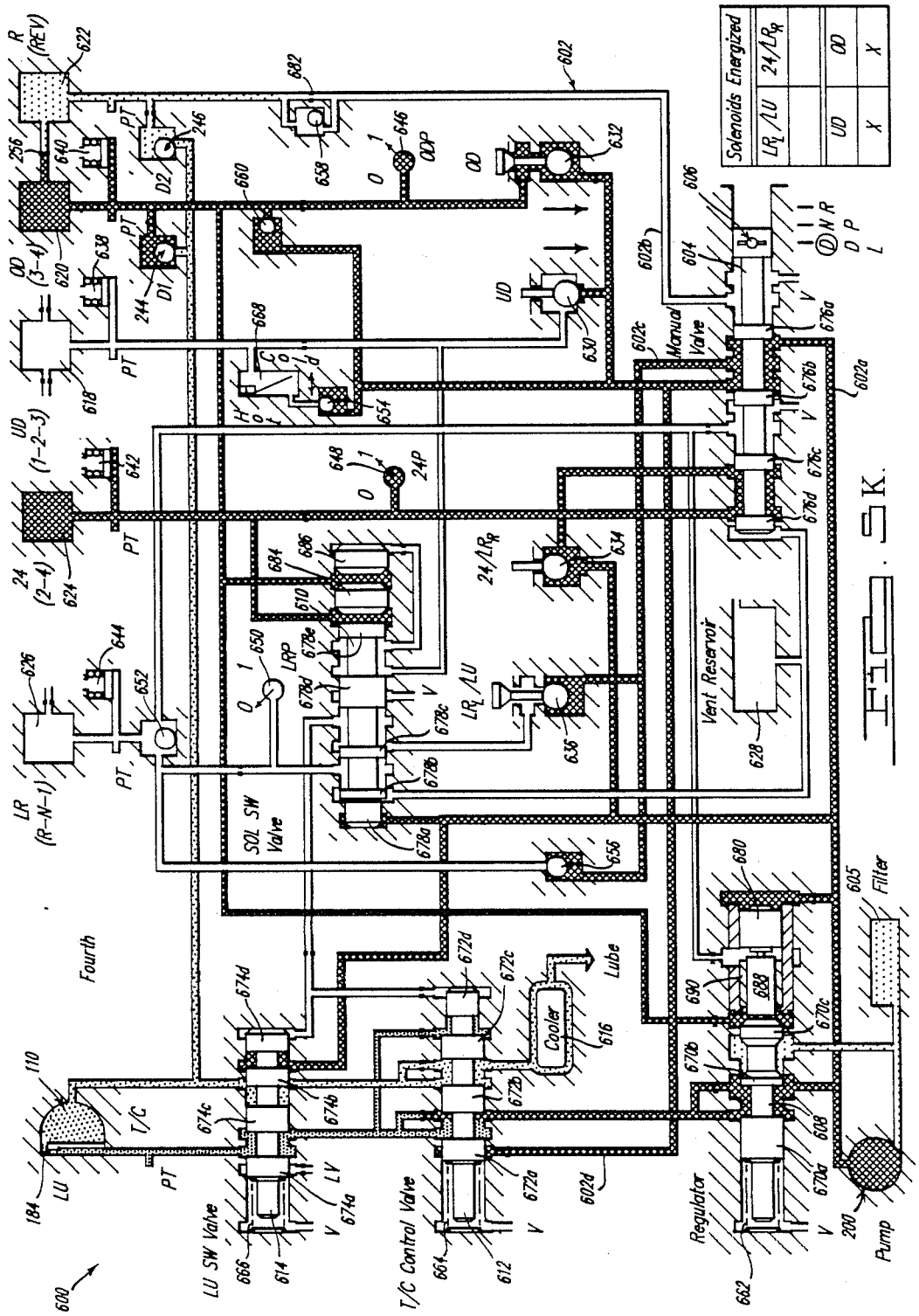

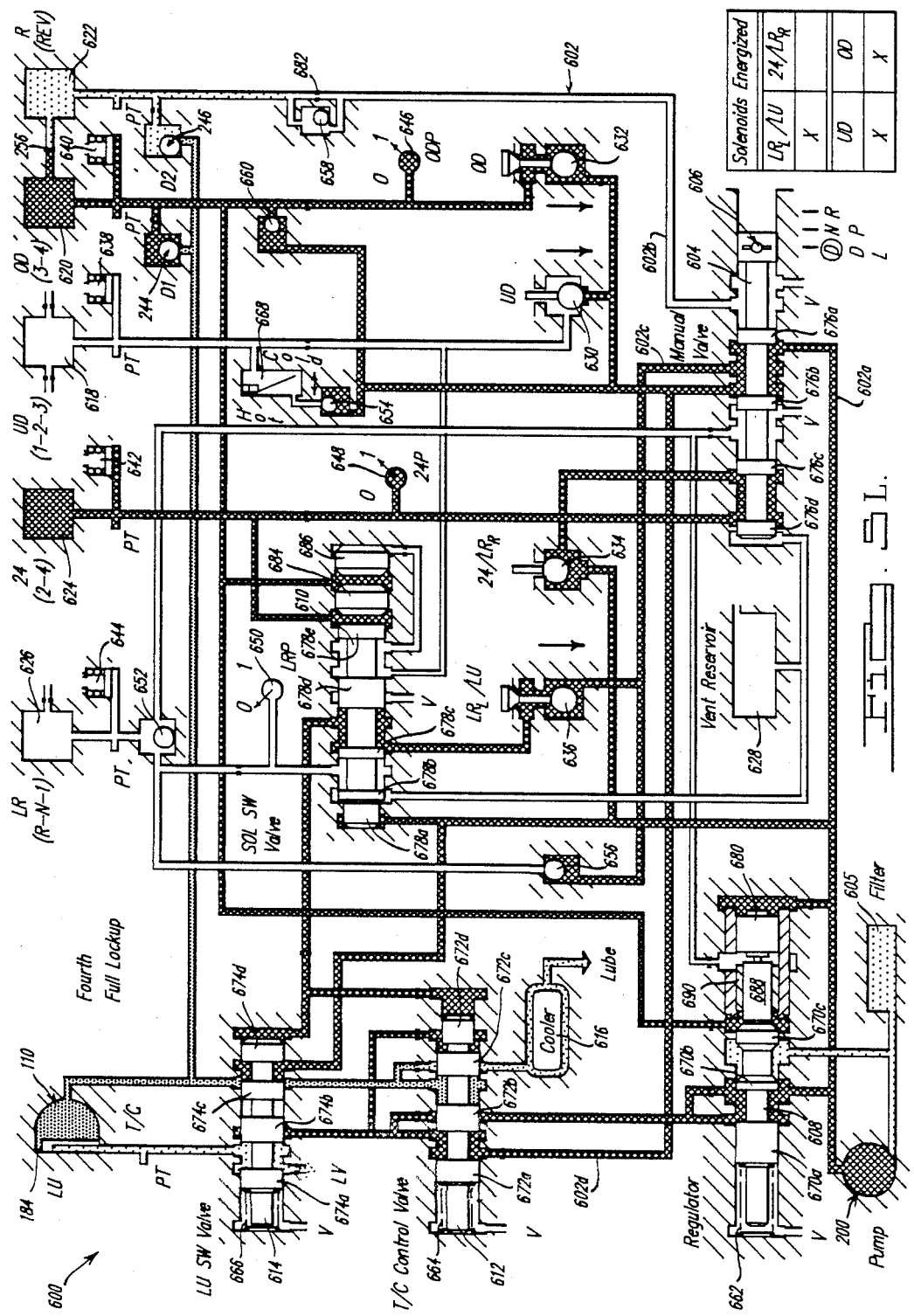

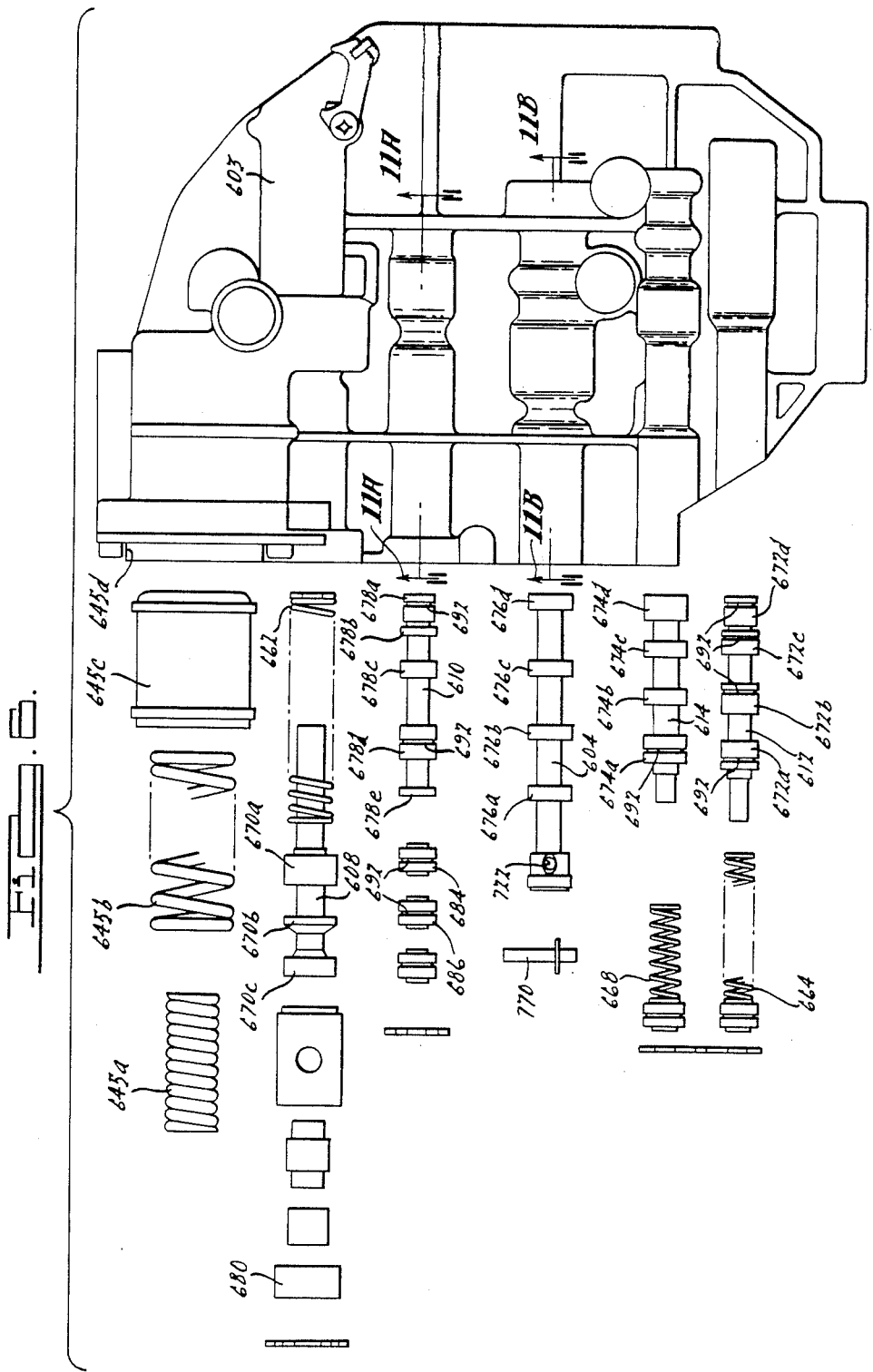

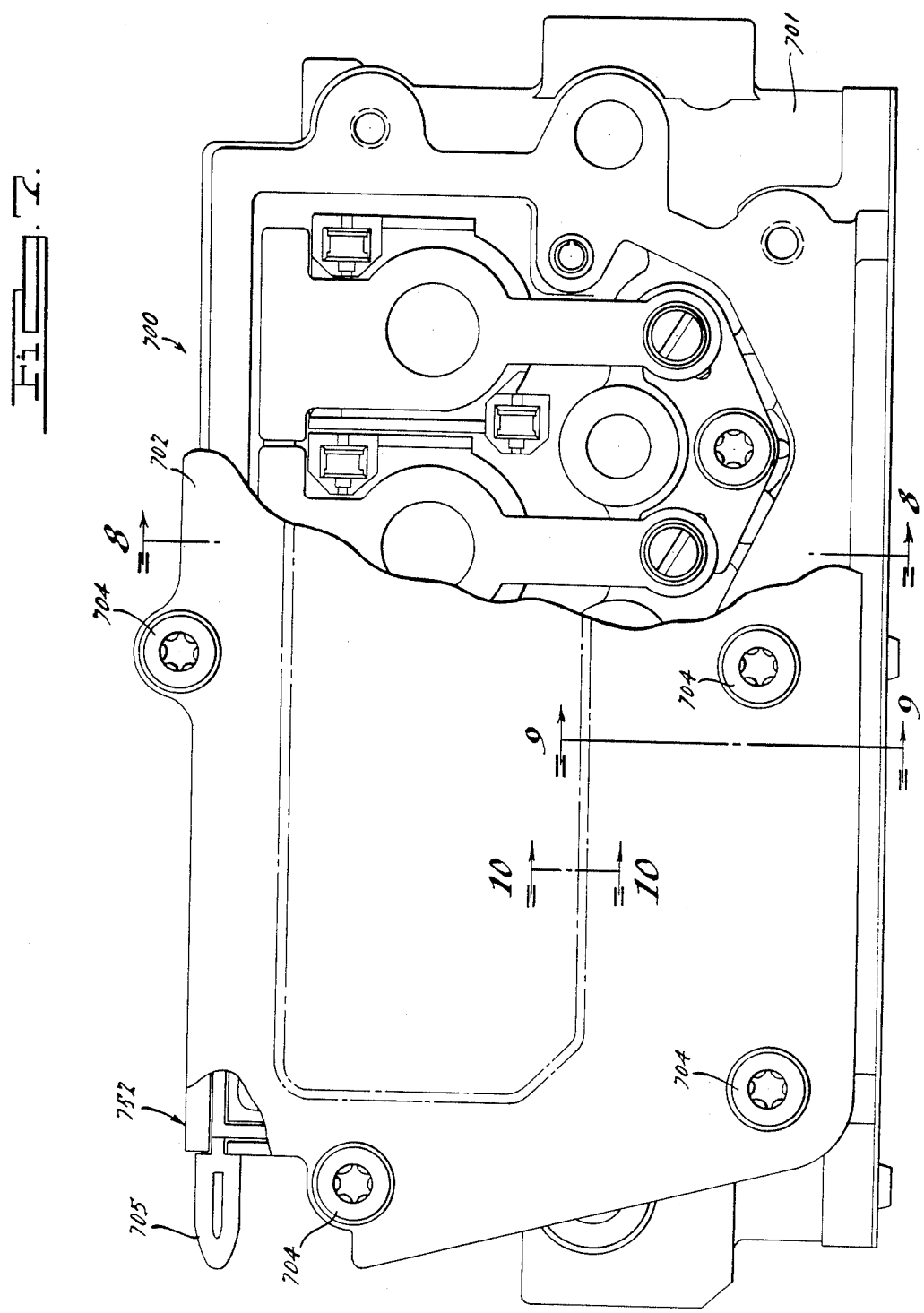

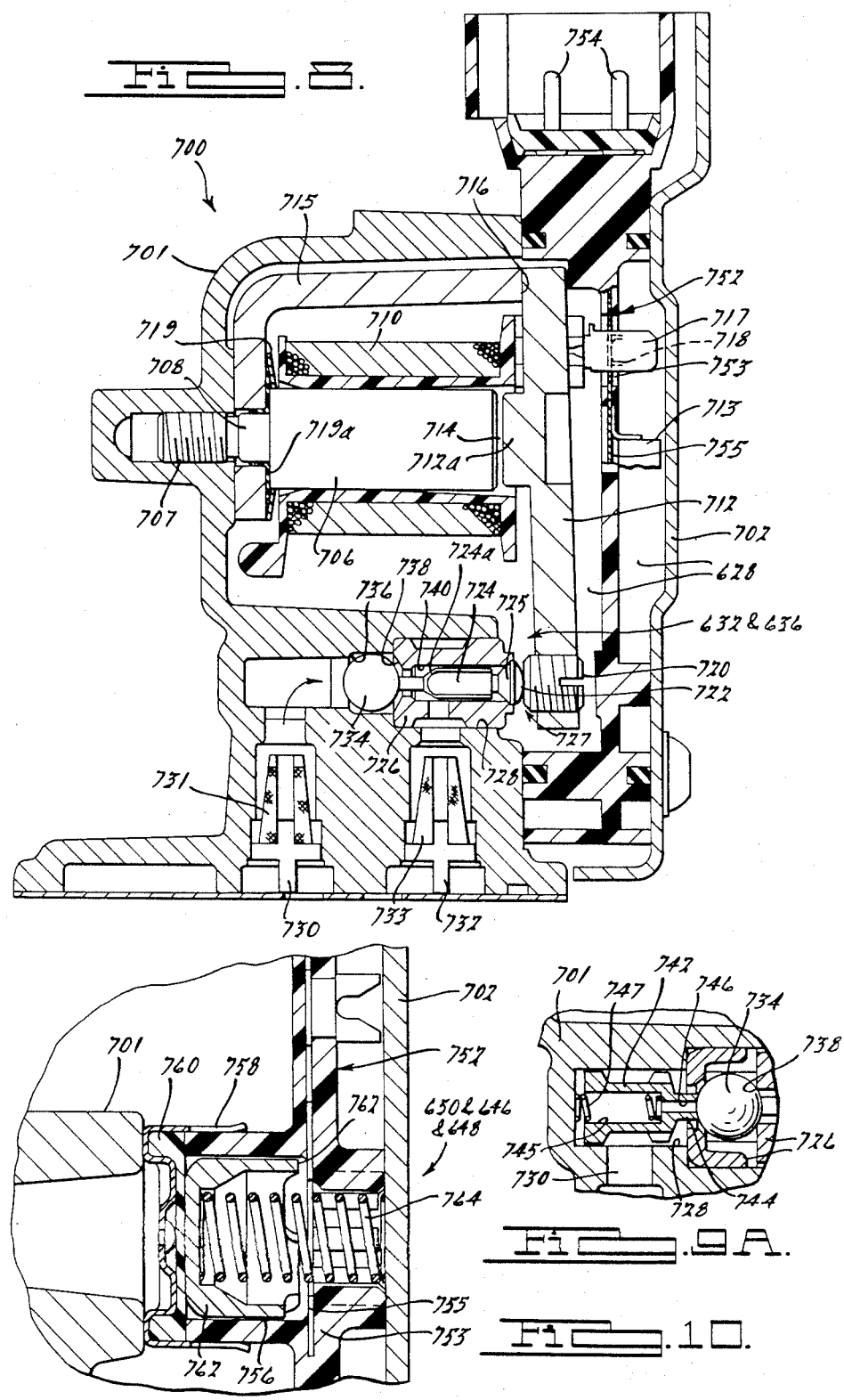

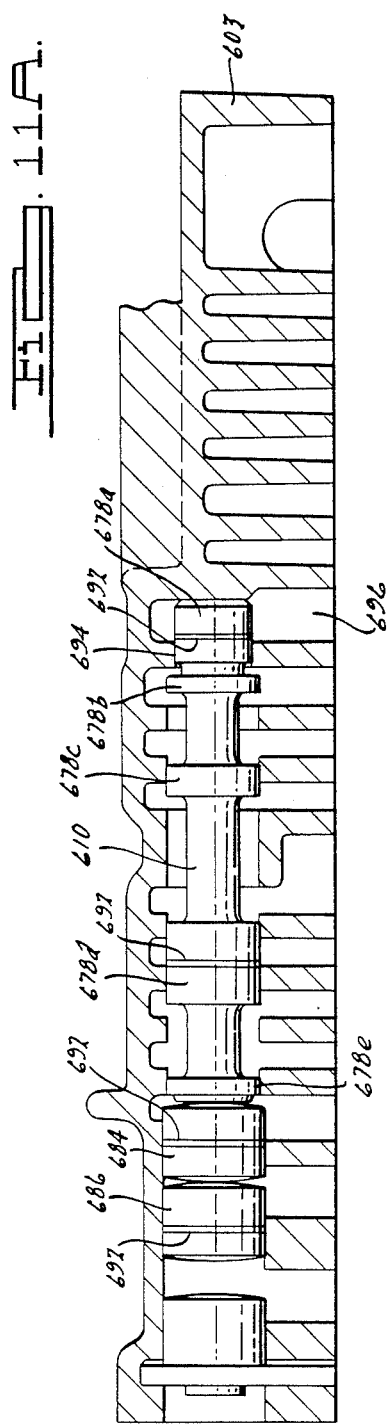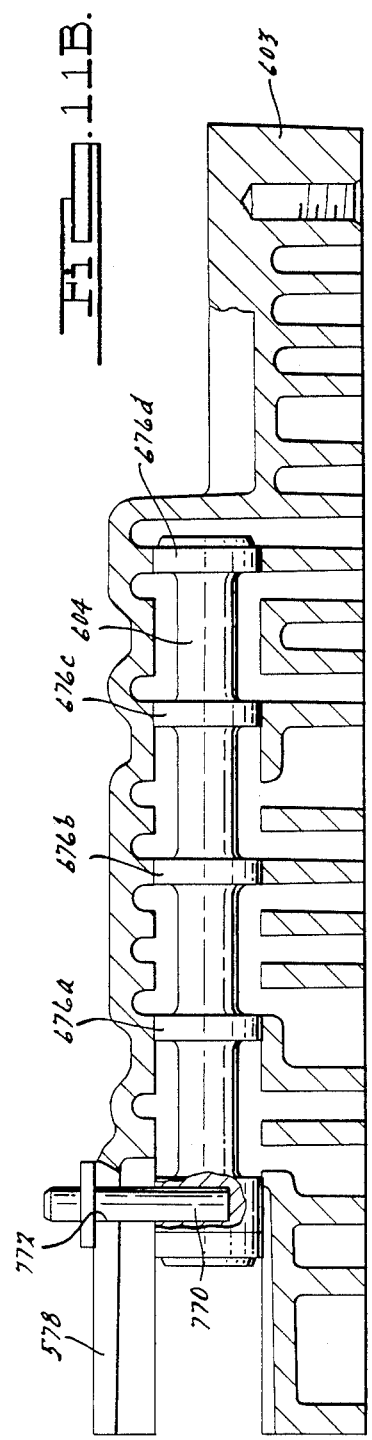

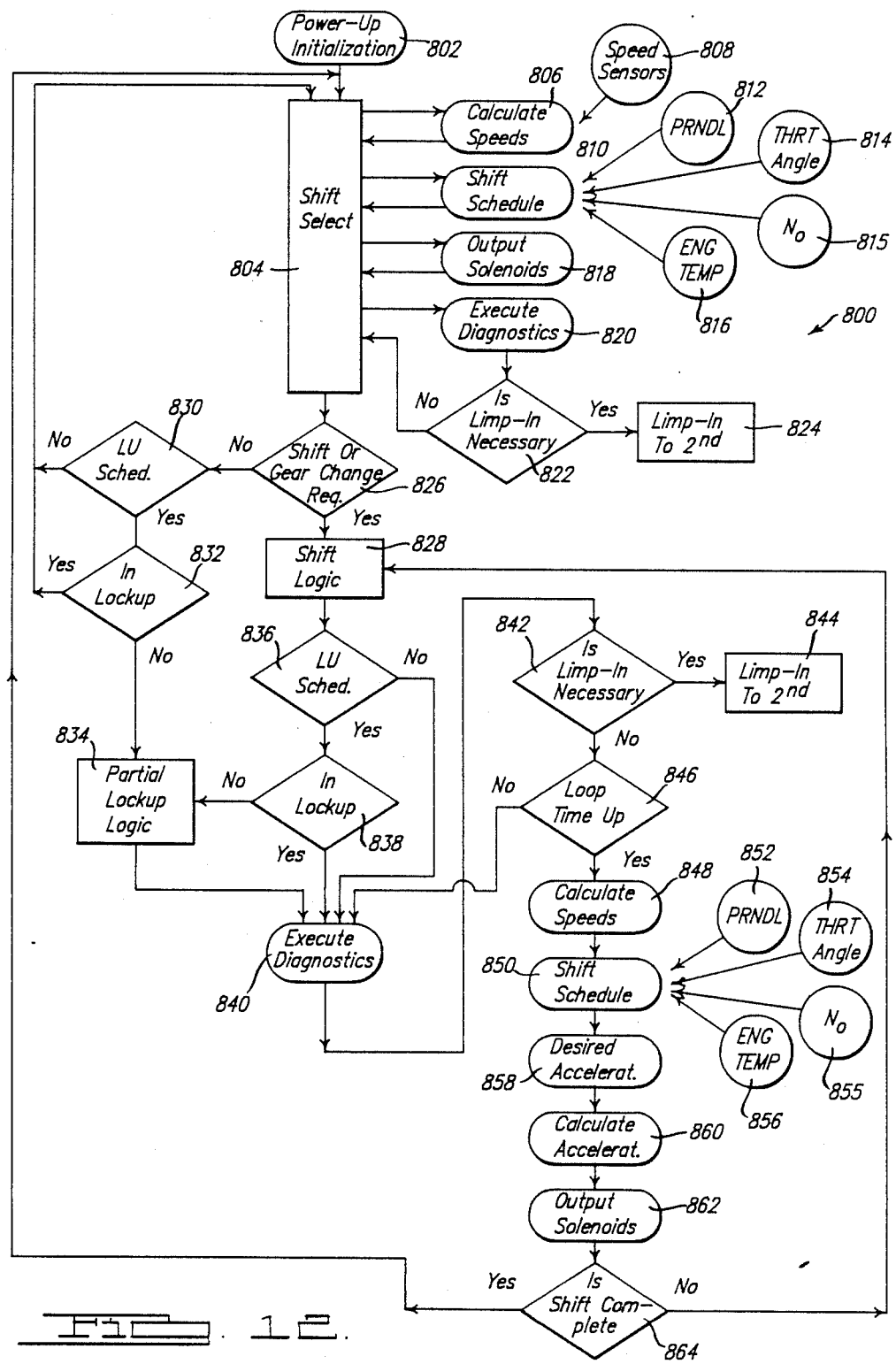

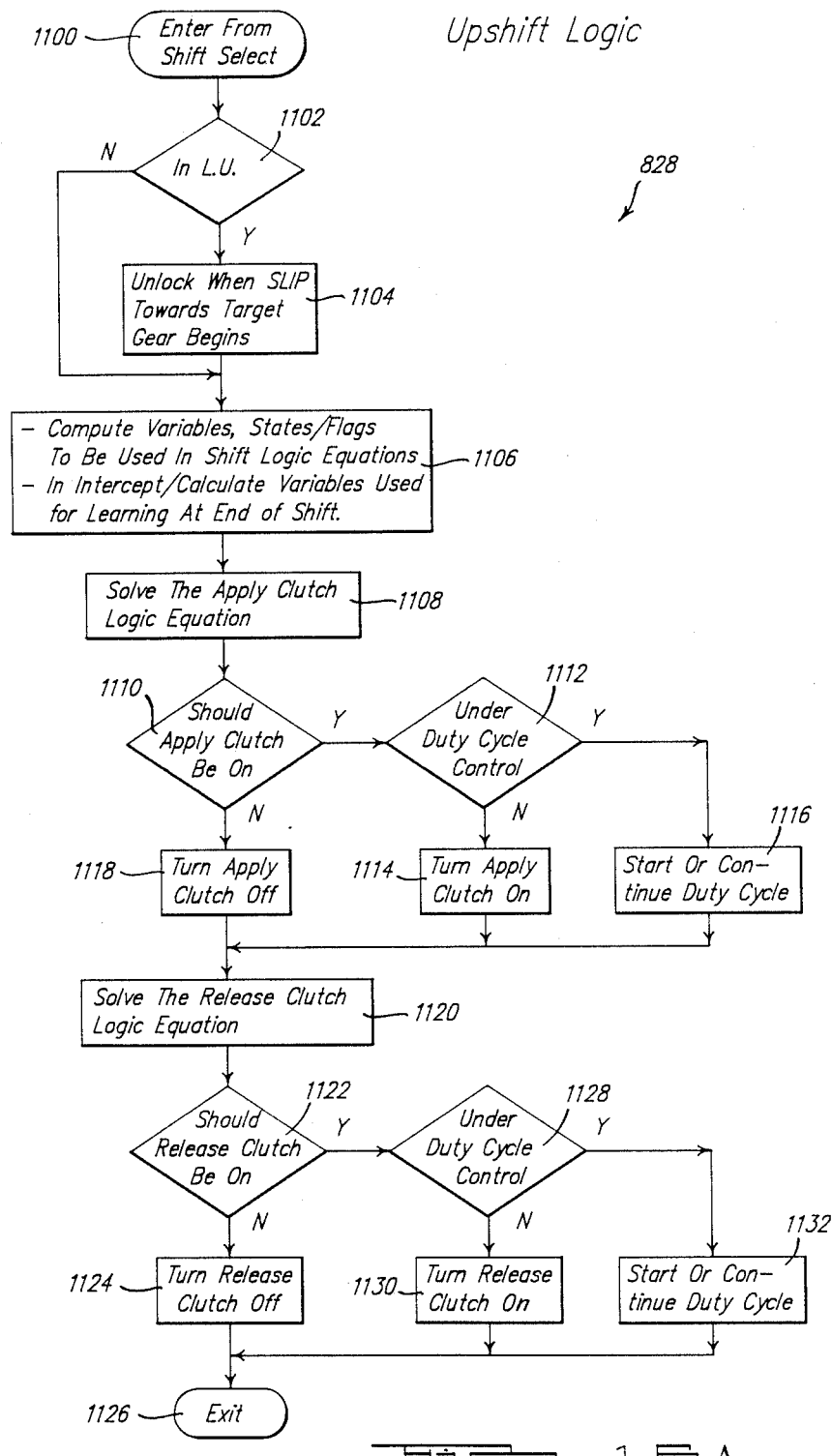

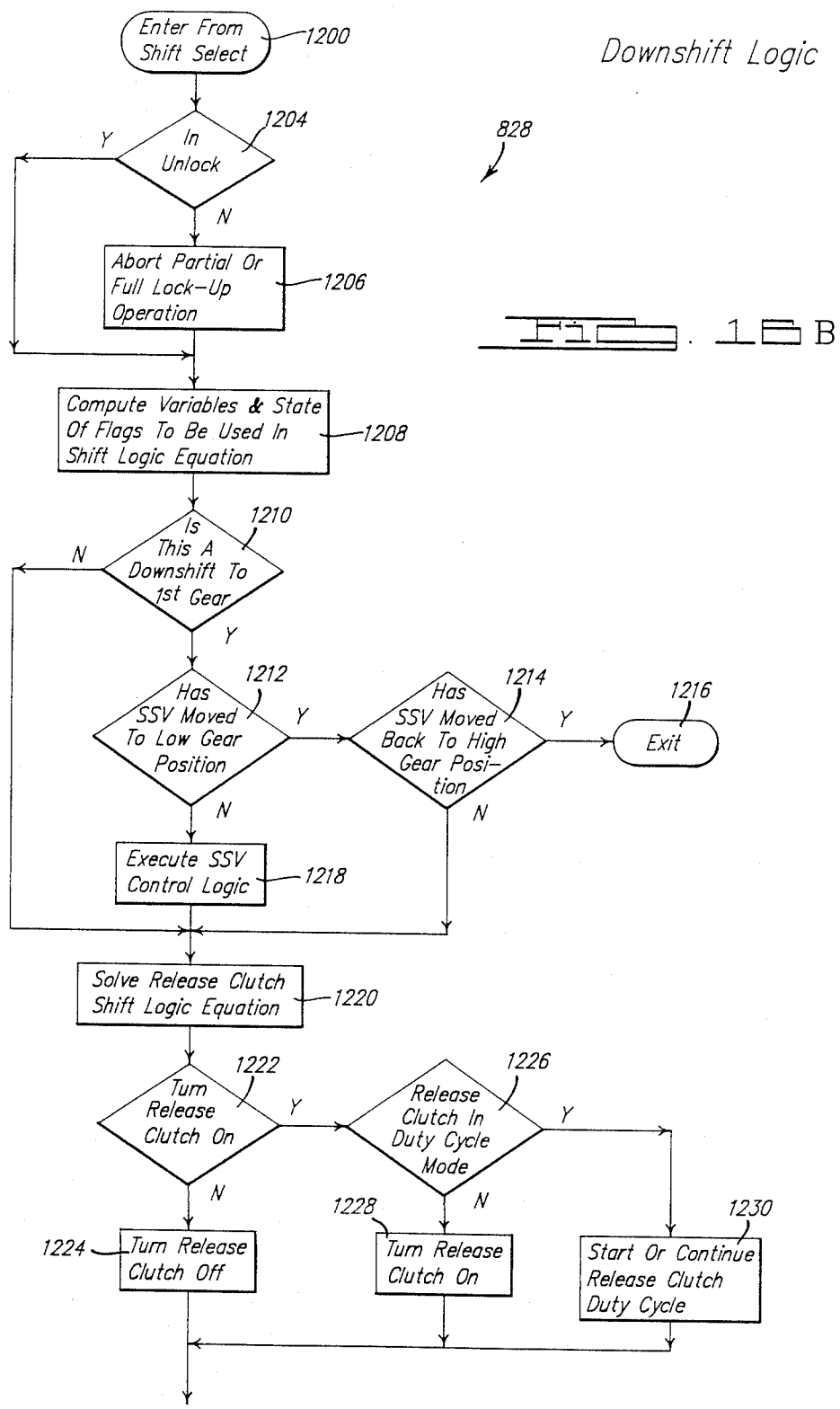

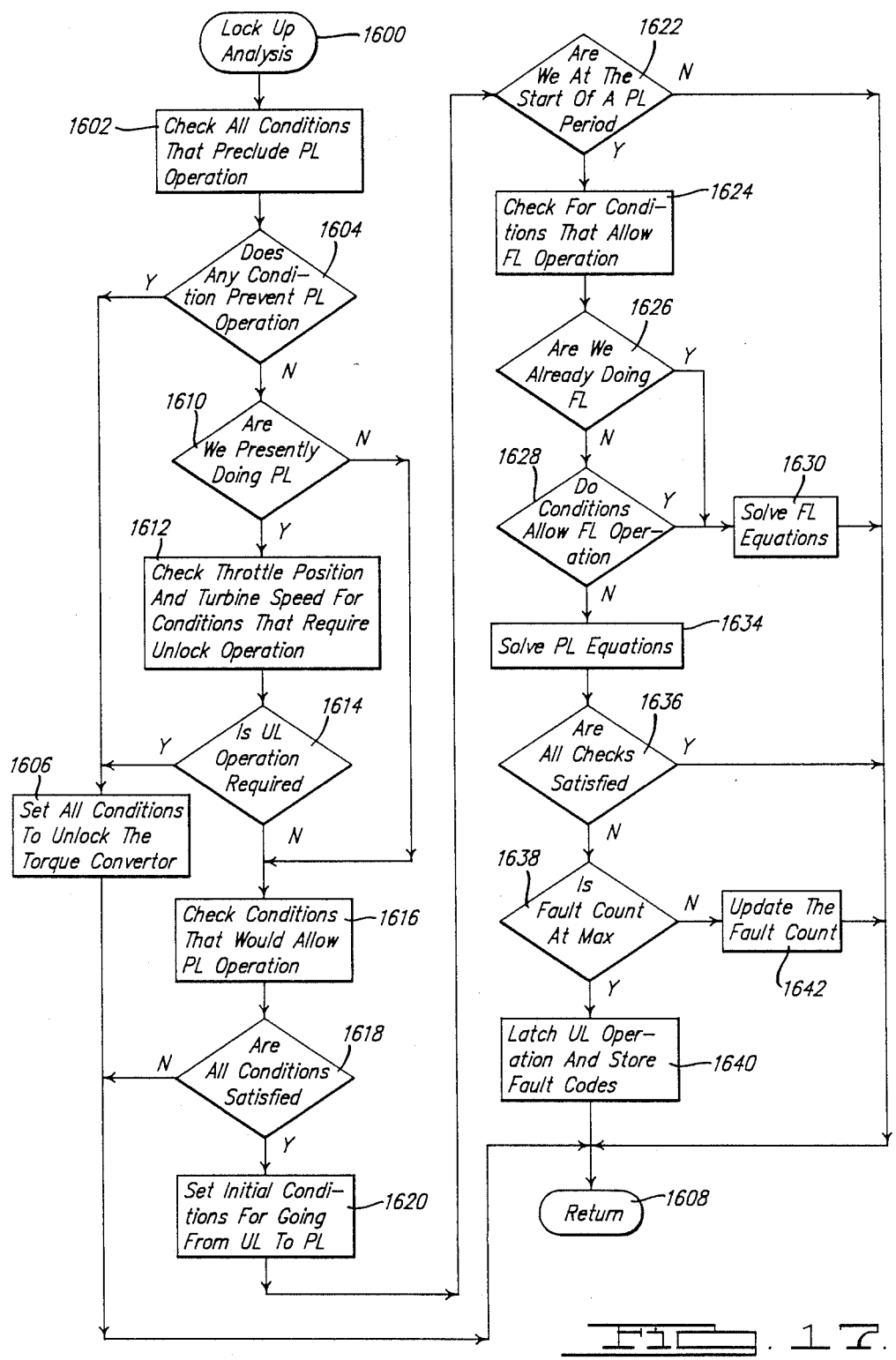

P = Park
R = Reverse
N = Neutral
Od = Overdrive
D = Drive
L = Low
$T_1, T_2$ = Temporary Codes
I = Invalid Codes

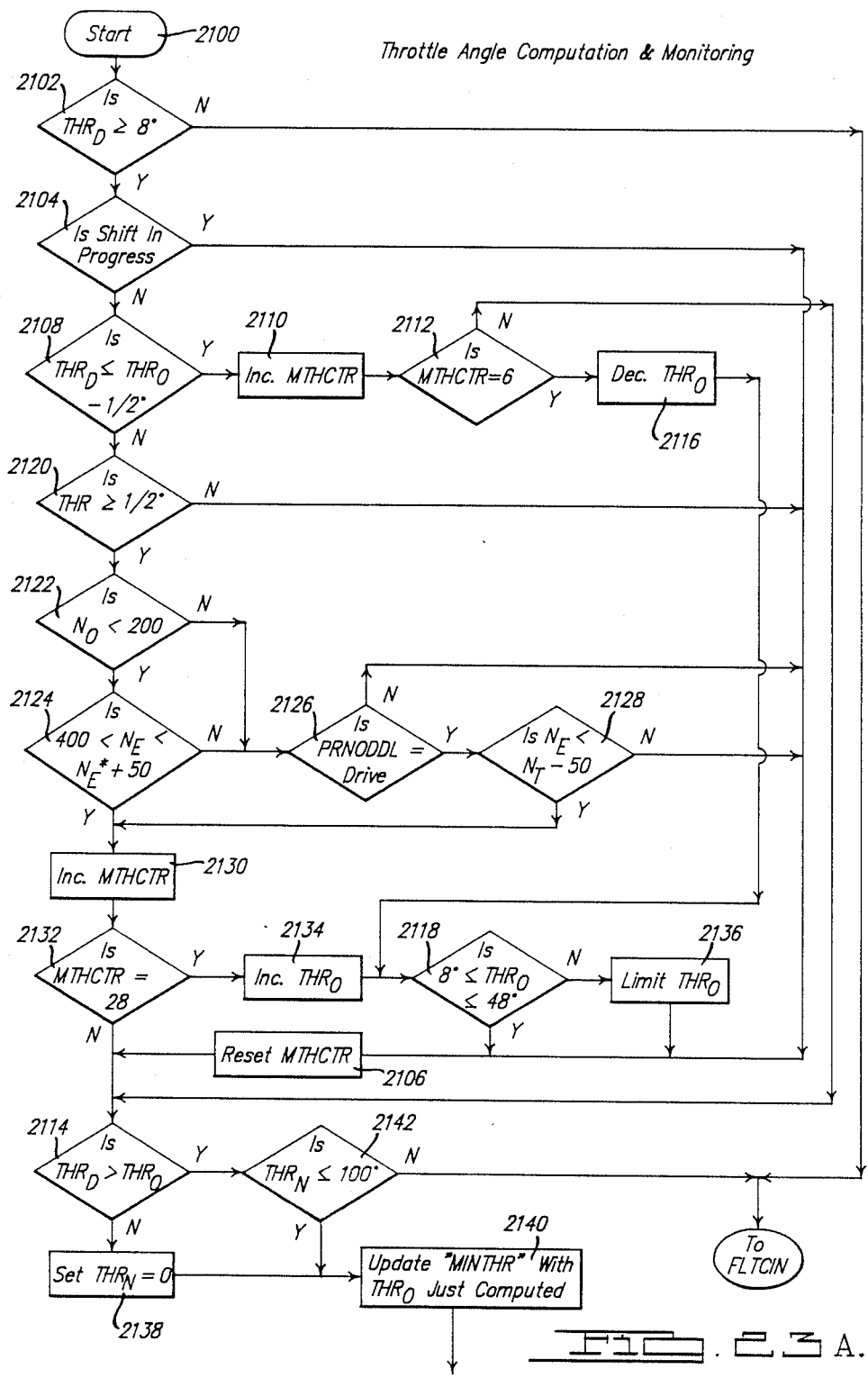

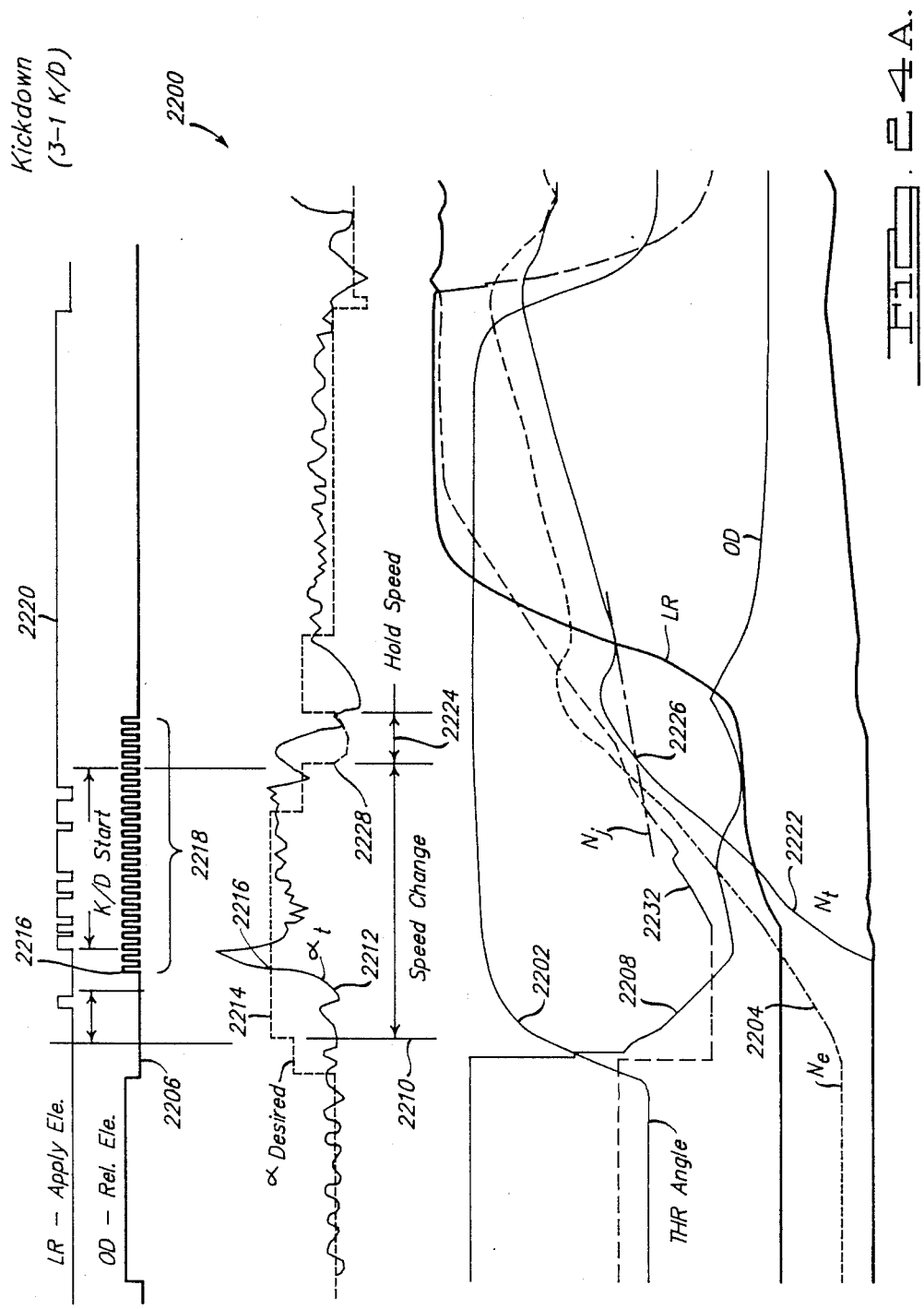

$$T_T = (69N_e - 57N_t) N_E (10^{-6}) \qquad N_t < .85 N_e$$
$$135(N_e - N_t) N_E (10^{-6}) \qquad N_t \geq .85 N_e$$

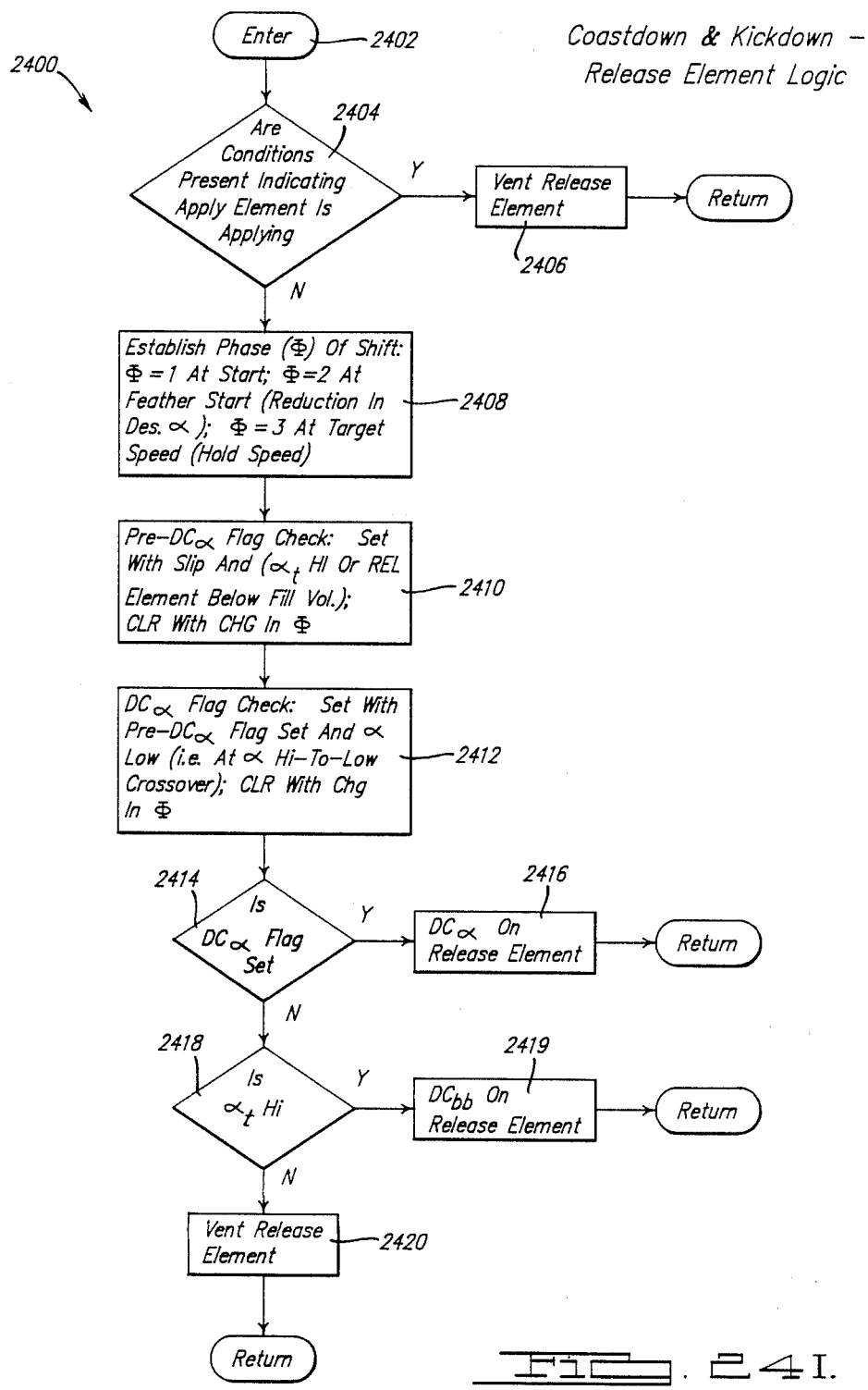

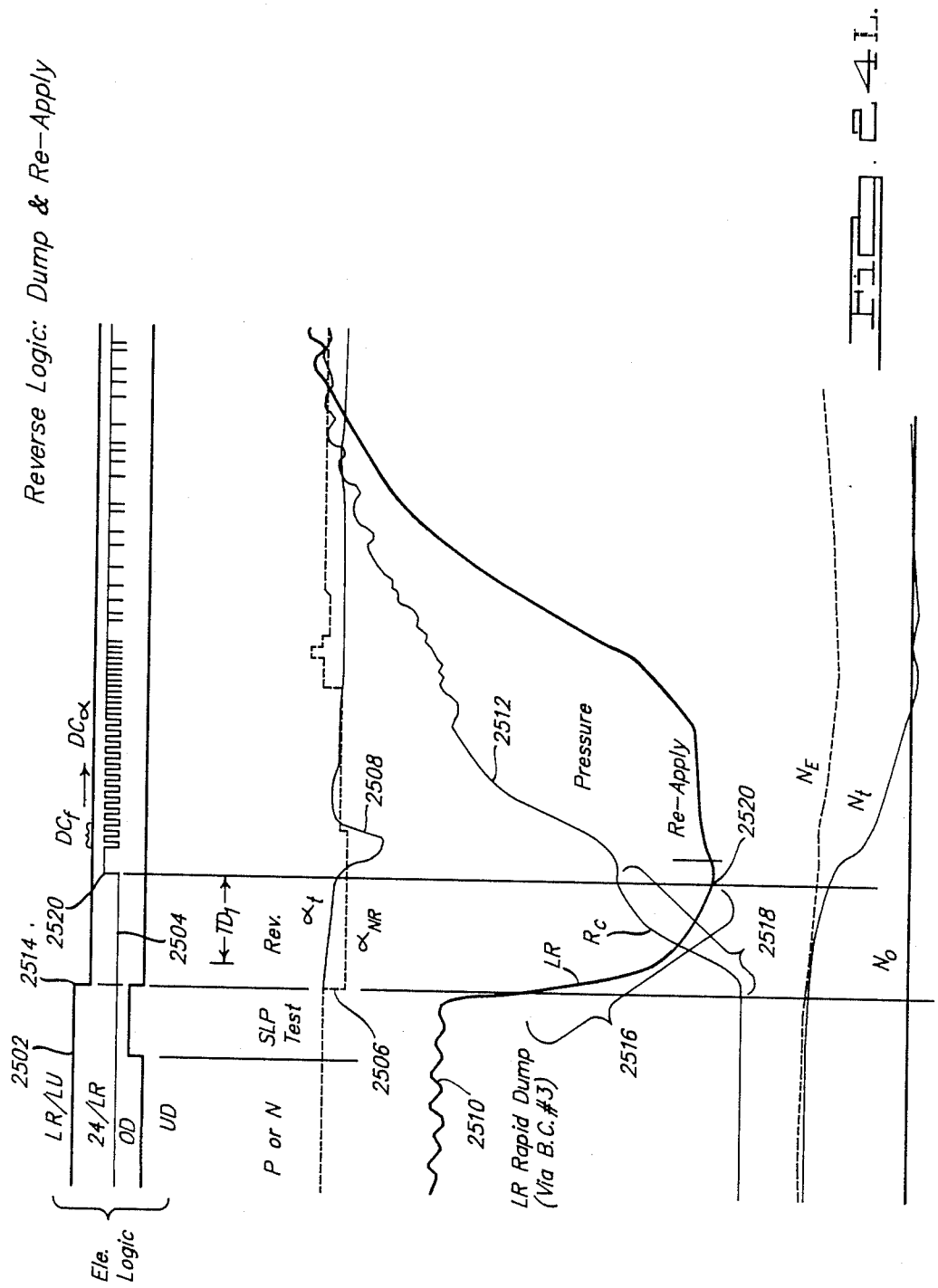

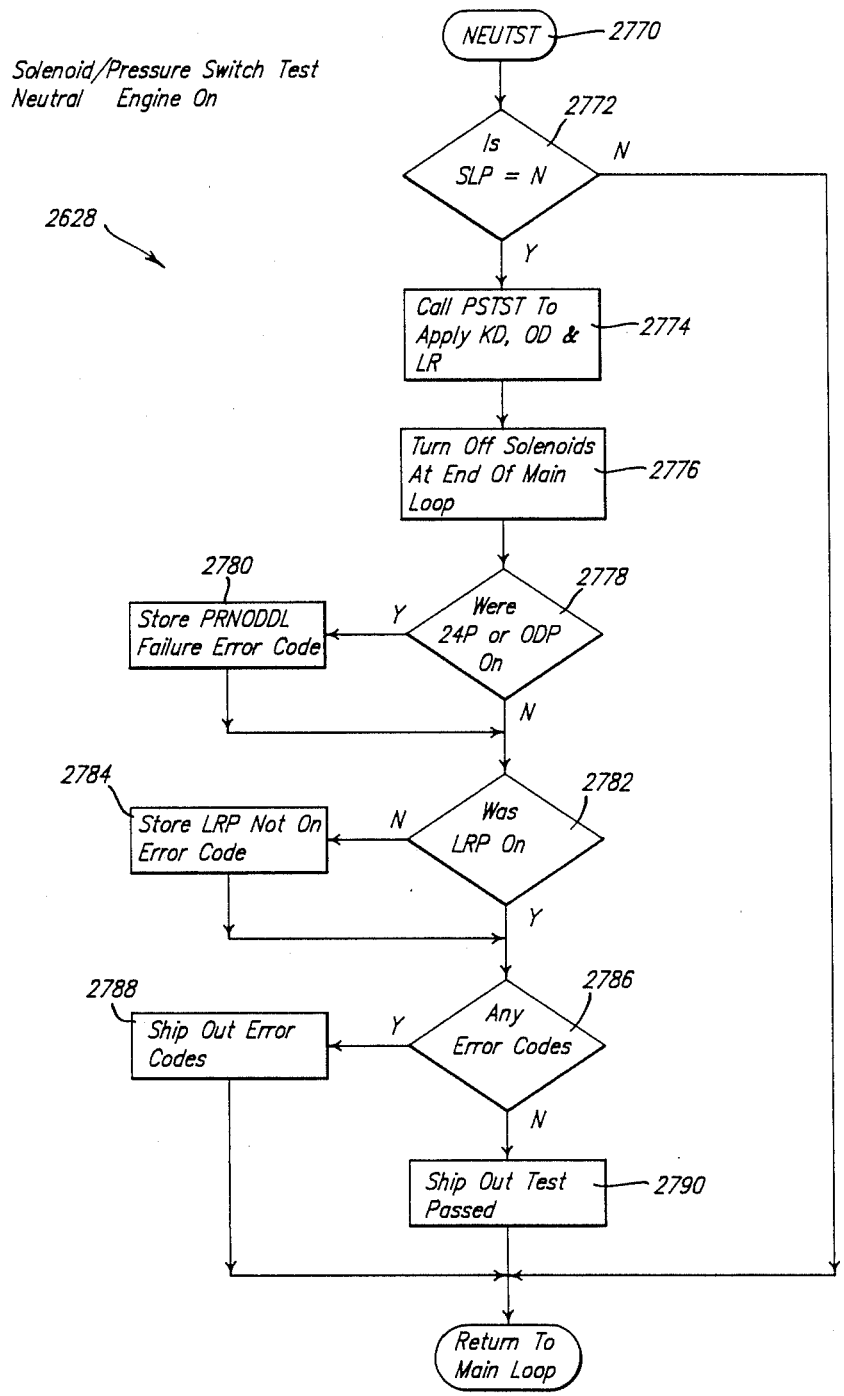

"Closing The Loop" For WOT Shift Energy Reduction

* In Engine Software

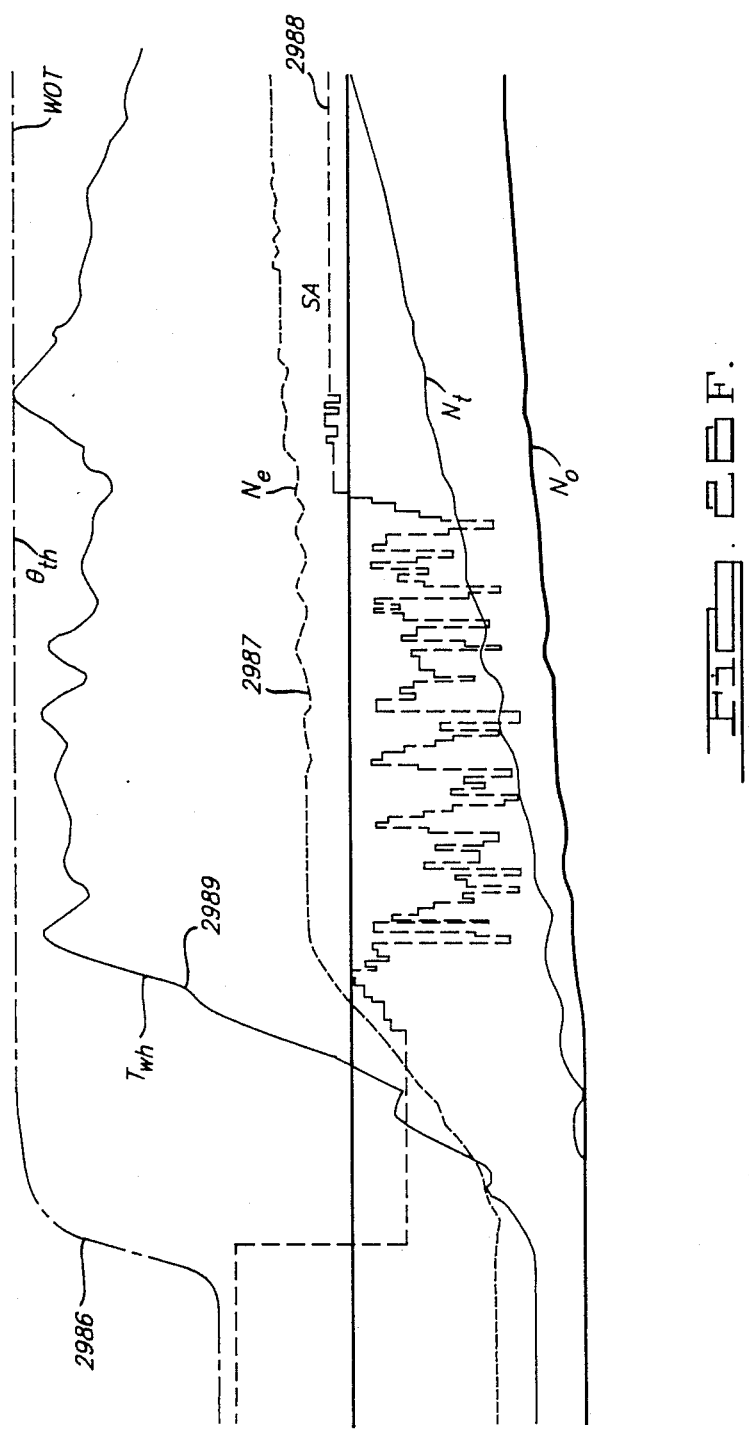

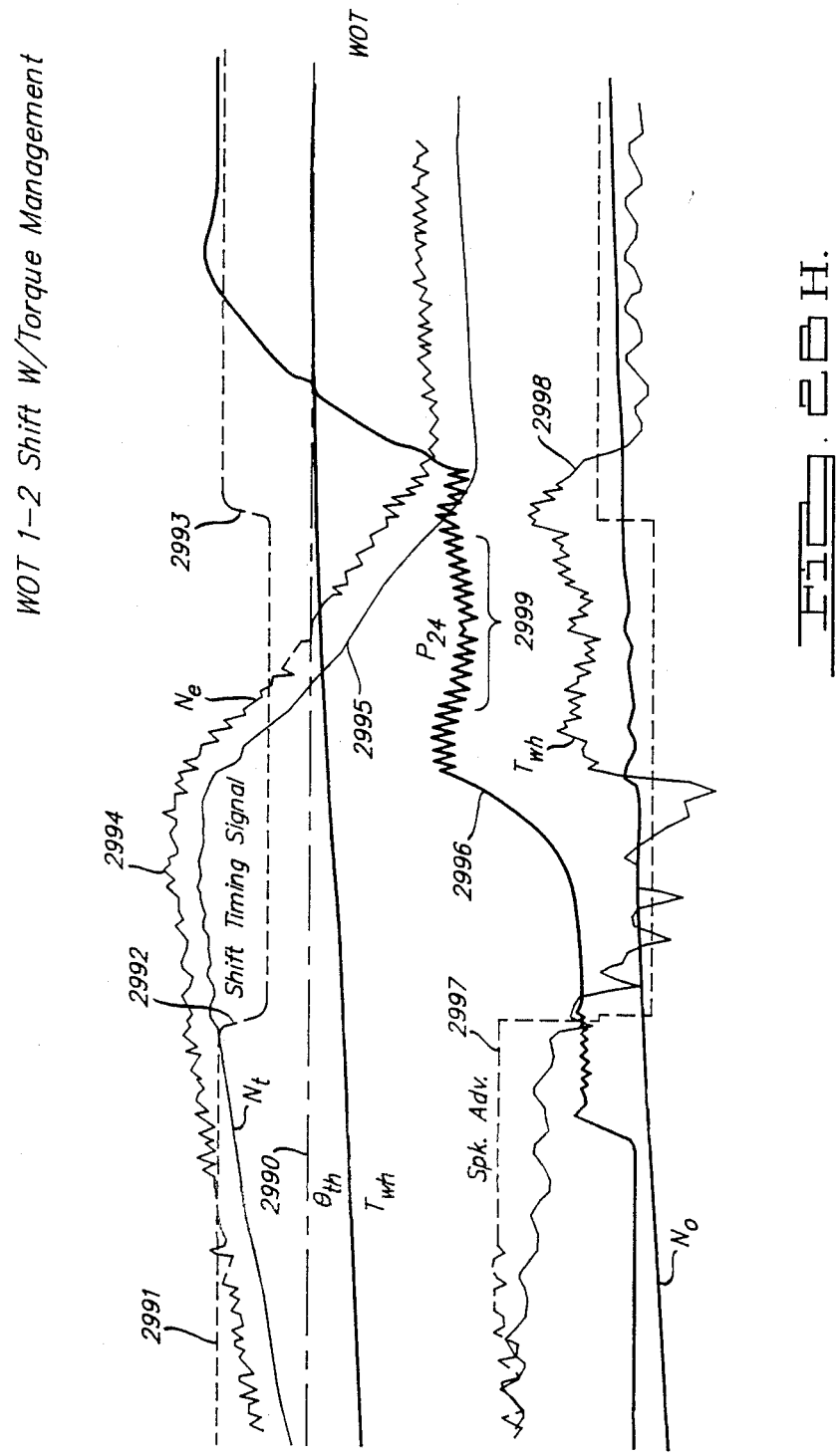

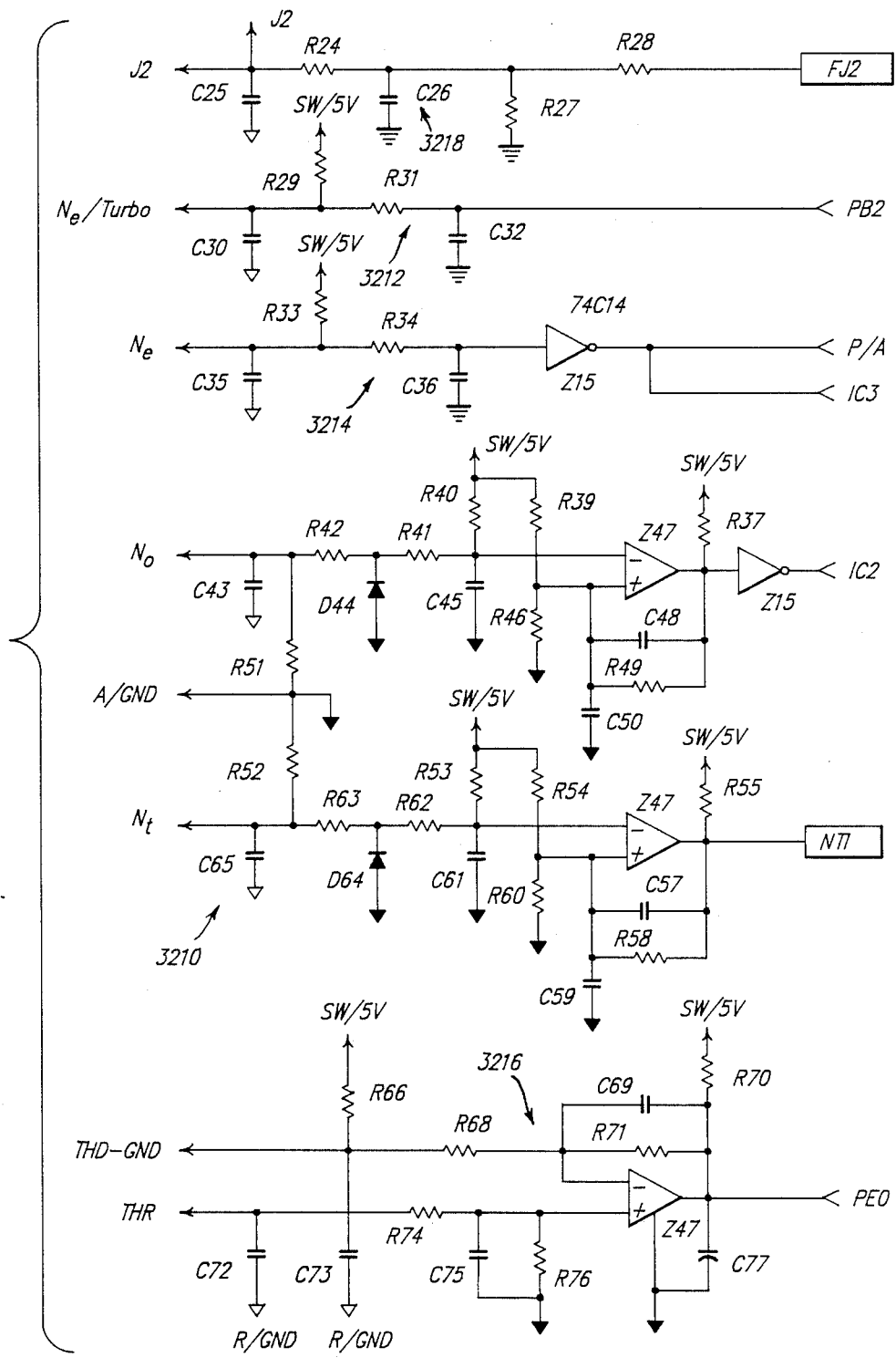

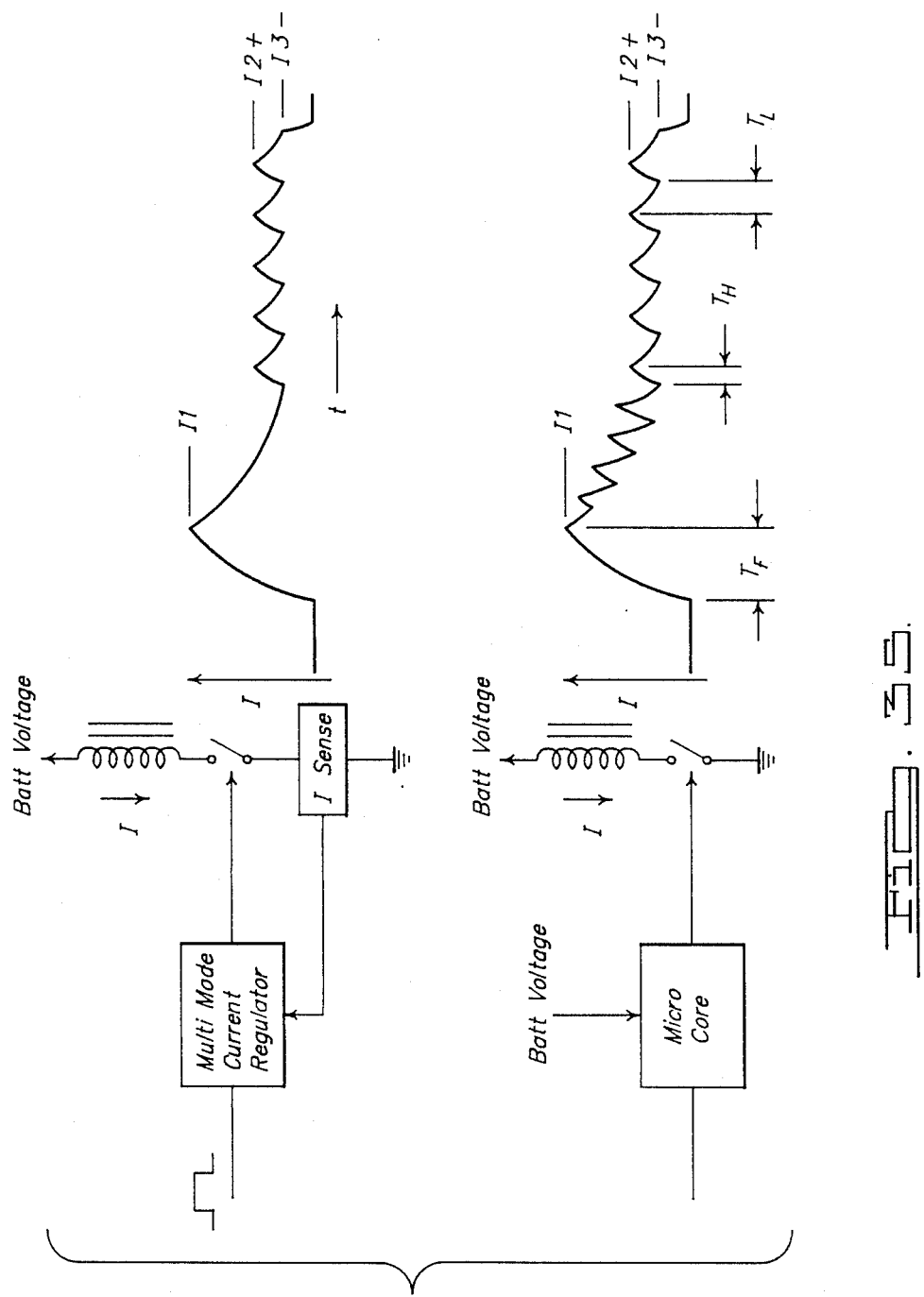

FLUID-ACTUATED PRESSURE SWITCH FOR AN AUTOMATIC TRANSMISSION

BACKGROUND OF THE INVENTION

1. Field of the Invention

The present invention relates to an automatic power-shift transmission primarily intended for motor vehicle use, and more particularly, to a fluid-actuated pressure switch to indicate the presence or absence of a predetermined fluid pressure in a transmission that is controlled electronically and hydraulically.

2. Description Of Related Art

Generally speaking, land vehicles require three basic components. These components comprise a power plant (such as an internal combustion engine) a power train and wheels. The internal combustion engine produces force by the conversion of the chemical energy in a liquid fuel into the mechanical energy of motion (kinetic energy). The function of the power train is to transmit this resultant force to the wheels to provide movement of the vehicle.

The power train's main component is typically referred to as the "transmission". Engine torque and speed are converted in the transmission in accordance with the tractive-power demand of the vehicle. The vehicle's transmission is also capable of controlling the direction of rotation being applied to the wheels, so that the vehicle may be driven both forward and backward.

A conventional transmission includes a hydrodynamic torque converter to transfer engine torque from the engine crankshaft to a rotatable input member of the transmission through fluid-flow forces. The transmission also includes frictional units which couple the rotating input member to one or more members of a planetary gearset. Other frictional units, typically referred to as brakes, hold members of the planetary gearset stationary during flow of power. These frictional units are usually brake clutch assemblies or band brakes. The drive clutch assemblies can couple the rotating input member of the transmission to the desired elements of the planetary gearsets, while the brakes hold elements of these gearsets stationary. Such transmission systems also typically provide for one or more planetary gearsets in order to provide various ratios of torque and to ensure that the available torque and the respective tractive power demand are matched to each other.

Transmissions are generally referred to as manually actuated or automatic transmissions. Manual transmissions generally include mechanical mechanisms for coupling rotating gears to produce different ratio outputs to the drive wheels.

Automatic transmissions are designed to take automatic control of the frictional units, gear ratio selection and gear shifting. A thorough description of general automatic transmission design principals may be found in "Fundamentals of Automatic Transmissions and Transaxles," Chrysler Corporation Training Manual No. TM-508A. Additional descriptions of automatic transmissions may be found in U.S. Pat. No. 3,631,744, entitled "Hydromatic Transmission," issued Jan. 4, 1972 to Blomquist, et al., and U.S. Pat. No. 4,289,048, entitled "Lock-up System for Torque Converter," issued on Sept. 15, 1981 to Mike, et al. Each of these patents is hereby incorporated by reference.

In general, the major components featured in such an automatic transmission are: a torque converter as above-mentioned; fluid pressure-operated multi-plate drive or brake clutches and/or brake bands which are connected to the individual elements of the planetary gearsets in order to perform gear shifts without interrupting the tractive power, one-way clutches in conjunction with the frictional units for optimization of power shifts; and transmission controls such as valves for applying and releasing elements to shift the gears (instant of shifting), for enabling power shifting, and for choosing the proper gear (shift point control), dependent on shift-program selection by the driver (selector lever), accelerator position, the engine condition and vehicle speed.

The control system of the automatic transmission is typically hydraulically operated through the use of several valves to direct and regulate the supply of pressure. This hydraulic pressure control will cause either the actuation or deactuating of the respective frictional units for effecting gear changes in the transmission. The valves used in the hydraulic control circuit typically comprise spring-biased spool valves, spring-biased accumulators and ball check valves. Since many of these valves rely upon springs to provide a predetermined amount of force, it will be appreciated that each transmission design represents a finely tuned arrangement of interdependent valve components. While this type of transmission control system has worked well over the years, it does have its limitations. For example, such hydraulically controlled transmissions are generally limited to one or a very small number of engines and vehicle designs. Therefore, considerable cost is incurred by an automobile manufacturer to design, test, build, inventory and repair several different transmission units in order to provide an acceptable broad model line for consumers.

Additionally, it should be appreciated that such hydraulically controlled transmission systems cannot readily adjust themselves in the field to compensate for varying conditions such as normal wear on the components, temperature swings and changes in engine performance over time. While each transmission is designed to operate most efficiently within certain specific intolerances, typical hydraulic control systems are incapable of taking self-corrective action on their own to maintain operation of the transmission at peak efficiency.

However, in recent years, a more advanced form of transmission control system has been proposed, which would offer the possibility of enabling the transmission to adapt itself to changing conditions. In this regard, U.S. Pat. No. 3,956,947, issued on May 18, 1976 to Leising, et al., which is hereby incorporated by reference, sets forth a fundamental development in this field. Specifically, this patent discloses an automatic transmission design which features an "adaptive" control system that includes electrically operated solenoid-actuated valves for controlling certain fluid pressures. In accordance with this electric/hydraulic control system, the automatic transmission would be "responsive" to an acceleration factor for controlling the output torque of the transmission during a shift from one ratio of rotation (between the input and output shafts of the transmission) to another. Specifically, the operation of the solenoid-actuated valves would cause a rotational speed versus time curve of a sensed rotational component of the transmission to substantially follow along a predetermined path during shifting.

3. Objects Of The Present Invention

It is one of the principal objects of the present invention to provide a four-speed automatic transmission design which can be readily utilized in conjunction with a variety of engines and vehicle sizes and types, including vehicles presently using conventional, mechanical-hydraulic only automatic transmission systems.

It is a more specific object of the present invention to provide a fluid-actuated pressure switch to prevent fluid contamination of electrical switch contacts which are opened and closed to indicate the absence or presence of a predetermined fluid pressure and to eliminate air trapped within the fluid.

This application is one of several applications filed on the same date, all commonly assigned and having similar Specifications and Drawings, these applications being identified below.

| U.S. Ser. No. | Title |
|---|---|
| 187,772 | AN ELECTRONICALLY-CONTROLLED, ADAPTIVE AUTOMATIC TRANSMISSION SYSTEM |
| 187,751 | AUTOMATIC FOUR-SPEED TRANSMISSION |
| 189,493 | PUSH/PULL CLUTCH APPLY PISTON OF AN AUTOMATIC TRANSMISSION |
| 187,781 | SHARED REACTION PLATES BETWEEN CLUTCH ASSEMBLIES IN AN AUTOMATIC TRANSMISSION |
| 189,492 | CLUTCH REACTION AND PRESSURE PLATES IN AN AUTOMATIC TRANSMISSION |
| 188,602 | BLEEDER BALL CHECK VALVES IN AN AUTOMATIC TRANSMISSION |
| 188,610 | PRESSURE BALANCED PISTONS IN AN AUTOMATIC TRANSMISSION |
| 189,494 | DOUBLE-ACTING SPRING IN AN AUTOMATIC TRANSMISSION |
| 188,613 | PARK LOCKING MECHANISM FOR AN AUTOMATIC TRANSMISSION |
| 187,770 | SOLENOID-ACTUATED VALVE ARRANGEMENT OF AN AUTOMATIC TRANSMISSION SYSTEM |
| 187,796 | RECIPROCATING VALVES IN A FLUID SYSTEM OF AN AUTOMATIC TRANSMISSION |
| 187,705 | VENT RESERVOIR IN A FLUID SYSTEM OF AN AUTOMATIC TRANSMISSION |
| 188,592 | FLUID ACTUATED SWITCH VALVE IN AN AUTOMATIC TRANSMISSION |
| 188,598 | DIRECT-ACTING, NON-CLOSE CLEARANCE SOLENOID-ACTUATED VALVES |
| 188,618 | NOISE CONTROL DEVICE FOR A SOLENOID-ACTUATED VALVE |
| 187,210 | METHOD OF APPLYING REVERSE GEAR OF AN AUTOMATIC TRANSMISSION |
| 187,672 | TORQUE CONVERTER CONTROL VALVE IN A FLUID SYSTEM OF AN AUTOMATIC TRANSMISSION |
| 187,120 | CAM-CONTROLLED MANUAL VALVE IN AN AUTOMATIC TRANSMISSION |
| 187,181 | FLUID SWITCHING MANUALLY BETWEEN VALVES IN AN AUTOMATIC TRANSMISSION |
| 187,704 | METHOD OF OPERATING AN ELECTRONIC AUTOMATIC TRANSMISSION SYSTEM |
| 188,020 | METHOD OF SHIFT SELECTION IN AN ELECTRONIC AUTOMATIC TRANSMISSION SYSTEM |
| 187,991 | METHOD OF UNIVERSALLY ORGANIZING SHIFTS FOR AN ELECTRONIC AUTOMATIC TRANSMISSION SYSTEM |
| 188,603 | METHOD OF DETERMINING AND CONTROLLING THE LOCK-UP OF A TORQUE CONVERTER IN AN ELECTRONIC AUTOMATIC TRANSMISSION SYSTEM |
| 188,617 | METHOD OF ADAPTIVELY IDLING AN ELECTRONIC AUTOMATIC TRANSMISSION SYSTEM |
| 189,553 | METHOD OF DETERMINING THE DRIVER SELECTED OPERATING MODE OF AN AUTOMATIC TRANSMISSION SYSTEM |

-continued

| U.S. Ser. No. | Title |
|---|---|
| 188,615 | METHOD OF DETERMINING THE SHIFT LEVER POSITION OF AN ELECTRONIC AUTOMATIC TRANSMISSION SYSTEM |
| 188,837 | METHOD OF DETERMINING THE ACCELERATION OF A TURBINE IN AN AUTOMATIC TRANSMISSION |
| 187,771 | METHOD OF DETERMINING THE FLUID TEMPERATURE OF AN ELECTRONIC AUTOMATIC TRANSMISSION SYSTEM |
| 188,607 | METHOD OF DETERMINING THE CONTINUITY OF SOLENOIDS IN AN ELECTRONIC AUTOMATIC TRANSMISSION SYSTEM |
| 189,579 | METHOD OF DETERMINING THE THROTTLE ANGLE POSITION FOR AN ELECTRONIC AUTOMATIC TRANSMISSION SYSTEM |
| 188,604 | METHOD OF CONTROLLING THE SPEED CHANGE OF A KICKDOWN SHIFT FOR AN ELECTRONIC AUTOMATIC TRANSMISSION SYSTEM |
| 188,591 | METHOD OF CONTROLLING THE APPLY ELEMENT DURING A KICKDOWN SHIFT FOR ELECTRONIC AUTOMATIC TRANSMISSION SYSTEM |
| 188,608 | METHOD OF CALCULATING TORQUE FOR AN ELECTRONIC AUTOMATIC TRANSMISSION SYSTEM |
| 187,150 | METHOD OF LEARNING FOR ADAPTIVELY CONTROLLING AN ELECTRONIC AUTOMATIC TRANSMISSION SYSTEM |
| 188,595 | METHOD OF ACCUMULATOR CONTROL FOR A FRICTION ELEMENT IN AN ELECTRONIC AUTOMATIC TRANSMISSION SYSTEM |
| 188,599 | METHOD OF ADAPTIVELY SCHEDULING A SHIFT FOR AN ELECTRONIC AUTOMATIC TRANSMISSION SYSTEM |

Commonly assigned application Ser. No. 187,772, filed Apr. 29, 1988, now allowed, will be printed in its entirety. The Figures and the entire Specification of that application are specifically incorporated by reference. For a description of the above copending applications, reference is made to the above mentioned application, Ser. No. 187,772.

| | |
|---|---|
| 188,601 | METHOD OF SHIFT CONTROL DURING A COASTDOWN SHIFT FOR AN ELECTRONIC AUTOMATIC TRANSMISSION SYSTEM |
| 188,620 | METHOD OF TORQUE PHASE SHIFT CONTROL FOR AN ELECTRONIC AUTOMATIC TRANSMISSION |
| 188,596 | METHOD OF DIAGNOSTIC PROTECTION FOR AN ELECTRONIC AUTOMATIC TRANSMISSION SYSTEM |
| 188,597 | METHOD OF STALL TORQUE MANAGEMENT FOR AN ELECTRONIC AUTOMATIC TRANSMISSION SYSTEM |
| 188,606 | METHOD OF SHIFT TORQUE MANAGEMENT FOR AN ELECTRONIC AUTOMATIC TRANSMISSION SYSTEM |
| 188,616 | ELECTRONIC CONTROLLER FOR AN AUTOMATIC TRANSMISSION |
| 188,600 | DUAL REGULATOR FOR REDUCING SYSTEM CURRENT DURING AT LEAST ONE MODE OF OPERATION |
| 188,619 | UTILIZATION OF A RESET OUTPUT OF A REGULATOR AS A SYSTEM LOW-VOLTAGE INHIBIT |
| 188,593 | THE USE OF DIODES IN AN INPUT CIRCUIT TO TAKE ADVANTAGE OF AN ACTIVE PULL-DOWN NETWORK PROVIDED IN A DUAL REGULATOR |
| 188,669 | SHUTDOWN RELAY DRIVER CIRCUIT |

| | -continued |
|---|---|
| 188,614 | CIRCUIT FOR DETERMINING THE CRANK POSITION OF AN IGNITION SWITCH BY SENSING THE VOLTAGE ACROSS THE STARTER RELAY CONTROL AND HOLDING AN ELECTRONIC DEVICE IN A RESET CONDITION IN RESPONSE THERETO |
| 188,612 | THROTTLE POSITION SENSOR DATA SHARED BETWEEN CONTROLLER WITH DISSIMILAR GROUNDS |
| 188,611 | NEUTRAL START SWITCH TO SENSE SHIFT LEVER POSITION |
| 188,981 | OPEN LOOP CONTROL OF SOLENOID COIL DRIVER |

SUMMARY OF THE INVENTION

To achieve the foregoing objects, the present invention provides a comprehensive four-speed automatic transmission system. While this transmission system particularly features a fully adaptive electronic control system, numerous other important advances are incorporated into this unique transmission system, as will be described below in detail.

In addition to the advantages offered by the adaptive control system, the present invention achieves the combination of this control system with a unique four-speed transaxle structure which requires fewer components and is smaller than previous four-speed transmission systems. For example, the four-speed transmission system according to the present invention is capable of fitting into the space made available for a conventional three-speed transmission system.

While the transmission system according to the present invention includes electronic control features, it is also designed to provide fluid-actuated pressure switches which feature a diaphragm to prevent fluid contamination of the electrical switch contacts and features a leakage path to eliminate air trapped within the fluid.

BRIEF DESCRIPTION OF THE DRAWINGS

Other objects, features and advantages of the present invention will become more fully apparent from the following detailed description of the preferred embodiment, the appended claims and in the accompanying drawings in which:

FIGS. 1A-E illustrate one physical embodiment of the transmission according to the present invention; FIG. 1A is a perspective view, partially broken away of the transmission; FIG. 1B is a sectional elevational view of one embodiment of a transmission constructed according to the present invention; FIG. 1C is a partial sectional elevational view of one half of the transmission of FIG. 1B: FIG. 1D is a partial sectional elevational view of the other half of the transmission of FIG. 1B; and FIG. 1E is a schematic diagram of the transmission of FIGS. 1A and 1B;

FIGS. 2A and 2B illustrate two views of a bleeder ball check valve assembly according to the present invention; FIG. 2A is a front elevational view of the reaction shaft support and bleeder ball check valve assembly; and FIG. 2B is a sectional view of FIG. 2A;

FIGS. 3A-E illustrate the structure and operation of the double acting spring; FIG. 3A is an elevational view of the structure of the double acting spring; FIG. 3B is a sectional view taken along lines B—B of FIG. 3A; FIG. 3C is a partial sectional elevational view of the spring in its non-applied position; FIG. 3D is a partial sectional elevational view of the spring while the overdrive clutch is being applied; and FIG. 3E is a partial sectional elevational view of the spring while the reverse clutch is being applied;

FIG. 4A is an elevational view, partly in section with parts broken away, of the underside of an automatic transmission housing showing the manual lever rotated to its park lock position; FIG. 4B is a sectional view taken substantially along line B—B of FIG. 4A; FIG. 4C is a fragmentary view of the park lock mechanism of FIG. 4B showing the mechanism in its unlocked mode; FIG. 4D is a fragmentary view of the park lock mechanism of FIG. 4B showing the mechanism in its locked mode with the pawl out of registry with a space between adjacent teeth of the parking gear; FIG. 4E is an exploded perspective view of the park lock mechanism; FIG. 4F is an enlarged fragmentary sectional view of the park lock cam rollers; FIG. 4G is a sectional view taken substantially along line G—G of FIG. 4F; FIG. 4H is a fragmentary elevational view of the upper surface of the manual lever rotated to its installation position; FIG. 4I is an end elevational fragmentary view of the manual lever as viewed in the direction of the arrow of FIG. 3H; and FIG. 4J is a fragmentary perspective view illustrating, in a schematic manner, the interlocking relationship between the park lock carrier and the transmission case;

FIGS. 5A-L are schematic diagrams of the hydraulic circuits employed in the transmission according to the present invention in various gear positions;

FIG. 6 is a partial exploded view of the valve body and other valves contained therein of FIGS. 5A-L according to the present invention;

FIG. 7 is a plan view of the solenoid valve manifold assembly with the cover partially broken away of the valves shown in FIGS. 5A-L;

FIG. 8 is a cross-sectional view of the normally vented solenoid-actuated valve 632 taken along line 8—8 of FIG. 7;

FIG. 9 is a cross-sectional view of the normally applied solenoid-actuated valve 630 taken along line 9—9 of FIG. 7;

FIG. 9A is a partial sectional view of the valve of FIG. 9 with a noise reducing device;

FIG. 10 is a cross-sectional view of a pressure switch of FIGS. 5A-L taken along line 10—10 of FIG. 7;

DESCRIPTION OF THE PREFERRED EMBODIMENT

Figure 1A:
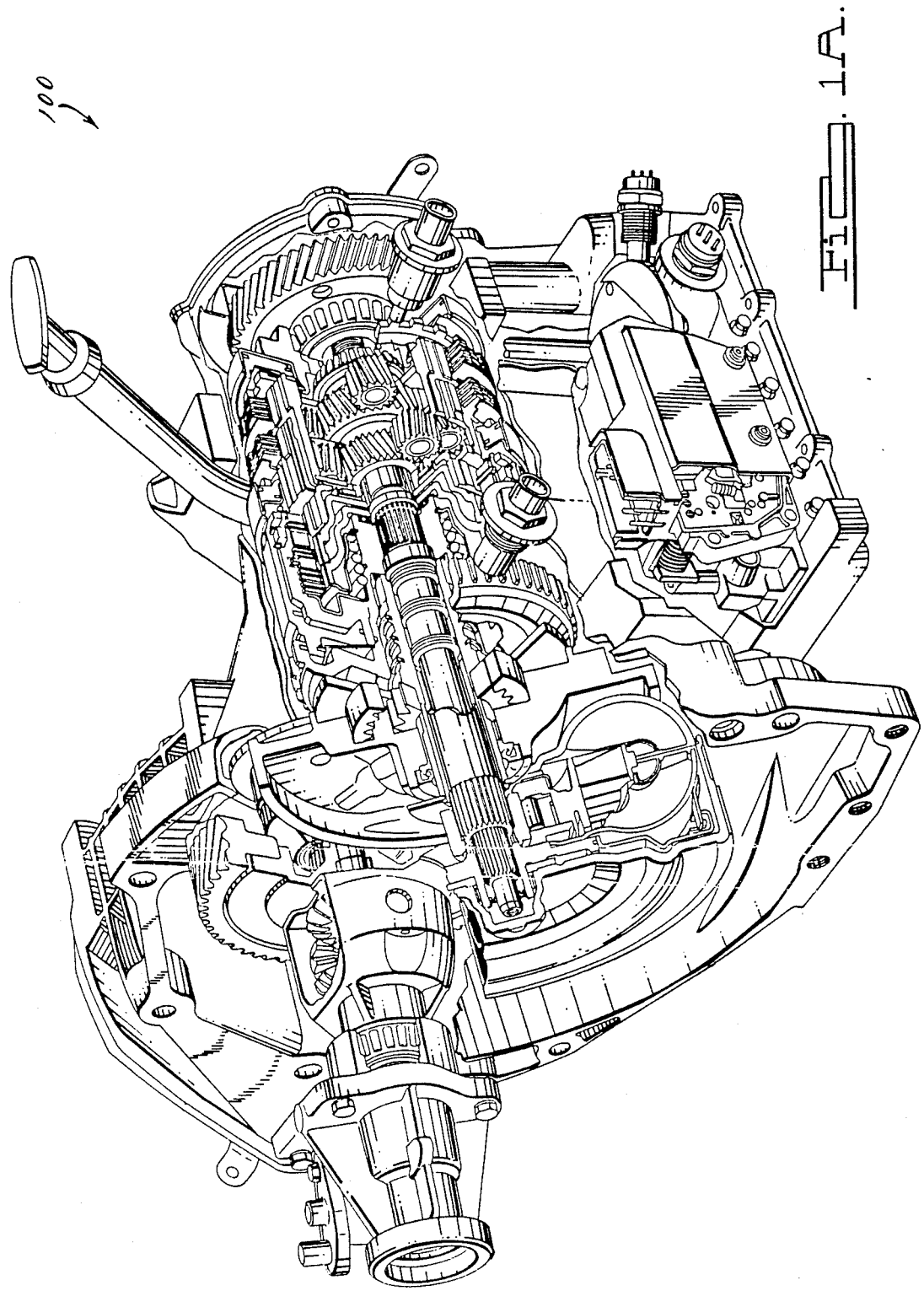

Referring to FIGS. 1A and 1B, an automatic transmission 100 according to one embodiment of the present invention is shown. The transmission 100 is adapted to be used in a vehicle (not shown), such as an automobile. However, it should be appreciated that the principles of the present invention may be employed in other types of vehicles and devices. The transmission 100 includes a transmission housing or case 102 for enclosing the numerous subassemblies which make up the transmission 100, including a torque converter assembly 110, pump assembly 200, multi-clutch assembly 300 and gear assembly 500.

TORQUE CONVERTER ASSEMBLY STRUCTURE

The torque converter assembly 110 is operative to transmit power from a rotating crankshaft 114 of a prime mover such as an automobile engine (not shown) to the input member of the transmission 100. This power may then be subsequently transmitted to a drive unit 104 (partially shown) which is connected to one or more drive wheels (not shown) of the vehicle. The torque converter 110 is generally comprised of an impeller assembly 126, turbine assembly 128 and a stator assembly 130.

As illustrated in FIG. 1C, power is transmitted from the rotating crankshaft 114 of the engine to a front cover member 116 of the impeller assembly 126 through a rotatable plate member 118. Balance weights 119 are circumferentially spaced about the outer periphery of the front cover member 116. The plate member 118 is secured proximate its inner periphery to the crankshaft 114 by suitable fastening means such as bolts 120, and is likewise secured proximate its outer periphery to the front cover member 116 by suitable fastening means such as bolts 122. The front cover member 116 is secured, such as by welding at 124, to the impeller assembly 126 of the torque converter 110.

The impeller assembly 126 is fluidly connected in toroidal flow relationship in a known manner with the turbine assembly 128 and the stator assembly 130. The impeller assembly 126 comprises a plurality of circumferentially spaced impeller blades 132 connected to the inside of an impeller shell 134. The impeller shell 134 is secured, such as by welding at 136, to an impeller hub or pump drive shaft 138. The impeller hub 138 is drivingly engaged at its neck portion 140 to the positive displacement pump 200, from which fluid is supplied to the torque converter 110 in a manner to be described herein. An arcuate inner portion 142 of the impeller blade 132 is disposed about one half of a split torus ring 144 which reduces fluid turbulence within the torque converter 110. A thrust plate 146 is connected by tabs (not shown) on the inner surface of a slot 148 of the impeller hub 138 and disposed between the impeller assembly 126 and a stator thrust member 165.

The stator assembly 130 includes a plurality of circumferentially spaced stator vanes 150 which are connected at their inner end to a stator plate 152. The stator plate 152 is mounted on a one-way or over-running clutch assembly, generally indicated at 154. The over-running clutch assembly 154 permits rotation only in the direction of the impeller assembly 126. The over-running clutch assembly 154 comprises an over-running clutch cam 156 mounted about over-running clutch rollers 158, which in turn, travel about an over-running clutch race 160. The over-running clutch race 160 is splined at inner surface 162 to a stationary reaction shaft member 164. An annular thrust member 165 having retaining transverse flanges or tabs 167 is disposed between the stator plate 152 and the thrust plate 146.

The turbine assembly 128 includes a plurality of circumferentially spaced turbine blades 166 which are connected to the inside of a turbine shell 168. The turbine shell 168 is secured by rivets 170 or the like to a turbine hub member 172. The turbine hub member 172 is drivingly connected, as by a spline connection 174, to a rotatable input member or shaft 176 to which the gear assembly 500 of the transmission 100 is drivingly engaged. A turbine hub seal 178 is disposed between the inside of the turbine hub member 172 and the input shaft 176 to prevent entry of fluid therebetween. A cover bushing 180 having grooves (not shown) for fluid flow therethrough supports the turbine hub member 172 in a cavity 182 of the front cover member 116. A thrust plate or washer 184 having grooves (not shown) for fluid flow therethrough is disposed between the turbine hub member 172 and the front cover member 116. An annular stepped member 185 having grooves (not shown) for fluid flow therethrough is disposed between the turbine hub member 172 and stator plate 152, as well as the over-running clutch race 160.

The torque converter 110 also includes a lock-up clutch assembly, generally indicated at 186, to prevent slip between the rotating crankshaft 114 of the engine and the turbine assembly 128 of the torque converter 110. The lock-up clutch assembly 186 includes an annular piston member 188 having an inner flange portion 190 disposed about the turbine hub member 172 of the turbine assembly 128. The piston member 188 has a plurality of circumferentially spaced inverted U-shaped outer flange portions 192 which are formed to engage corresponding slots 194 in a drive ring 196 that is welded to the turbine shell 168. The piston member 188 is slidingly and sealingly mounted for axial movement on the outer axial surface of the turbine hub member 172 through annular seal element 198. An annular disc-shaped frictional element or lock-up disc 199 is carried proximate the outer periphery of the front cover member 116 for engagement with a cooperating portion of the piston member 188.

PUMP ASSEMBLY STRUCTURE

Figure 1D:
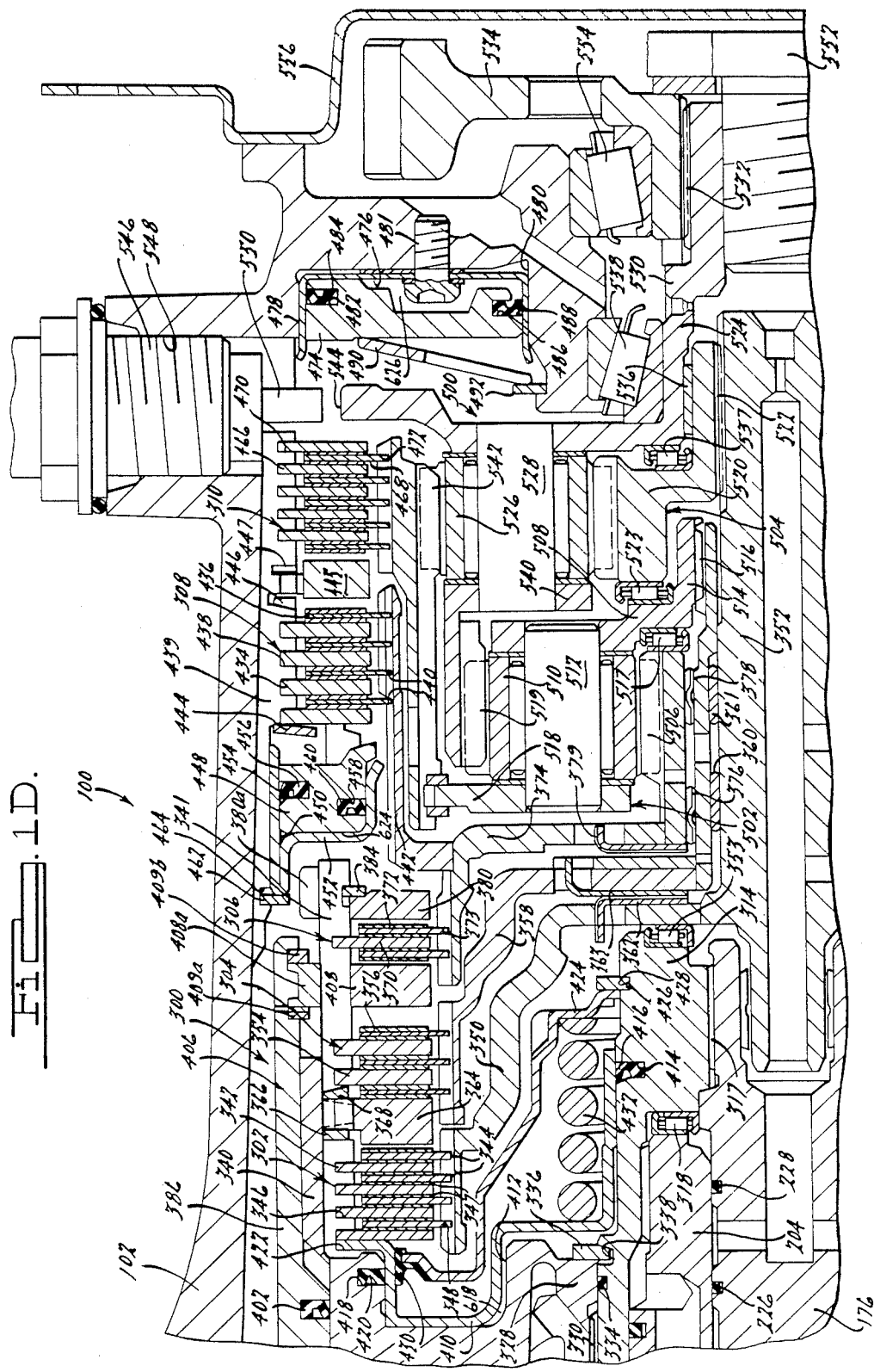

The fixed positive displacement pump assembly 200 includes a pump housing 202 secured proximate its inner periphery to a reaction shaft support 204 by suitable fastening means such as bolts 206. The pump housing 202 is likewise secured proximate its outer periphery to the transmission case 102 by suitable fastening means such as bolts 208. The reaction shaft support 204 is secured, such as by press fitting with splines at 210, to the reaction shaft member 164. The impeller hub or pump drive shaft 138 is supported in the pump housing 202 through a bushing member 212. A seal ring assembly 214 is disposed about the impeller hub or pump drive shaft 138 in a bore or recess 216 at one end of the pump housing 202 to prevent fluid from exiting the end of the pump housing 202. An outer gear or rotor 218 with internal teeth (not shown) operates within a bore 220 of the pump housing 202. An inner gear or rotor 222 having external teeth (not shown), cooperative with the teeth of the outer rotor 218, is disposed within the outer rotor 218. As illustrated in FIGS. 1C and 1D, sealing means, such as seal rings 224, 226 and 228, are axially spaced between the input shaft 176 and reaction shaft support 204. The reaction shaft support 204 includes a fluid passage 230 to allow fluid to flow to the torque converter 110 in a manner to described herein.

MULTI-CLUTCH ASSEMBLY STRUCTURE

During the flow of power through the transmission 100, the multi-clutch assembly 300 provides a means for application and release of two separate members to and from each other. In other words, the multi-clutch assembly 300 is the means by which the gears within the transmission are selectively engaged and disengaged from either the crankshaft 114 of the prime mover or the transmission case 102. Near the input side of the transmission 100, the multi-clutch assembly 300 includes an underdrive clutch 302 (applied in first, second and third gears), overdrive clutch 304 (applied in third and fourth gears) and a reverse clutch 306 (applied in reverse gear) assemblies. Near the output side of the transmission 100, the multi-clutch assembly 300 includes a two/four shift clutch assembly 308 (applied in second and fourth gears), and a low/reverse clutch assembly 310 (applied in first and reverse gears).

As illustrated in FIGS. 1C and 1D, an input clutch retainer hub 312 is provided to house the input clutch assemblies 302, 304 and 306. The input clutch retainer hub 312 has a generally axially extending shoulder portion 313 and a generally axially extending portion 314. A plurality of spaced seal rings 315 are disposed in corresponding annular grooves 316 which are formed along the reaction shaft support 204. The input clutch retainer hub 312 is also splined at 317 to the input shaft 176. A thrust bearing 318 is disposed axially between one end of the reaction shaft support 204 and the axially extending portion 314 of the input clutch retainer hub 312. The input clutch retainer hub 312 has teeth 319 at its outer periphery. A turbine speed sensor 320 threadably engages a bore 322 in the transmission case 102 and has one end 324 disposed or spaced radially just above the teeth 319 of the input clutch retainer hub 312. The turbine speed sensor 320 is used to monitor or sense the revolution rate of the turbine assembly 128 by counting the teeth 319 passing thereby in relation to time. Preferably, a passive type speed sensor is used for the turbine speed sensor 320. However, it should be appreciated that other suitable speed sensors could be employed within or before the transmission 100 to provide an input speed signal for the transmission controller 3010 to be described in connection with FIGS. 28A-G.

An input clutch retainer 326 has a hub portion 328 disposed about and drivingly connected to, as by a spline connection 330, to the axially extending portion 314 of the input clutch retainer hub 312. Sealing means, such as sealing rings 332 and 334, are disposed in corresponding grooves of the input clutch hub retainer 312 between the hub portion 328 and the axially extending portion 314 of the input clutch retainer hub 312. A tapered snap ring 336 is disposed in a groove 338 of the input clutch retainer hub 312 to prevent axial movement of the input clutch retainer 326 toward the gear assembly 500. The input clutch retainer 326 includes an axially extending flange 340 forming a cylinder. A plurality of circumferentially spaced clutch retainer fingers 341 extend radially inwardly from the flange 340 to which the clutch plates, which will be described herein, are mounted.

As illustrated in FIG. 1D, the underdrive clutch assembly 302 comprises a plurality of axially spaced annular clutch plates 342 and a plurality of axially spaced annular clutch discs 344. The clutch discs 344 are alternated between the clutch plates 342 and when the clutch assembly 302 is not applied, these plates and discs are free to move or rotate relative to each other. The clutch plates 342 have splines (not shown) on their outer diameter and mount in grooves 346 of the clutch retainer fingers 341 which are inside the input clutch retainer 326. The clutch discs 344 have internal splines (not shown) and are lined with a friction material 347. The clutch discs 344 are mounted in grooves 348 in an underdrive clutch hub 350. The underdrive clutch hub 350 is integral with a rotatable underdrive gear shaft 352 of the gear assembly 500. A thrust bearing 353 is disposed axially between the axially extending portion 314 of the input clutch retainer hub 312 and underdrive clutch hub 350.

The overdrive clutch assembly 304 comprises a plurality of axially spaced annular clutch plates 354 and a plurality of axially spaced annular clutch discs 356. The clutch plates 354 and clutch discs 356 are similar to those of the underdrive clutch assembly 302. Clutch discs 356 are disposed in splines formed in an overdrive clutch hub 358 which is supported by bushings 360 and 361 about the gear shaft 352. Thrust members 362 and 363 are disposed axially between the underdrive clutch hub 350 and overdrive clutch hub 358. The thrust members 362 and 363 are similar to the thrust member 165. An annular reaction plate 364 is secured to the inside of the input clutch retainer 326 axially between the underdrive and overdrive clutch plates and discs 342, 344 354 and 356, respectively. The reaction plate 364 is shared by the underdrive 302 and overdrive 304 clutch assemblies. Annular snap rings 366 and 368 are disposed on the sides of the reaction plate 364. Snap ring 368 is a tapered ring, restraining reaction plate 364 from axial movement.

The reverse clutch assembly 306 comprises at least one annular clutch plate 370 and a plurality of axially spaced annular clutch discs 372. The reverse clutch plate 370 and clutch discs 372 are similar to those of the underdrive clutch assembly 302. The reverse clutch discs 372 are mounted in splines 373 of a reverse clutch hub 374. The reverse clutch hub 374 is supported by bushings 376 and 378 about one end of the overdrive clutch hub 358. A thrust member 379 is disposed axially between the overdrive clutch hub 358 and reverse clutch hub 379. The thrust member 379 is similar to the thrust member 165. An annular reaction plate 380 is mounted about one end of the flange 340 of the input clutch retainer 326 on one side of the reverse clutch plate 370 and discs 372. Selective snap rings 384 secure the reaction plate 380 from axial movement along the input clutch retainer 326.

To apply the overdrive clutch assembly 304 and reverse clutch assembly 306, a fluid actuating device such as a first hydraulic piston 386 has an axially extending projection 388 which operates in a bore or recess 390 of the input clutch retainer hub 312. The inner diameter of the projection 388 has a groove 392 provided for a snap ring 394, while the recess 390 of the input clutch retainer hub 312 has a groove 396 for a sealing means such as a synthetic rubber seal ring 398. The first hydraulic piston 386 is slidingly and sealingly mounted for axial movement on the outer diameter of the hub portion 328 of the input clutch retainer 326 through sealing means 400 at its inner periphery and near the outer periphery of the input clutch retainer 326 through sealing means 402. A double-acting spring means such as a Belleville like spring 404 is disposed between the first hydraulic piston 386 and the input clutch retainer hub 312 to bias or return the first hydraulic piston 386 to its non-displaced or non-applied position shown in the figure. The double-acting spring 404 has a conical shape with fingers 405 and is formed with a linear slope such that its inner and outer diameters do not lie in the same cross-sectional plane. The double-acting spring 404 will be discussed more in detail under the section heading "DOUBLE-ACTING SPRING".

The first hydraulic piston 386 includes an axially extending cylinder portion 406 which has an annular pressure plate member 408 secured at one end thereof by waved snap ring 409a and snap ring 409b. A pressure plate member 408 is interposed between the overdrive clutch assembly 304 and the reverse clutch assembly 306 to engage the clutch plates 354, 370 and discs 356, 372, respectively. Hence, the single pressure plate member 408 is shared by the overdrive clutch 304 and reverse clutch 306 assemblies.

To engage or disengage the underdrive clutch assembly 302, a second hydraulic piston 410 operates in a recess 412 of the input clutch retainer 326. The smooth outer diameter of the hub portion 314 of the input clutch retainer hub 312 has a groove 414 provided with a sealing means such as a synthetic rubber inner seal ring 416, while the outer periphery of recess 412 has a groove 418 for an outer seal ring 420. The second hydraulic piston 410 has one end 422 abutting the clutch plates 342 of the underdrive clutch assembly 302. An annular conically shaped spring retainer member 424 is abuttingly mounted against a snap ring 426. The snap ring 426 is disposed in a groove 428 formed in the axially extending portion 324 of the input clutch retainer hub 312. The other end of the spring retainer member 424 is in sealing engagement with the second hydraulic piston 410 through sealing means 430. The spring retainer member 424 is filled with fluid fed through an orifice (not shown) in the second hydraulic piston 410 from a passage (not shown) in the input clutch retainer hub 312 to provide the pressure balance for the second hydraulic piston 410. The excess fluid is allowed to leak past the snap ring 426 to cool the underdrive clutch assembly 302. A spring means such as a coiled spring 432 is disposed between the spring retainer member 424 and the second hydraulic piston 410 to bias or return the second hydraulic piston 410 to its original position shown in the figure when not applied.

At the output end of the transmission 100, the transmission case 102 houses the output or brake clutch assemblies such as the two/four shift clutch assembly 308 and the low/reverse clutch assembly 310. The two/four shift clutch assembly 308 comprises a plurality of axially spaced annular clutch plates 434 and a plurality of axially spaced annular clutch discs 436. The clutch plates 434 and clutch discs 436 are similar to those of the underdrive clutch assembly 302. The clutch plates 434 are mounted in splines 438 of circumferentially spaced and radially inwardly extending case clutch fingers 439 inside the transmission case 102. The clutch discs 436 are mounted in splines 440 formed in an axially extending flange 442 of the reverse clutch hub 374. A spring means such as a Belleville like spring 444, similar to spring 404, is mounted inside the transmission case 102 on one side of the two/four shift clutch assembly 308. An annular reaction plate 445 is mounted on the other side of the two/four shift clutch assembly 308 and between the two/four shift clutch assembly 308 and the low/reverse clutch assembly 310. The reaction plate 445 is shared by the two/four shift clutch 308 and low/reverse clutch 310 assemblies. Snap rings 446 and 447 are mounted in the transmission case 102 on the sides of the reaction plate 445 to lock it in place. Snap ring 446 is a tapered ring, restraining reaction plate 445 from axial movement.

To apply the two/four shift clutch assembly 308, a third hydraulic piston 448 operates in a cavity 450 formed by an annular piston housing 452. The piston housing 452 is secured to the transmission case 102 by suitable fastening means (not shown). The smooth diameter of the third hydraulic piston 448 has a groove 454 formed in its outer periphery for an outer seal ring 456 and a groove 458 formed in its inner periphery for an inner seal ring 460. A snap ring 462 is disposed in a groove 464 in the transmission case 102 to prevent axial movement of the piston housing 452.

The low/reverse clutch assembly 310 comprises a plurality of axially spaced annular clutch plates 466 and a plurality of axially spaced annular clutch discs 468. The clutch plates 466 and clutch discs 468 are similar to those of the underdrive clutch assembly 302. The clutch plates 466 are mounted in splines 470 of the case clutch fingers 439 inside the transmission case 102. The clutch discs 468 are mounted in splines 472 of the outer periphery of an annulus gear 542 of the gear assembly 500 to be described further herein.

To apply the low/reverse clutch assembly 310, a fourth hydraulic piston 474 operates in a cavity 476 formed by an annular piston housing 478. The piston housing 478 is disposed in an annular recess 480 of the transmission case 102 and secured by suitable fastening means, such as bolts 481, to the transmission case 102. The smooth diameter of the fourth hydraulic piston 474 has a groove 482 formed in its outer periphery for an outer seal ring 484 and a groove 486 formed in its inner periphery for an inner seal ring 488. A spring means such as a Belleville like spring 490, similar to spring 404, is disposed between the fourth hydraulic piston 474 and the gear assembly 500 to bias or return the fourth hydraulic piston 474 to its original position when not applied as shown in the figure. A snap ring 492 retains one end of the spring 490 to the transmission case 102.

GEAR ASSEMBLY STRUCTURE

During the flow of power, the gear assembly 500 changes the ratio of torque between an input member, such as input shaft 176, and an output member, such as output gear 534 which will be further described herein. The gear assembly 500 comprises a front or first planetary gear set, generally indicated at 502, and an axially spaced rear or second planetary gear set, generally indicated at 504. The first planetary gear set 502 includes a first sun gear 506 at its center. The first sun gear 506 is connected to the reverse clutch hub 374 at its inner periphery and is supported upon bushings 376 and 378. A first planet carrier 508 is disposed about the first sun gear 506. The first planet carrier 508 includes a plurality of circumferentially spaced first pinion gears 510 mounted about shafts 512 connected to the first planet carrier 508. The first planet carrier 508 includes an inner portion 514 splined at 516 to the overdrive clutch hub 358. A thrust bearing 517 is disposed axially between one end of the first sun gear 506 and inner portion 514 of the first planet carrier 508. The first planet carrier 508 also includes an axially extending outer portion 518 forming a cylinder about the first planetary gear set 502. A first annulus gear 519 is disposed about the first planet carrier 508 and engages the first pinion gears 510.

The rear or second planetary gear set 504 includes a second sun gear 520 at its center which is splined at 522 to the gear shaft 352. A thrust bearing 523 is axially disposed between one end of the inner portion 514 of the first planet carrier 508 and the second sun gear 520. A second planet carrier 524 is disposed about the second sun gear 520. The second planet carrier 524 includes a plurality of circumferentially spaced second pinion gears 526 mounted about shafts 528 connected to the second planet carrier 524. The second planet carrier 524 includes an inner portion 530 splined at 532 to a rotatable output gear 534 which acts as the output member of the transmission 100. The inner portion 530 of the second planet carrier 524 is supported by a bushing 536 disposed about the second sun gear 520. A thrust bearing 537 is disposed axially between the second sun gear 520 and second planet carrier 524. A tapered roller bearing assembly 538 supports the inner portion 530 of the second planet carrier 524 within the transmission case 102.

The second planet carrier 524 also includes an outer portion 540 connected to the first annulus gear 519. The second annulus gear 542 is disposed about the second planet carrier 524 and engages the second pinion gears 526. The second annulus gear 542 is connected to the outer portion 518 of the first planet carrier 508.

The second planet carrier 524 includes teeth 544 at its outer periphery of the outer portion 540. An output speed sensor 546 threadably engages a bore 548 in the transmission case 102 and has one end 550 disposed or radially spaced just above the teeth 544 of the second planet carrier 524. The output speed sensor 546 is used to monitor or sense the revolution rate (per minute) of the second planet carrier 524 by counting or sensing the teeth 544 passing thereby relative to time. The output speed sensor 546 is similar to the turbine speed sensor 320. It should also be noted that other suitable speed sensors could be used inside or after the transmission 100 to provide an output speed signal to the transmission's controller 3010.

The output gear 534 is secured to the second planet carrier 524 by suitable fastening means such as a bolt 552. The output gear 534 is supported by a tapered roller bearing assembly 554 within the transmission case 102. A rear cover plate member 556 is connected by suitable fastening means (not shown) to the rear or output end of the transmission case 102 to enclose the output gear 534 and the transfer gear (not shown).

To visualize and understand how power is transmitted from the rotating crankshaft 114 of the engine to the output gear 534 of the transmission 100, the operation of the assemblies described above will now be discussed in connection with FIGS. 1C, 1D and 1E.

OPERATION OF THE TORQUE CONVERTER

Rotation of the crankshaft 114 of the engine causes the front cover member 116 to rotate with it due to the connection between bolts 120, plate member 118 and bolts 122. Since the front cover member 116 is welded at 124 to the impeller shell 134 of the impeller assembly 126, the impeller assembly 126 also rotates with the crankshaft 114. The fluid within the impeller assembly 126 is set into motion by the rotation of the impeller assembly 126 and by the fluid pressure from the pump assembly 200. The impeller blades 132 start to carry the fluid around with them. As the fluid is spun around by the impeller blades 132, it is thrown outward by centrifugal force and into the turbine assembly 128 at an angle. The fluid strikes the turbine blades 166 of the turbine assembly 128, thus imparting torque, or turning effort to the turbine assembly 128 and causing the turbine shell 168 and the turbine assembly 128 to rotate. Since the turbine shell 168 is connected to the turbine hub 172 through rivets 170 and the turbine hub 172 is splined at 174 to the input shaft 176, the input shaft 176 is caused to rotate. As engine speed is increased, the force of the fluid striking the turbine blades 166 is also increased. Thus, torque is imparted to the input shaft 176 of the transmission 100 via the turbine assembly 128.

In the torque converter 110, the stator assembly 130 redirects the fluid flow so that the turbine blades 166 will have more force exerted upon them during a torque multiplication stage. During torque multiplication, the over-running clutch assembly 154 in the stator assembly 130 is locked in a known manner so that the stator assembly 130 will remain stationary. As the fluid passes from the turbine assembly 128 to the impeller assembly 126, the stator blades 150 of the stator assembly 130 "push" the fluid against the impeller blades 132 so that a greater entry angle is imparted to the turbine blades 166, resulting in a greater force on the blades 166 and increasing the torque to the input shaft 176 of the transmission 100.

The over-running clutch assembly 154 also permits the stator assembly 130 to rotate only in the same direction as the impeller assembly 126. The over-running clutch assembly 154 resists torque in one direction for the purpose of making the stator plate 152 and stator vanes 150 stationary. This is accomplished by the clutch rollers 158 engaging radially narrowing recesses (not shown) in the over-running clutch cam 156 to cause the over-running clutch cam 156, rollers 158 and race 160 to form a single unit. Since the over-running clutch race 160 is splined at 162 to the reaction shaft 164 which, in turn, is welded at 210 to the reaction shaft support 204 which cannot rotate, the over-running clutch cam 156, rollers 158 and race 160 remain stationary, resulting in the stator plate 152 and vanes 150 remaining stationary. The over-running clutch assembly 154 allows the stator plate 152 and vanes 150 to rotate freely in the opposite direction when their function as a reaction member is not desired because the rollers 158 do not engage the recesses, resulting in the over-running clutch cam 156 rotating freely about the clutch race 160.

OPERATION OF TORQUE CONVERTER LOCK-UP

The lock-up function of the torque converter 110 will now be described. Fluid flows through the center passage 175 of the input shaft 176 into the cavity 182 of the front cover member 116. The turbine hub seal 178 prevents leakage of the fluid back around the input shaft 176. The fluid in cavity 182 flows through slots (not shown) in the front cover bushing 180 and the thrust washer 184 and against the lock-up piston 188. The fluid pushes the portion 192 of the lock-up piston 188 off the friction disc 199, resulting in non-lock-up operation. At the same time, fluid from the pump assembly 200 flows through passage 230 in the reaction shaft support 204 and between the input shaft 176 and reaction shaft member 164. This fluid flows through slots (not shown) in the stepped member 185 and into the turbine 128, stator 130 and impeller 126 assemblies of the torque converter 110. Fluid also flows from these assemblies 126, 128 and 130 between the lock-up piston 188 and the turbine shell 168. Hence, during normal torque converter operation, fluid flow is acting on the opposite side of the lock-up piston 188, attempting to apply the lock-up piston 188. When the input shaft fluid is vented, the torque converter fluid pushes the lock-up piston 188 against the front cover member 116 with the friction disc 199 sandwiched between the two elements. Engine torque can then go through the front cover member 116 to the lock-up piston 188 and, in turn, to drive ring 196 and turbine shell 168.

As will be appreciated, lock-up of the torque converter 110 is desirable to reduce or eliminate rotational speed difference or "slip" between the crankshaft 114 of the engine and the input shaft 176 of the transmission 100. Lock-up of the torque converter 110 may be partial or full lockup. Partial lockup will reduce slip to predetermined value. Full lockup will eliminate slip or reduce it to a zero value. Lockup of the torque converter 110 may occur in second, third and fourth gears. The methodology for lock-up of the torque converter 110 will be described in more detail below, particularly with reference to FIG. 17.

OPERATION OF PUMP

The general operation of the pump assembly 200 will now be described. Specific fluid flow from the pump 200 to various assemblies in the transmission 100 will be described in other sections herein.

The pump 200 creates flow and applies force to the fluid. As described previously, the impeller shell 134 is welded at 136 to the impeller hub 138 which acts as the pump drive shaft of the pump assembly 200. Rotation of the impeller shell 134 results in rotation of the impeller hub 138. Thus, the external source of power for the pump 200 is the engine.

In the pump assembly 200, both rotor members 218 and 222 rotate together. The inner rotor 222 is splined at 140 to the impeller hub 138 and, therefore, rotates as the impeller hub 138 rotates. As the inner rotor 222 rotates or drives the outer rotor 218, a space (not shown) between the rotors 218, 222 increases as the rotor teeth separate and pass an outlet port (not shown).

In the pump assembly 200, a crescent-shaped protrusion (not shown) of the pump housing 202 divides the rotors 218 and 222. Fluid is trapped between the protrusion and the rotor teeth as it is carried to the outlet port for further use in a manner to be described in other sections herein.

OPERATION OF THE CLUTCHES

As described previously, the input shaft 176 of the transmission 100 is rotating due to torque being transferred from the rotating crankshaft 114 of the engine and through the torque converter 110 to the input shaft 176. The input clutch retainer hub 213 also rotates with the input shaft 176 due to its spline connection 317 with the input shaft 176. The input clutch retainer 326 and clutch plates 342, 354 and 370 also rotate with the input shaft 176 due to the spline connection 330 of the input clutch retainer 326 to the input clutch retainer hub 312 and spline connection of clutch plates 342, 354 and 370 to the input clutch retainer 326.

To apply the underdrive clutch assembly 308, hydraulic pressure from fluid entering between the input clutch retainer 326 and second hydraulic piston 410 moves the second hydraulic piston 410 axially, thereby compressing the spring 432. The second hydraulic piston 410 forces the rotating clutch plates 342 and momentarily stationary discs 344 of the underdrive clutch assembly 302 together and produces frictional force between the clutch plates 342 and discs 344. Because the input clutch retainer 326 and underdrive clutch plates 342 are rotating, the frictional force causes the underdrive clutch discs 344 and hub 350 to rotate, in turn, rotating gear shaft 352 of the gear assembly 500. When the hydraulic fluid to the underdrive clutch assembly 302 is vented, the compressed spring 432 applies a force to the second hydraulic piston 410, thereby returning the second hydraulic piston 410 to its non-applied position as shown in the figure.

To apply the overdrive clutch assembly 304, hydraulic pressure from fluid entering between the first hydraulic piston 386 and the input clutch retainer 326 moves or pulls the first hydraulic piston 386 axially, thereby deflecting axially the spring 404. The pressure plate member 408 of the first hydraulic piston 386 forces the clutch plates 354 and discs 356 of the overdrive clutch assembly 304 together against the reaction plate 364 and produces a frictional force between them. Because the input clutch retainer 326 and overdrive clutch plates 354 are rotating, the frictional force causes the overdrive clutch discs 356 and overdrive clutch hub 358 to rotate, in turn, rotating the first planet carrier 508 and second annulus gear 542. When the hydraulic fluid to the overdrive clutch assembly 304 or first hydraulic piston 386 is vented, the deflected spring 404 applies a force to the first hydraulic piston 386, thereby returning the first hydraulic piston 386 to its non-applied position as shown in the figure.

To apply the reverse clutch assembly 306, hydraulic pressure from fluid entering between the first hydraulic piston 386 and input clutch retainer hub 213 moves or pushes the first hydraulic piston 386 axially, thereby deflecting the spring 404. The pressure plate member 408 of the first hydraulic piston 386 forces the clutch plate 370 and discs 372 of the reverse clutch assembly 306 together against the reaction plate 380 and produces a frictional force between them. Because the input clutch retainer 326 and reverse clutch plate 370 are rotating, the frictional force causes the reverse clutch discs 372 and reverse clutch hub 374 to rotate, in turn, rotating the first sun gear 506. When the hydraulic fluid to the reverse clutch assembly 306 or first hydraulic piston 386 is vented, the deflected spring 404 applies a force to the first hydraulic piston 386, thereby returning the first hydraulic piston 386 to its non-applied position as shown in the figure.

At the output end of the transmission 100, the two/four shift clutch 308 and low/reverse clutch 310 assemblies are used to hold a particular gear element of the gear assembly 500 against rotation by coupling it to the relatively stationary transmission case 102. To apply the two/four shift clutch assembly 308, hydraulic pressure from fluid entering between the third hydraulic piston housing 452 and the third hydraulic piston 448 moves the third hydraulic piston 448 axially, thereby deflecting the spring 444. The third hydraulic piston 448 forces the clutch plates 434 and discs 436 of the two/four shift clutch assembly 308 together against the reaction plate 445 and produces a frictional force between them. Because the two/four clutch plates 434 do not rotate or are stationary, as they are connected to the transmission case 102, the frictional force holds the two/four clutch discs 436 stationary, in turn, holding the flange 442, reverse hub member 374 and first sun gear 506 stationary. When the hydraulic fluid to the two/four shift clutch assembly 308 or third hydraulic piston 448 is vented, the deflected spring 444 applies a force to the third hydraulic piston 448, thereby returning the third hydraulic piston 448 to its non-applied position as shown in the figure.

To apply the low/reverse clutch assembly 310, hydraulic pressure from fluid entering between the fourth hydraulic piston housing 476 and the fourth hydraulic piston 474 moves the fourth hydraulic piston 474 axially, thereby deflecting the spring 490. The fourth hydraulic piston 474 forces the clutch plates 466 and discs 468 of the low/reverse clutch assembly 310 together against reaction plate 445 and produces a frictional force between them. Because the low/reverse clutch plates 466 are stationary, as they are connected to the transmission case 102, the frictional force holds the low/reverse clutch discs 468 stationary, in turn, holding the second annulus gear 542 and first planet carrier 508 stationary. When the hydraulic fluid to the low/reverse clutch assembly 474 or fourth hydraulic piston 474 is vented, the deflected spring 490 applies a force to the fourth hydraulic piston 474, thereby returning the fourth hydraulic piston 474 to its non-applied position as shown in the figure.

OPERATION OF PLANETARY GEARS

In the neutral N or park P modes of transmission operation, the input shaft 176 (which is attached to the turbine assembly 128) freely rotates with the engine crankshaft 114. Since the input clutch retainer hub 312 is also attached to the input shaft 176, the input clutch retainer hub 312 rotates, in turn, causing the input clutch retainer 326 and clutch plates 342, 354 and 370 to freely rotate with the engine crankshaft 114.

When the transmission 100 is desired to operate in first gear, the underdrive clutch assembly 302 and low/-reverse clutch assembly 310 are applied. Hydraulic fluid moves the second hydraulic piston 410 axially away from the torque converter 110 to engage the clutch plates 342 and friction discs 344 of the underdrive clutch assembly 302. This engagement causes the underdrive clutch hub 350 to rotate which, in turn, rotates the gear shaft 352. Because the second sun gear 520 is splined at 522 to the gear shaft 352, rotation of the gear shaft 352 causes the second sun gear 520 to rotate. As the low/reverse clutch assembly 310 is applied by the engagement of the low/reverse clutch plates 466 with the discs 468, the second annulus gear 542 is held stationary. Since the second annulus gear 542 is connected to the first planet carrier 508, the first planet carrier 508 is held stationary. As a result, rotation of the second sun gear 520 causes rotation of the second pinion gears 528 and the second planet carrier 524. Because the output gear 534 is splined at 532 to the second planet carrier 524, rotation of the second planet carrier 524 causes the output gear 534 to rotate. Since the second planet carrier 524 rotates, the first annulus gear 519 also rotates, causing the first pinion gears 510 and first sun gear 506 to freely rotate in first gear. The output gear 534 then transfers the torque from the second planetary carrier 524 to the transfer gear (not shown).

When the transmission 100 is desired to operate in second gear, the underdrive clutch assembly 302 and the two/four shift clutch assembly 308 are applied. Once again, the underdrive clutch hub 350 rotates as described above which, in turn, rotates the gear shaft 352. Rotation of gear shaft 352 causes the second sun gear 520 to rotate. As the two/four shift clutch assembly 308 is applied by engagement of the two/four shift clutch plates 434 with the discs 436, the flange 442, reverse clutch hub 374 and first sun gear 506 are held stationary. Because the transmission 100 has been operating in first gear, the first annulus gear 519 and second planet carrier 524 have been rotating at output speed. Also, the first sun gear 506 has been rotating freely. By holding the first sun gear 506 stationary, the first pinion gears 510 and first planet carrier 508 increase in speed. As a result, the first annulus gear 519, second planet carrier 524 and the output gear 534 rotate at a greater r.p.m. than first gear.

When the transmission 100 is desired to operate in third gear, the underdrive clutch assembly 302 and the overdrive clutch assembly 304 are applied. Once again, engagement of the underdrive clutch assembly 302 causes the second sun gear 520 to rotate as previously described. As the overdrive clutch assembly 304 is applied by engagement of the clutch plates 354 and discs 356 of the overdrive clutch assembly 304, the overdrive clutch hub 358 rotates, in turn, rotating the first planet carrier 508 due to the spline connection at 516. Since the first planet carrier 508 rotates, the first pinion gears 510, first sun gear 506 and second annulus gear 542 also rotate. As a result, the second pinion gears 526 of the second planet carrier 524 rotate, causing the second planet carrier 524 to rotate which, in turn, rotates the output gear 534 at input speed or a higher r.p.m. than second gear.

When the transmission 100 is desired to operate in fourth gear, the overdrive clutch assembly 304 and two/four shift clutch assembly 308 are applied. Application of the overdrive clutch assembly 304 causes the overdrive clutch hub 358 to rotate, as previously described. Rotation of the overdrive clutch hub 358 causes the first planet carrier 508 and second annulus gear 542 to rotate. Application of the two/four shift clutch assembly 308 causes the flange 442, reverse clutch hub 374 and first sun gear 506 to be held stationary as previously described. As a result, rotation of the first planet carrier 508 causes the first pinion gears 510, first annulus gear 519 and second annulus gear 542 to rotate. Rotation of the first and second annulus gears 519 and 542, respectively, causes the second pinion gears 526 and second planet carrier 524 to rotate which, in turn, rotates the output gear 534 at a greater r.p.m. than third gear.

When the transmission 100 is desired to operate in reverse gear, the reverse clutch assembly 306 and low/-reverse clutch assembly 310 are applied. The reverse clutch assembly 306 is applied by engagement of the reverse clutch plate 370 and discs 372. This engagement causes the reverse clutch hub 374 to rotate which, in turn, rotates the first sun gear 506. Application of the low/reverse clutch assembly 310 causes the first planet carrier 508 and the second annulus gear 542 to be held stationary as previously described. As a result, the first sun gear 506 rotates the first pinion gears 510 which, in turn, rotate the first annulus gear 519 backwards. Rotation of the first annulus gear 519 causes the second planet carrier 524 and second pinion gears 526 to rotate which, in turn, causes rotation of the output gear 534 in a direction opposite to the other gear positions. Rotation of the second pinion gears 526 also causes the second sun gear 520 to rotate freely.

CLUTCH REACTION AND APPLY PLATES

Referring to FIG. 1D, the reaction plate 380 and pressure plate member 408 are shown. The present invention features web means such as an annular web 380a spaced radially at the outer periphery of the reaction plate 380 and connected to the reaction plate 380 at least one location circumferentially, and an annular web 408a spaced radially at the outer periphery of the pressure plate member 408 and connected to the pressure plate member 408 at least one location circumferentially. The webs 380a and 408a are an efficient means of increasing axial rigidity to restrict clutch deflection. The reaction plate 380 and pressure plate member 408 resist loads producing a stress pattern like that found in a Belleville spring (i.e. producing a family of moments along the radial direction).

In a standard pressure or reaction plate, the highest stresses occur at the outer diameter (OD) and inner diameter (ID) edges. The distributed loading by the clutch apply piston causes the plate to deflect to a generally conical shape of some angle theta. With the addition of the annular web 380a, 408a, more material is being strained, resulting in lower stresses and less deflection theta. Thus, the addition of the web 380a, 408a produces a plate having a stiffness comparable to the entire volume from ID to OD of the reaction plate 380 or pressure plate member 408 having been filled with material.

Additionally, the inside diameter of the annular web portion 380a is fitted closely with the outside diameter of clutch retainer fingers 341 such that the fingers 341 and snap ring 384 are better supported (effectively stronger) against axial piston loading and centrifugally induced loads.

BLEEDER BALL CHECK VALVES

As illustrated in FIGS. 2A and 2B, the reaction shaft member 164 and reaction shaft support 204 are shown. The reaction shaft member 164 is welded at 210 to the reaction shaft support 204. The reaction shaft support 204 comprises a plate portion 232 integral with a hub portion 234. The plate portion 232 includes a pair of circumferentially spaced apertures 236 and 238. Each aperture 236 and 238 has a corresponding passageway 240 communicating therewith and an outlet port 242. Bleeder means such as bleeder ball check valves or dribblers, generally indicated at 244 and 246, are disposed in apertures 236 and 238, respectively, to fill the clutch apply cavities 620 and 622 of the overdrive 304 and reverse 306 assemblies, respectively, as soon as possible after the input clutch retainer 326 begins to rotate and to assure that some fluid always dribbles thereto.

The bleeder ball check valves 244 and 246 each include a screen 248, a ball support 250 disposed in the passageway 240 and a ball 252 supported therein. The ball 252 moves to open and close a narrow aperture or orifice 254 in the ball support 250. The screen 248 acts as a filter to prevent plugging of the orifice 254. The ball support 250 is also formed with inwardly directed fingers 255 which limit the axial movement of the ball 252. The bleeder ball check valves 244 and 246 allow one-way fluid flow to either the overdrive 304 or reverse 306 clutch assemblies, respectively. The size or diameter of the orifice 254 is selected to maintain a minimum pressure, i.e. approximately 0.25 to 2 p.s.i., in the clutch apply cavities 620 and 622 at all times.

In operation, fluid flows from the torque converter 110 to reaction shaft support 204. When either clutch assembly 304, 306 is released, fluid enters apertures 236 or 238 in the plate portion 232 and flows through the corresponding orifice 254 in ball support 250 due to the pressure differential between the fluid pressure from the torque converter 110 and the respective clutch apply cavity being vented. Fluid displaces and moves past the ball 252 to the overdrive 304 or reverse 306 clutch assemblies. When the clutch apply cavity is filled, the fluid pressure moves the ball 252 to close the orifice 254 to prevent backflow. Thus, the bleeder ball check valves 236 and 238 provide fluid to keep the clutch apply cavities 620 and 622, respectively, filled and maintain a pressure balance on the first hydraulic piston 386 whenever rotation exists.

PRESSURE BALANCED PISTONS

Referring to FIG. 1B, the first hydraulic piston 386 includes at least one bleeder orifice 256. The bleeder orifice 256 is typically 0.020 inches in diameter and communicates axially through the first hydraulic piston 386. A filter such as a screen 258 is disposed in the bleeder orifice 256 to prevent plugging of the bleeder orifice 256 by dirt and other contaminants.

In operation, the first hydraulic piston 386 is displaced axially by fluid pressure in the clutch apply cavities 622 and 620 for the application of either the reverse 306 or overdrive 304 clutch assemblies, respectively. When that application is removed, the first hydraulic piston 386 must return to its substantially centered or non-applied position. Due to the centrifugal force acting on the rotating fluid in either of the clutch apply cavities 620 or 622 which applied the piston 386, an unbalanced pressure will exist and cause the first hydraulic piston 386 to be biased and remain in that position even through the fluid apply line is vented. The bleeder orifice 256 acts as a means to allow fluid to pass through the first hydraulic piston 386 due to this differential pressure and allows the first hydraulic piston 386 to be centered by the spring 404 since any centrifugal fluid pressure in the clutch apply cavity is balanced by a comparable centrifugal fluid pressure on the opposite side when both clutch apply cavities 620 and 622 are filled. The second hydraulic piston 410 has a similar bleed orifice (not shown) and secondary source of fluid to fill its pressure balance cavity.

DOUBLE-ACTING SPRING

As illustrated in FIGS. 1C, 3A and 3B, a means such as a double-acting spring 404 locates and returns the first hydraulic piston 386. The double-acting spring 404 is a Belleville like spring. The double-acting spring 404 is also annular and conically shaped with circumferentially spaced and inwardly extending fingers 405. The double-acting spring 404 provides the advantage of saving space axially in the transmission 100 due to its compactness. In other words, a conventional coil spring would increase the axial length of the transmission 100 as compared to the double-acting spring 404.

The spring 404 is double-acting; that is, it is applied in two directions at two different focal points. As illustrated in FIG. 3C, when the first hydraulic piston 386 is located or substantially centered in its non-engaged or non-applied position between the input clutch retainer hub 312 and the input clutch retainer 326, the double-acting spring 404 maintains a four point contact. The double-acting spring 404 contacts the snap ring 394, the shoulder portion 313 of the input clutch retainer hub 312, the inner periphery of the first hydraulic piston 386 and one end of the hub portion 328 of the input clutch retainer 326.

When the first hydraulic piston 386 applies the overdrive clutch 304, the double-acting spring 404 is displaced toward the torque converter 110. As illustrated in FIG. 3D, the double-acting spring 404 at its outer periphery contacts the shoulder portion 313 of the input clutch retainer hub 312 and the inner periphery of the first hydraulic piston 386. The double-acting spring 404 applies a return force toward its centered position at the inner periphery of the first hydraulic piston 386.

When the first hydraulic piston 386 applies the reverse clutch 306, the double-acting spring 404 is displaced axially in a direction away from the torque converter 110. As illustrated in FIG. 3E, the double-acting spring 404 contacts the snap ring 394 and the end of the hub portion 328 of the input clutch retainer 326. The double-acting spring 404 applies a return force toward its centered position at the snap ring 394.

In other words, double-acting spring 404 applies a force at its outer periphery in the direction of the torque converter 110 to move the first hydraulic piston 386 axially toward the torque converter 110. This focal point is located at the inner periphery thereof. The double-acting spring 404 also applies a force at its inner periphery in the direction of the output gear 534 to move the first hydraulic piston 386 toward the output gear 534. This focal point is located at the outer periphery of the double-acting spring 404.

Additionally, the double-acting spring 404 is preloaded either by the first hydraulic piston 386 or the input clutch retainer hub 312. Since the double-acting spring 404 usually bends as a cantilever beam, the preloading of the spring 404 by the inner periphery of the first hydraulic piston 386 produces a tip deflection at the outer periphery of the double-acting spring 404, resulting in a gap between the spring 404 and the snap ring 394. Preloading at the shoulder 313 by the input clutch retainer hub 312 produces a tip deflection in the opposite direction, reducing the gap between the double-acting spring 404 and snap ring 394 by a large amount. As a result, the double-acting spring 404 will take some intermediate or statically indeterminate position, distributing the load to all four apply points previously described. In other words, the axial lash in the piston position is removed by the double-acting spring 404 as it deforms to take a statically indeterminate position between the first hydraulic piston 386 and the input clutch retainer hub 312.

LOW-EFFORT DOUBLE-ROLLER PARK SPRAG

The park locking mechanism positively locks the second planet carrier 524 of the transmission 100 to the transmission case 102 when the park operating mode of the transmission 100 is manually selected by the driver or operator of the vehicle. The present invention provides an automatic transmission park locking mechanism designed to reduce to the least possible extent the sliding friction and effort required to actuate the park locking mechanism.

Figure 4A:
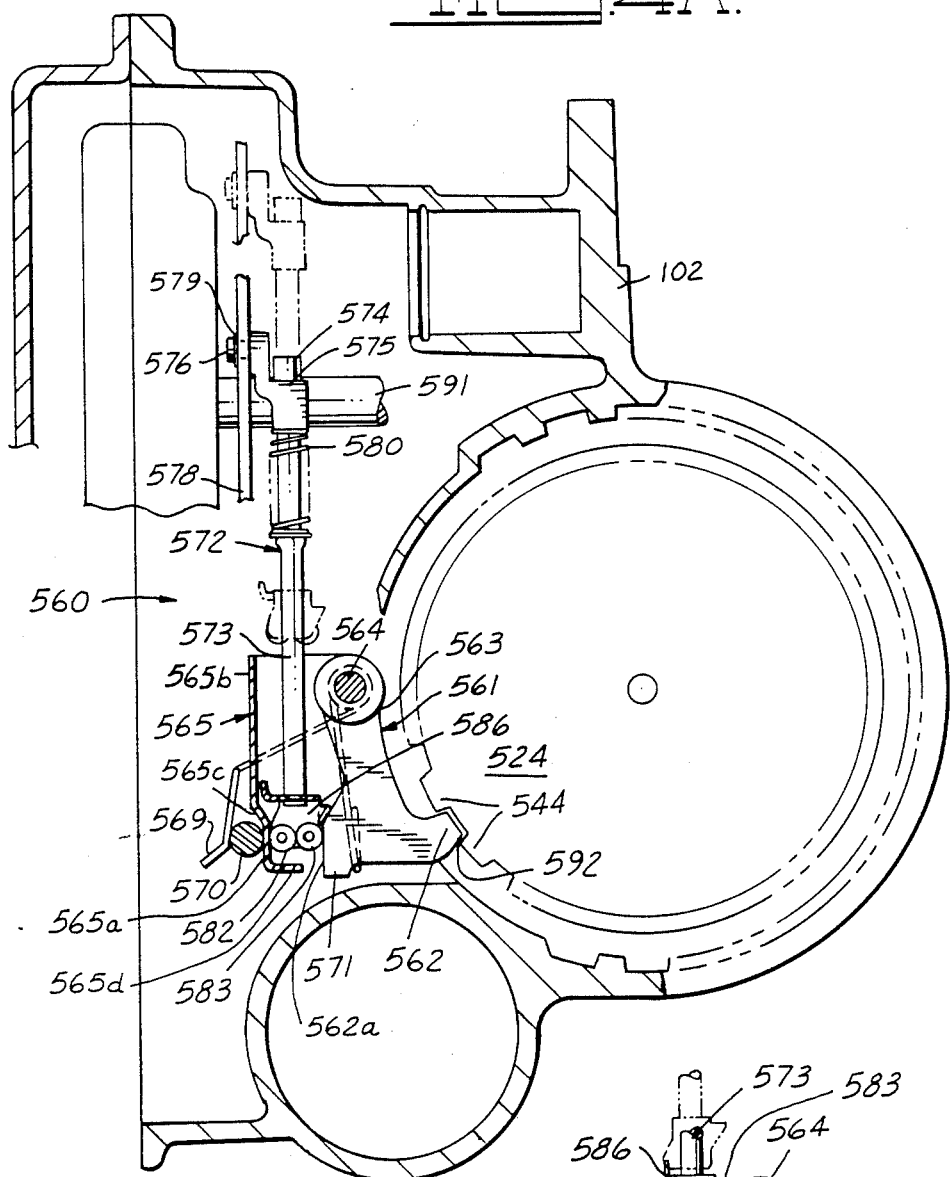
FIGS. 4A-J illustrate the park locking mechanism according to the present invention.

Referring to FIGS. 4A through 4J, a low-effort double-roller park locking mechanism or sprag 560 is shown. As illustrated in FIG. 4E, the park sprag 560 includes a pawl lever or member, generally indicated at 561, having a shape similar to the lower case letter "r". The pawl member 561 includes a head portion 562. A planar edge portion 562a, a sloping cam or ramp portion 562b and a pressure edge portion 562c provide a cam surface, as will be explained below, engageable with rollers. One end 563 of the pawl member 561 is pivotally connected about a dowel or pin 564 of the transmission case 102. The pawl member 561 is supported by the pin 564 between a retainer bracket, generally indicated at 565. The retainer bracket 565 is U-shaped in cross-section and includes an inwardly offset wall portion 565a joined to the principal wall portion 565b by an intermediate oblique or angled wall portion 565c to form a bracket wall. The angled wall portion 565c together with the principal 565b and offset 565a wall portions provide a cam surface for the rollers to be described herein. The offset wall portion 565a terminates in a right-angled stop flange or end wall 565d (FIG. 4D). The retainer bracket 565 includes a pair of side walls 566 extending outwardly from the bracket wall 565a, 565b, 565c.

Washers 567 and 568 are disposed about each side of the pawl member 561 and the pin 564 between the side walls 566 of the retainer bracket 565. A spring means comprising a spring 569 is disposed about the pin 564 and has one end engaging a second dowel or pin 570 of the transmission case 102 and the other end engaging as step or shoulder 571 on the pawl member 561. The spring 569 biases the pawl member 562 toward the offset wall portion 565a of the retainer bracket 565.

The pawl member 561 cooperates with a rod assembly, generally indicated at 572. The rod assembly 572 comprises a rod 573 having a cap member 574 secured at one end. An attachment member 575 is disposed about the rod 573. The attachment member 575 includes a shaft 576 disposed in an aperture 577 of a manual lever or rooster comb 578 and secured thereto by a snap ring 579. A spring 580 is disposed about the rod 573 between the attachment member 575 and laterally extending projections 581 on the rod 573. A more detailed description of the manual lever 578, manual valve 604, shaft member 770, and cam groove 772 can be found under section heading "CAM CONTROLLED MANUAL VALVE".

The other end of the rod 573 includes a pair of laterally adjacent cam rollers 582 and 583 journally supported thereon by their associated support pins 584 and 585, respectively, secured to a U-shaped carrier or bracket member 586, as illustrated in FIG. 4F. Each of the rollers 582, 583 are formed with a central bore 584a and 585a, respectively. Each bore 584a, 585a receive pins 584, 585, respectively, therethrough in an oversize manner such that each of the rollers 582 and 583 are free for predetermined limited transverse movement relative to its associated pin so as to rollingly engage the remaining roller.

The U-shaped bracket member 586 includes an inclined projection 587 extending outwardly parallel with the sides thereof. A projection 588 extends outwardly from each side of the U-shaped bracket member 586 to guide the bracket member 586 between the sides of the retainer bracket 565, as illustrated in FIG. 4G. The U-shaped bracket member 586 also includes an inverted "L" shaped portion 590 at the bottom of the "U".

Figure 4C:
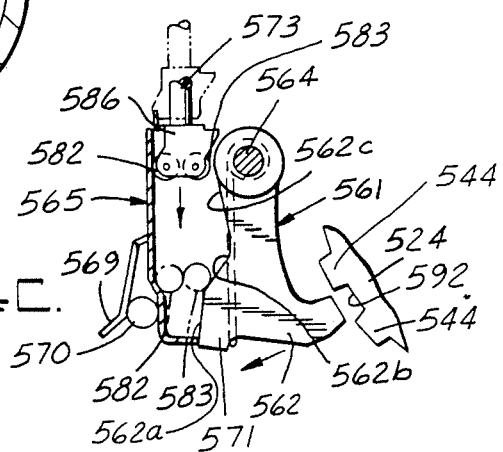
Figure 4H:
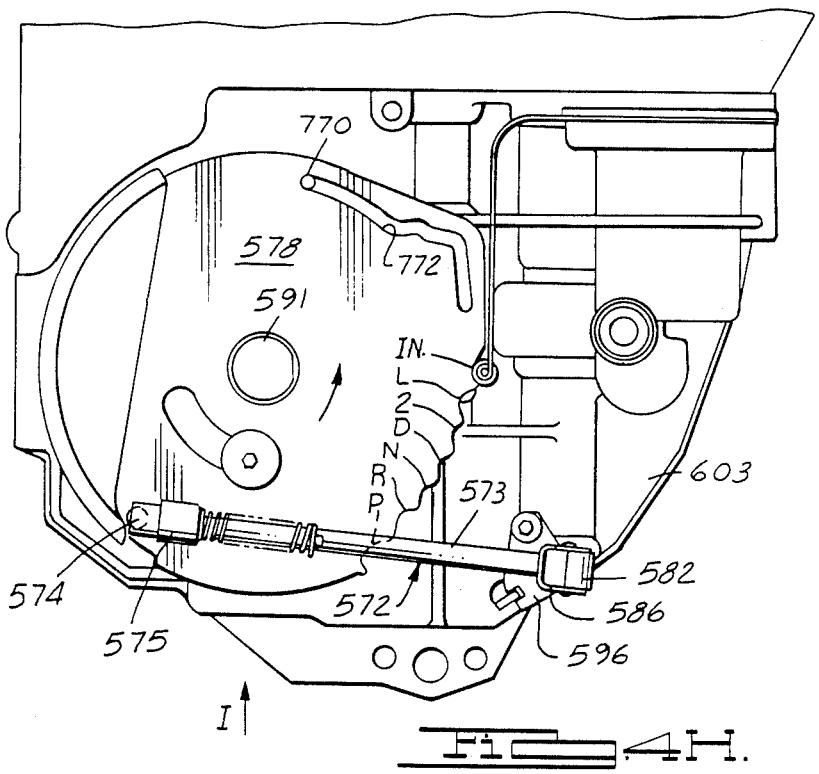

In operation, the pawl member 561 abuts the retainer bracket 565 due to the biasing of the spring 569, as illustrated in solid lines in FIG. 4C, when the shift lever position is not park P. When a shift position or gear selector lever or shaft 591 connected to the manual lever 578, as illustrated in FIGS. 4B and 4H, is moved to the park P position, the rod 573 is moved. The rollers 582 and 583 roll along the principal wall portion 565b of the retainer bracket 565 and the pressure edge portion 562c of the pawl member 561, respectively. One 583 of the rollers engages a ramp portion 562b of the pawl member 561 and one 582 of the rollers engages the angled wall portion 566 of the retainer bracket 565, as illustrated in FIGS. 4C and 4D. This causes the pawl member 561 to be displaced or rotated about the pin 564. The rod 573 moves until one end of the head portion 562 of the pawl member 561 has engaged a space 592 between a pair of adjacent teeth 544 in the second planet carrier 524 of the gear assembly 500 and the rollers 582 and 583 abutting interconnect the planar edge portion 562a of the pawl member 561 and the offset wall portion 565a of the retainer bracket 565 as illustrated in solid lines in FIG. 4A. The operation is reversed when the shift lever is in a position other than the park P position.

Figure 4I:
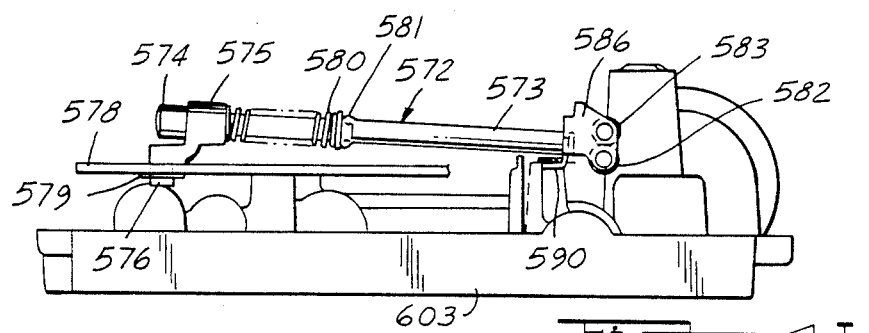
Figure 4J:
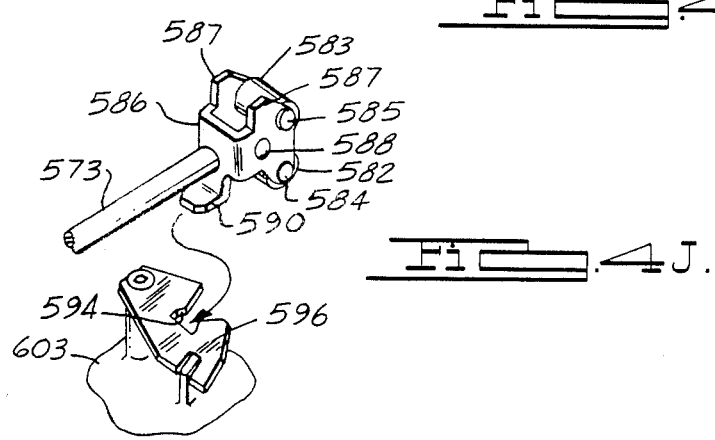

The L-shaped portion 590 engages a slot 594 in a plate member 596 connected to the valve body 603 of the transmission case 102 at the other extreme of the travel, the installation position (IN), as illustrated in FIGS. 4H, 4I and 4J, to limit the travel of the rod assembly 572. During assembly of the transmission 100, the installation position prevents the rod assembly 572 from being moved and maintaining the rod assembly 572 in axial alignment with the guide bracket 565.

When the shift lever position is park P position, the pawl member 561 may not engage a space 592 between adjacent teeth 544 in the second planet carrier 524 as shown in FIG. 4D. In this case, the spring 580 biases the rod 573 toward the end wall 565d of the bracket member 565. This causes the head portion 562 of the pawl member 561 to contact a tooth 544 on the second planet carrier 524. When the vehicle rolls backward, causing the second planet carrier 524 to rotate, the biased spring 580 moves the rod 573 and, in turn, moves the head portion 562 into the next available space 592 in the second planet carrier 524 to lock the second planet carrier 524 in place.

Accordingly, the park locking mechanism 560 provides cam rollers 582, 583 with oversized bores 584a, 585b, respectively, to allow the rollers 582, 583 to shift into load-bearing contact. Thus, the main reaction load applied by the offset wall portion 565b and the cam surface 562b of the pawl member 561 are transmitted first between the rollers 582, 583 to the offset wall portion 565b and, in turn, to the transmission case 102. Hence, substantially reduced reaction loads are transmitted to the pins 584, 585 so as to increase the service life of the pins 584, 585 and rollers 582, 583.

HYDRAULIC SYSTEM STRUCTURE

The function of the hydraulic system is to cooperate with the electronic controls (FIGS. 28A through 28G) to make the transmission 100 fully automatic. Referring to FIGS. 5A through 5L, a schematic diagram of the hydraulic system 600 for controlling and operating the fluid flow throughout the transmission 100 is shown. The pump assembly 200, clutch assemblies 302, 304, 306, 308 and 310, torque converter assembly 110 of FIG. 1, and valves to be described herein, are connected by a plurality of internal passageways, generally indicated at 602, in or between the valve body 603 (FIG. 6), transfer plate (not shown) and transmission case 102.

The fluid source of the transmission 100 is the fluid contained in the transmission pan (not shown) which acts as a reservoir. A filter 605 is attached to the lower half of a transfer plate at the inlet of the transfer plate to prevent dirt and other foreign matter from entering the hydraulic system 600. Another filter (not shown) is disposed in the valve body 603 at the pump pressure inlet to a pressure regulator valve 608 to protect the pressure regulator valve 608 from any loose chips and dirt in the pump hydraulic circuit.

The pump assembly 200 is also connected by the passageways 602 to a manual valve 604 which is coupled to the manually actuated shift lever or manual shaft 591. The manual shaft 591 is connected to the manual lever 578 (FIG. 4B), its shift lever position PRNODDL being generally indicated by numeral 606. The pump assembly 200 is further connected by passageways 602 to a pressure regulator valve 608 and to a solenoid or fluid switch valve 610. The passageways 602 also connect the pressure regulator 608 to a cooler or torque converter (T/C) control valve 612. The passageways 602 also connect the T/C control valve 612 to a lock-up (LU) switch valve 614. The passageways 602 further connect the LU switch valve 614 to the torque converter 110, and they also provide a path from the torque converter 110 back to the LU switch valve 614 and to T/C control valve 612. A cooler 616 is connected by passageways 602 to the T/C control valve 612. The manual valve 604 is also connected by passageways 602 to an underdrive element or clutch apply cavity 618, an overdrive clutch apply cavity 620, reverse clutch apply cavity 622 and a two/four shift clutch apply cavity 624. A low/reverse clutch apply cavity 626 is connected by passageways 602 to the solenoid switch valve 610 and, in turn, to the manual valve 604.

The clutch apply cavities 618, 620, 622, 624 and 626 are also identified in FIGS. 1C and 1D. The valves 604 and 610 are also connected by passageways 602 to a vent reservoir 628 in the manifold assembly 700 (FIGS. 7–9) which is at a higher elevation than the sump of fluid reservoir in the transmission pan. The other valves vent to the sump as indicated by the letter "V".

The hydraulic system 600 also includes an underdrive element or clutch solenoid-actuated valve 630, overdrive clutch solenoid-actuated valve 632, two/four shift clutch solenoid-actuated valve 634 and low/reverse clutch solenoid-actuated valve 636 which will be described in connection with FIGS. 7–9. The solenoid-actuated valves 630, 632, 634 and 636 control the fluid flow to their respective clutch apply cavities 618, 620, 624 and 626.

Figure 5C:
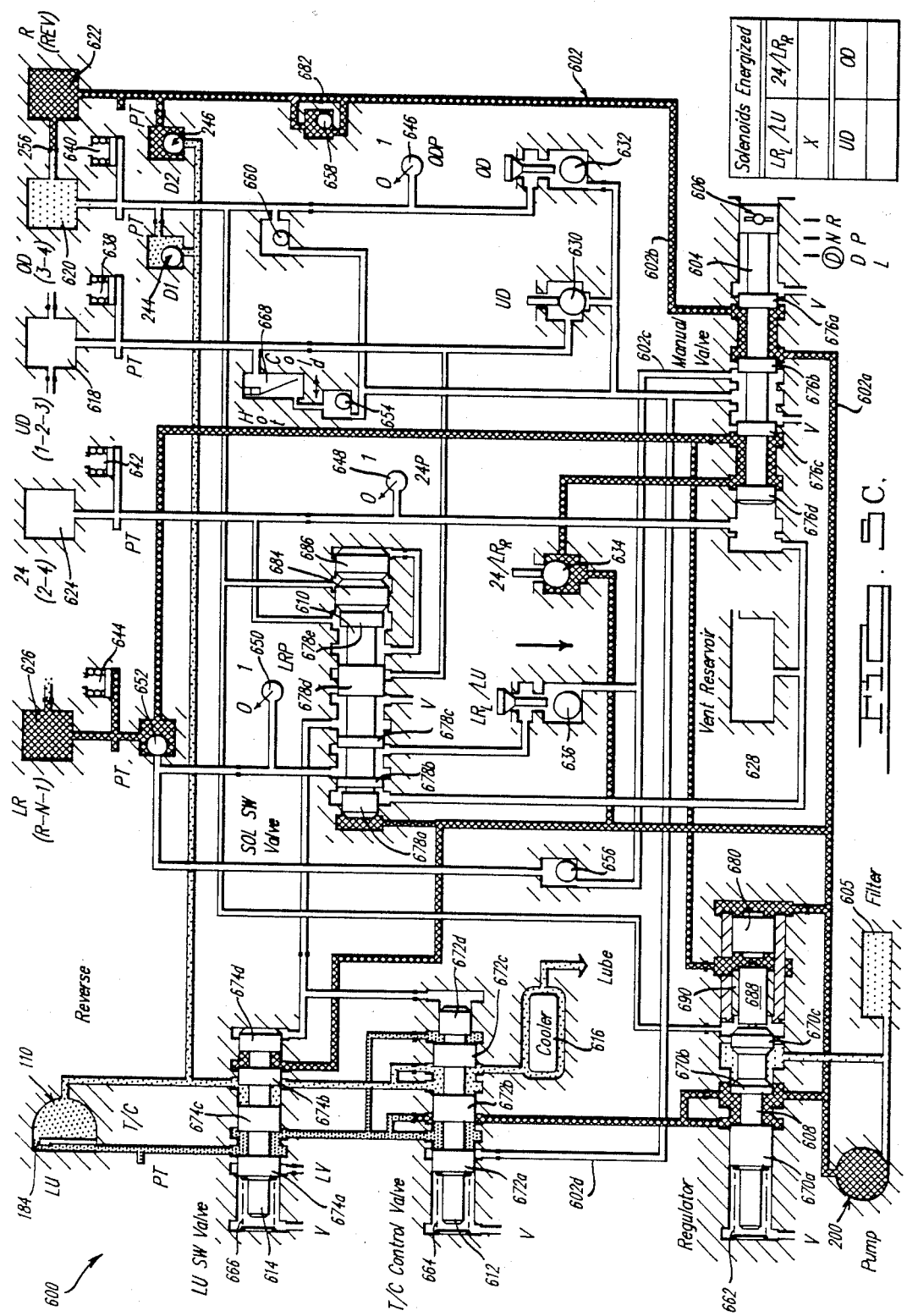

The manual valve 604 controls the fluid flow to the reverse clutch apply cavity 622. The low/reverse clutch solenoid-actuated valve 636 includes a second or dual function of controlling fluid flow to the LU switch valve 614 during lock-up of the torque converter 110 (FIGS. 5G, 5I, 5J, 5L). The two/four clutch solenoid-actuated valve 634 also has a dual function of controlling fluid flow to the low/reverse clutch apply cavity 626 when the shift lever position 606 is reverse (FIG. 5C). These solenoid-actuated valves 630, 632, 634 and 636 operate in response to command or control signals from the electronic controls.

In one embodiment according to the present invention, both the underdrive clutch solenoid-actuated valve 630 and two/four shift clutch solenoid-actuated valve 634 are designed to be normally applied. This means that in the absence of electrical power, the solenoid-actuated valves 630 and 634 will allow pressure or fluid flow in the passageways 602 to be transmitted to the underdrive clutch apply cavity 618 and two/four shift clutch apply cavity 624, respectively. Hence, the underdrive clutch assembly 302 and two/four shift clutch assembly 308 will be applied, resulting in the transmission 100 operating in second gear. Likewise, the overdrive clutch solenoid-actuated valve 632 and low/reverse clutch solenoid-actuated valve 636 are designed to be normally vented. This means that in the absence of electrical power, the solenoid-actuated valves 632 and 636 will vent fluid in passageways 602 and thus prevent fluid flow to the overdrive clutch apply cavity 620 and low/reverse clutch apply cavity 626, respectively. Hence, the overdrive clutch assembly 304 and low/reverse clutch assembly 310 will not be applied so that the transmission 100 may operate in second gear.

The hydraulic system 600 also includes accumulators 638, 640, 642 and 644 which are connected to passageways 602 before the underdrive 618, overdrive 620, two/four shift 624 and low/reverse 626 clutch apply cavities, respectively. As illustrated in FIG. 6, the accumulators 638, 640, 642 and 644 comprise a first spring 645a, a second spring 645b and a piston 645c operating in a bore 645d in the valve body 603. The purpose of these accumulators 638, 640, 642 and 644 is to absorb the fluid apply pressure to help cushion the application of the underdrive 302, overdrive 304, two/four shift 308 and low/reverse 310 clutch assemblies, respectively.

As illustrated in FIGS. 5A–5L, pressure switches 646, 648 and 650 are connected to the passageways 602 which lead to the overdrive clutch apply cavity 620, the two/four shift clutch apply cavity 622 and the low/reverse clutch apply cavity 626, respectively. The pressure switches 646, 648 and 650 provide a digital electrical signal of zero (0) value when there is either an absence of fluid pressure or fluid pressure below a predetermined pressure, and a value of one (1) when there is fluid pressure present at or above a predetermined pressure in the passageway 602 leading to the respective clutch apply cavities 620, 624 and 626. However, it should be appreciated that other suitable pressure sensors may be employed in these or other locations in the appropriate application.

The hydraulic system 600 also includes first 652, second 654, third 656, fourth 658 and fifth 660 ball check valves in the passageways 602 leading to the low/reverse 626, underdrive 618, low/reverse 626, reverse 622 and overdrive 620 clutch apply cavities, respectively. The ball check valves 652, 654, 656, 658 and 660 comprise a rubber ball operating against a seat, typically formed in the valve body 603, and are used for flow control to open and close particular passageways 602. The ball is seated by pressure acting against the ball and unseated by pressure being applied on the opposite or seat side of the ball.

As illustrated in FIGS. 5A through 5L, the LU switch valve 614, T/C switch valve 612 and pressure regulator 608 include springs 662, 664 and 666, respectively, at one end to preload these valves. A thermal valve 668 is also provided to regulate the fluid flow through check valve 654 at higher fluid temperatures. The thermal valve 668 closes or opens a particular passageway 602 based on the fluid temperature.

OPERATION OF THE HYDRAULIC SYSTEM

As illustrated in FIGS. 5A–L, the hydraulic system 600 is shown. The dense shading or hatching in the passageways 602 shows fluid at pump pressure. The sparse shading or hatching illustrates a low fluid pressure. The intermediate shading or hatching illustrates a fluid pressure between that of pump pressure and a low pressure. The absence of shading or hatching shows the passageways 602 as vented.

When the engine is initially started, the pressure regulator 608 is actuated or moved by fluid pressure to allow fluid from the pump assembly 200 to flow through the pressure regulator 608 between the first 670a and second 670b lands to the T/C control valve 612, as illustrated in FIG. 5A. The T/C control valve 612 is similarly actuated by fluid pressure to allow fluid from the pressure regulator 608 to flow between the first 672a and second 672b lands of the T/C control valve 612 to the LU switch valve 614. Fluid then flows between the first 674a and second 674b lands of the LU switch valve 614 to the torque converter 110. This fluid pressure moves the lock-up piston 188 off or in disengagement with the friction disc 199 of the lock-up clutch assembly 186 so that lock-up is not applied. Fluid also flows from the torque converter 110 back to the T/C control valve 612. Fluid flows between the second 674b and third 674c lands thereof and through the cooler 616 where it is cooled and used for lubrication.

As illustrated in FIG. 5A, when the shift lever position 606 is park P or neutral N with the output speed $N_o$ from the transmission's output speed sensor 546 less than 600 r.p.m., fluid flows from the pump assembly 200 to the manual valve 604. Fluid flows through the manual valve 604 between the first 676a and second 676b lands to the low/reverse clutch solenoid-actuated valve 636 which is energized by the transmission controller 3010 and moves to allow fluid to flow through it to the solenoid switch valve 610. The solenoid switch valve 610 is hydraulic or fluid pressure operated for reciprocal movement between a first position shown in FIG. 5E and a second position shown in FIG. 5F.

Fluid flows through the solenoid switch valve 610 between the second 678b and third 678c lands thereof to the first ball check valve 652. The first ball check valve 652 is moved by fluid pressure to close the flow path to the vent through the manual valve 604 and opens the flow path to the low/reverse clutch apply cavity 626. Fluid flows through the first ball check valve 652 to the low/reverse clutch apply cavity 626 behind the fourth hydraulic piston 474 to apply the low/reverse clutch assembly 310 in a manner controlled by the command signal from the transmission controller 3010 sent to the low/reverse clutch solenoid-actuated valve 636.

As illustrated in FIG. 5A, fluid flows from the manual valve 604 and solenoid switch valve 610 to both sides of the third ball check valve 656. In this case, the third ball check valve 656 is redundant.

The manual valve 604 also allows fluid in the clutch apply cavity 624 of the two/four shift clutch assembly 308 to vent to the vent reservoir 628, resulting in this clutch not being engaged or applied. Similarly, fluid in the clutch apply cavity 618 of the underdrive clutch assembly 302 is vented either through the manual valve 604 to the sump or through the underdrive clutch solenoid-actuated valve 630. Some fluid from the torque converter 110 also flows through the bleeder ball check valves 244 and 246 to the overdrive 620 and reverse 622 clutch apply cavities as previously described. However, the overdrive 304 and reverse 306 clutch assemblies are essentially vented and not applied.

Fluid from the pump assembly 200 also flows to the solenoid switch valve 610 at one end of the first land 678a to pressure balance solenoid switch valve 610. In other words, fluid flow pressurizes one end of the solenoid switch valve 610 to allow the valve to maintain its current position and prevent the valve from moving to one end or the other past its desired or proper position. Fluid also flows from the pump assembly 200 to the LU switch valve 614 between the third 674c and fourth 674d lands and is dead-ended. This is because the LU switch valve 614 is a single diameter valve, therefore no resultant force exists to overcome the spring force of spring 666. Additionally, fluid from the pump assembly 200 flows to one end of a plug 680 of the pressure regulator 608 to pressure balance the pressure regulator 608. Fluid from the pump assembly 200 further flows to the two/four shift clutch solenoid-actuated valve 634. However, this valve is energized by the transmission controller 3010 and moves to block or close fluid flow to the two/four shift clutch apply cavity 624.

As illustrated in FIG. 5B, when the shift lever position 606 is neutral N with the output speed $N_o$ from the transmission's output speed sensor 546 greater than 600 r.p.m., fluid flows from the pump assembly 200 to the manual valve 604. Fluid flows through the manual valve 604 between the first 676a and second 676b lands to the third ball check valve 656. This fluid pressure moves the third ball check valve 656 to close the flow path to the low/reverse clutch apply cavity 626. Hence, the low/reverse clutch assembly 310 is not applied, but vented through the first ball check valve 652 to either the low/reverse clutch solenoid-actuated valve 636 or the manual valve 604. This prevents the transmission 100 from being shifted into a drive mode OD, D or L above an undesired output speed $N_o$, i.e. 600 r.p.m. Fluid from the manual valve 604 also flows to the low/reverse clutch solenoid-actuated valve 636 which is off or de-energized (i.e. normally vented) and closes the flow path to the solenoid switch valve 610.

The manual valve 604 further allows fluid in the clutch apply cavity 624 of the two/four shift clutch assembly 308 to vent to the vent reservoir 628, resulting in this clutch not being engaged or applied. Fluid in the clutch apply cavity 618 of the underdrive clutch assembly 302 vents through the underdrive clutch solenoid-actuated valve 630 to vent the reservoir 628, resulting in this clutch not being engaged or applied. The overdrive 304 and reverse 306 clutch assemblies receive some fluid but are vented or not applied as previously described. Fluid from the pump assembly 200 also flows to one end of the first land 678a of the solenoid switch valve 610 to hold it in a position for fluid communication by the passageways 602 between the low/reverse clutch solenoid-actuated valve 636 and the clutch apply cavity 626 of the low/reverse clutch assembly 310. Fluid also flows from the pump assembly 200 to the LU switch valve 614 and pressure regulator 608 as previously described. Additionally, fluid from the pump assembly 200 further flows to the two/four shift clutch solenoid-actuated valve 634. However, this valve is energized to block fluid flow as previously described.

As illustrated in FIG. 5C, when the shift lever position 606 is reverse R, the manual valve 604 attached to the manual lever 578 is moved or shifted. Fluid flows from the pump assembly 200 to the manual valve 604. Fluid flows through the manual valve 604 between the first 676a and second 676b lands and through an orifice 682 to the reverse clutch apply cavity 622 between the second hydraulic piston 410 and input clutch retainer hub 312 to apply the reverse clutch assembly 306. Fluid flows to both sides of the fourth ball check valve 658 making it redundant. However, the fourth ball check valve 658 allows fluid flow from the reverse clutch apply cavity 622 to bypass the orifice 682 when venting the reverse clutch apply cavity 622 through the manual valve 604.

The manual valve 604 also allows fluid in the clutch apply cavity 624 of the two/four shift clutch assembly 308 to vent to the vent reservoir 628, resulting in this clutch not being engaged or applied. Fluid in the clutch apply cavity 618 of the underdrive clutch assembly 302 vents through the underdrive clutch solenoid-actuated valve 630. The overdrive clutch assembly 304 receives some fluid but is vented or not applied as previously described. Fluid to the reverse clutch apply cavity 622 causes the reverse bleeder ball check valve 246 to close as previously described.

Fluid from the pump assembly 200 flows through the two/four shift clutch solenoid-actuated valve 634, which is not energized or applied normally, to the manual valve 604. Fluid flows through the manual valve 604 between the third 676c and fourth 676d lands of the manual valve 604 to the first ball check valve 652. This fluid pressure moves the first ball check valve 652 to close the flow path to the solenoid switch valve 610 and opens the flow path to the low/reverse clutch apply cavity 626 behind the fourth hydraulic piston 474 to apply the low/reverse clutch assembly 310. Fluid from the pump assembly 200 further flows to one end of the first land 678a of the solenoid switch valve 610 and the LU switch valve 614 as previously described. Additionally, fluid flows to both ends of the plug 680 of the pressure regulator 608. Since the pressure area of the plug 688 is smaller than plug 680, the valve 680 is shifted, creating a new fluid line pressure.

Figure 5D:
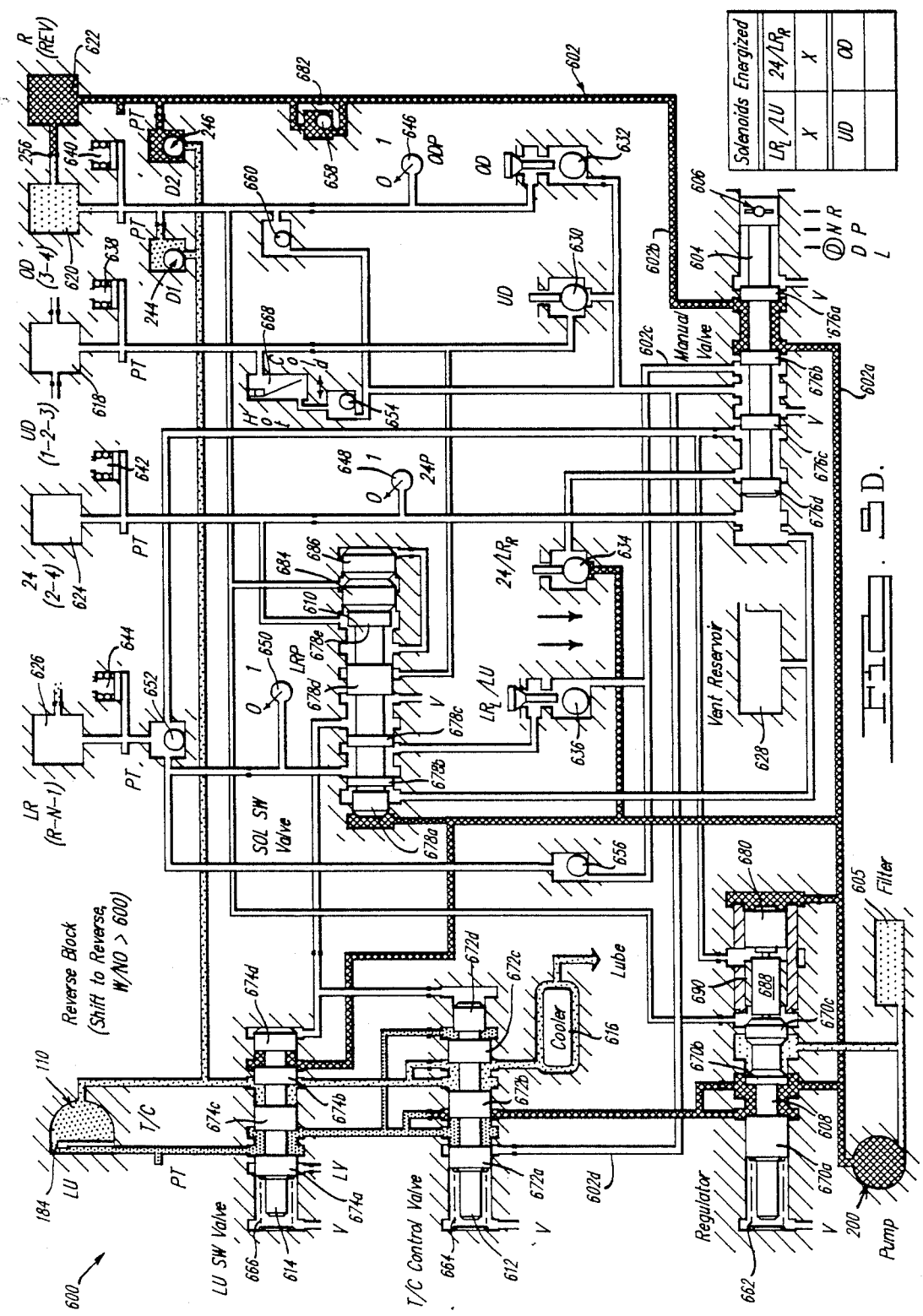

As illustrated in FIG. 5D, when the shift lever position 606 is reverse R and the output speed $N_o$ is greater than 600 r.p.m., fluid flows from the pump assembly 200 to the manual valve 604. Fluid flows through the manual valve 604 between the first 676a and second 676b lands and through the orifice 682 to the reverse clutch apply cavity 622 between the second hydraulic piston 410 and the input clutch retainer hub 312 to apply the reverse clutch assembly 306. The two/four shift clutch solenoid-actuated valve 634 is energized by the transmission controller 3010 and moves to prevent fluid flow to the manual valve 604, resulting in the low/reverse clutch 310 not being applied. This prevents the transmission 100 from being shifted into the reverse mode above an undesired output speed $N_o$, i.e. 600 r.p.m.

Fluid in the clutch apply cavities 624, 618 and 620 of the two/four shift clutch 308, underdrive clutch 302 and overdrive clutch 304 assemblies, respectively, are vented as previously described, resulting in these clutches not being engaged or applied. The overdrive clutch assembly 304 receives some fluid but is vented or not applied as previously described. Otherwise, fluid flow is similar to the reverse hydraulic schematic of FIG. 5C as previously described.

As illustrated in FIG. 5E, when the shift lever position 606 is the drive D position, overdrive OD or low L, the transmission 100 is operated initially in first gear. As a result, the manual valve 604 is moved or shifted. Fluid flows from the pump assembly 200 to the manual valve 604. Fluid flows through the manual valve 604 between the first 676a and second 676b lands to the underdrive clutch solenoid-actuated valve 630. The underdrive clutch solenoid-actuated valve 630 which is normally applied, allows fluid to flow through it and the flow path to the underdrive clutch apply cavity 618 behind the second hydraulic piston 410 to apply the underdrive clutch assembly 302.

Fluid from the manual valve 604 also flows to the second ball check valve 654 which is pressurized from both sides and becomes redundant. Fluid from the manual valve 604 moves the fifth ball check valve 660 to close the flow path to the overdrive clutch apply cavity 620. Fluid from the manual valve 604 further flows to the overdrive clutch solenoid-actuated valve 632 which is normally vented and is prevented from flowing through the flow path to the overdrive clutch apply cavity 620.

Fluid further flows to both sides of the third ball check valve 656, making it redundant. Fluid from the manual valve 604 also flows to the low/reverse clutch solenoid-actuated valve 636. The low/reverse clutch solenoid-actuated valve 636 is energized by the transmission controller 3010 and moves to open the flow path to the solenoid switch valve 610. Fluid flows through the solenoid switch valve 610 between the second 678b and third 678c lands to the low/reverse clutch apply cavity 626 behind the fourth hydraulic piston 474 to apply the low/reverse clutch assembly 310.

Fluid in the clutch apply cavity 624 of the two/four shift clutch assembly 308, is vented as previously described, resulting in this clutch not being engaged or applied. Fluid in the clutch apply cavity 620 of the overdrive clutch assembly 304 is vented through the overdrive clutch solenoid-actuated valve 632. Fluid in the clutch apply cavity 622 of the reverse clutch assembly 306 is vented through the manual valve 604. Hence, the overdrive 304 and reverse 306 clutch assemblies are essentially vented and not applied as previously described.

Fluid from the pump assembly 200 also flows to one end of the first land 678a of the solenoid switch valve 610, the LU switch valve 614, and one end of the plug 680 of the pressure regulator 608 as previously described. Fluid from the pump assembly 200 also flows to the two/four shift clutch solenoid-actuated valve 634. However, this valve is energized and moved to engage its seat to block fluid flow as previously described.

Referring to FIG. 5F, the operation of the hydraulic system is illustrated when the transmission 100 is shifted into second gear. It should be noted that none of the solenoid-actuated valves 630, 632, 634 and 636 are energized, so that they will each assume their normally open (applied) or closed (vented) positions as described earlier.

As illustrated in FIG. 5F, when the shift lever position 606 is in the overdrive OD, drive D or low L position, and the transmission 100 is to be operated in second gear, the manual valve 604 remains in the same position as first gear. Fluid flows from the pump assembly 200 to the manual valve 604. Fluid flows through the manual valve 604 between the first 676a and second 676b lands to the underdrive clutch solenoid-actuated valve 630 which is normally applied and allows fluid flow to the underdrive clutch apply cavity 618 as previously described. Fluid also flows from the manual valve 604 to the overdrive clutch solenoid-actuated valve 632 which is normally vented and prevents fluid flow to the overdrive clutch apply cavity 620. Fluid from the manual valve 604 also flows to the second and fifth ball check valves 654 and 660 as previously described.

Fluid from the pump assembly 200 also flows to the two/four shift clutch solenoid-actuated valve 634 which is normally applied and allows fluid flow to the manual valve 604. Fluid flows between the third 676c and fourth 676d lands of the manual valve 604 to the two/four shift clutch apply cavity 624 behind the third hydraulic piston 448 to apply the two/four shift clutch assembly 308. Fluid also flows between one end of fifth land 678e of the solenoid switch valve 610 and a plug 684. Because the pressure area of fifth land 678e is larger than the pressure area of first land 678a, when these lands 678a and 678e are exposed to the same pressure, the solenoid switch valve 610 is moved to the left as shown in the figure. Hence, the solenoid switch valve 610 is moved by fluid pressure acting on it to allow fluid to flow through the solenoid switch valve 610 between the fourth 678d and fifth 678e lands and to one end of a plug 686 thereof to pressure balance the solenoid switch valve 610.

Fluid in the clutch apply cavity 626 of the low/reverse clutch assembly 308 is vented as previously described, resulting in this clutch not being engaged or applied. The overdrive 304 and reverse 306 clutch assemblies are also vented as previously described. Fluid from the pump assembly 200 further flows through the LU switch valve 614 to one end of plug 680 of the pressure regulator 608 as previously described.

As illustrated in FIG. 5G, when the partial lock-up feature is used in second gear, the LU switch valve 614 is moved or shifted by fluid pressure, from the low/reverse clutch solenoid-actuated valve 636 and the solenoid switch valve 610, to close fluid flow from the T/C control valve 612 to the lock-up clutch assembly 186 of the torque converter 110 because it is dead-ended at second land 674b of the LU switch valve 614. This results in fluid flow from the lock-up clutch assembly 186 being vented at the LU switch valve 614. Fluid flow from the pump assembly 200 to the torque converter 110 causes the lock-up piston 188 to engage the friction disc 199 of the torque converter 110. Lock-up of the torque converter 110 occurs as previously described. The low/reverse clutch solenoid-actuated valve 636 is cycled or modulated (MOD) by command signals from the transmission controller 3010 to allow fluid to flow between the third 678c and fourth 678d lands of the solenoid switch valve 610 to one end of the fourth land 674d of the LU switch valve 614 to actuate or cycle it by fluid pressure, resulting in partial lock-up of the torque converter 110. Fluid also flows to one end of the fourth land 672d of the T/C control valve 612. This is because the fluid to one end of the fourth land 672d moves the T/C control valve 614 to one end of its valve bore and the fluid flow configuration maintains the valve's position during the off period of the duty cycle, causing quick torque build-up by the lock-up clutch 186 and slow torque loss rate by lock-up clutch 186 (i.e. goes to unlock more slowly).

As illustrated in FIG. 5H, when the operating mode of the transmission 100 is to be third gear, the manual valve 604 remains in the same position as first gear. Fluid flows from the pump assembly 200 to the manual valve 604. Fluid flows through the manual valve 604 between the first 676a and second 676b lands to the underdrive clutch solenoid-actuated valve 630 which is normally applied and allows fluid flow to the underdrive clutch apply cavity 618 as previously described. Fluid from the manual valve 604 also flows to the overdrive clutch solenoid-actuated valve 632 which is energized by the transmission controller 3010 and moves to open the flow path to the overdrive clutch apply cavity 620 behind the first hydraulic piston 386 to apply the overdrive clutch assembly 304.

Fluid from the manual valve 604 further flows to the third ball check valve 656 which is moved to close the flow path to the low/reverse clutch apply cavity 626. Fluid also flows to the low/reverse clutch solenoid-actuated valve 636 which is normally vented and is prevented from flowing through the flow path to the solenoid switch valve 610. Fluid from the underdrive clutch solenoid-actuated valve 630 also flows to the solenoid switch valve 610 between the fourth 678d and fifth 678e lands and to both sides of plug 686 of the solenoid switch valve 610 as previously described. Fluid from the overdrive clutch solenoid-actuated valve 632 flows between land 670c and plug 688 and sleeve 690 of the pressure regulator valve 608. Since fluid pressurized plug 680 has the same contact or pressure area as plug and sleeve 688, 690, these plugs are redundant. Hence, pressure area of third land 670c is the only active area, moving the pressure regulator 608 and causing a new line pressure.

Fluid in the clutch apply cavities 626 and 624 of the low/reverse clutch 310 and two/four shift clutch assemblies 308, respectively, is vented as previously described, resulting in these clutches not being engaged or applied. The reverse clutch assembly 306 receives some fluid and is essentially vented as previously described. Fluid from the pump assembly 200 also flows to the LU switch valve 614 as previously described. Fluid from the pump assembly 200 further flows to the two/four shift clutch solenoid-actuated valve 634. However, this valve is energized by the transmission controller 3010 and moves to block fluid flow as previously described.

As illustrated in FIG. 5I, when the partial lock-up feature is used in third gear, the LU switch valve 614 is moved by fluid pressure to prevent fluid flow from the T/C control valve 612 from reaching the lock-up clutch assembly 186 as previously described. Thus, fluid flow is vented from the lock-up clutch assembly 186 of the torque converter 110 at the LU switch valve 614. Fluid from the pump assembly 200 flows through the LU switch valve 614 between the third 674c and fourth 674d lands to the torque converter 110, causing the lock-up piston 188 to engage the friction disc 199 resulting in lock-up of the torque converter 100. Further, fluid from the torque converter 110 flows through the T/C control valve 612 past the cooler 616 and is used for lubrication. The low/reverse clutch solenoid-actuated valve 636 is cycled by command signals from the transmission controller 3010 to allow fluid flow from the manual valve 604 through the solenoid switch valve 610 to one end of fourth land 674d of the LU switch valve 614 and fourth land 672d of the T/C control valve 612 to actuate or cycle these valves for partial lock-up of the torque converter 110 as previously described.

Figure 5J:
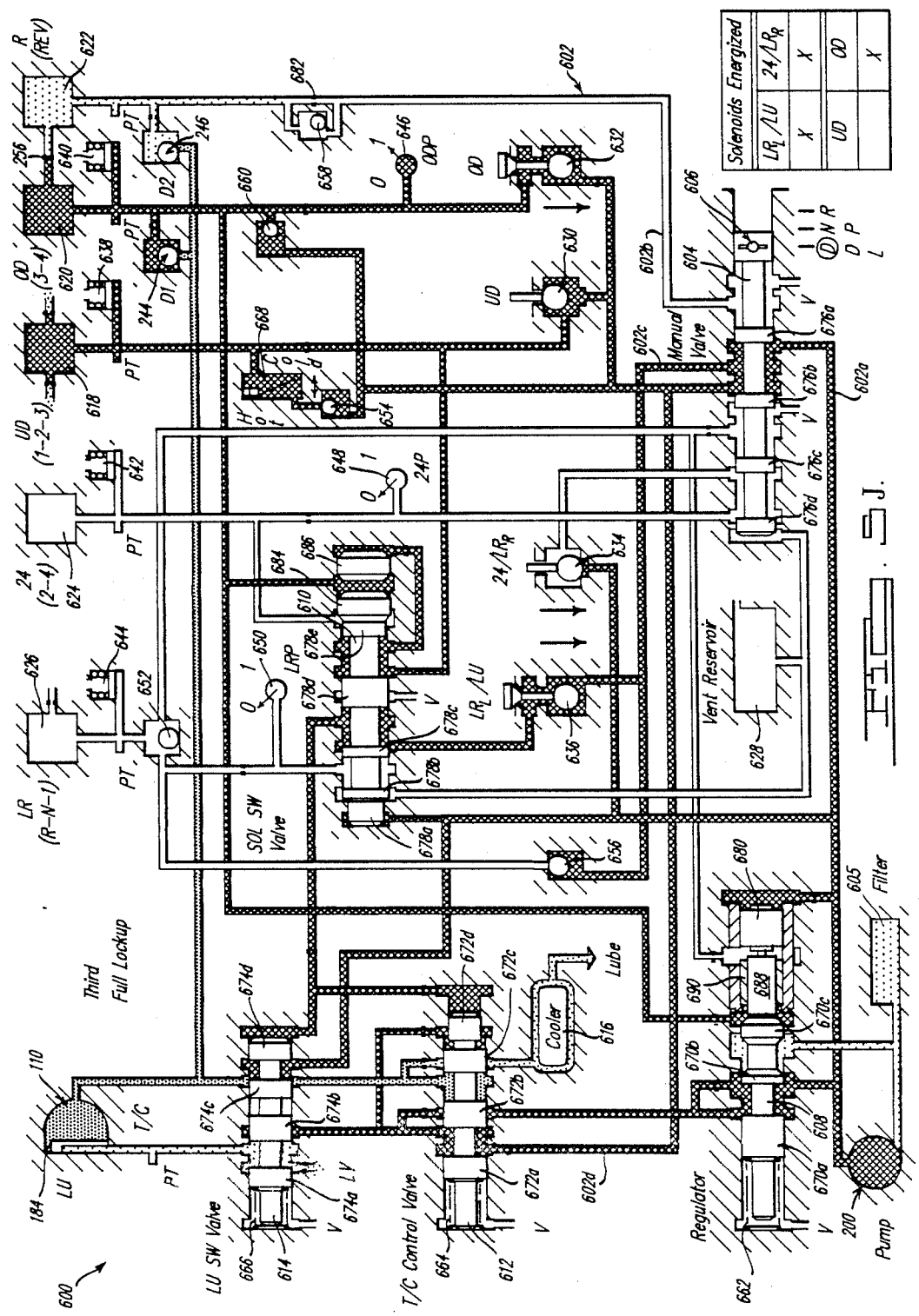
Figures 13A, 13C:
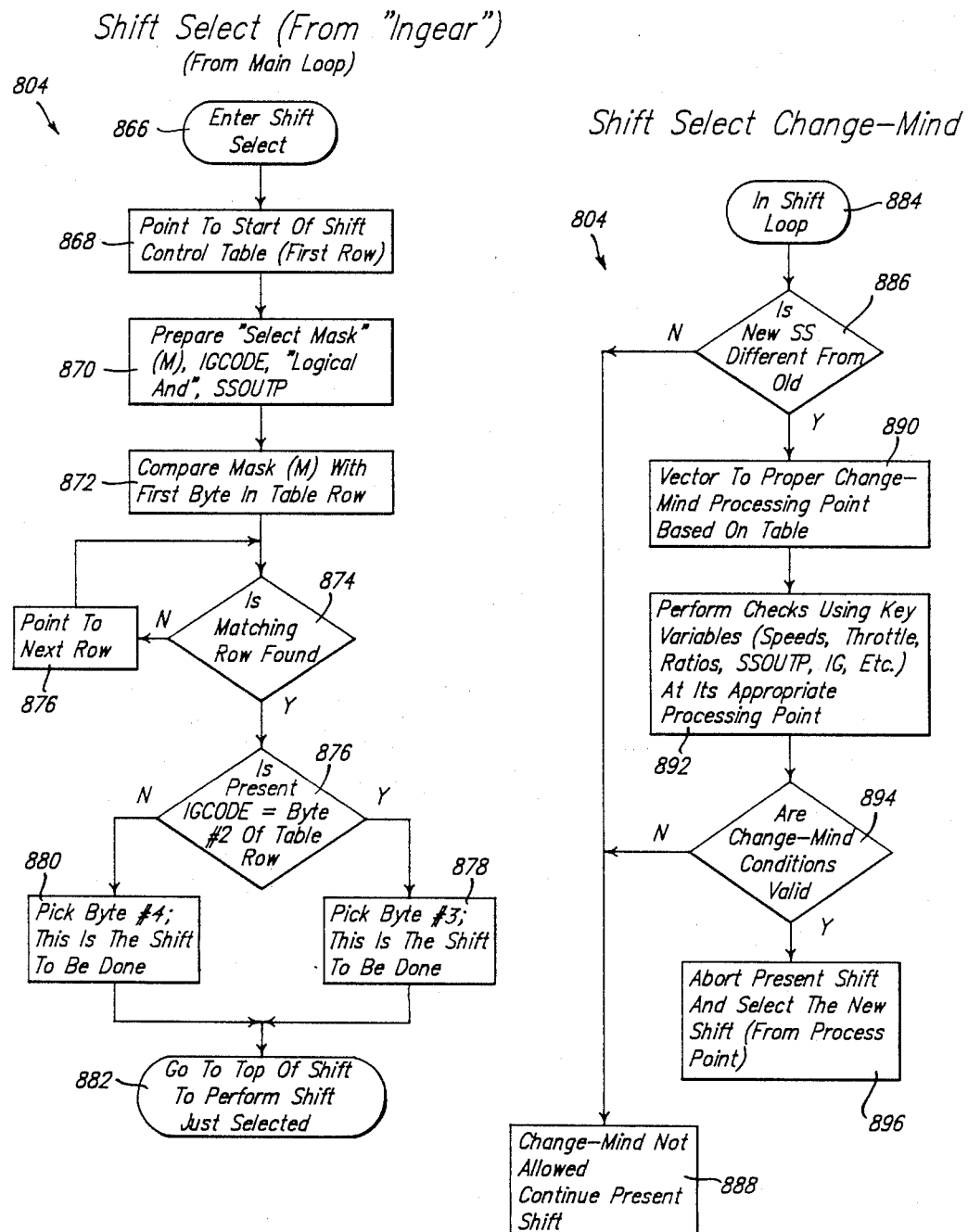
Figure 13B:
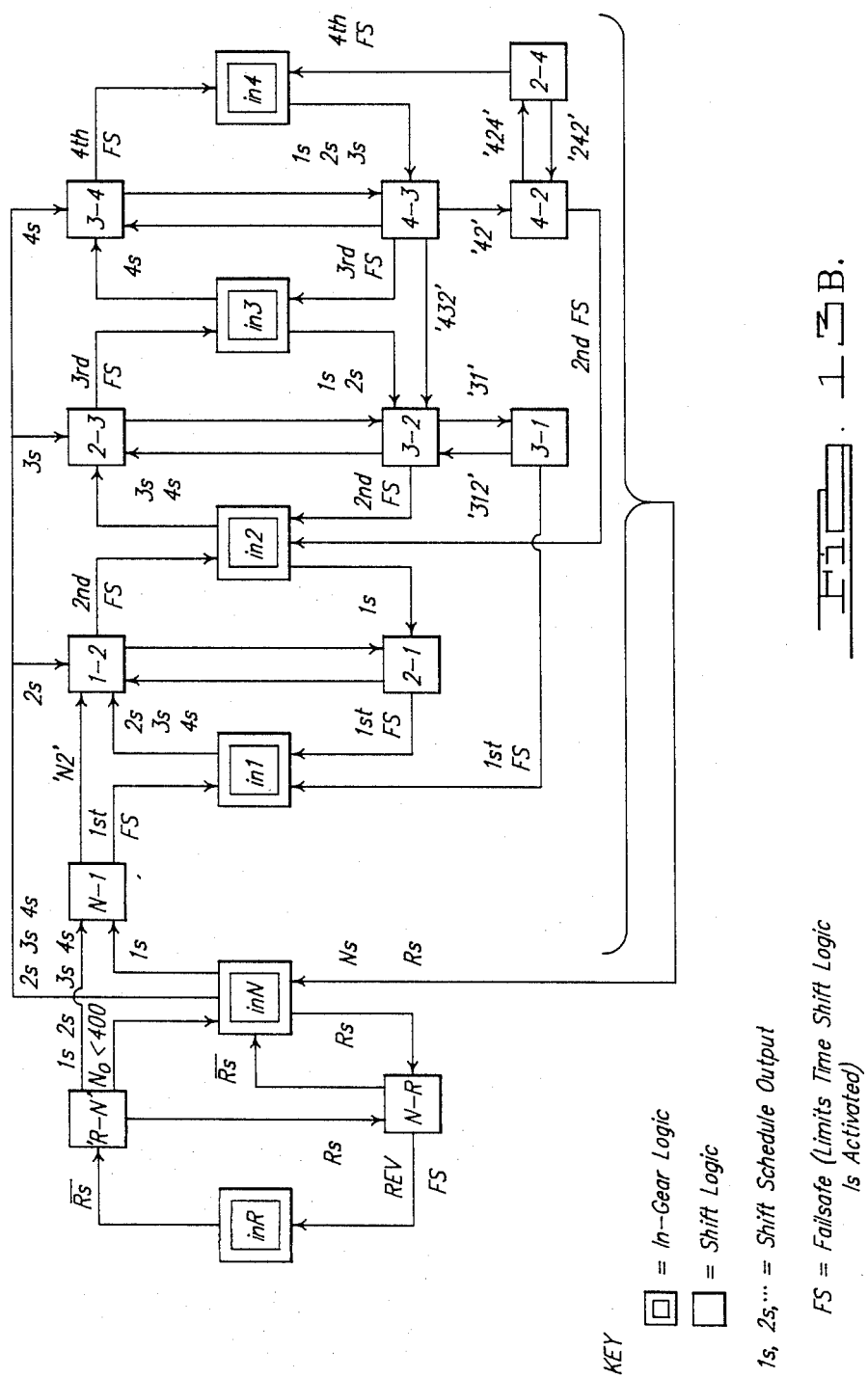
Figure 14A:
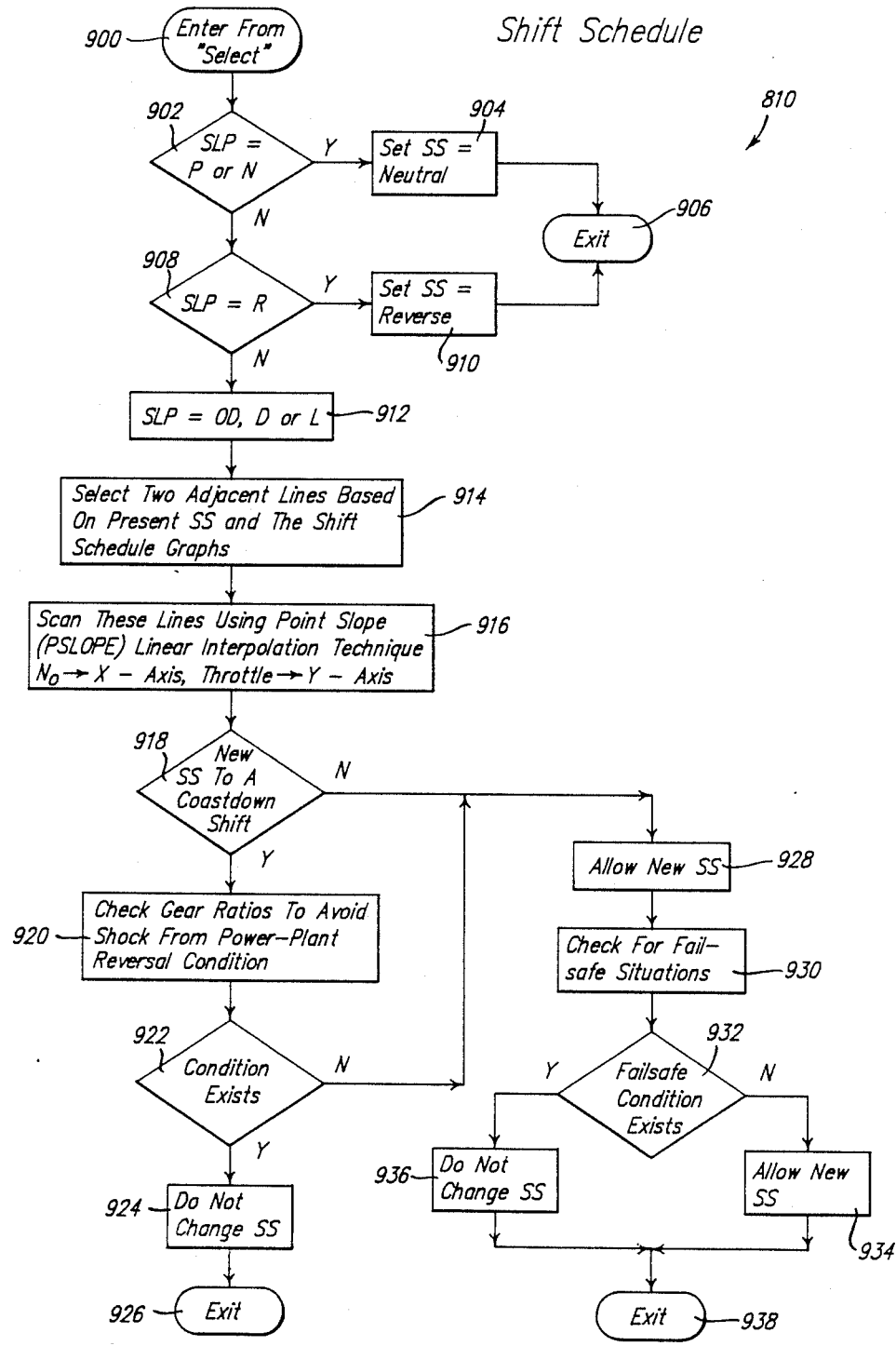
Figure 14B:
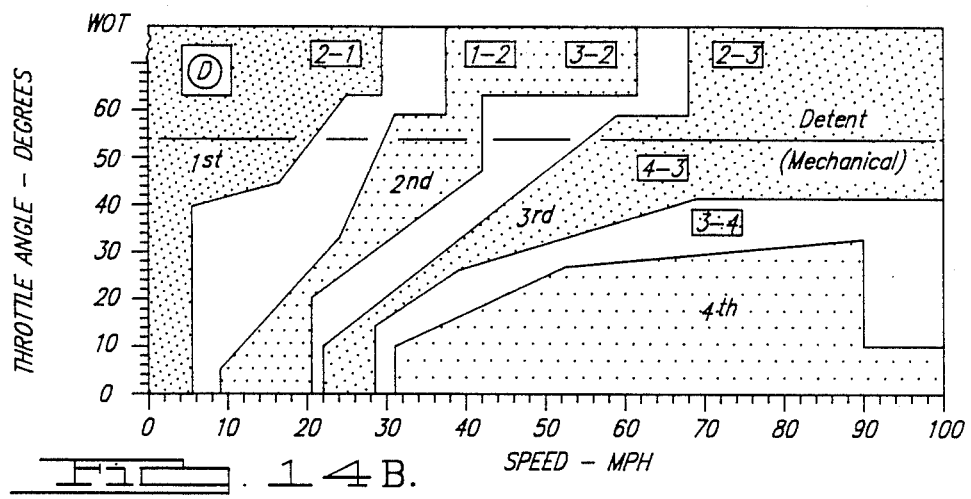
Figure 14C:
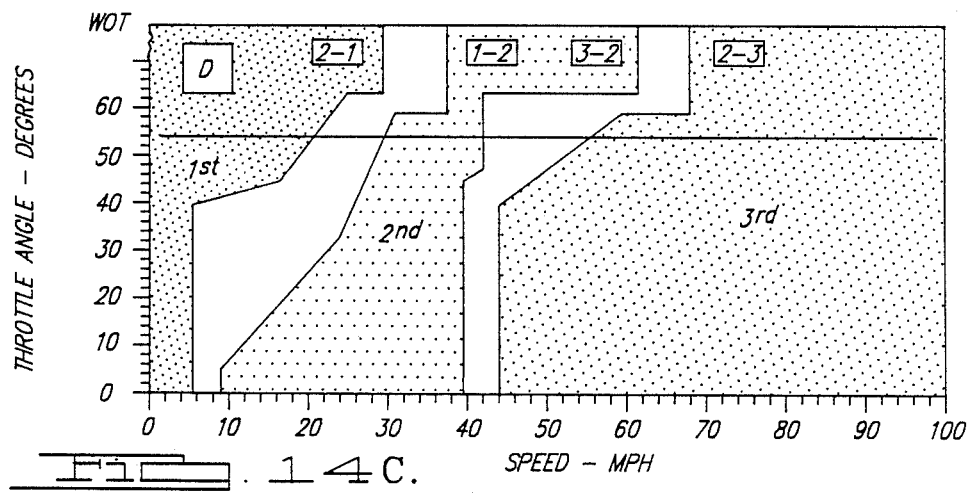
Figure 14D:
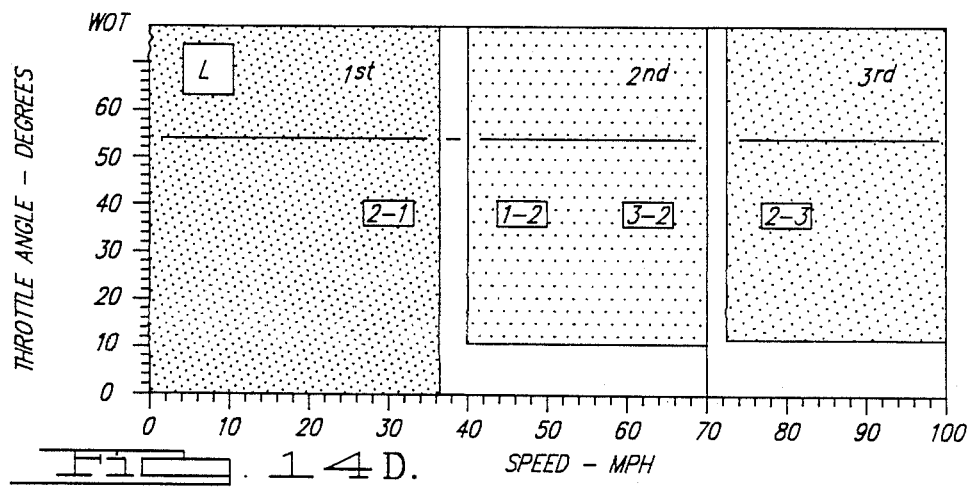
Figure 15A:
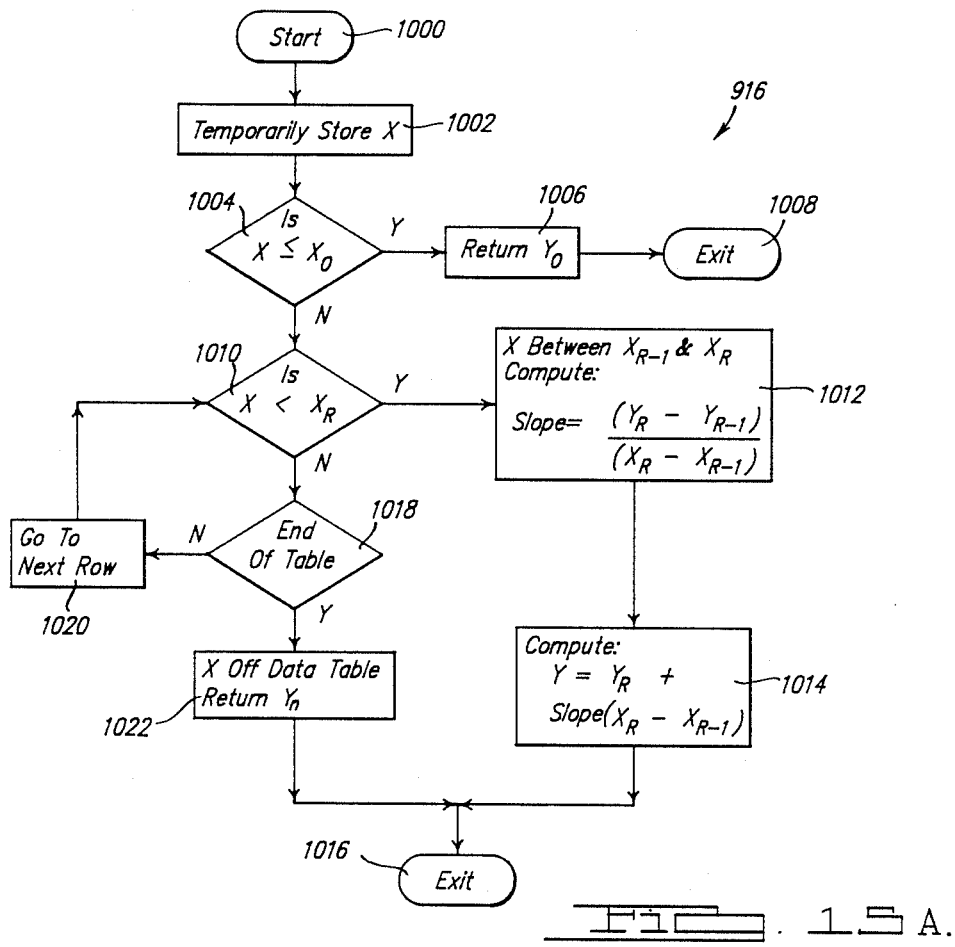
Figure 15B:
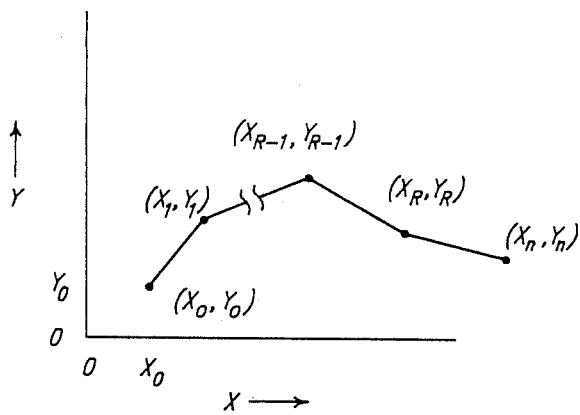
Figure 18C:
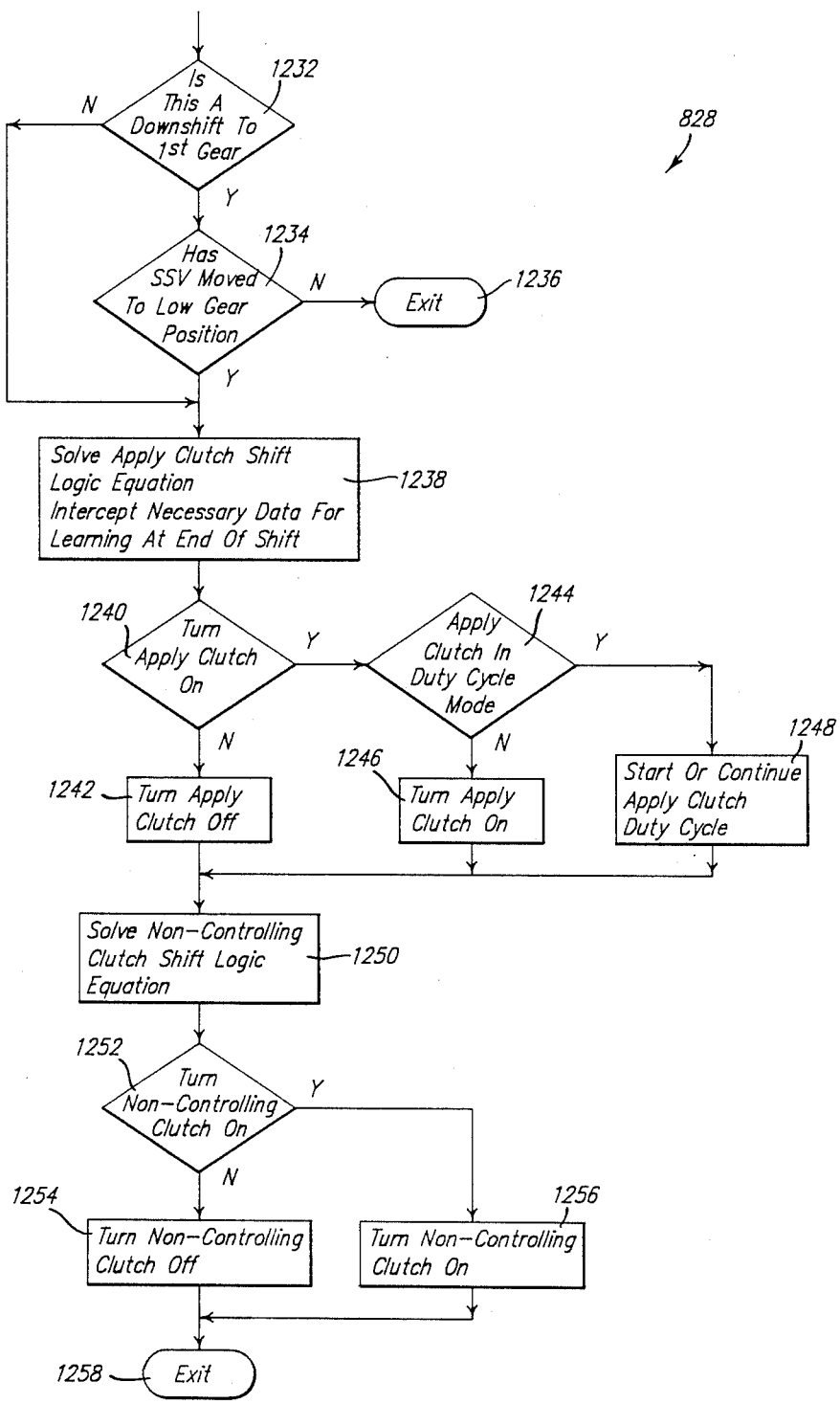
Figure 18D:
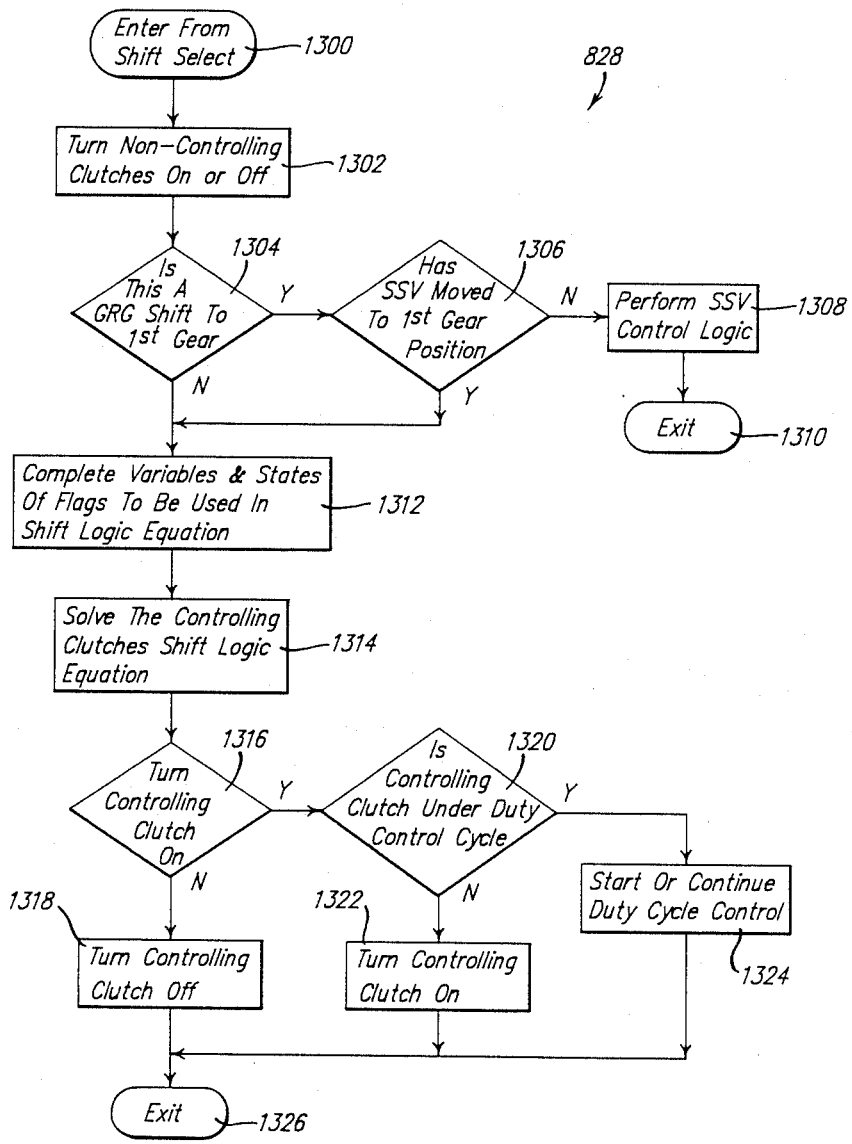
Figure 18A:
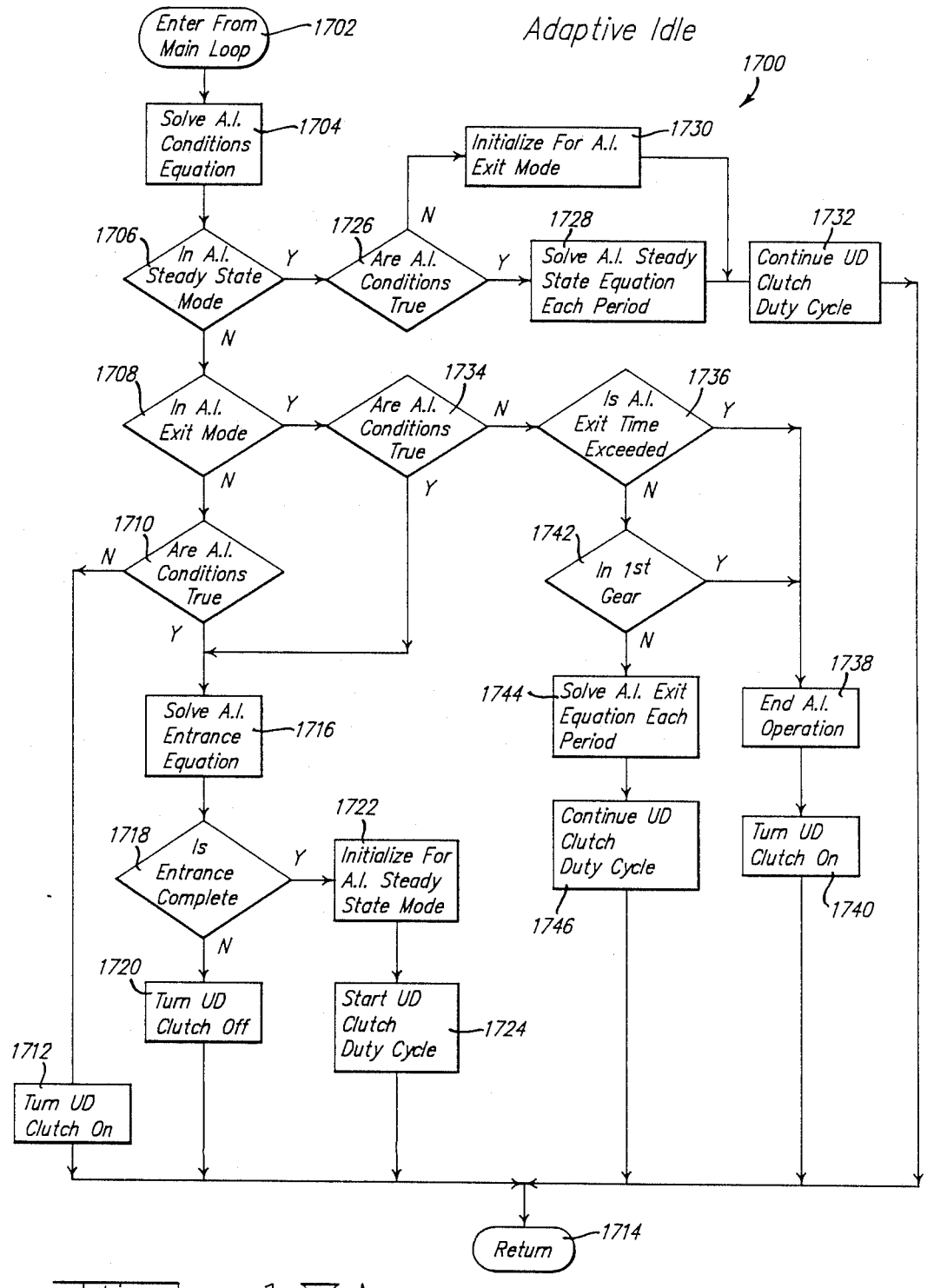
Figure 18B:
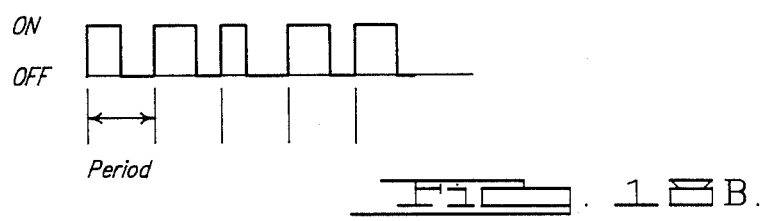
Figure 18C:
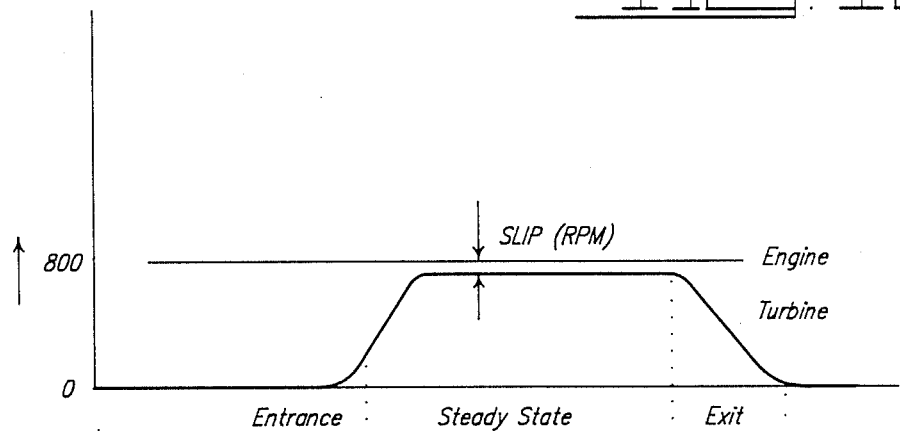
Figure 19:
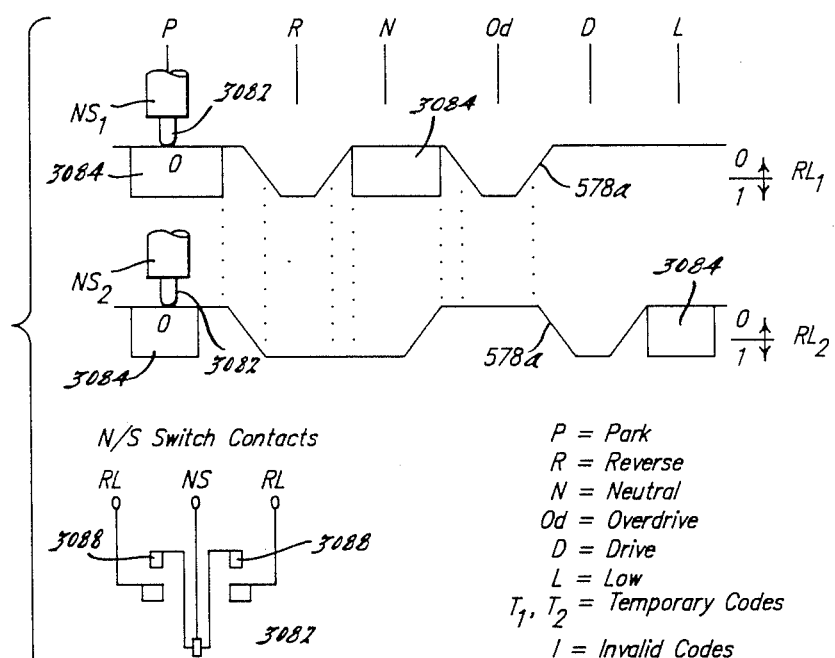
Figure 20A:
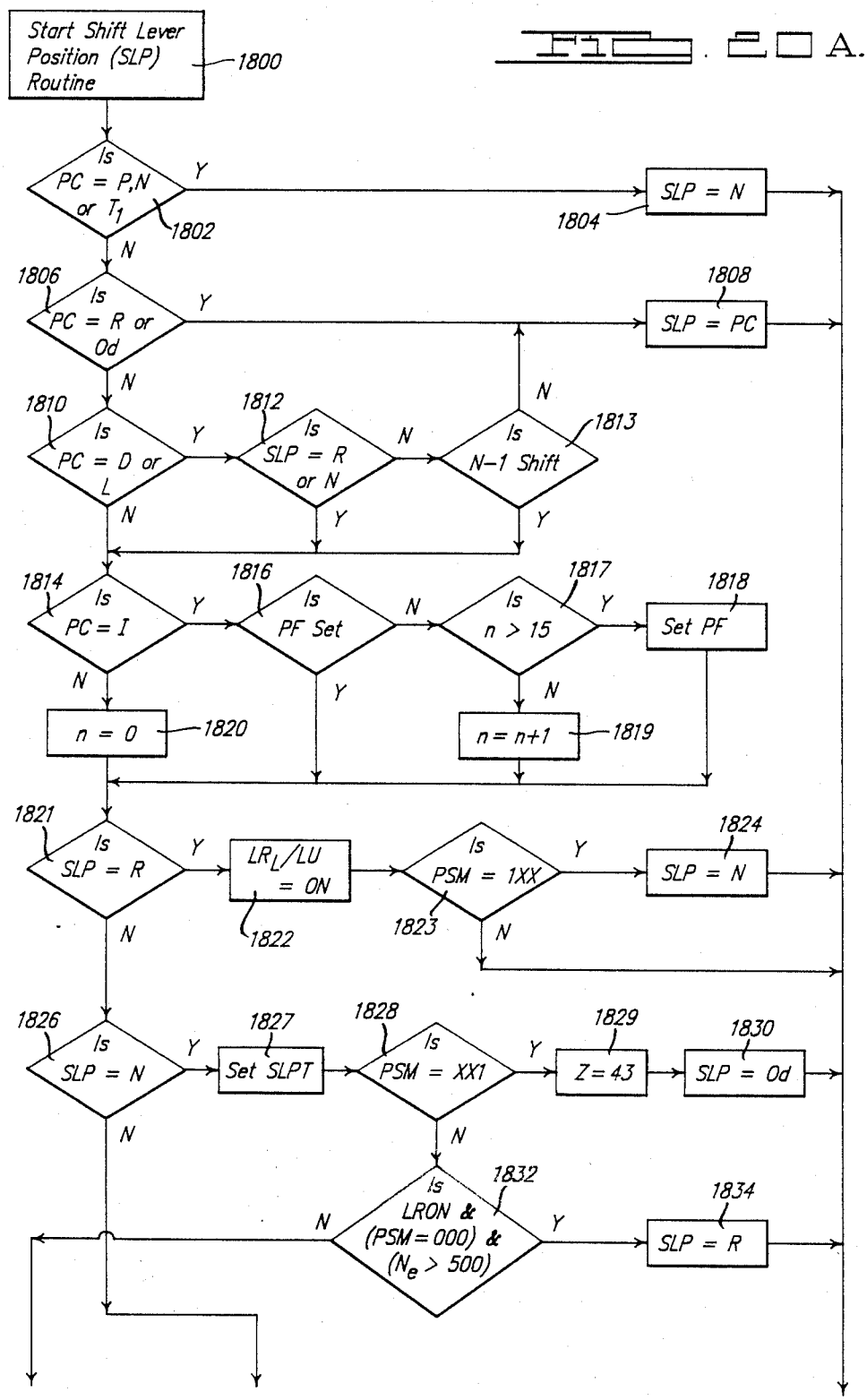
Figure 20B:
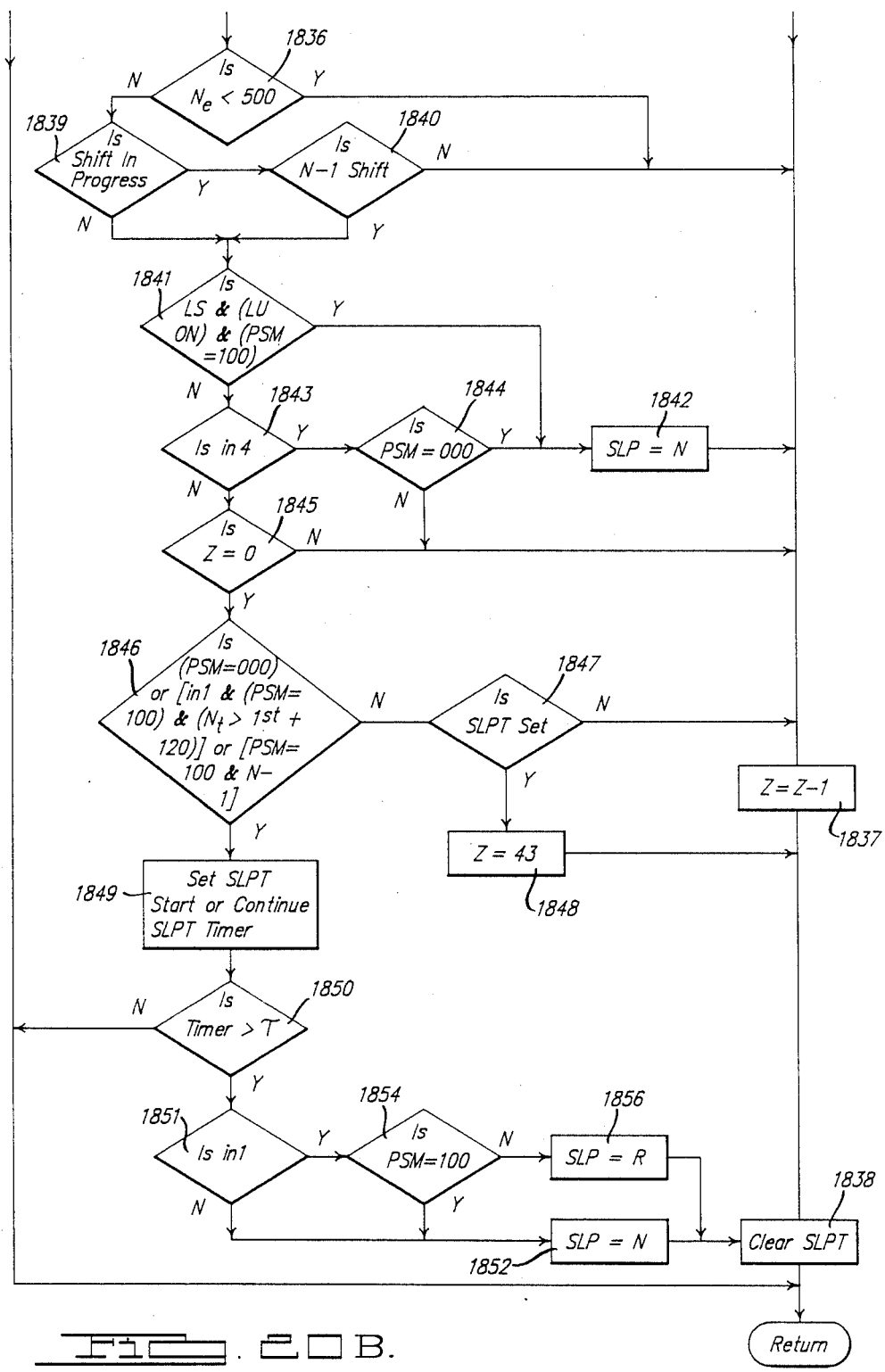
Figure 21A:
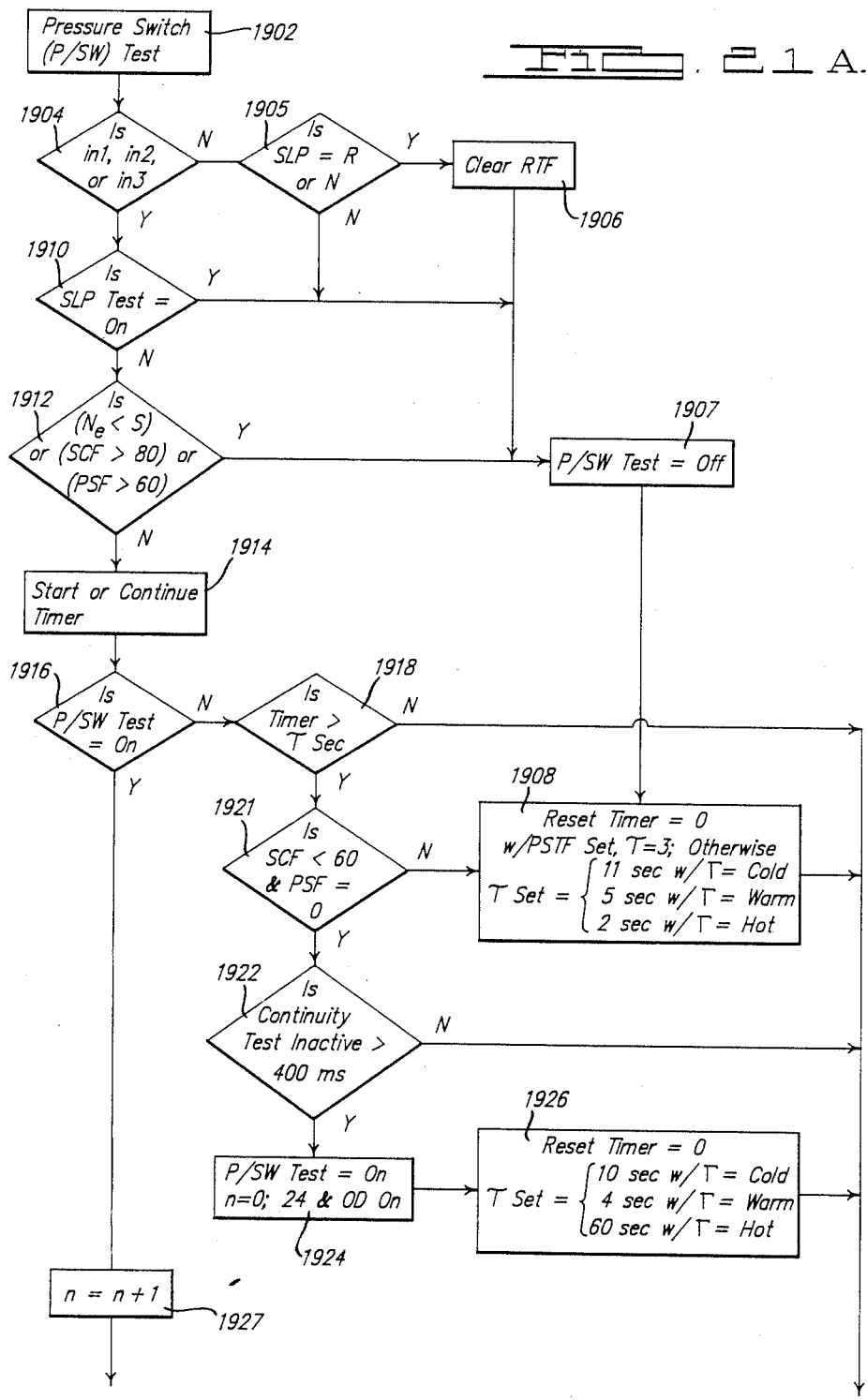
Figure 21B:
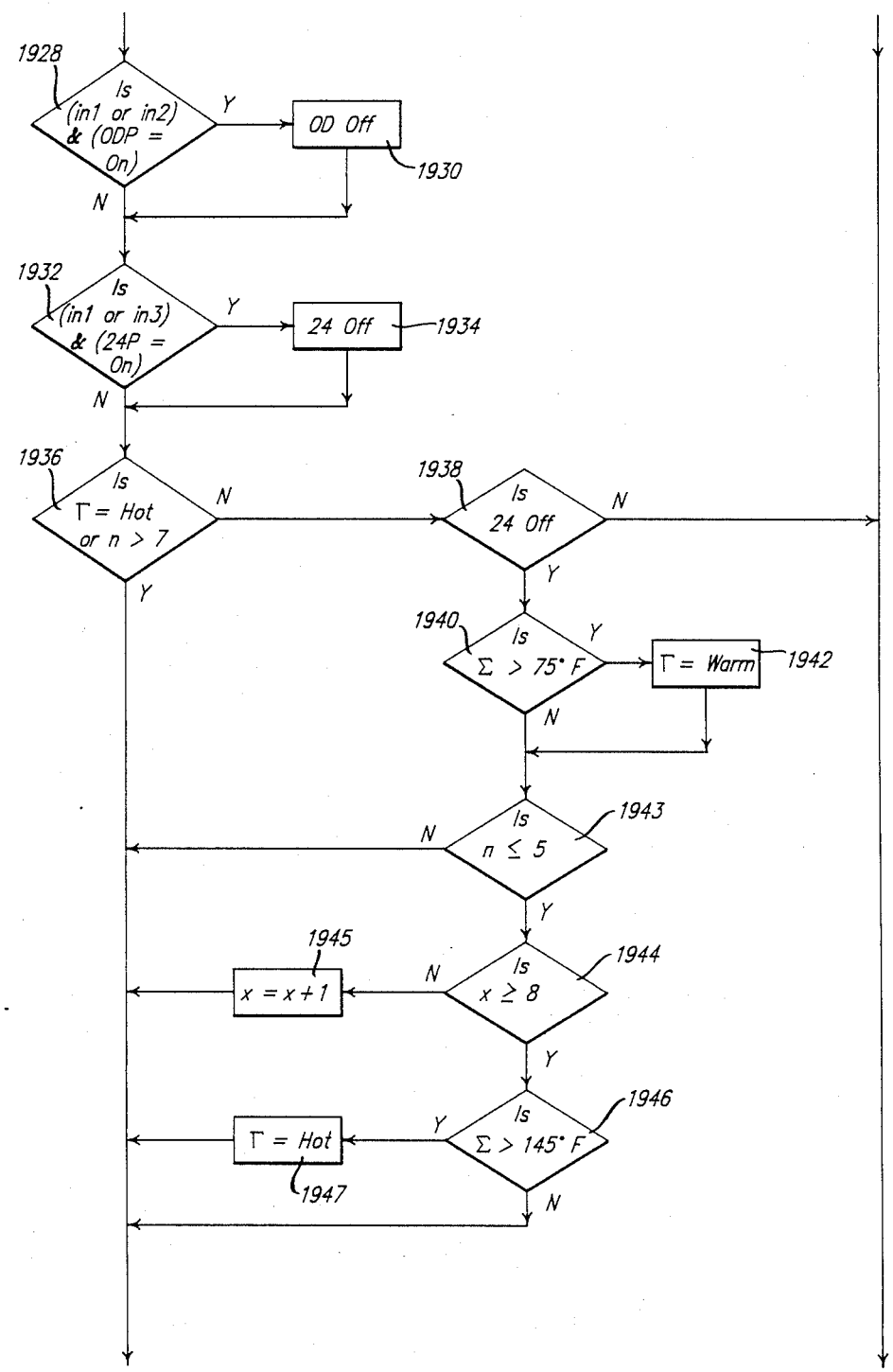
Figure 21C:
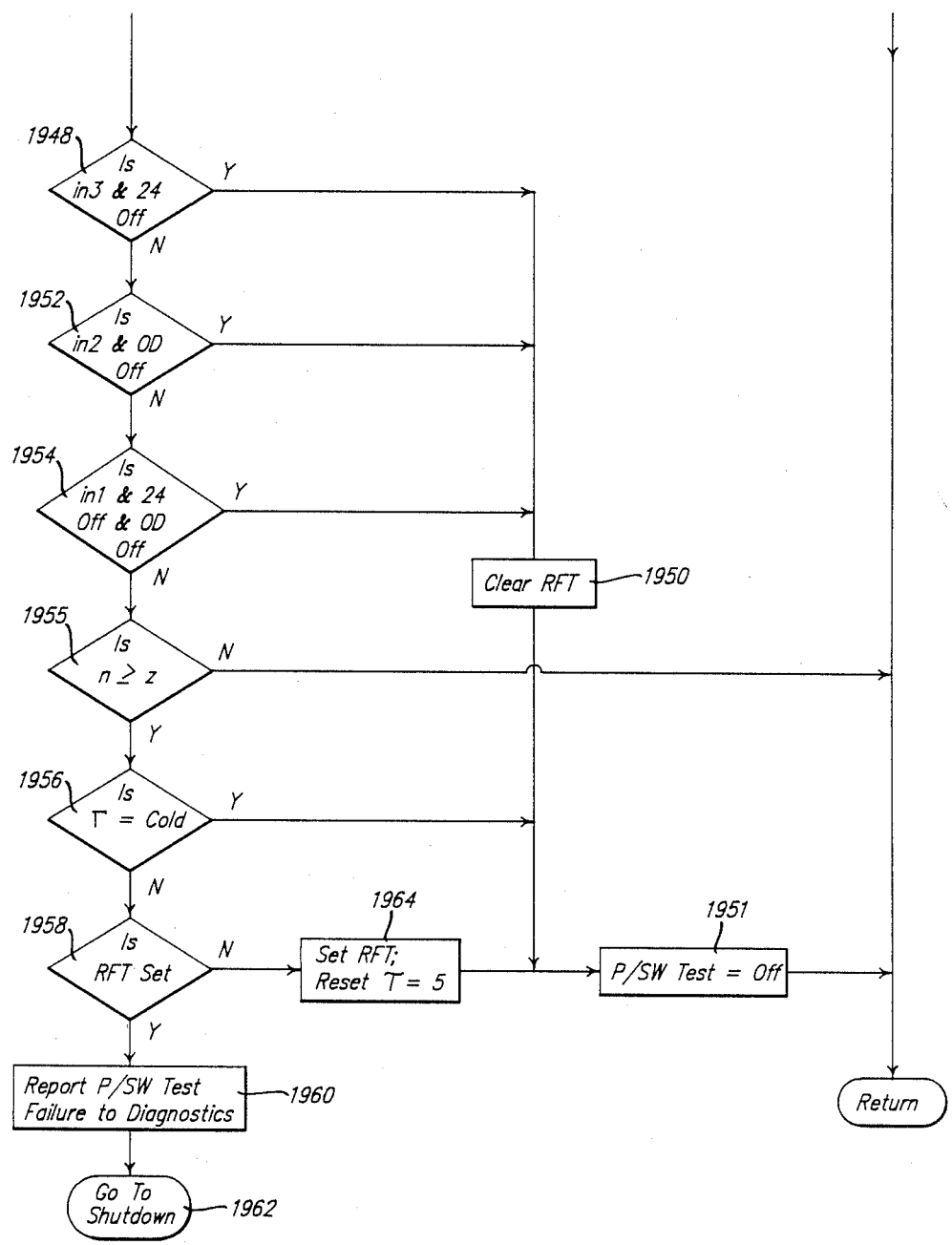
Figure 21D:
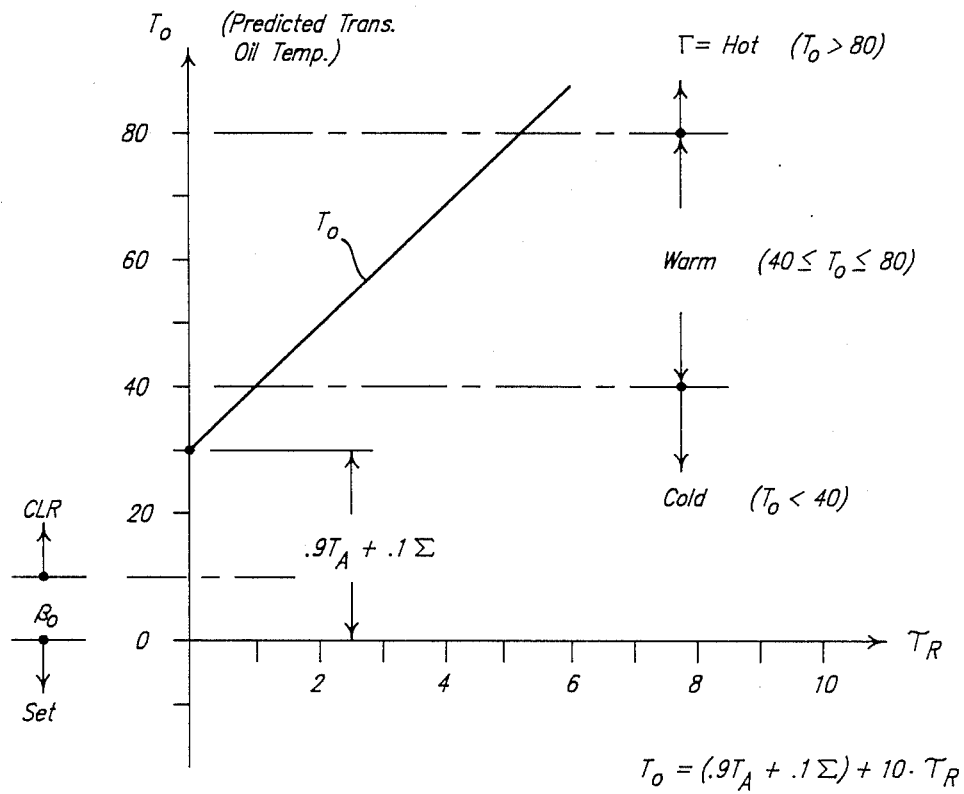
Figure 22A:
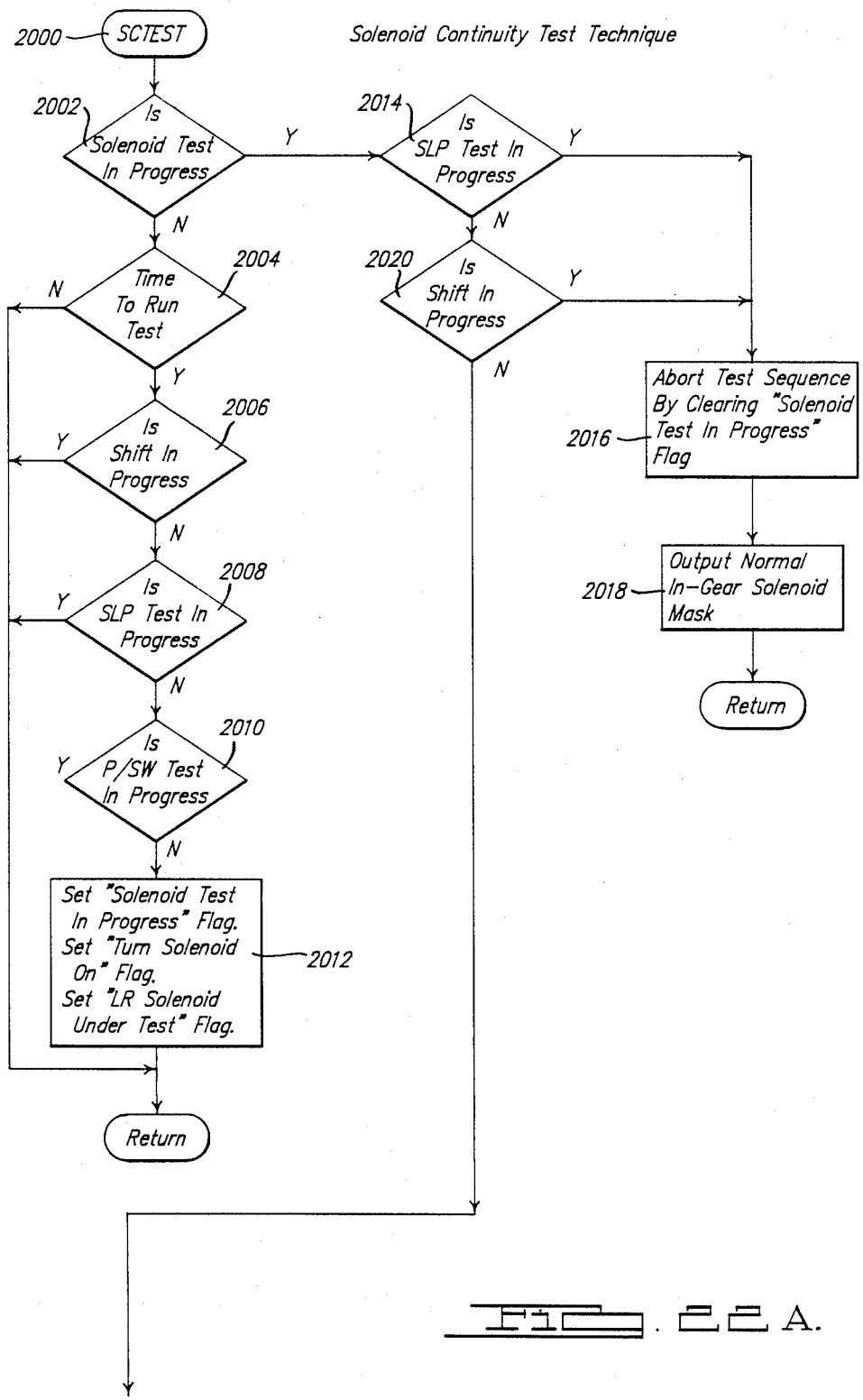
Figure 22B:
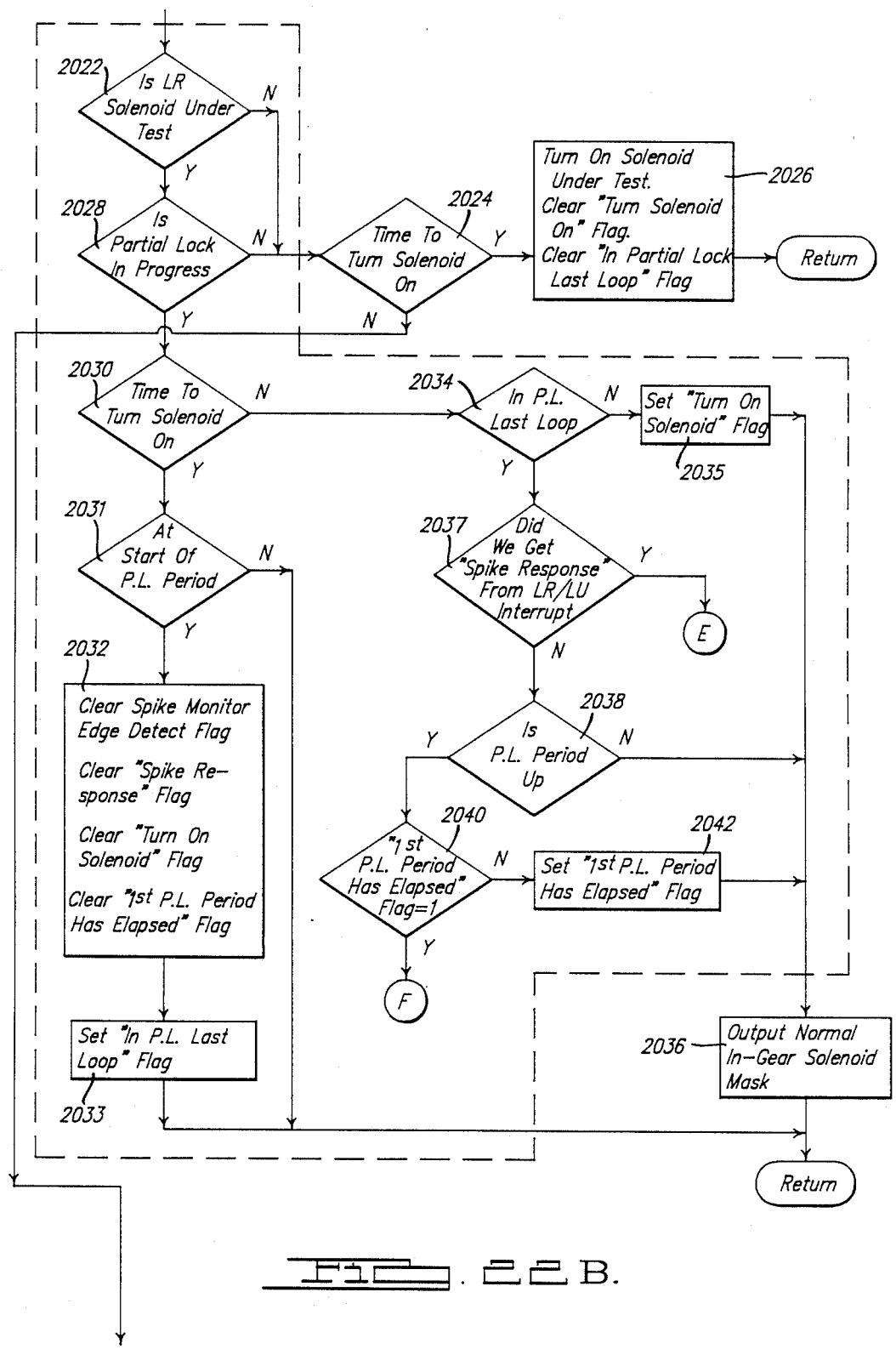
Figure 22C:
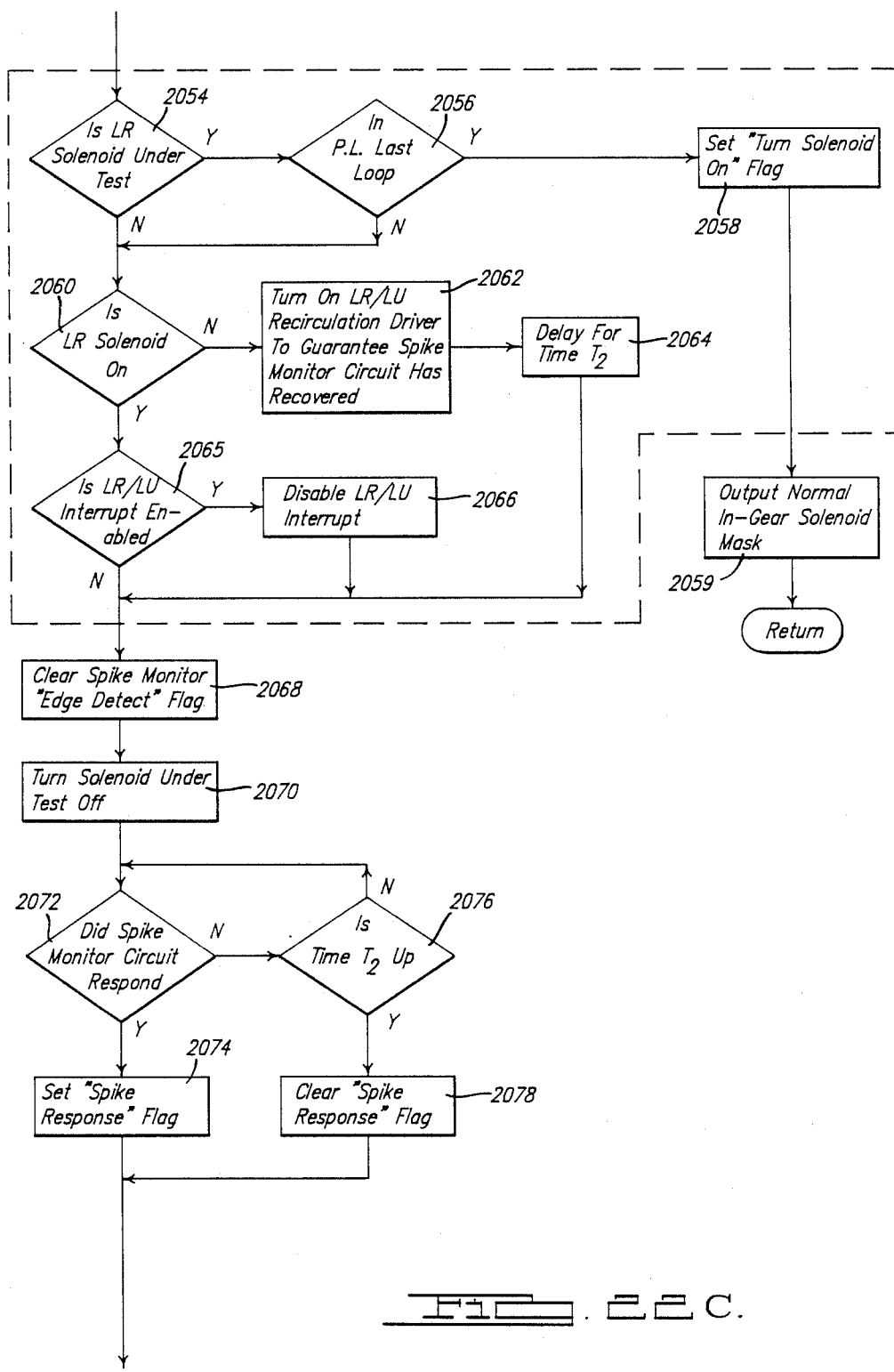
Figure 22D:
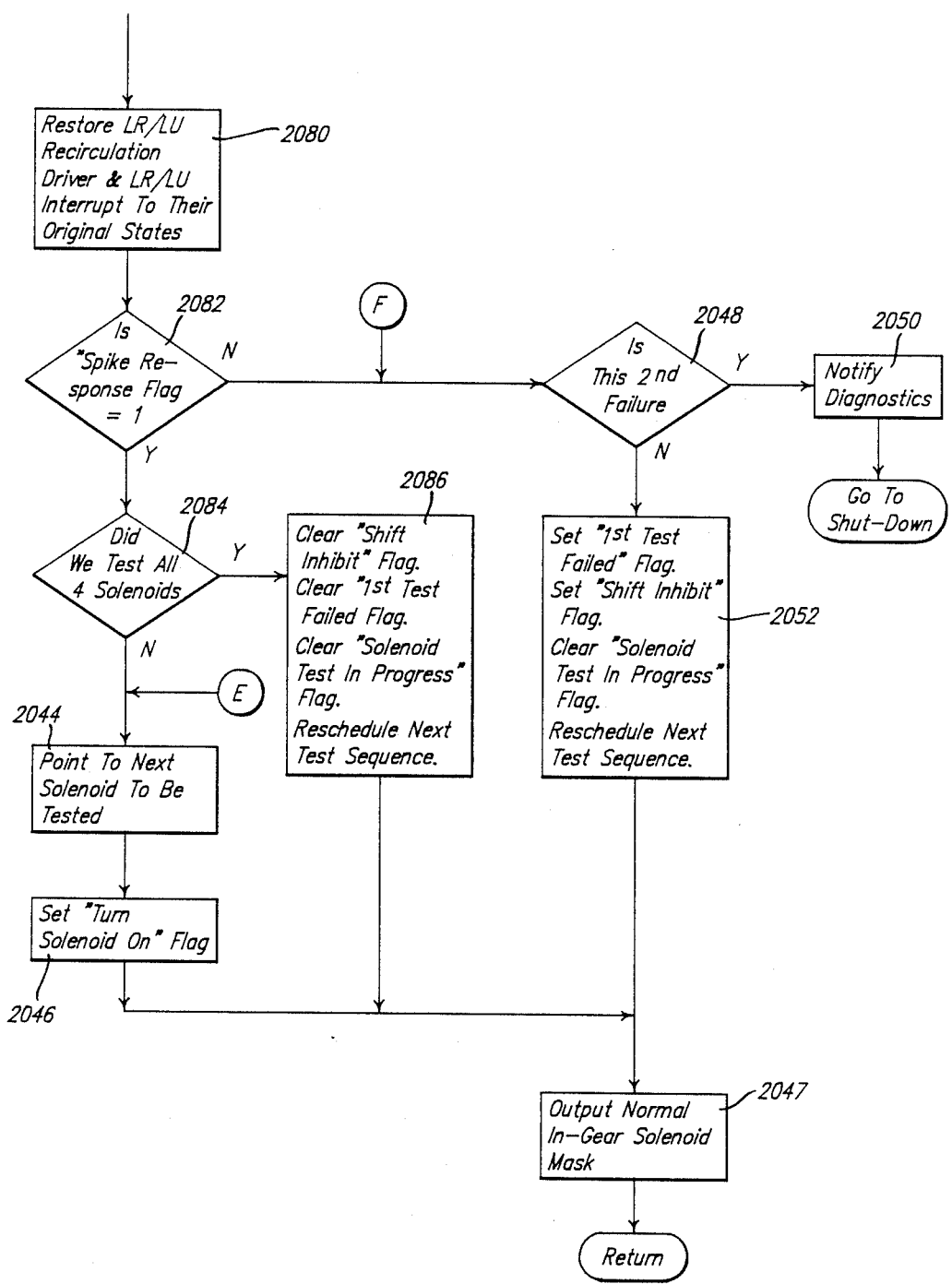
Figure 23B:
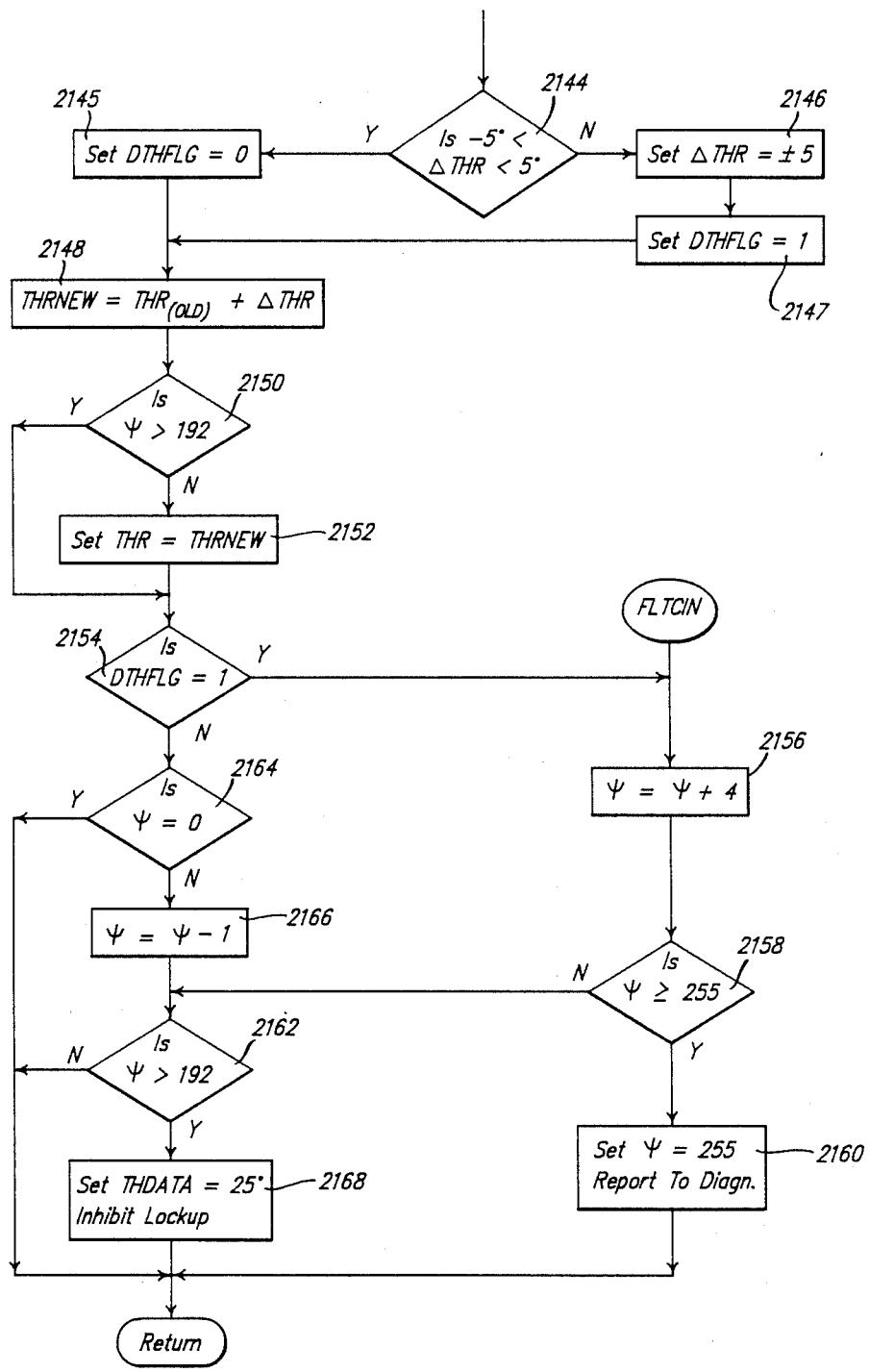
Figure 22E:
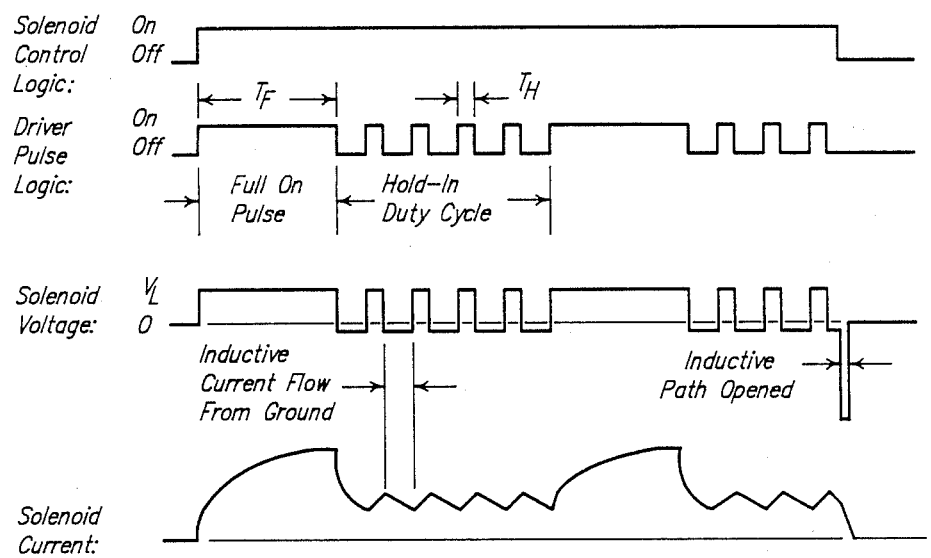
Figure 23C:
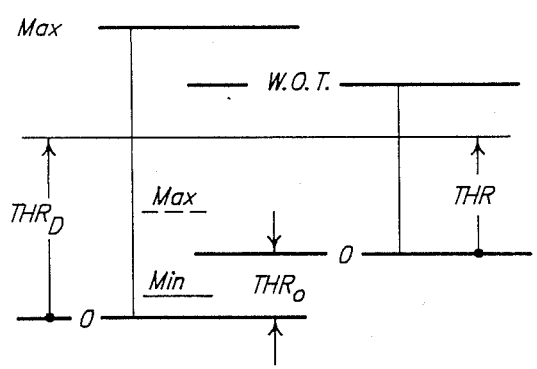
Figure 24B:
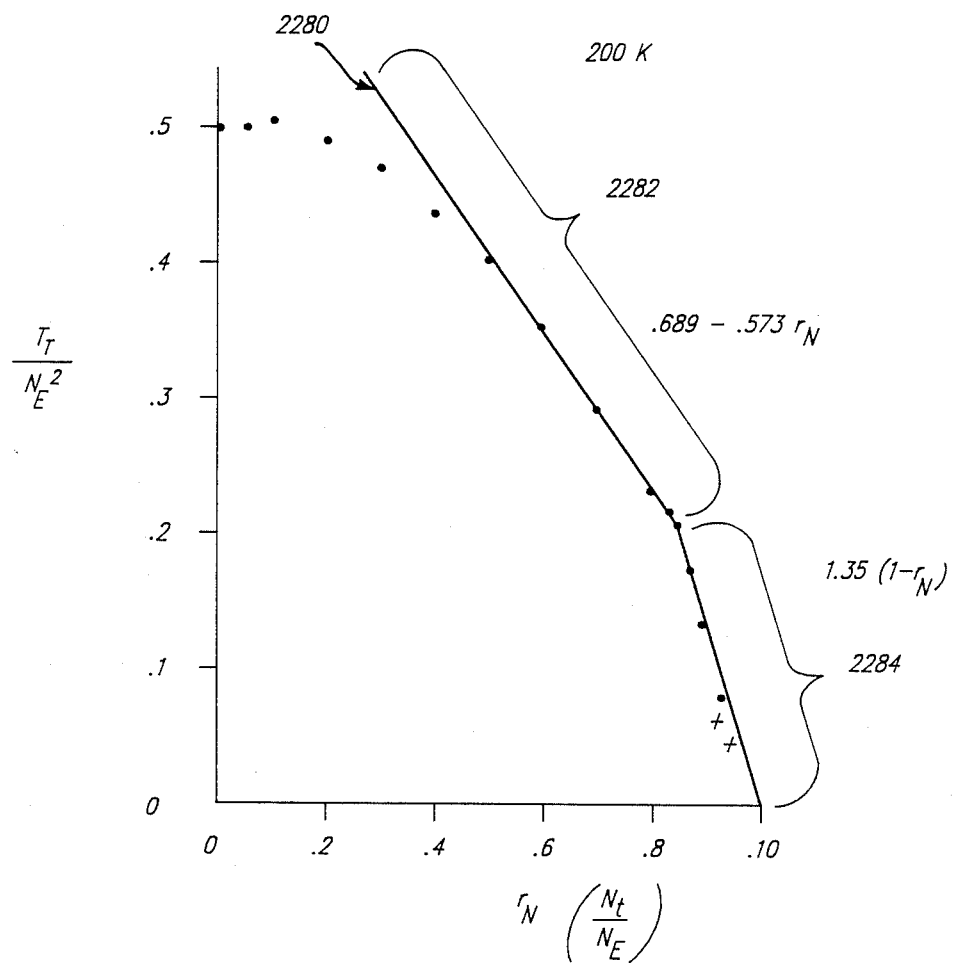
Figure 24C:
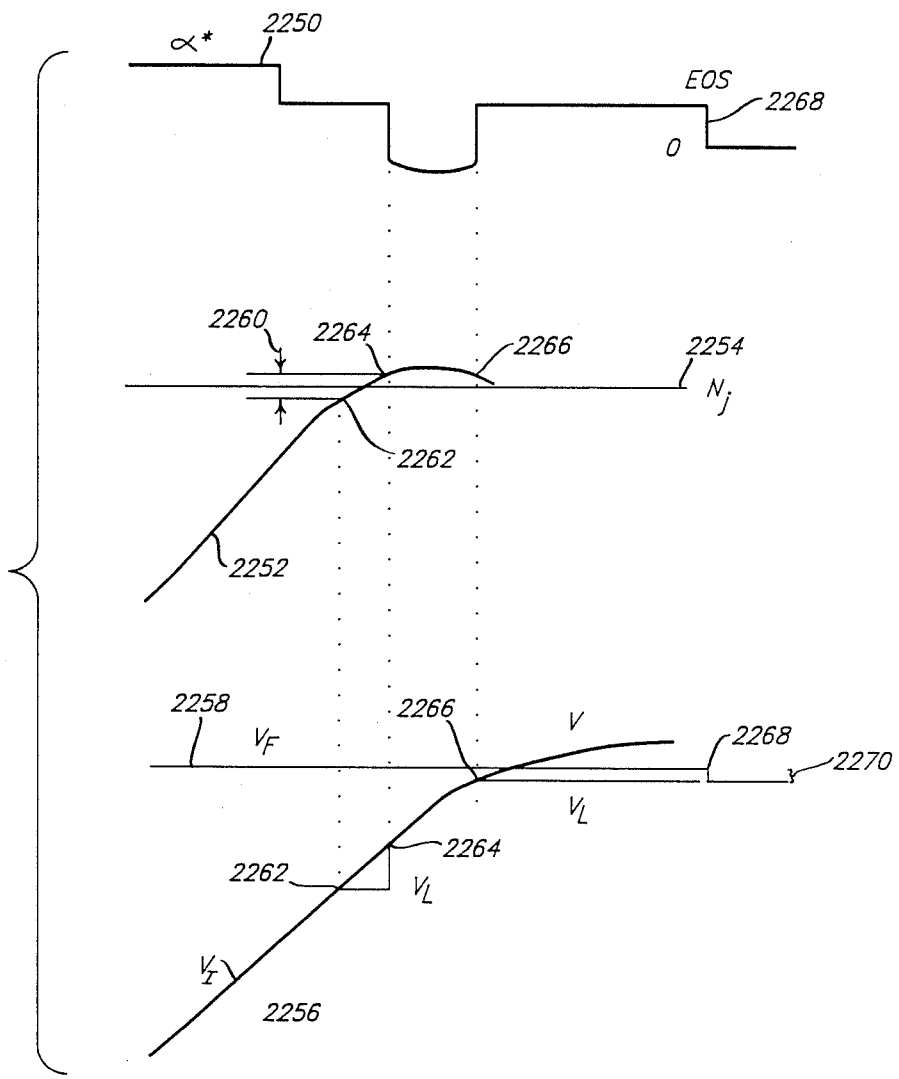
Figure 24D:
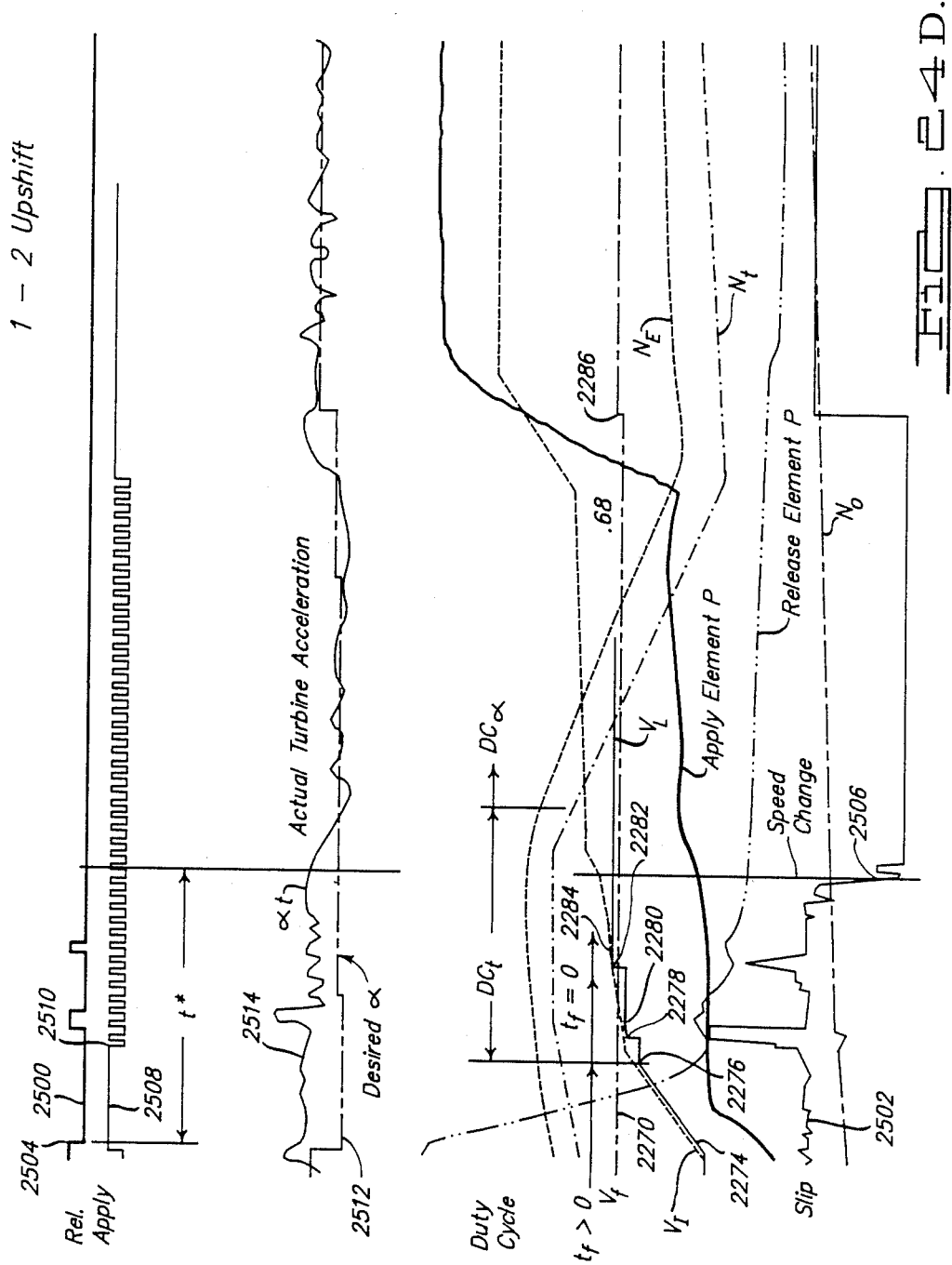
Figure 24E:
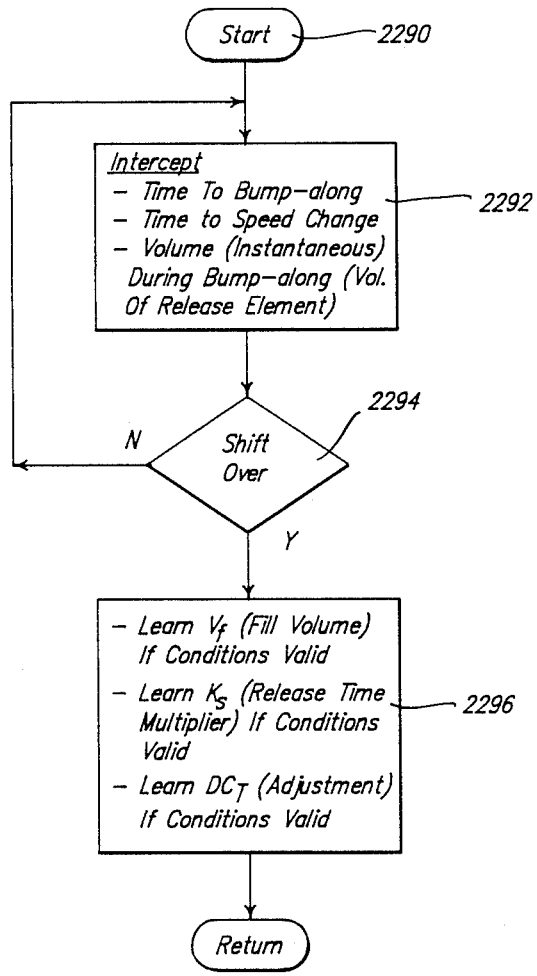
Figure 24F:
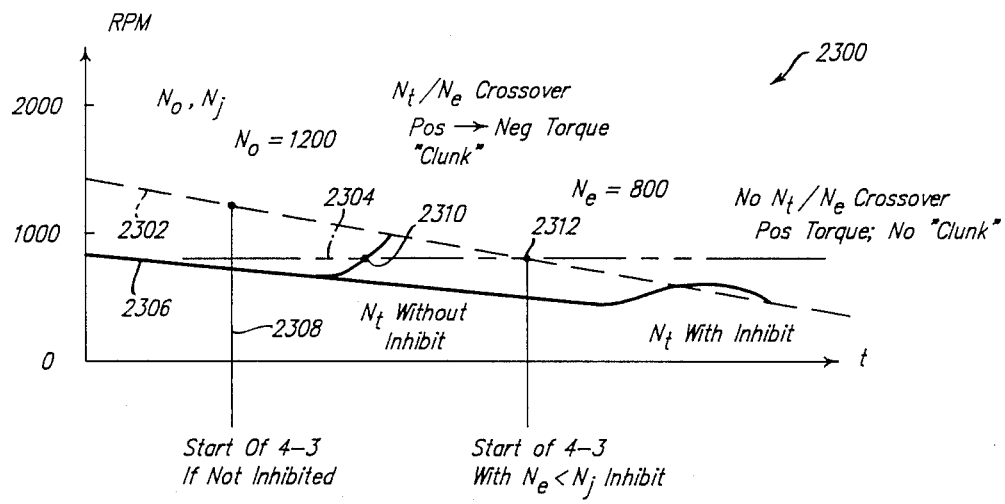
Figure 24G:
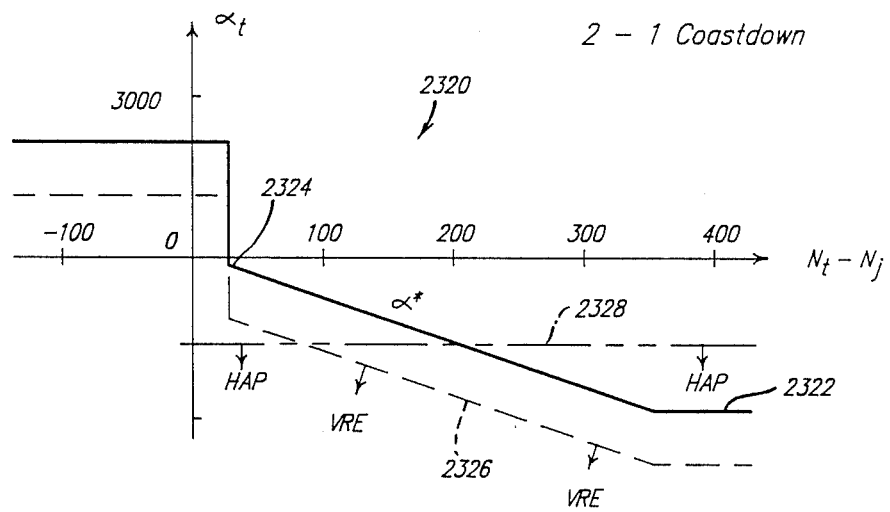
Figure 24H:
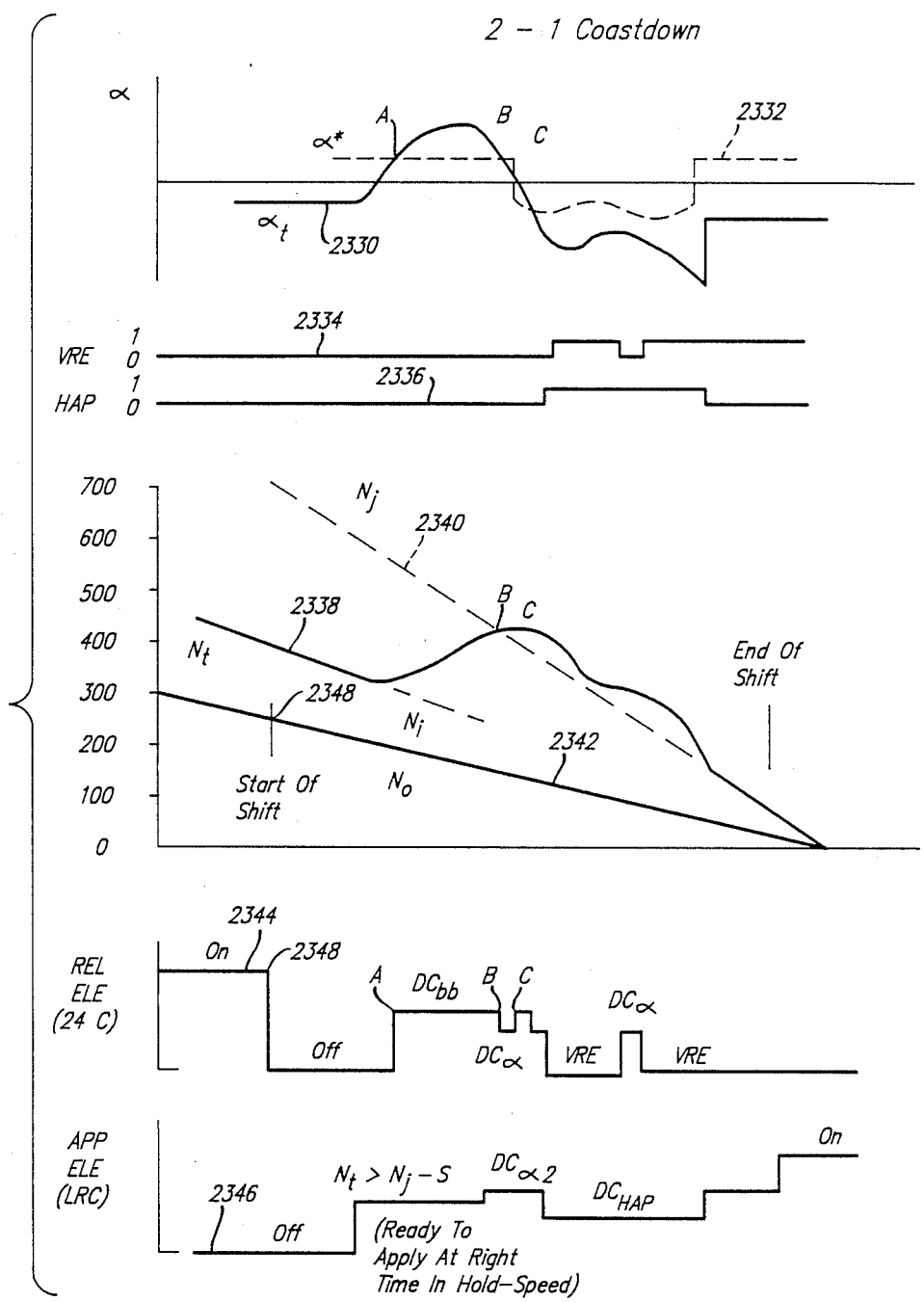
Figure 24J:
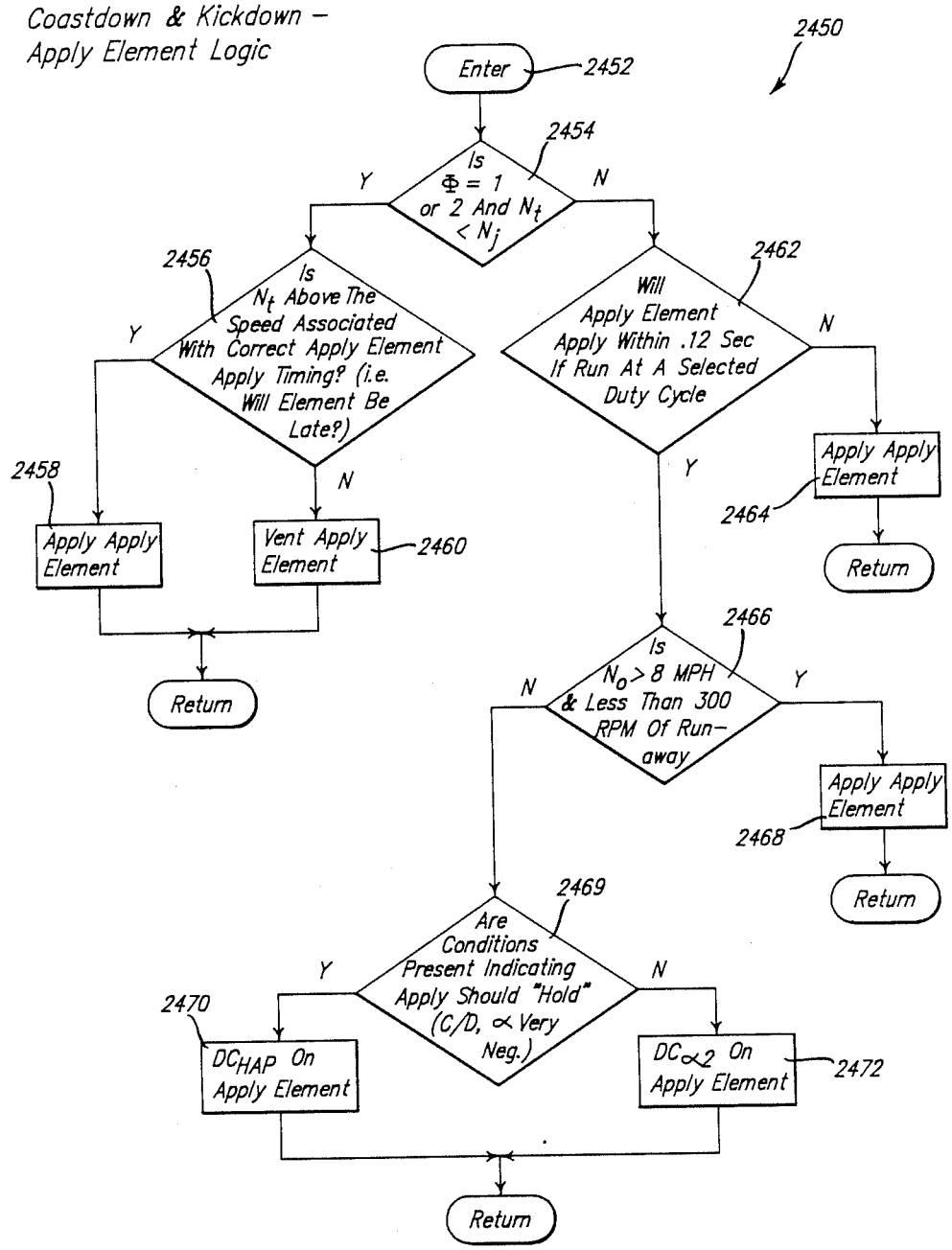
Figure 4K:
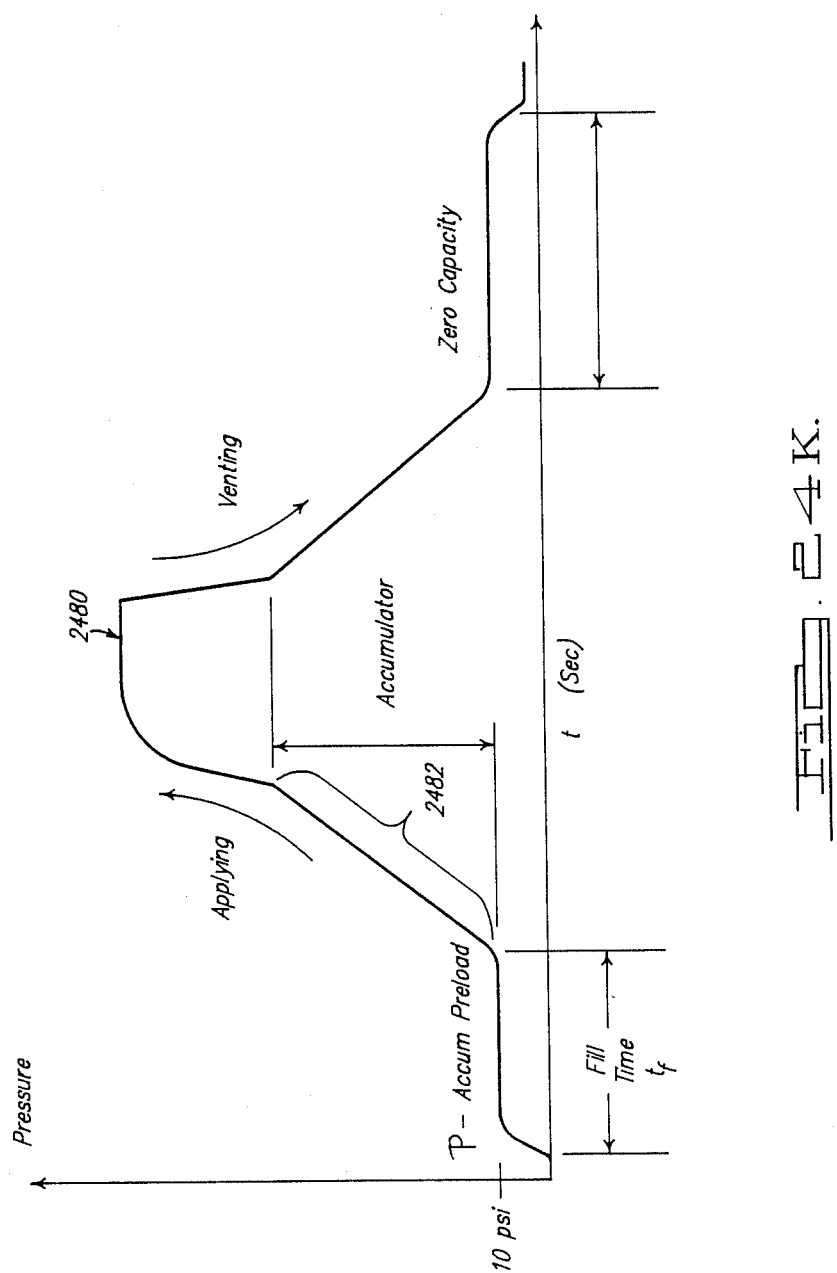
Figure 25A:
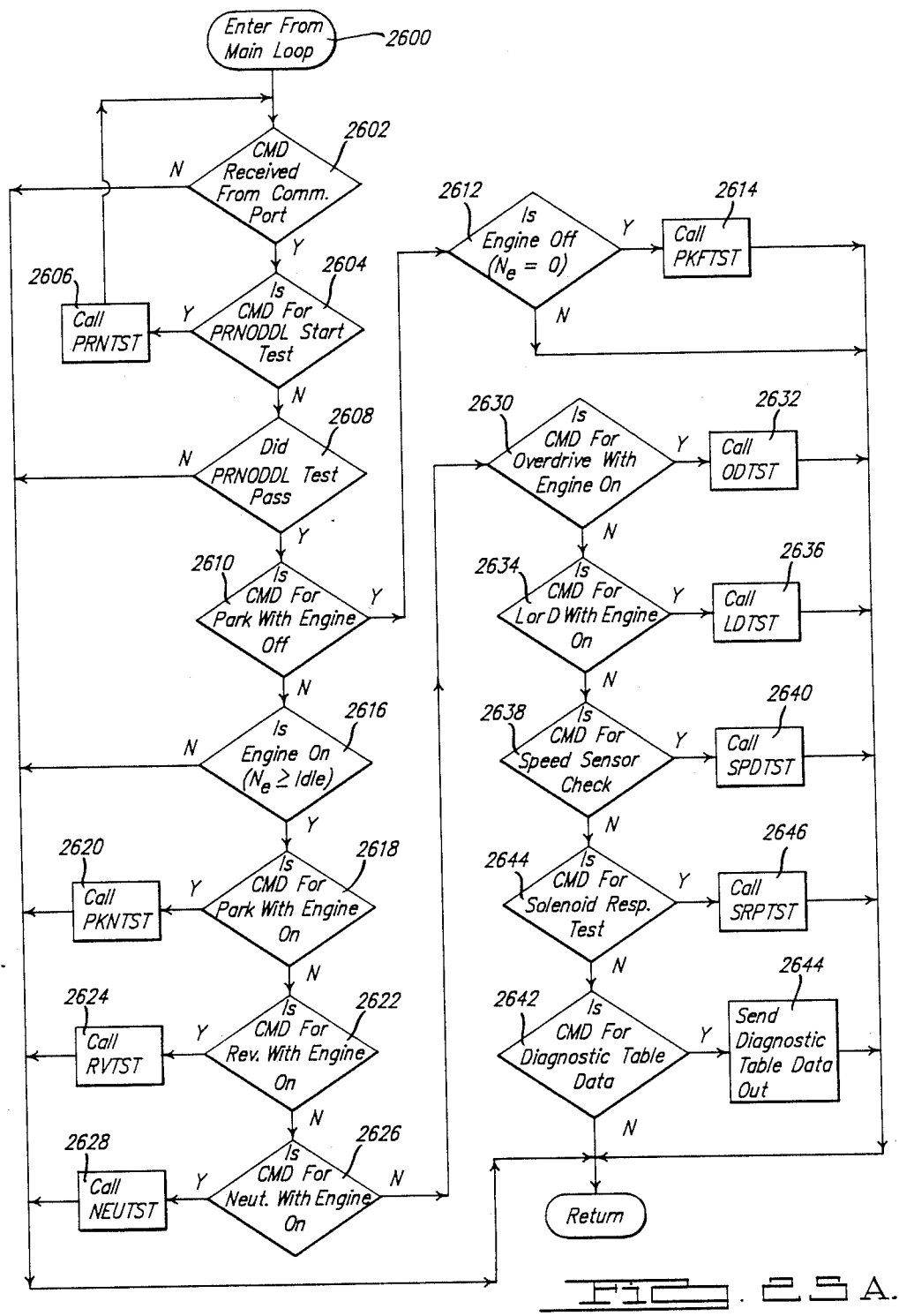
Figure 25B:
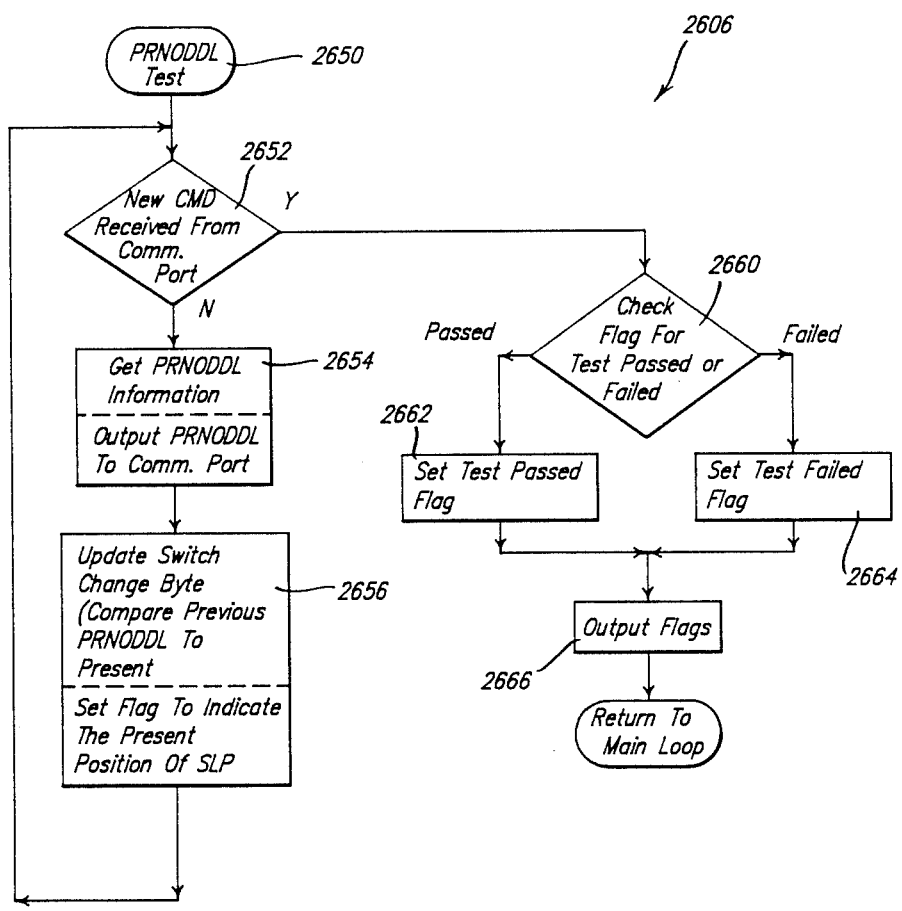
Figure 25C:
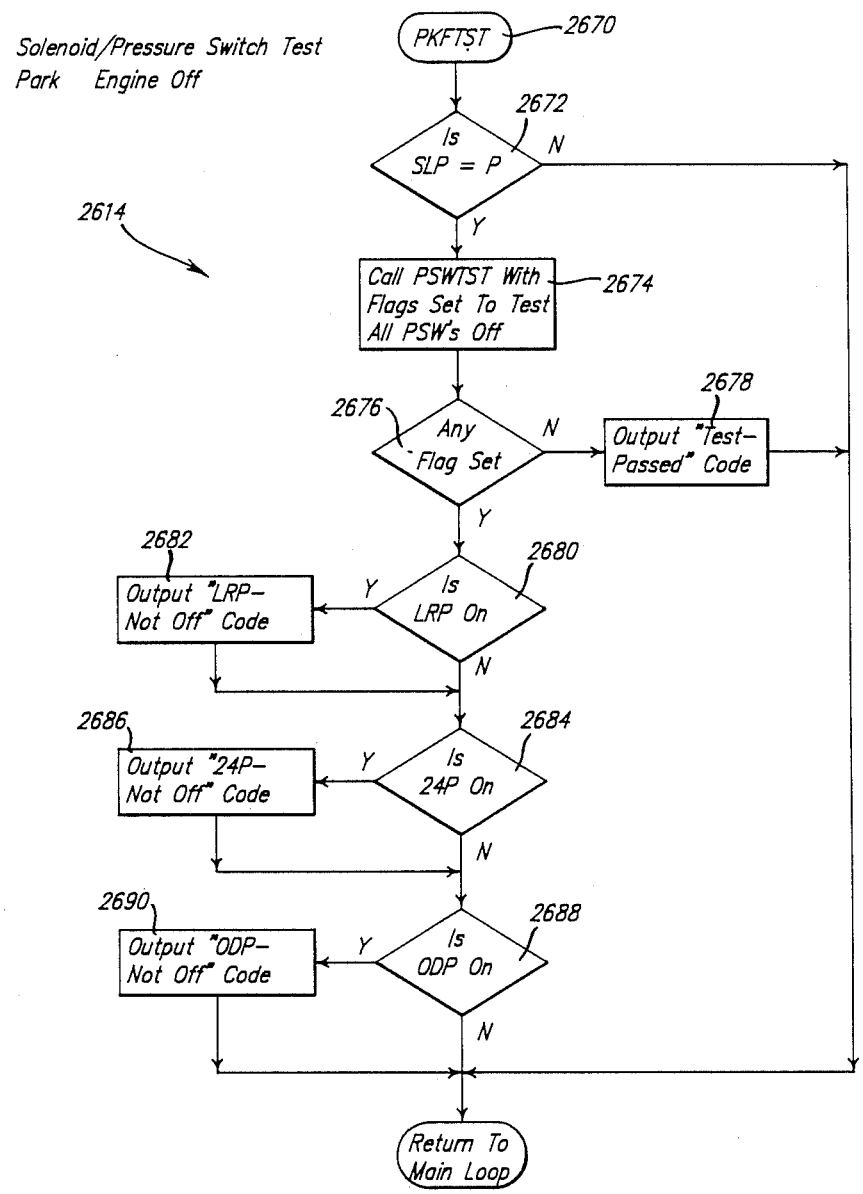
Figure 25D:
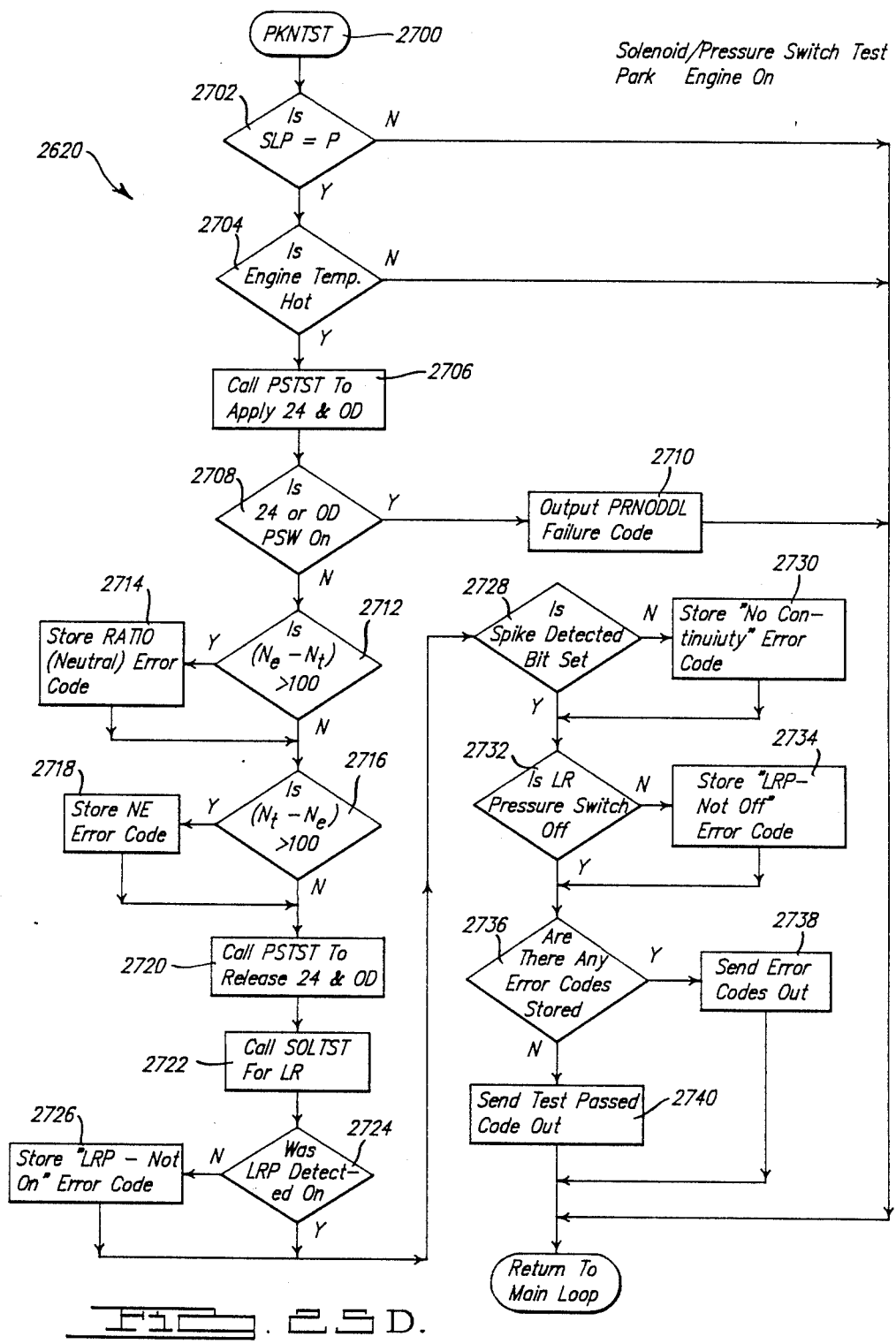
Figure 25E:
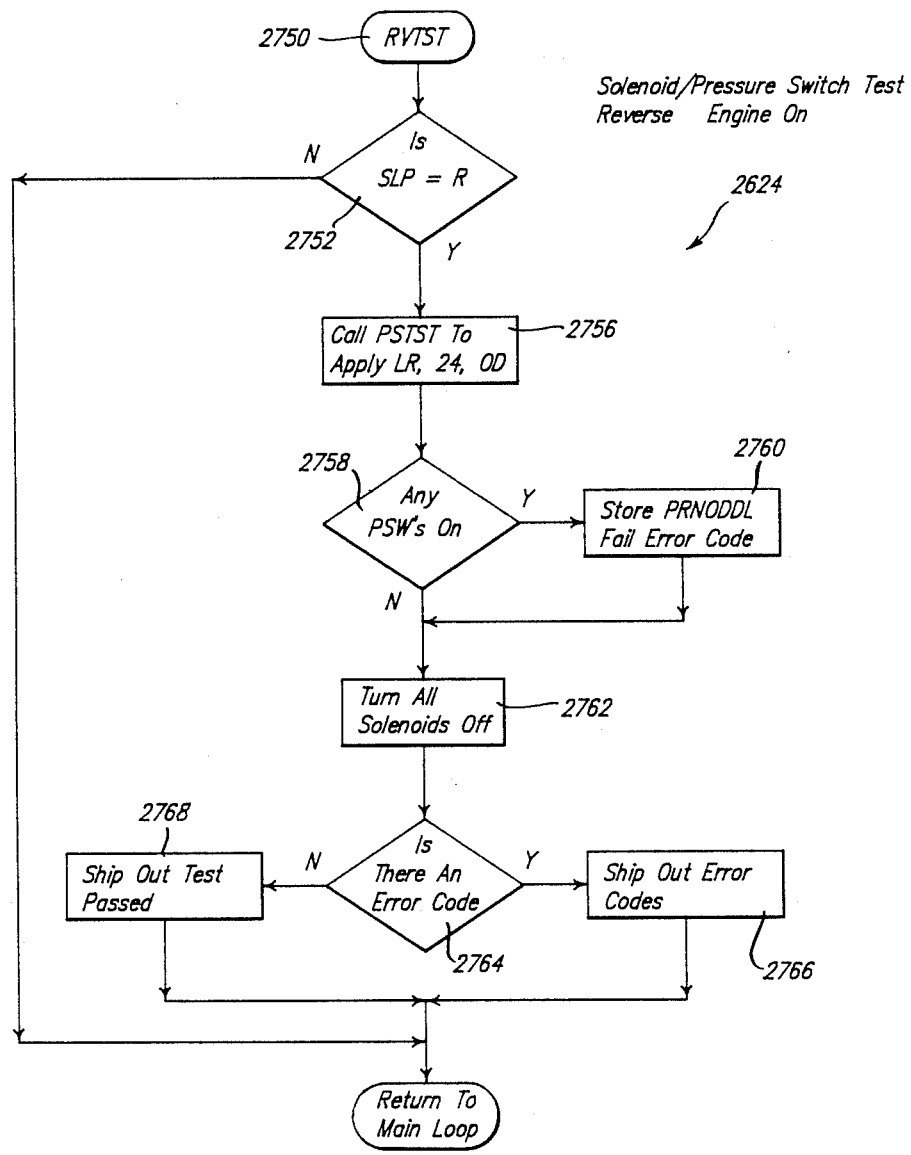
Figure 28G:
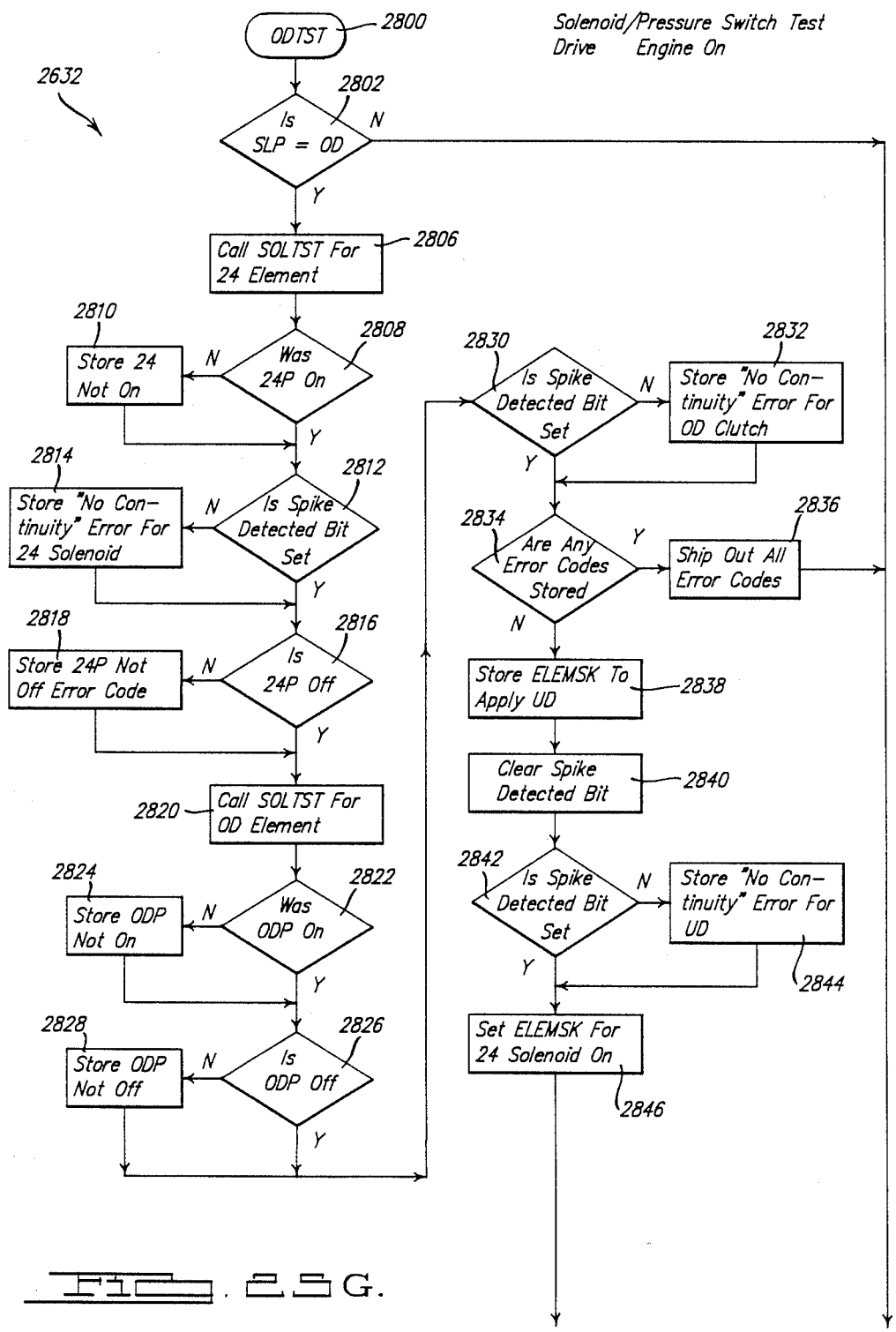
Figure 25H:
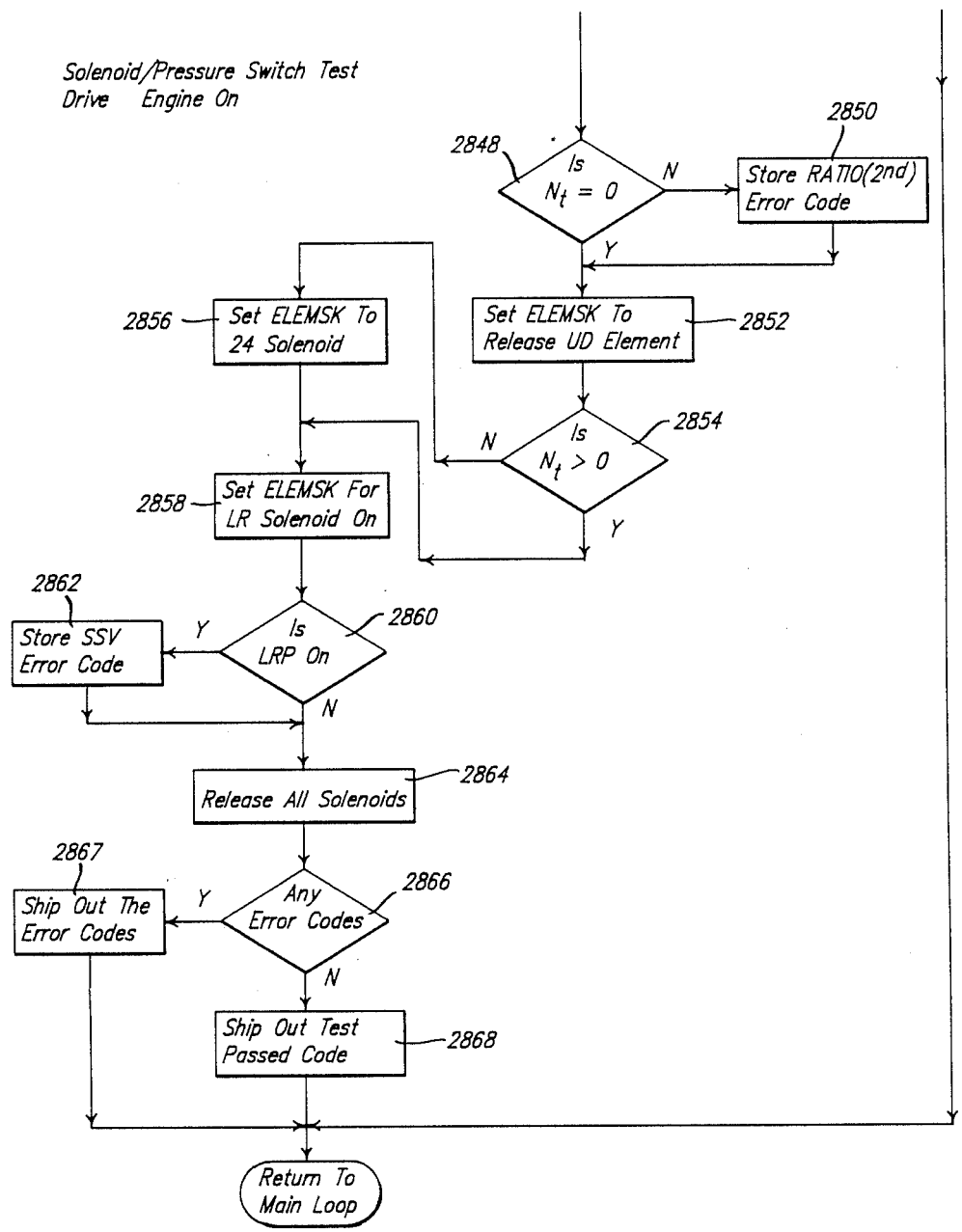
Figure 231:
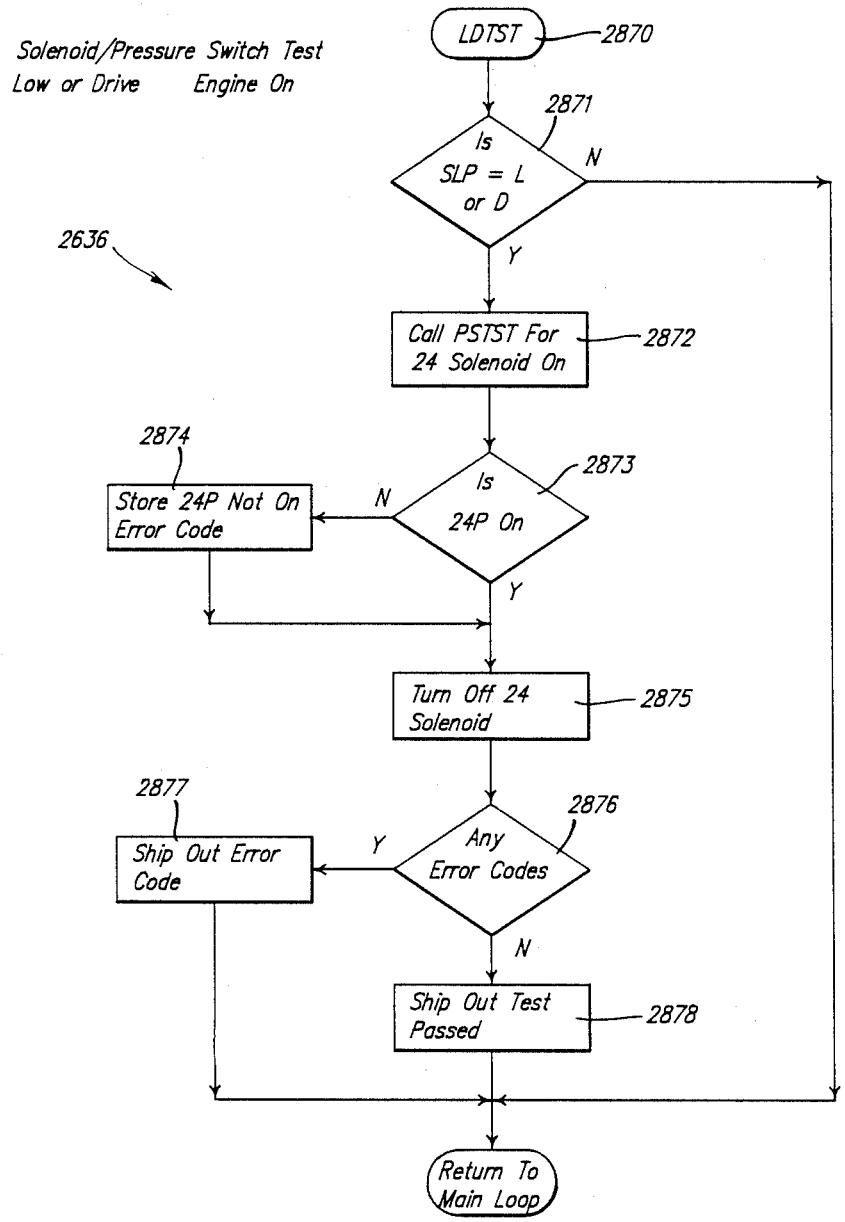
Figure 25J:
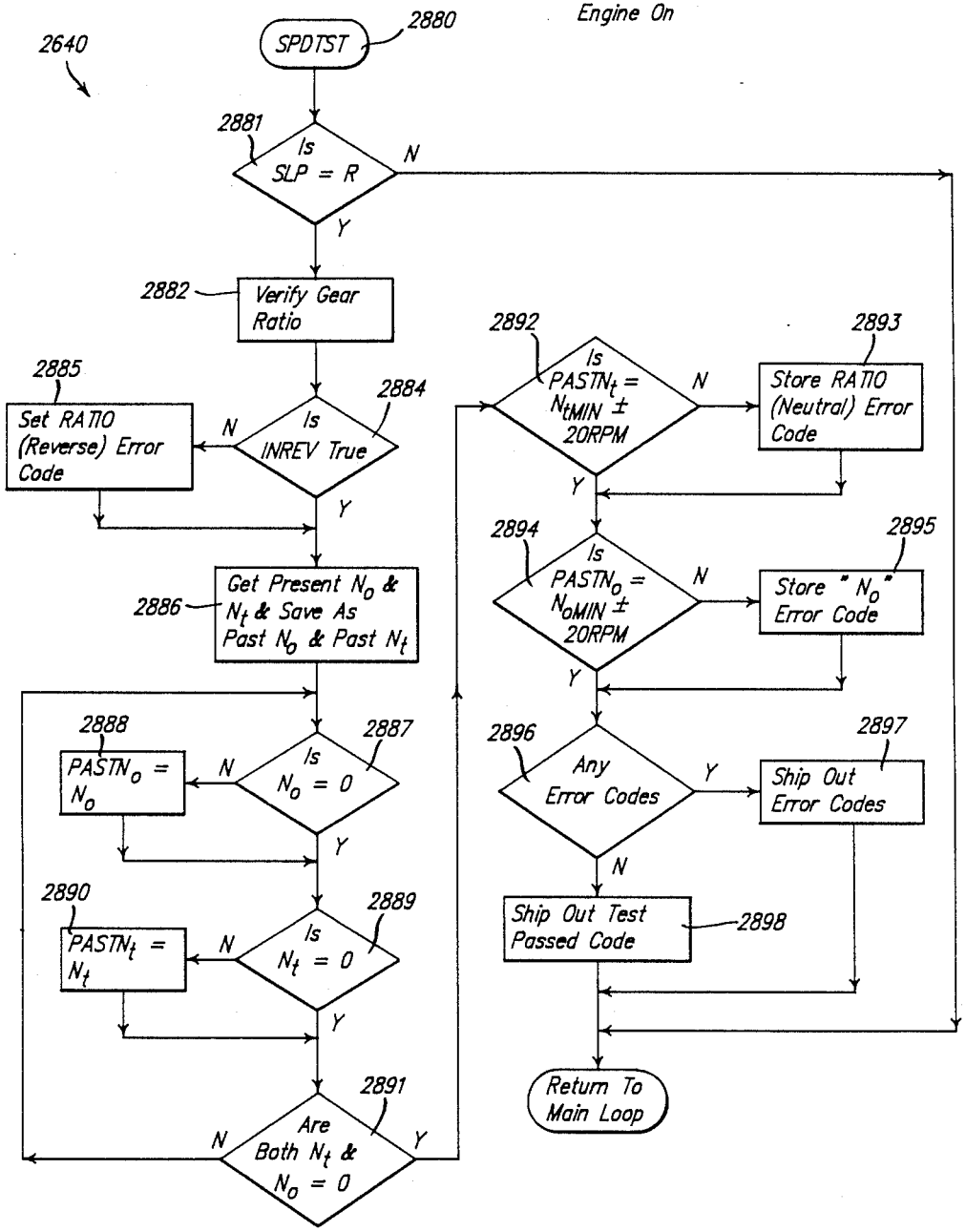
Figure 25K:
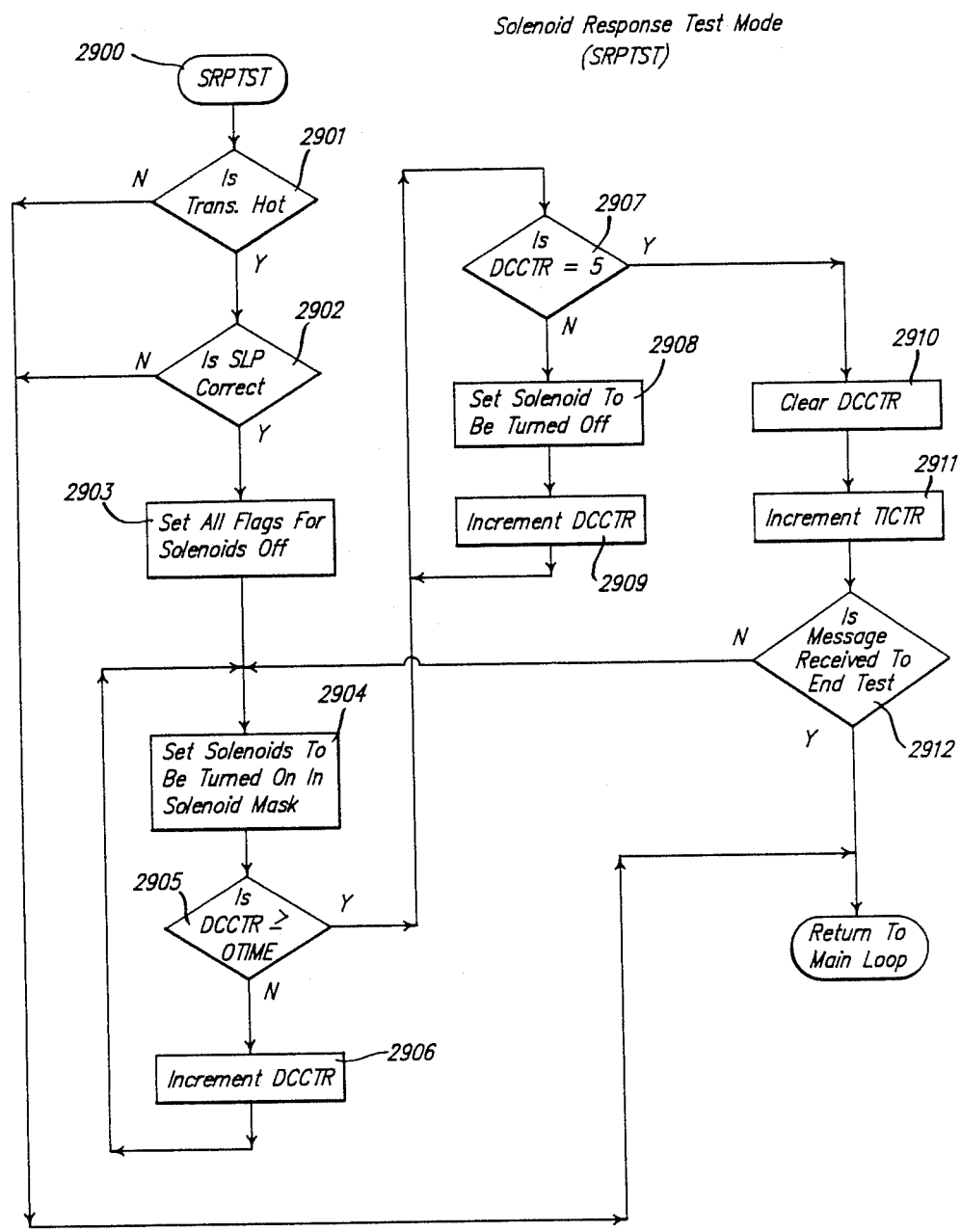
Figure 26A:
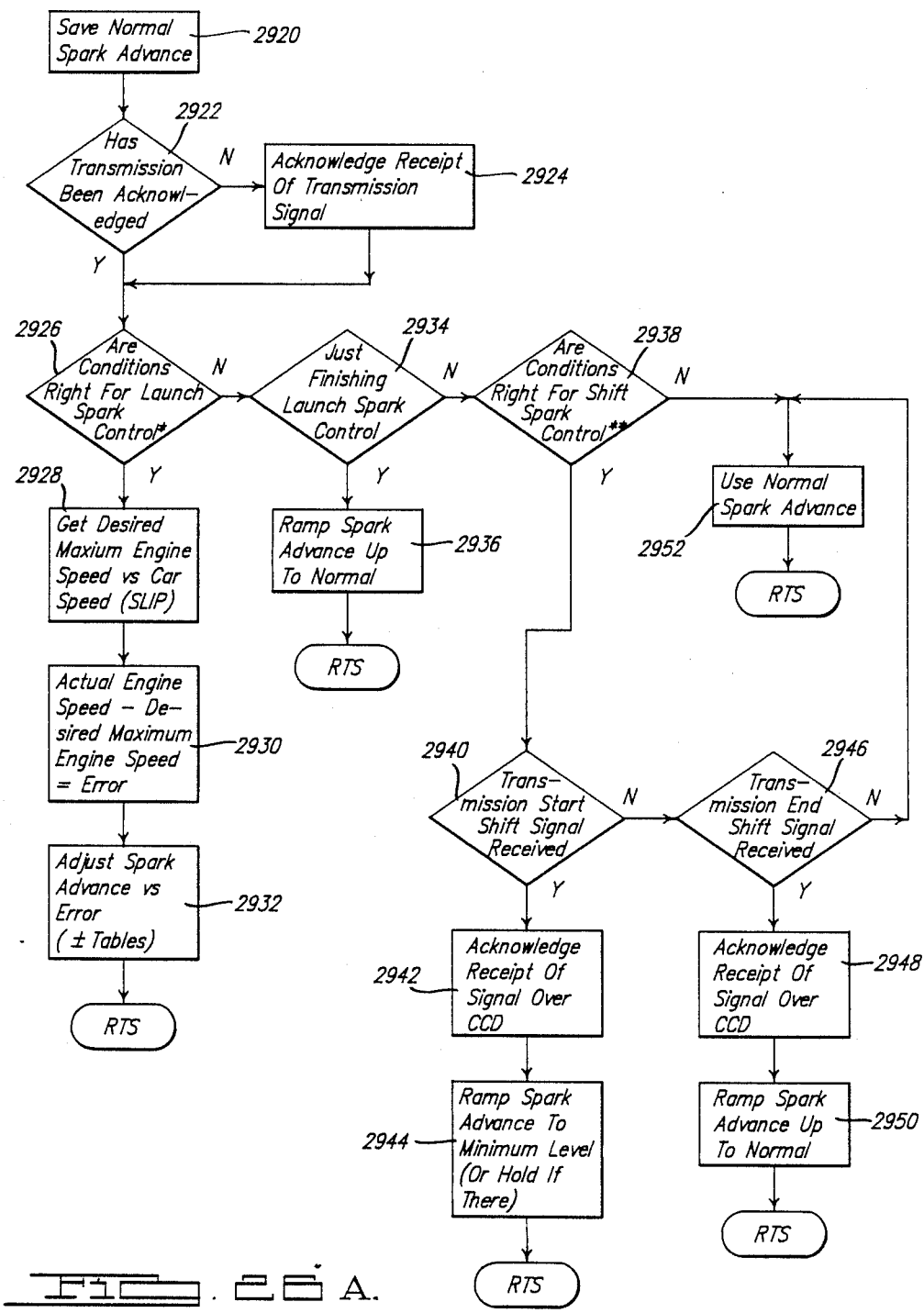
Figures 28B, 28C, 28D:
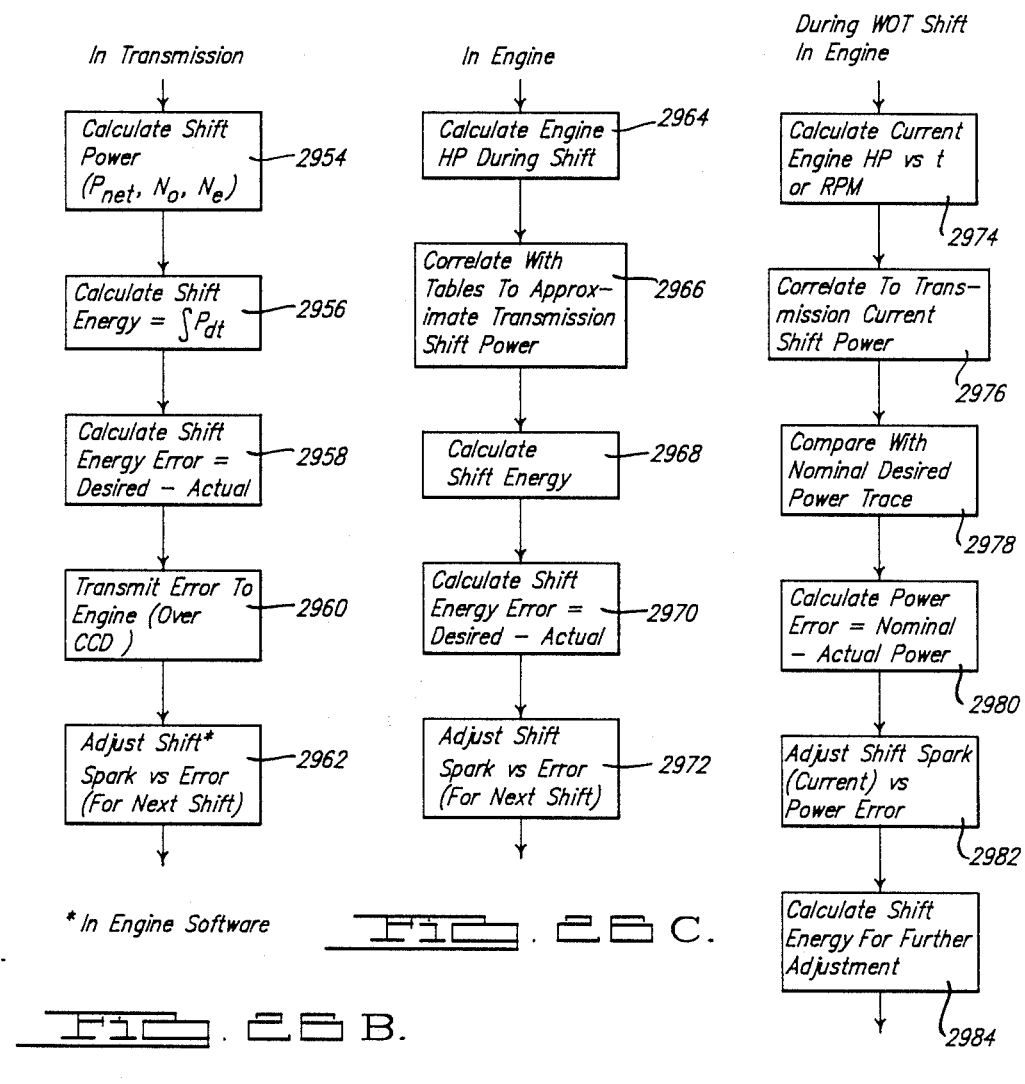
Figure 26E:
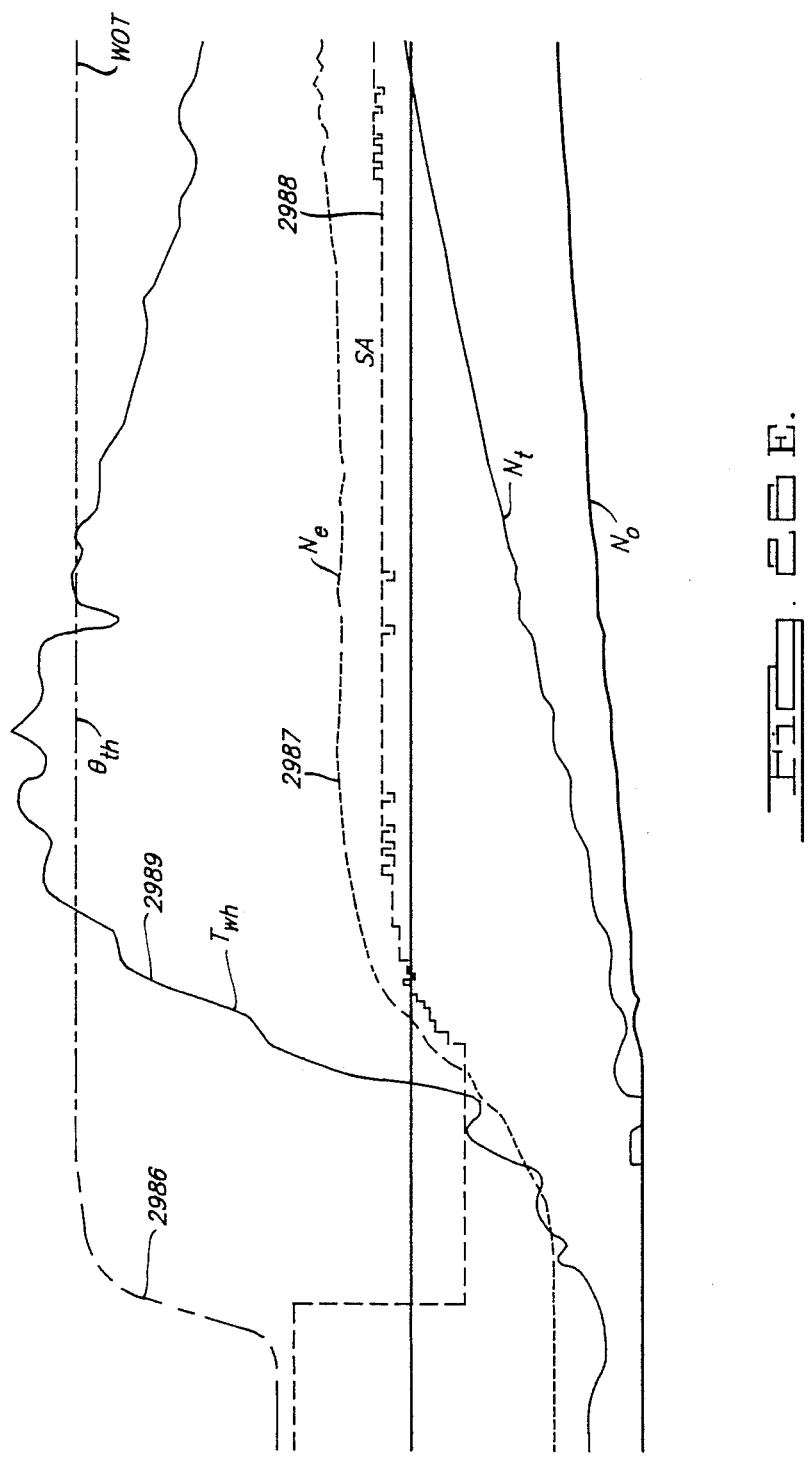
Figure 26G:
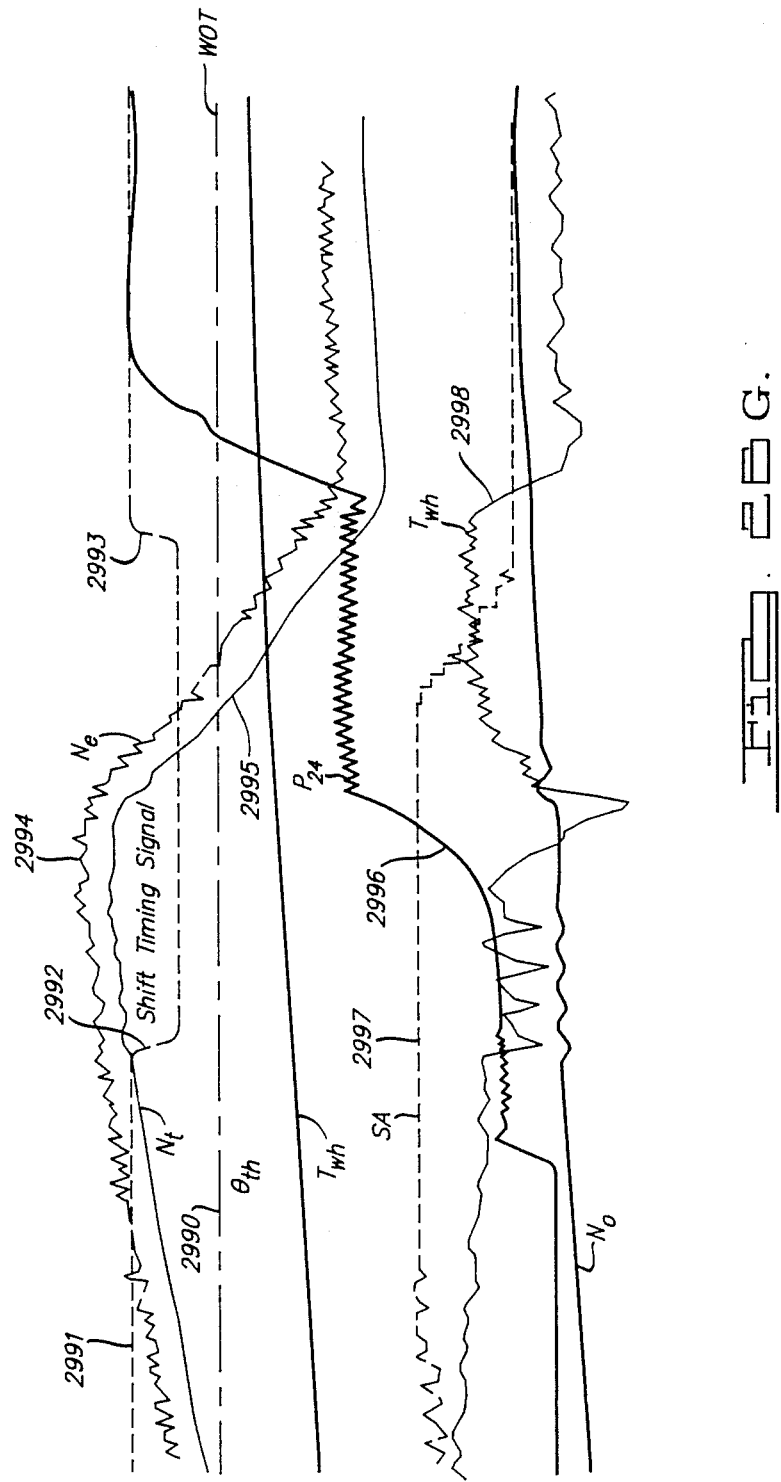
Figure 27A:
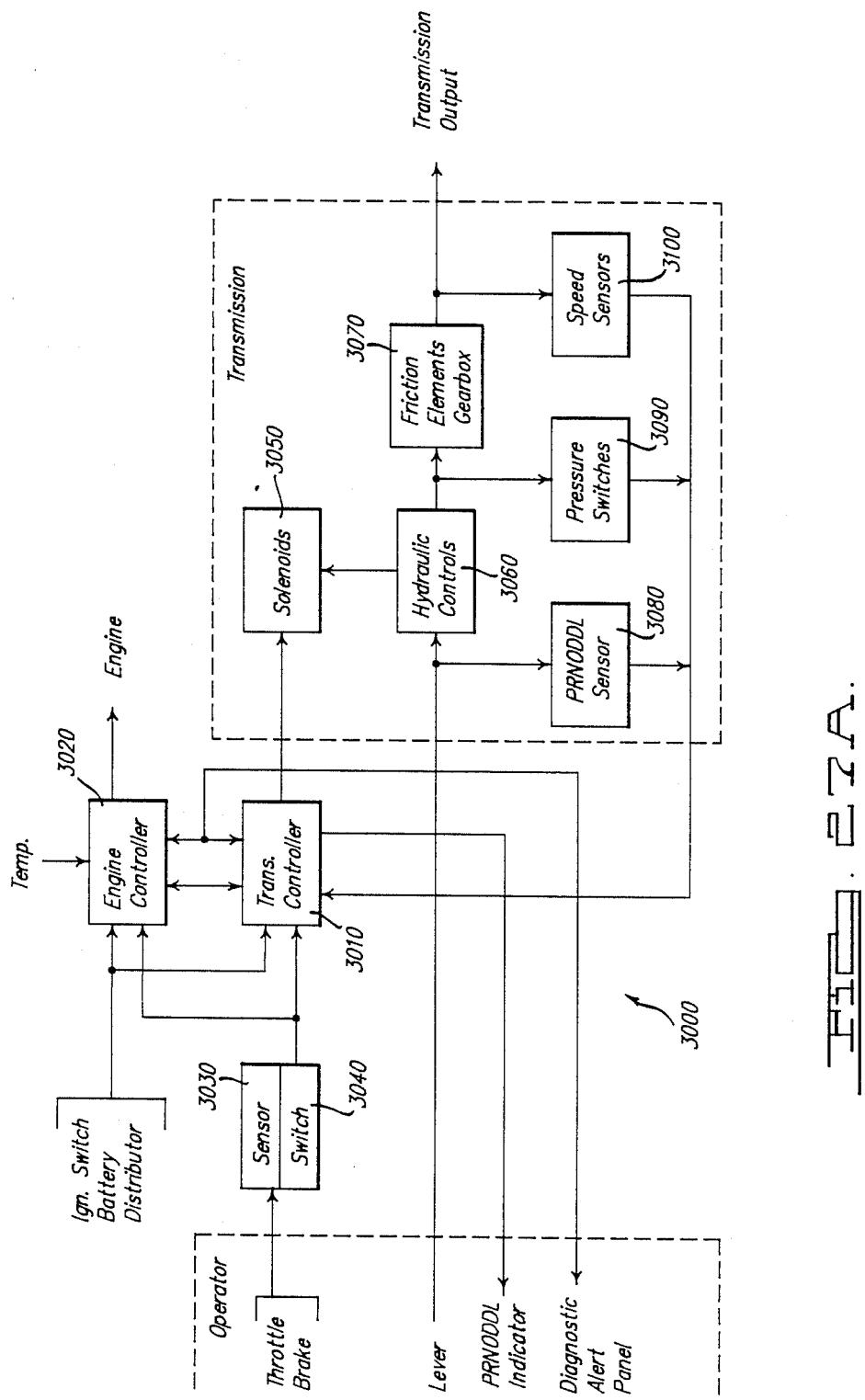
Figure 27B:
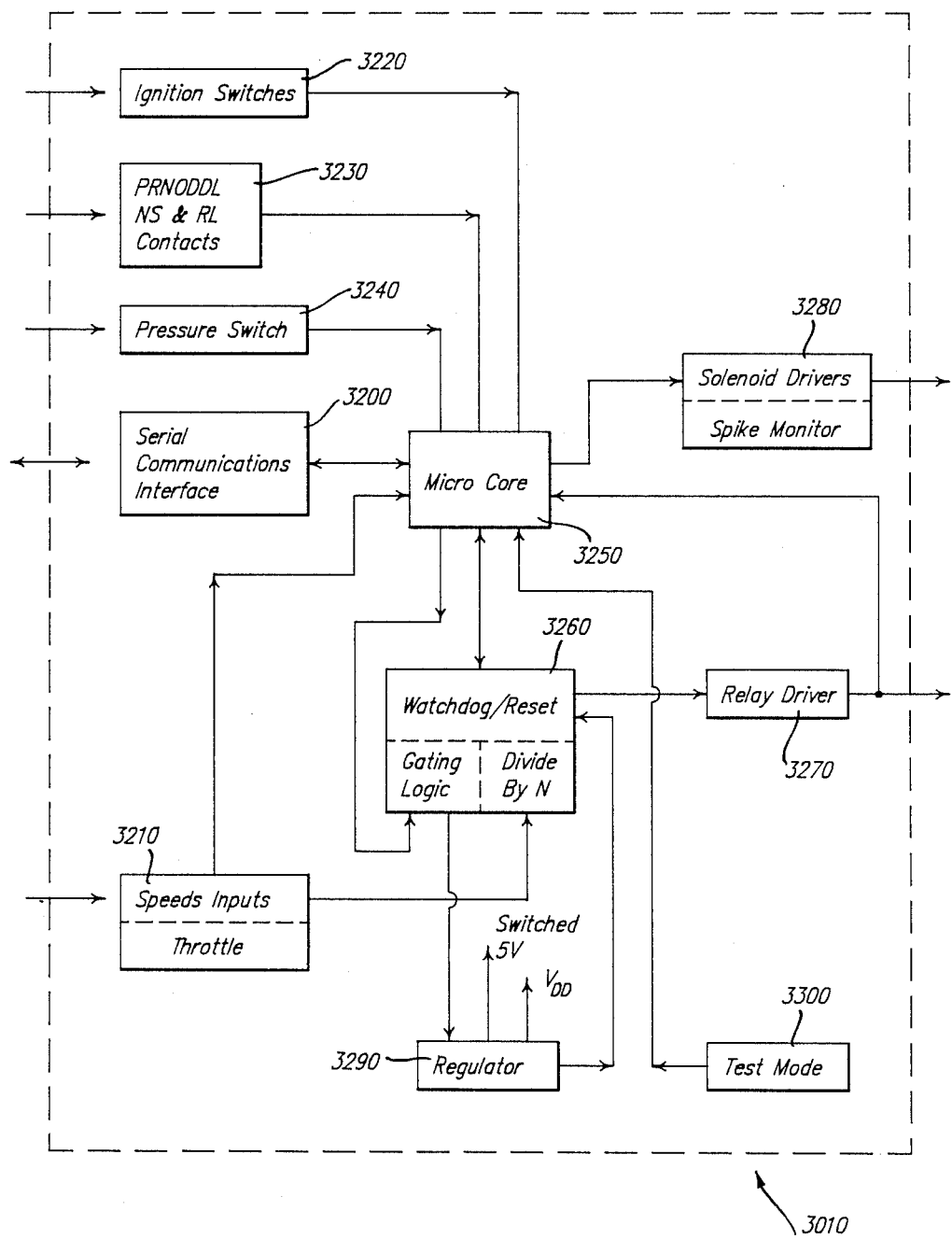
Figure 28A:
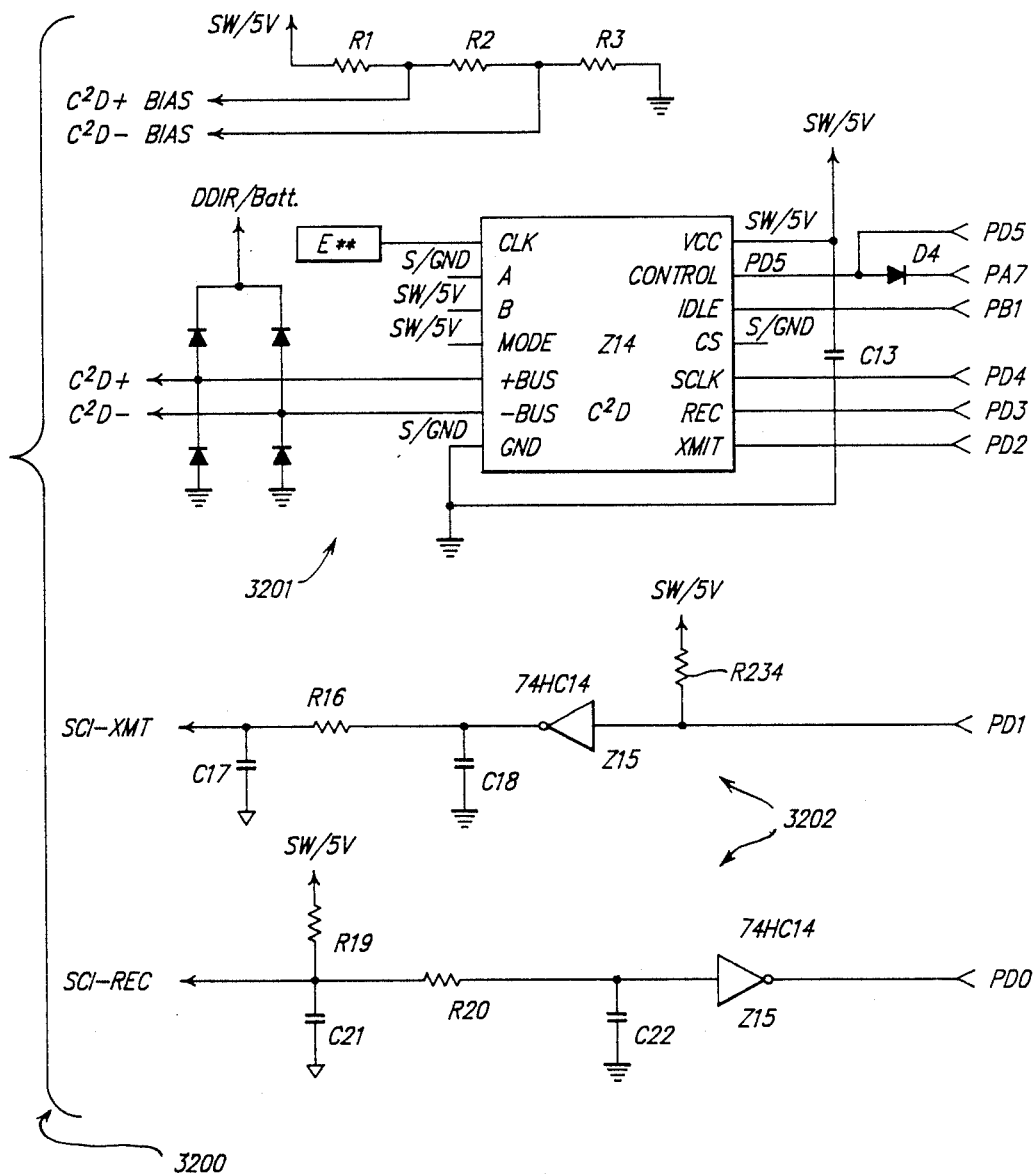
Figure 28B:
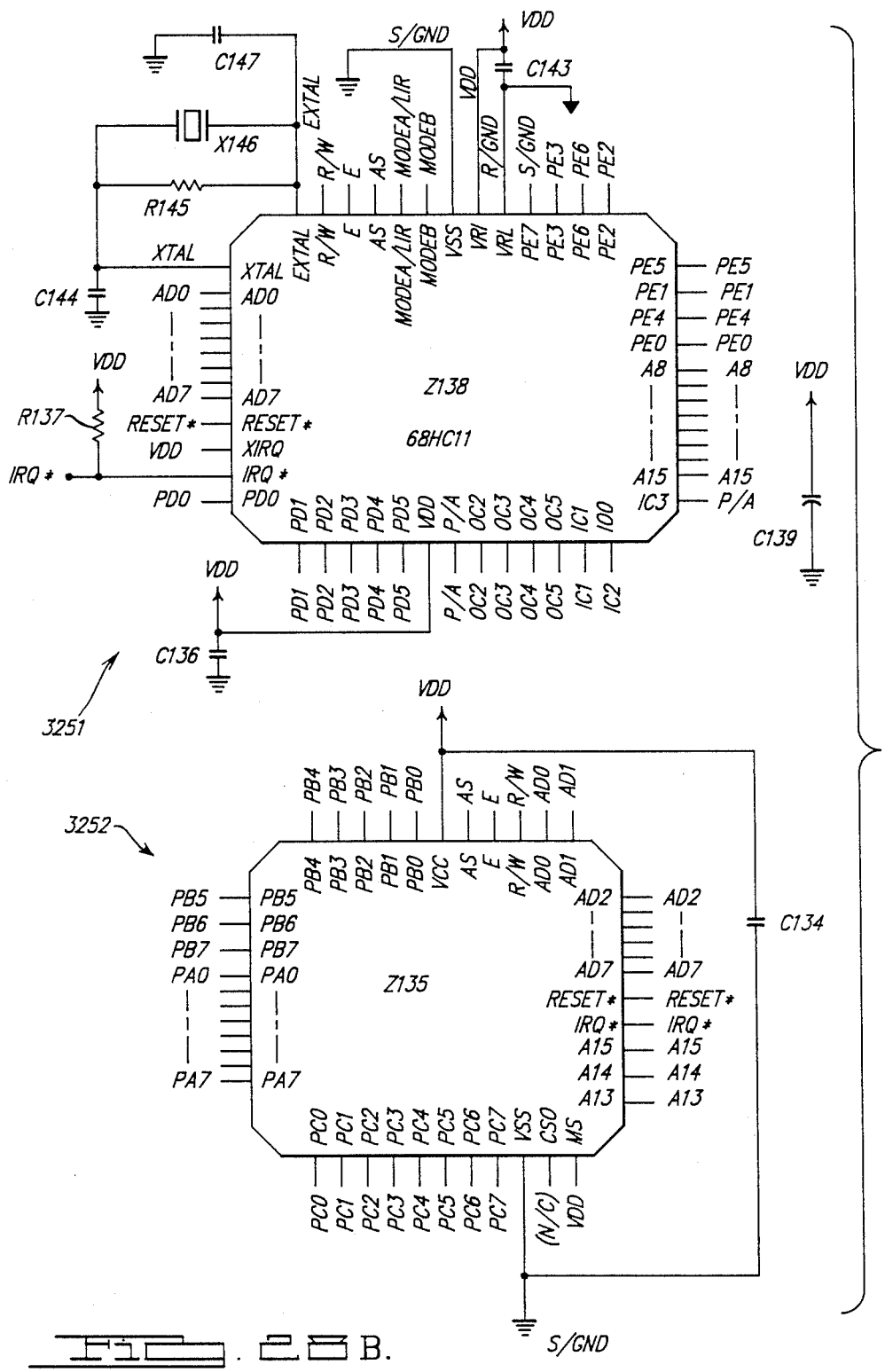
Figure 28C:
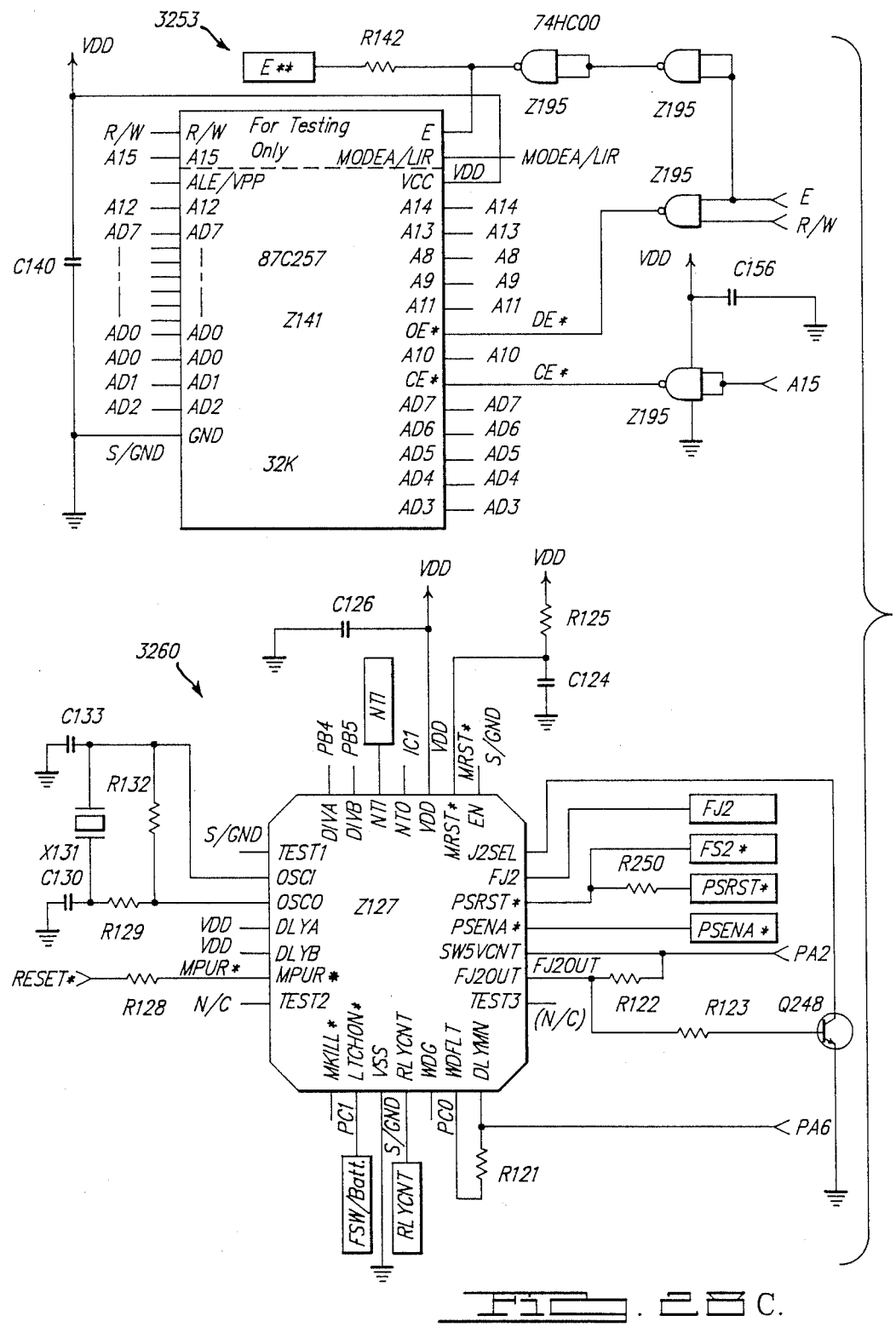
Figure 28E:
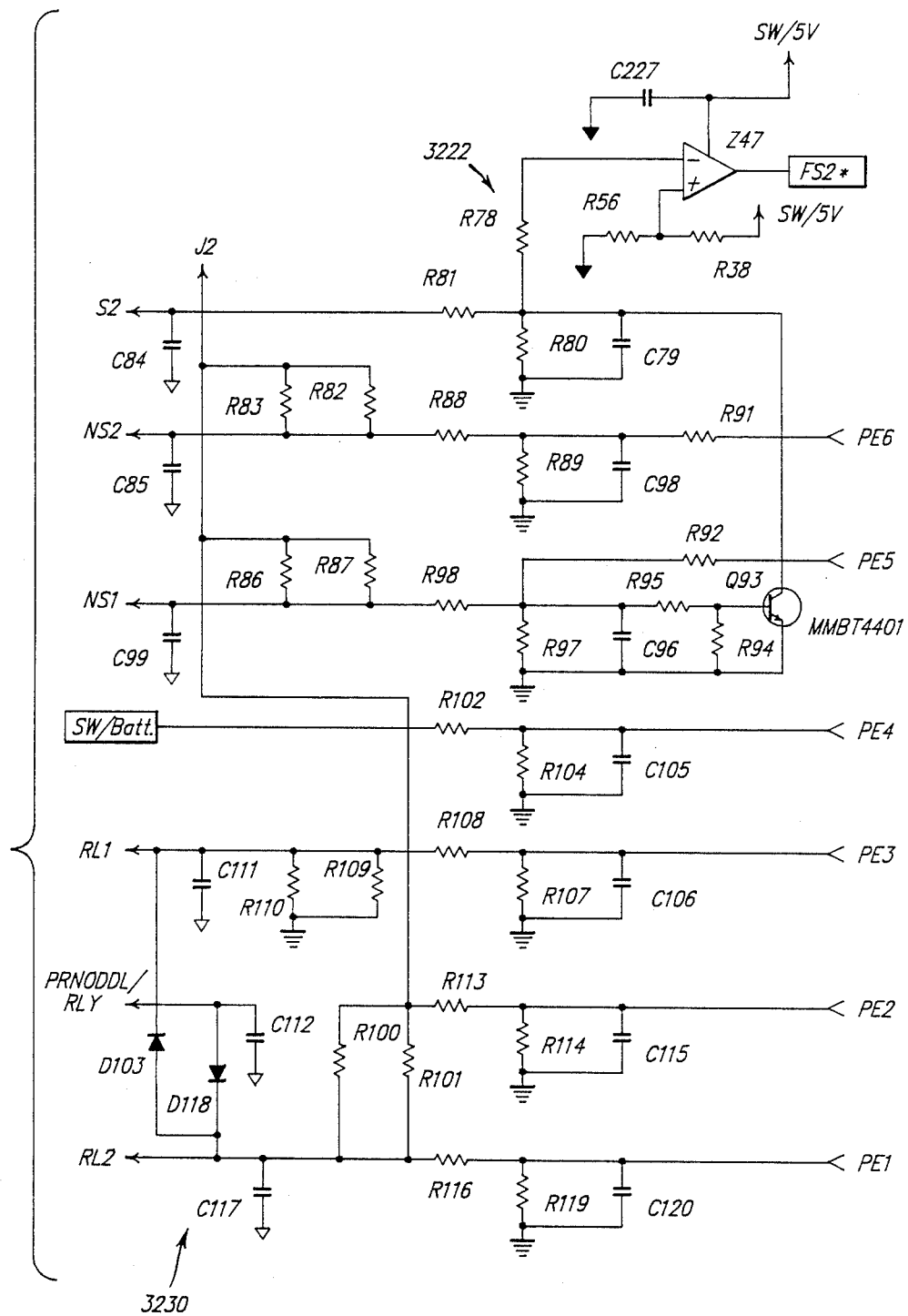
Figure 28F:
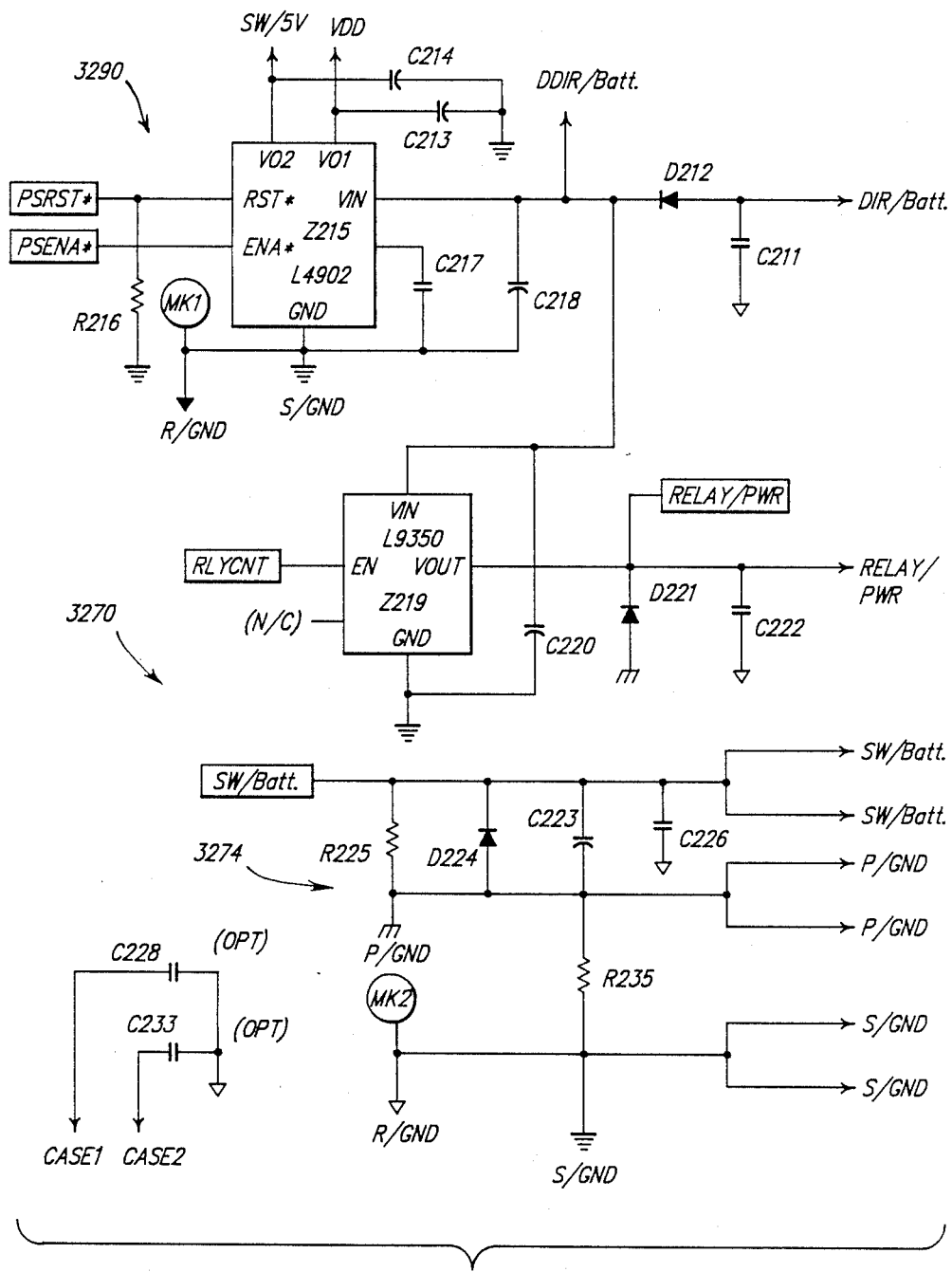
Figure 28G:
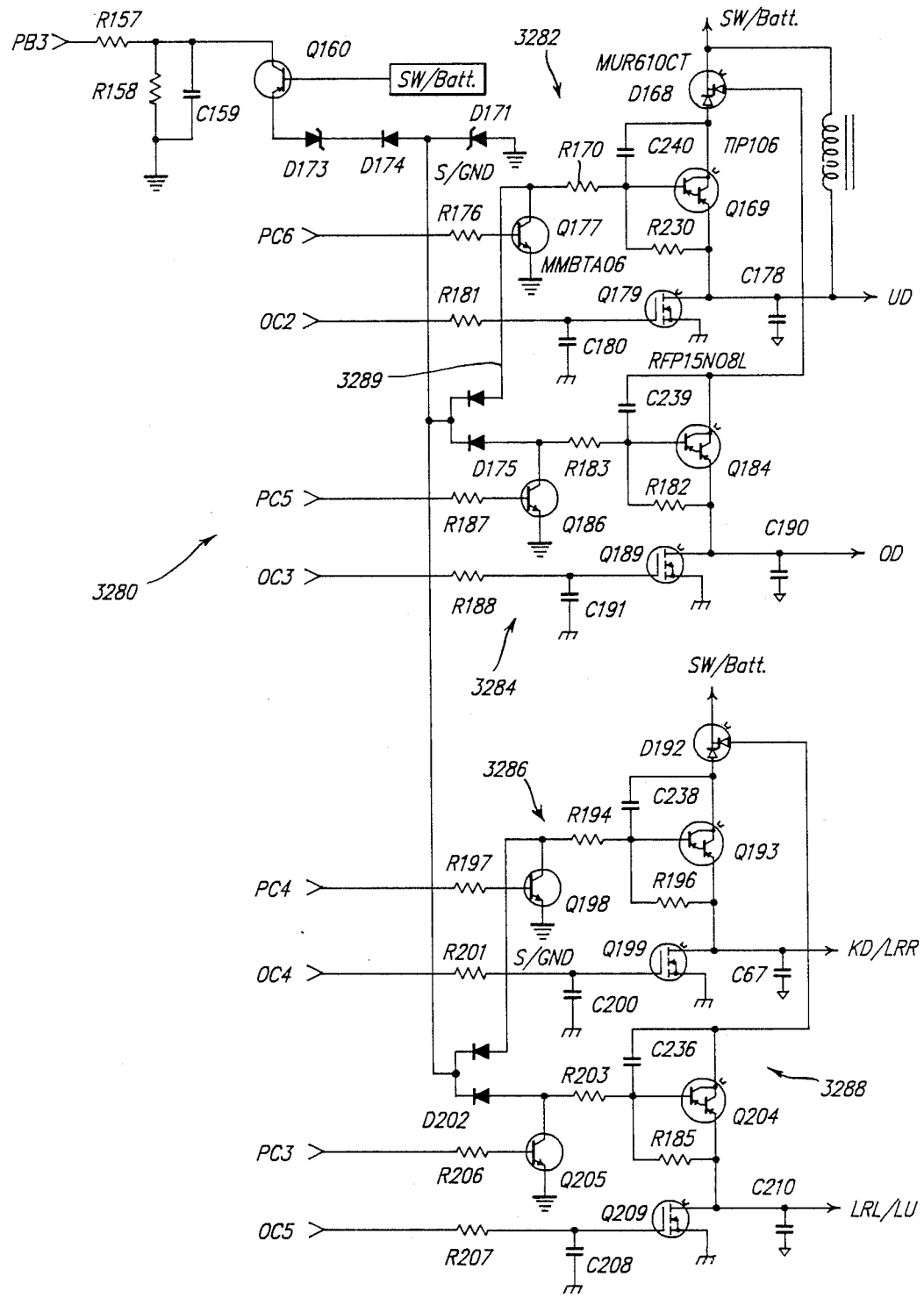
Figure 28H:
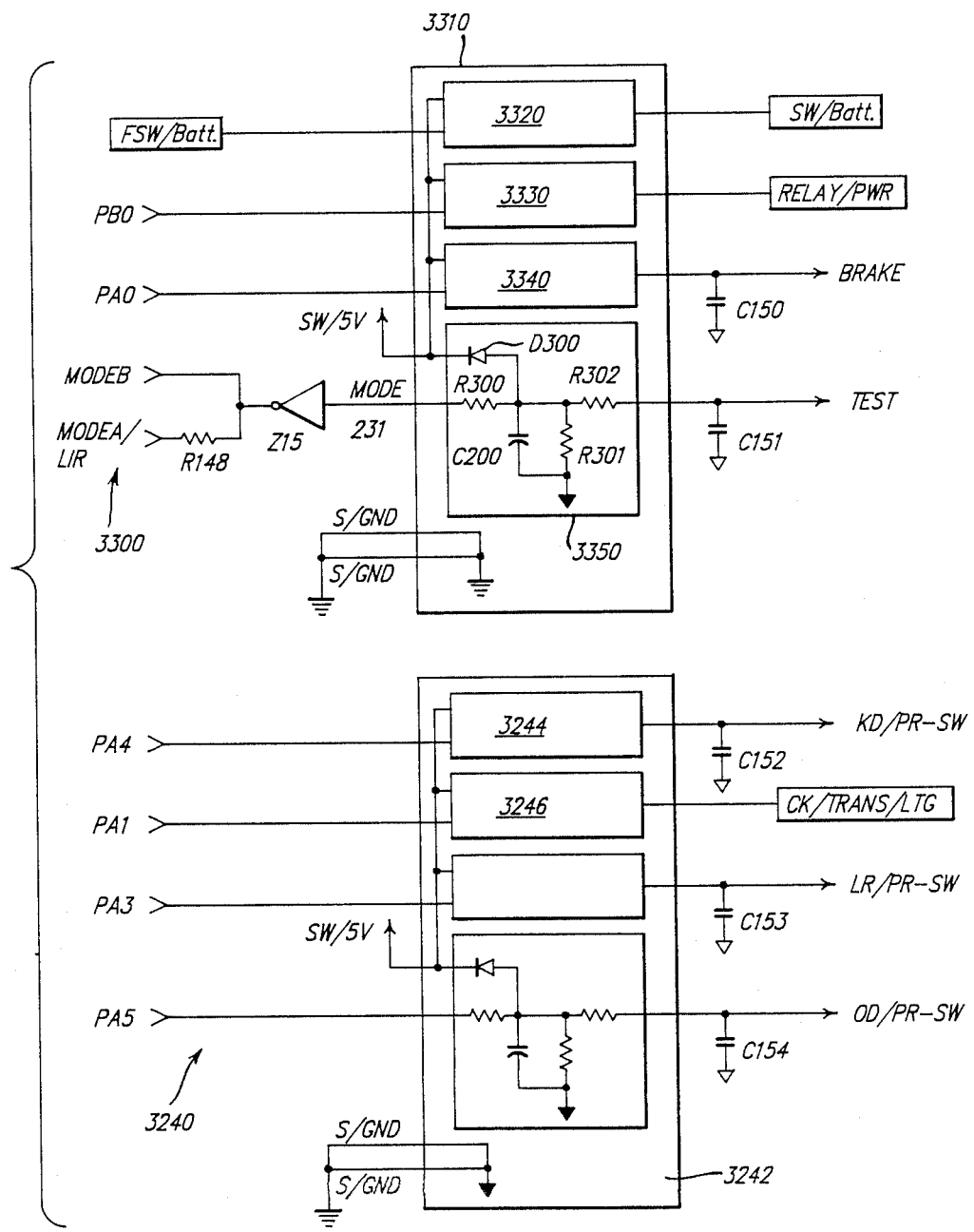
Figure 28I:
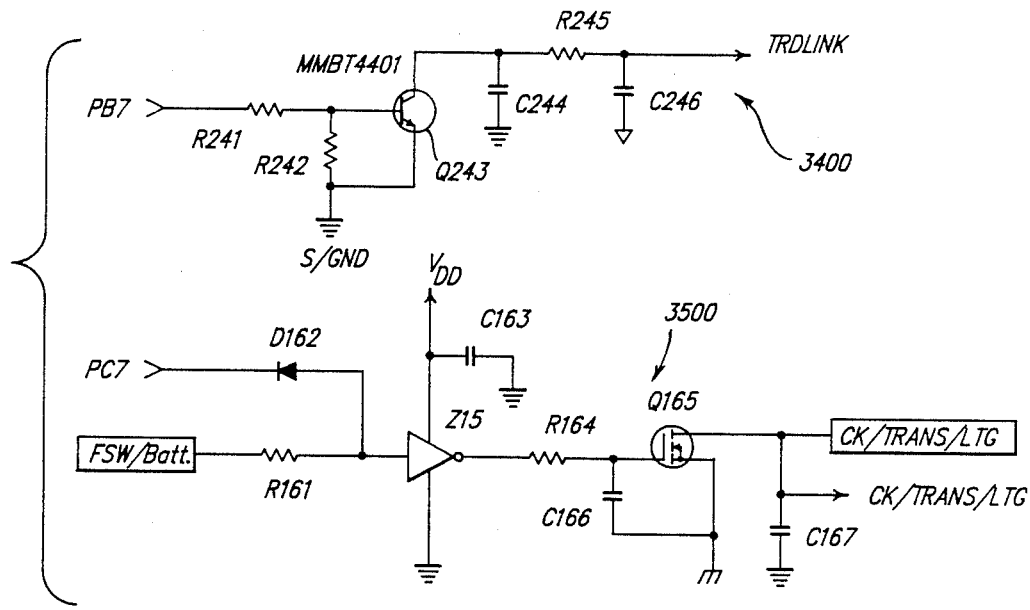
Figure 29:
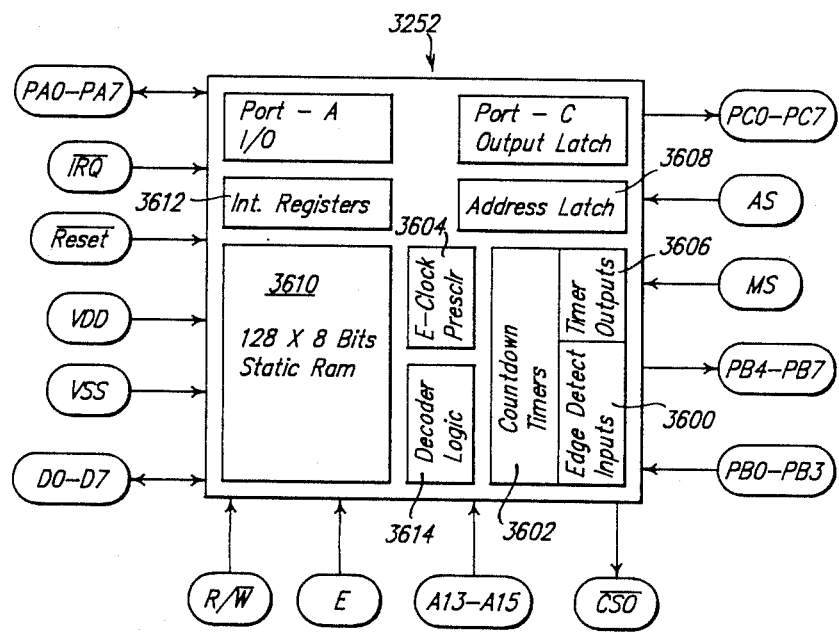
Figure 30:
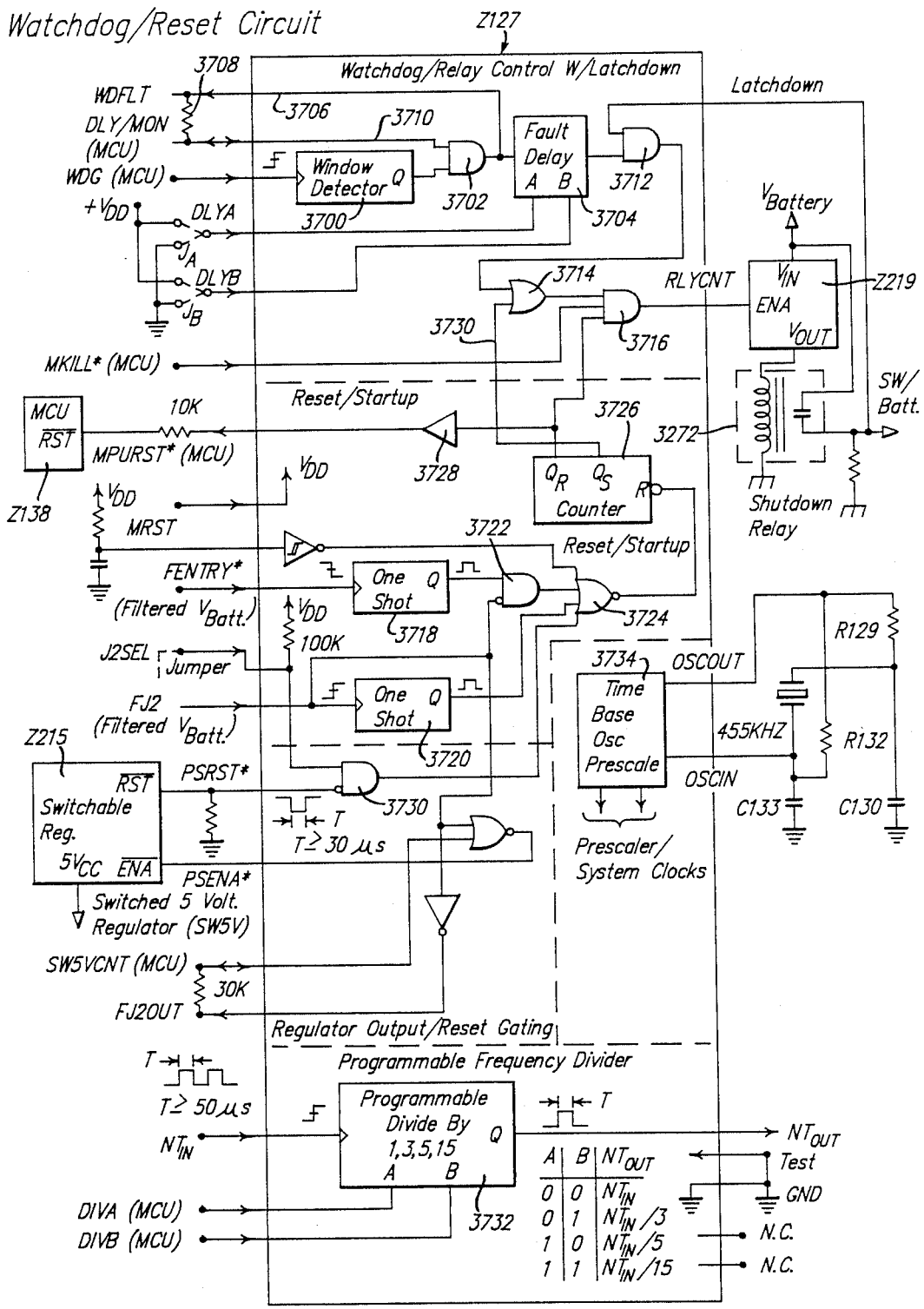
Figure 31:
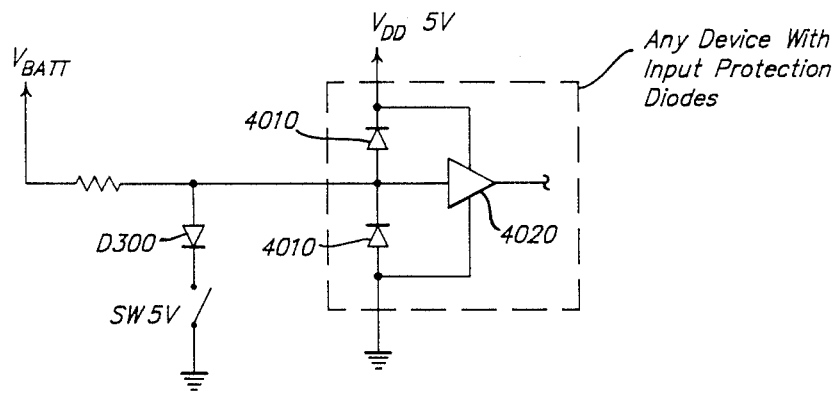
Figure 32:
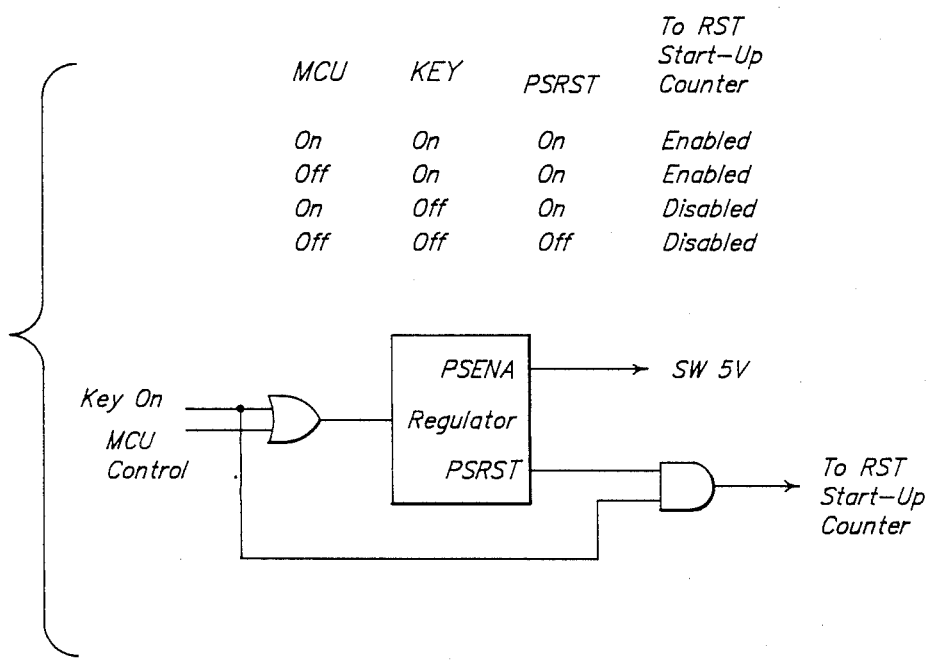
Figure 33:
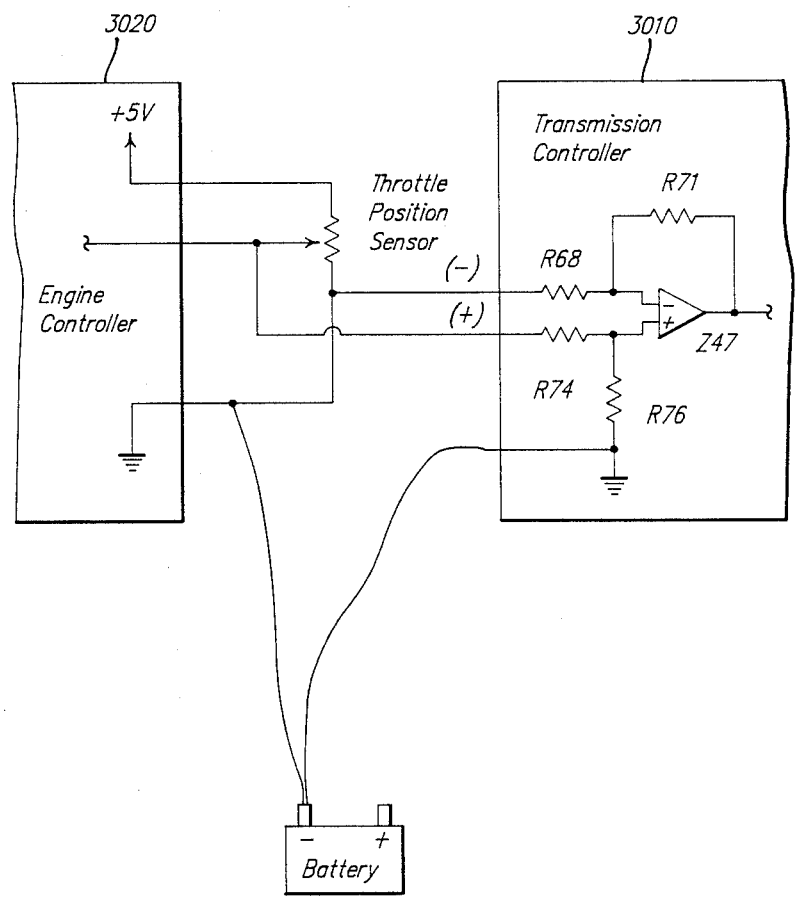
Figure 34:
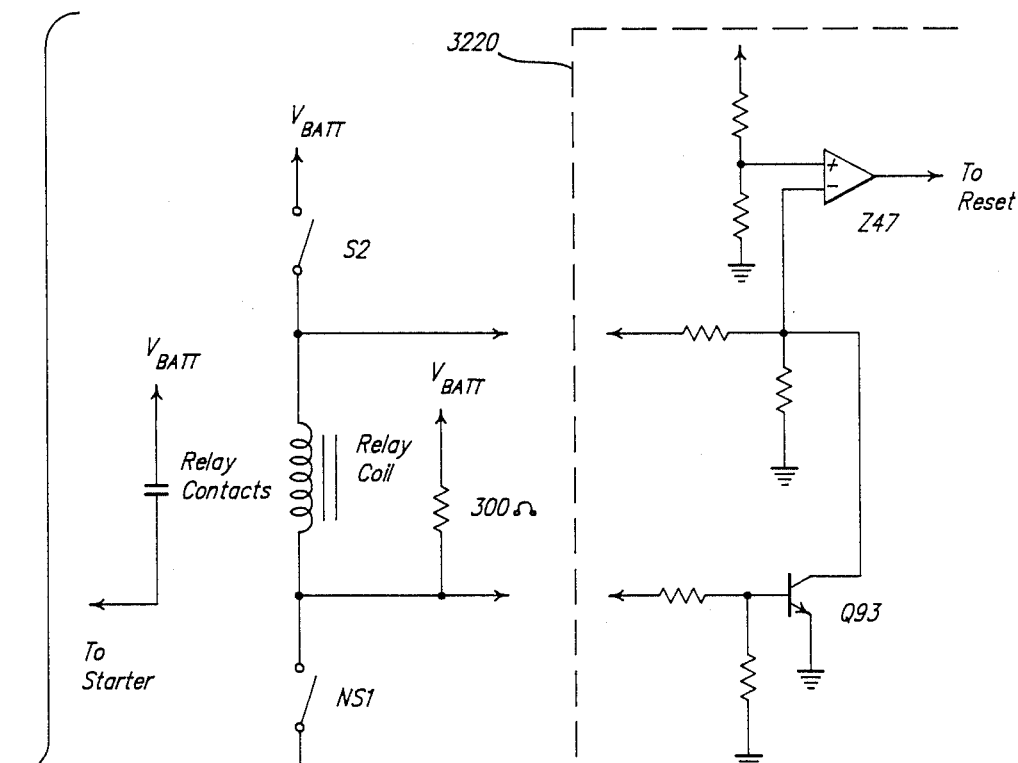

As illustrated in FIG. 5J, when the full lock-up feature is used in third gear, the lock-up switch valve 614 is moved by fluid pressure to prevent fluid from the T/C control valve 612 from reaching the lock-up assembly 186 as previously described. The low/reverse clutch solenoid-actuated valve 636 is energized by the transmission controller 3010 and moves to allow full fluid flow from the manual valve 604 through the solenoid switch valve 610 to one end of fourth land 674d of the LU switch valve 614 and fourth land 672d of the T/C control valve 612 as previously described. In other words, the low/reverse clutch solenoid-actuated valve 636 is not cycled, but energized fully for a predetermined time period, preventing the LU switch valve 614 from being cycled and resulting in full lock-up of the torque converter 110.

As illustrated in FIG. 5K, when the operating mode of the transmission 100 is to be fourth gear in the overdrive OD position, fluid flows from the pump assembly 200 to the manual valve 604. Fluid flows through the manual valve 604 between the first 676a and second 676b lands to the second ball check valve 654. The second ball check valve 654 is moved by fluid pressure to close one flow path to the underdrive clutch apply cavity 618. Fluid flows from the manual valve 604 to the underdrive clutch solenoid-actuated valve 630 which is energized by the transmission controller 3010 and moves to close the other flow path to the underdrive clutch apply cavity 618. Fluid also flows from the manual valve 604 to the overdrive clutch solenoid-actuated valve 632 which is energized by the transmission controller 3010 and moves to open the flow path to the overdrive clutch apply cavity 620. Fluid from the manual valve 604 also flows to the low/reverse clutch solenoid-actuated valve 636 which is normally vented, preventing fluid flow to solenoid switch valve 610. Fluid from the manual valve 604 further flows to the third ball check valve 656 which is moved to close the flow path to the low/reverse clutch apply cavity 626. Fluid from the pump assembly 200 further flows to the two/four shift clutch solenoid-actuated valve 634 which is normally applied and allows fluid flow through it to the manual valve 604. Fluid flows between the third 676c and fourth 676d lands of the manual valve 604 to the two/four shift clutch apply cavity 624.

Fluid in the clutch apply cavities 626 and 618 of the low/reverse clutch 310 and underdrive clutch 302 assemblies, respectively, is vented as previously described, resulting in these clutches not being engaged or applied. The reverse clutch assembly 306 receives some fluid but is essentially vented as previously described. Fluid from the pump assembly 200 also flows to the lock-up switch valve 614 and to the pressure regulator 608 as previously described.

As illustrated in FIG. 5L, when the full lock-up feature is used in fourth gear, the LU switch valve 614 is moved by fluid pressure to prevent fluid flow from the T/C control valve 612 from reaching the lock-up clutch assembly 186. Thus, fluid flow is vented from the lock-up clutch assembly 186 of the torque converter 110 to the sump as previously described. The low/reverse clutch solenoid-actuated valve 648 is energized by the transmission controller 3010 for a predetermined time period and moves to allow full fluid flow from the manual valve 604 through the solenoid switch valve 610 to one end of the fourth land 674d of LU switch valve 614 and the fourth land 672d of the T/C control control valve 612 as previously described, resulting in full lock-up of the torque converter 110.

LIMP-HOME MODE PROTECTION

Since a limp-home mode is typically needed in the presence of a failure, it must be designed to have virtually absolute reliability. Accordingly, the transmission controller 3010 is designed with a master power relay which will only remain energized with full and proper controller operation, thus assuring the ability to achieve a power-Off state. The solenoid state in limp-home is "Off" or de-energized. Therefore, the Off or "normal" state of the solenoid-actuated valves 630, 632, 634, 636 provide the needed clutch application. The solenoid-actuated valves 630, 632, 634, 636 are ball-type valves (FIGS. 8 and 9) which function without any dirt-sensitive close clearances and which will be effective even with dirt on the valve seat. The manually actuated valve 604 is the only component which must function to achieve second gear in OD, D or L, neutral in N, reverse in R and park in P.

Referring to FIG. 5F which illustrates the hydraulic schematic for second gear operation, fluid flows through the manual valve 604 between the first 676a and second 676b lands and through the underdrive clutch solenoid-actuated valve 630 which is normally applied, to the underdrive clutch apply cavity 618 as previously described. Fluid also flows from the manual valve 604 to the overdrive clutch solenoid-actuated valve 632 which is normally vented and is prevented from flowing to the overdrive clutch apply cavity 618. Fluid from the manual valve 604 also flows to the third ball check valve 656 which closes the flow path to the low/reverse clutch apply cavity 626. The manual valve 604 further allows fluid in the overdrive clutch 304, reverse clutch 306 and the low/reverse clutch 308 assemblies to vent as previously described, resulting in these clutches not being engaged or applied. Fluid from the pump assembly 200 also flows through the two/four clutch solenoid-actuated valve 634 which is normally applied to the manual valve 604. Fluid then flows between the third 676c and fourth 676d lands of the manual valve 604 to the two/four shift clutch apply cavity 624 as previously described. Hence, second gear is achieved.

It is also important to note that the limp-home mode protection feature of the present invention is also designed to allow reverse gear to be used. The transmission 100 will operate in accordance with the hydraulic schematic of FIG. 5C in order to permit use of the transmission's reverse gear. However, all of the solenoid-actuated valves will be in their "normal" state.

It is further important to note that the limp-home mode protection feature of the prevent invention is also designed to allow park and neutral operating modes to be used. The transmission 100 will operate in accordance with the hydraulic schematic of FIG. 5A except that all of the solenoid-actuated valves will be in their "normal" state.

DIRT-SHEDDING VALVES

In order to keep valves in a hydraulic system from sticking, it is preferable to supply them only with clean or substantially contaminant-free fluid from the pump, taken in through a filter. The LU switch valve 614 and the T/C control valve 612, however, are exposed to the relatively dirty fluid exiting the torque converter 110 where the lock-up friction clutch 186 and the torque converter thrust washers contribute dirt and other contaminants. In order to minimize the chance of these valves 612, 614 from sticking due to this dirt, there is higher pressure fluid in the ports adjacent to a port in which dirty fluid flows. In other words, fluid flow containing substantially no foreign matter or dirt is of a higher pressure than the fluid flow containing a relatively substantial amount of foreign matter or dirt in an adjacent port at a lower pressure. Thus, the pressure differential prevents the dirt from entering the close clearance between the lands of the valves 612, 614 and the valve body 603 (See FIGS. 5A-L, 6 and 11A).

Additionally, in accordance with another aspect of the present invention, the major valves 610, 612 and 614 for controlling the flow of hydraulic fluid through the system 600 have been advantageously designed to collect and subsequently shed or otherwise remove dirt and other contaminants from these valves.

As illustrated in FIG. 11a, the solenoid switch valve 610 incldues at least one, preferably a plurality of axially spaced circumferential grooves 692 formed in its lands and plugs. The grooves 692 serve as a means to collect dirt and other contaminants in the fluid. Similar grooves are also formed in the T/C control valve 612 and the LU switch valve 614.

In operation, when the valve 610 passes a land 694 in the valve body 603, the land 694 will push dirt collected on the valve into the groove 692. Then, whenever the groove 692 passes a port 696, the flowing fluid through the port 696 flushes the dirt from the groove 692, thereby keeping dirt and other contaminants from inhibiting the operation of the valves 610, 612 and 614.

VENT RESERVOIR

The vent reservoir 628 is placed in the hydraulic system 600 and acts as a means to reduce unwanted gasses or air intermittently trapped within the hydraulic passageways 602, etc. The vent reservoir 628 is disposed inside the manifold assembly 700, and is further illustrated in FIG. 8. The passageways 602 to the solenoid-actuated valves 630, 632, 634 and 636 vent to a chamber inside the manifold assembly 700 forming the vent reservoir 628. The vent reservoir 628 maintains a fluid level above the vent port 727 of each solenoid-actuated valve 630, 632, 634, 636. The vent reservoir 628 is elevated approximately three or four inches above the valve body 603. This, of course, maintains that same fluid level in each clutch passageway 602 and thereby ensures rapid hydraulic response of the overall fluid or hydraulic system 600 by eliminating accumulated air in the hydraulic system 600 and eliminating the necessity of purging the hydraulic passages 602 of air as has been done in the past. Additionally, any trapped air is allowed to vent automatically to the vent reservoir 628.

SOLENOID SWITCH VALVE

The reciprocal fluid or solenoid switch valve 610 is a particularly unique and advantageous feature of the present invention. It provides hydraulic protection against the simultaneous actuation of the low/reverse clutch solenoid-actuated valve 636 and either the two/four 634 or overdrive 632 clutch solenoid-actuated valves. The solenoid switch valve 610 allows double use of low/reverse solenoid-actuated valve 636 to control fluid flow to the low/reverse clutch assembly 310 and to the lock-up clutch assembly 186. The hydraulic protection feature is achieved by designing the valve 610 so that for a downshift to first gear, a specific logic controlled sequence of solenoid commands from the transmission controller 3010 is required to allow low/reverse clutch application after an upshift from first gear has occurred. Moreover, the valve 610 has been designed so that a failure caused application of either the two/four shift 308 or overdrive 304 clutch assemblies, while the low/reverse clutch assembly 310 is applied, will simply vent the low/reverse clutch assembly 310 and shift the transmission 100 to second gear or third gear, respectively. Any control failure which might attempt to apply the low/reverse clutch assembly 310 while in second, third or fourth gear is prevented from doing so by this valve 610. Apply fluid pressure from two/four 634 or overdrive 632 or underdrive 630 solenoid-actuated valves can keep the valve 610 in the upshifted position (spool to the left in FIG. 5F) which precludes any low/reverse clutch assembly 310 application.

The logic sequence used during a downshift to first gear is FIRST, wait briefly until the two/four or overdrive clutch pressure falls to less than 60% of the fluid line pressure (generated by the combination of the pressure regulator valve 608, pump assembly 200, and other system factors); SECOND, turn OFF the underdrive clutch solenoid-actuated valve 630—this will downshift the valve 610 (move valve 610 to its position in first gear as in FIG. 5E) without allowing slippage in the underdrive clutch 302 since the pressure used is from the solenoid end of a control orifice U1 in the underdrive clutch passage (fluid from control orifice U1 to the solenoid-actuated valve 630 is vented at valve 630 while fluid between control orifice U1 and clutch apply cavity 618 is essentially maintained, resulting in a fluid pressure to keep the underdrive clutch 302 from slipping); THIRD, wait briefly for valve motion to cease; FOURTH, turn ON low/reverse solenoid-actuated valve 636; and FIFTH, look for confirmation from low/reverse pressure switch 650; SIXTH, if confirmation is received, turn OFF low/reverse solenoid-actuated valve 636 briefly to wait for valve actuation pressures to stabilize and SEVENTH, return to normal downshift logic. If low/reverse confirmation is not received, return logic to second gear.

Other features of the solenoid switch valve 610 are obtained. Firstly, by using differential areas on the valve 610 to move the valve 610 instead of a spring, the valve 610 maintains the proper valve position with variations in fluid or line pressure. Secondly, line pressure is always acting on one end of the valve 610 to put it into a position to control fluid flow to the low/reverse clutch assembly 310. Thus, on start-up, a high force is available to position the valve 610 properly. Additionally, high line pressure in the reverse R operating mode acts to dislodge or free the valve 610 if stuck in a position to allow control of the LU switch valve 614.

Thirdly, the fluid pressure top of the underdrive clutch assembly 302 to the solenoid switch valve 610 is located on the solenoid side of the control orifice U1 to provide for a rapid drop in the "latch pressure" without causing a significant loss of fluid pressure to the underdrive clutch assembly 302. This provides a means to allow the valve 610 to move back to the low/reverse control position without affecting shift quality.

Fourthly, it is significant that at least one of the three pressures which can keep the valve 610 in its upshifted position (LR vented and LU controlled) is essentially equal to line pressure during any shift which may occur, i.e. 2–3, 3–2, 3–4, 4–3, 2–4 or 4–2. This not only ensures continuous protection against failures, but also maintains the availability of control of the lockup clutch 186 during shifts. Fluid pressure on underdrive clutch 302 keeps the valve 610 upshifted during 2–3 or 3–2; pressure on the overdrive clutch 304 keeps the valve 610 upshifted during the 3–4 or 4–3; pressure on the two-four shift clutch 308 keeps the valve 610 upshifted during the 4–2 or 2–4.

As illustrated in FIG. 5F through 5L, the solenoid switch valve 610 remains in a valve position at one end of its valve bore in second, third or fourth gears, as well as during shifts between these gears. This valve position disconnects the low/reverse solenoid-actuated valve 636 from the low/reverse clutch apply cavity 626 and connects valve 636 to the LU switch valve 614, and vents the low/reverse clutch assembly 310 as previously described.

The solenoid switch valve 610 eliminates the need for a fifth solenoid-actuated valve for the lock-up mode which would add to the cost and complexity of the system. This double duty operation is illustrated, for example, in FIGS. 5E and 5J.

Referring to FIG. 5E, the solenoid switch valve 610 is shown to be in a first position to allow fluid flow from the manual valve 604 thrugh the low/reverse clutch solenoid-actuated valve 636 and between the second 678b and third 678c lands of the solenoid switch valve 610 to the low/reverse clutch apply cavity 626 as previously described. As illustrated in FIG. 5J, the solenoid switch valve 610 is moved to a second position during an upshift from first gear to allow fluid flow from the manual valve 604 through the low/reverse clutch solenoid-actuated valve 636 and between the third 678c and fourth 678d lands of the solenoid switch valve 610 to one end 691 of the LU switch valve 614 to control engagement of the lock-up clutch assembly 186 as previously described. Thus, the solenoid switch valve 610 has a first position to control fluid flow to the low/reverse clutch assembly 310 and a second position to control fluid flow to the lock-up clutch assembly 186.

DIRECT-ACTING, NON-CLOSE CLEARANCE SOLENOID-ACTUATED VALVES

Advantageously, the present invention provides direct-acting, non-close clearance solenoid-actuated valves, namely solenoid-actuated valves 630, 632, 634 and 636. An example of a solenoid operated directional control valve is disclosed in U.S. Pat. No. 4,338,966, issued July 13, 1982 to Smith, which is hereby incorporated by reference. The solenoid-actuated valves 630, 632, 634 and 636 directly control fluid flow to their respective clutch assemblies. Since the solenoid-actuated valves 630, 632, 634 and 636 have a non-close clearance design to be described herein, dirt and other contaminants do not inhibit these solenoid-actuated valves from achieving either their normal or solenoid-actuated position. Additionally, as previously described, these solenoid-actuated valves 630, 632, 634, 636 are designed to provide a limp-home mode of operation.

Referring to FIG. 7, a manifold assembly 700 is shown. The manifold assembly 700 houses or contains the solenoid-actuated valves 630, 632, 634 and 636. A cover member 702 is secured by suitable fastening means 704, such as a screw and washer assembly, to a manifold housing 701. A circuit and switch assembly 752 along with two perimeter seals 705 are sandwiched between the cover member 702 and manifold housing 701.

Referring to FIG. 8, the overdrive clutch solenoid-actuated valve 632, which is normally vented, is shown and is identical to the low/reverse clutch solenoid-actuated valve 636. The solenoid which actuates valve 632 includes a stationary core member 706 having an outer cylindrical shape. A threaded portion 707 extends from one end of the core member 706 and is threadably engageable with the manifold housing 701. An electrical coil assembly 710 is disposed coaxially around the core member 706. A movable member or armature 712 is spaced axially from the core member 706 to form a working air gap 714 therebetween. An L-shaped magnetic shunt member 715 is secured between the core member 706 and the manifold housing 701. One edge 716 of the shunt member 715 contacts or abuts the armature 712 to allow the armature 712 to pivot or hinge about that line while efficiently transmitting the magnetic flux through the armature 712 and shunt member 715. A plurality of blades 717 are connected one end of the electrical coil assembly 710 and extend outwardly therefrom. The blades 717 are removably disposed in corresponding biased slots 718 in the circuit and switch assembly 752. A bowed or wave spring 719 is disposed between the shunt member 715 and the coil assembly 710 to bias or cause the blades 717 of the electrical coil assembly 710 to fully engage the slots 718 in the circuit and switch assembly 752. This prevents the electrical contact surfaces between the blades 717 and slots 718 from moving or vibrating which may cause excessive wear of these contact surfaces. Additionally, in conjunction with a cylindrical offset portion 712a of the armature 712, this coil position causes the working air gap 714 to be offset toward the center inside of the coil assembly 710, resulting in a more efficient magnetic flow. Also, resistors 713 are connected to the circuit and switch assembly 752 and will be described subsequently.

A nonmagnetic spacer 719a is disposed between the shunt member 715 and core member 706. The outside diameter of the spacer 719a is larger than the diameter of the core member 706 to avoid magnetic bridging due to fine magnetic debris in the system. The spacer center is configured to retain on a corresponding undercut of the core member 706 and on a projection 708 connected to threaded portion 707 to enhance handling and to prevent the projection 708 from contacting radially the shunt member 715 through the corresponding hole in the shunt member 715.

The other end of the armature 712 has an adjustment screw 720 threadably engaged and, in turn, capable of contacting the spherical end 722 of a valve plunger 724, so that the valve plunger 724 will reciprocate in response to appropriate magnetically induced actuations of the armature 712.

The adjustment screw 720 is welded to armature 712 after factory setting is established to prevent further thread movement. The adjustment of the screw 720 establishes the working air gap 714 (typically 0.05 to 0.20 mm) with all parts in the actuated or energized position such that: full force is available at the valve seat; there is allowance for valve wear; noise of armature 712 striking core member 706 is avoided; small debris in the working air gap 714 does not cause malfunction; and consistent pull-in and drop-out characteristics are maintained.

The valve plunger 724 is formed with a conical portion 725 which, when the solenoid is energized, is shown to be in sealing engagement with a valve insert 726, thereby closing a vent port 727 leading to the vent reservoir 628. The valve insert 726 is disposed in a passageway 728 which communicates between an inlet or supply port 730 and a clutch or element port 732 leading to a clutch apply cavity. Filters or screens 731 and 733 are disposed in the supply port 730 and clutch port 732, respectively, to filter or trap large debris (such as machining chips) and prevent its distribution through the hydraulic system 600 where it could cause malfunction. A movable ball 734 is disposed between a localized, non-sealing travel stop 736 in the passageway 728 and a seat 738 on the valve insert 726. The valve plunger 724 is coaxially disposed within a central passage 740 formed in the valve insert 726 which communicates with the passageway 728, vent port 727 and the clutch port 732. As shown in FIG. 8, the valve plunger 724 has a fluted central portion 724a which supports valve plunger 724 concentrically in the central passage 740, yet permits fluid to flow readily through the central passage 740 around the valve plunger 724.

Conventionally, the transmission shift control valve member is typically a spool type valve having lands and being reciprocal between lands of a housing. The diametrical clearance between the lands of the conventional valve member and housing range from 0.0002 to 0.001 inches, resulting in potential sticking or jamming by small debris. The present invention utilizes a ball 734 in an oversized passageway 728 to allow an open flow path around the ball 734 during actuation or operation. Hence, close clearances are not required between the ball 734 and passageway 728. In fact, momentarily during the valve ball movement from one seat to the other, the present invention allows a burst of fluid flow from supply port 730 to vent port 727 which flushes the passages.

Additionally, the circuit and switch assembly 752 includes an insulative circuit housing 753 disposed between the cover member 702 and the manifold housing 701 (See FIGS. 7 and 8). A male plug member 754 is connected to the circuit housing 753 for attachment to an external source of electrical power such as the transmission controller 3010.

In operation, the overdrive clutch solenoid-actuated valve 632 is normally vented when not energized (i.e. no current flows through the windings of the coil assembly 710). As a result, fluid enters the inlet port 730 and flows through the passageway 728, causing the ball 734 to move and engage the seat 738 of the valve insert 726. The ball 734 on its seat 738 blocks fluid flow from the inlet port 730, preventing fluid from entering clutch port 732. The displacement of the ball 734 moves the valve plunger 724, causing the conical portion 725 to be disengaged or moved off the valve insert 726. As a result, fluid from the clutch port 732 flows through the central passage 740 along the plunger flutes 724a and between the conical portion 725 and valve insert 726, venting through vent port 727 to the vent reservoir 628. Hence, the overdrive clutch solenoid-actuated valve 632 and its related clutch assembly 304 are normally vented.

When the overdrive clutch solenoid-actuated valve 632 is actuated, as shown in FIG. 8, current flows through the coil assembly 710 and creates a magnetic flux loop through the armature member 712, core member 706 and shunt member 715. This magnetic flux causes a magnetic attraction between the armature 712, shunt member 715 and the core member 706. This causes the armature 712 to move toward and contact the edge 716 of the shunt member 715 to reduce the working air gap 714, but not contact the core member 706. The armature 712 pivots about the edge 716 of the shunt member 715 and displaces the valve plunger 724, and in turn, displaces the ball 734 off the seat 738 to allow fluid to flow from the inlet port 730 past the ball 734 by way of passage 740 through the valve insert 726 to the clutch port 732. Simultaneously, fluid also momentarily flows out vent port 727, producing a cleansing flush of conical portion 725. The motion of armature 712 continues to drive valve plunger 724 until conical portion 725 engages the surface of valve insert 726, thereby closing vent port 727 and preventing continued fluid flow from clutch port 732 into vent reservoir 628 and thereby causing clutch pressure to increase toward the level of inlet pressure. By appropriate time-cycling of the current in coil 710, these valve ports will reciprocate rapidly and provide effective control of the pressure in clutch port 732 at any desired level between that of vent reservoir 628 and fluid flow from inlet port 730.

As partially illustrated in FIG. 9, the underdrive clutch 630 and two/four shift clutch 634 solenoid-actuated valves are normally applied when not energized or no current flows through the windings of the coil assembly 710. Prime numerals are used for parts similar to the overdrive clutch solenoid-actuated valve 632 of FIG. 8. As a result, fluid enters the inlet or supply port 730' and flows in the passageway 728', causing the ball 734' to move and engage its seat 738' of the two piece valve insert 726'. When the ball 734' is on or engaging the seat 738', a small gap 739 exists between the ball 734' and another ball seat 737. As a result, fluid flows in the gap 739 past the ball 734' and to the clutch port 732'. By engaging seat 738', the ball 734' prevents fluid flow from exiting clutch port 732' via passage 740' and into the vent reservoir 628. Hence, the solenoid-actuated valves 630 and 634 and their related transmission clutch assemblies 302 and 308 are normally applied.

When the underdrive clutch solenoid-actuated valve 630 is actuated, the armature 712 pivots and displaces the valve plunger 724', and in turn, displaces the ball 734' to engage seat 737. As a result, fluid flow from the supply port 730' is blocked by the ball 734' and is prevented from flowing to the clutch port 732'. Fluid flow from the clutch port 732' is allowed to flow between the ball 734' and seat 738' and through central passage 740', venting through vent port 727' to the vent reservoir 628. As with the normally vented valves, clutch pressure may be regulated by time-cycling the valve.

As illustrated in FIG. 3A, the present invention provides a means for reducing noise resulting from solenoid valve action. A spool 742 having a generally cylindrical shape is disposed in the passageway 728. The spool 742 can slide in the passageway 728. The spool 742 has an axially projecting portion 744 extending into the central passage 740 of the valve seat 726. The projecting portion 744 contacts the ball 734. The spool 742 includes a chamber 745 and an aperture 746 extending axially through the projecting portion 744, both of which allow fluid flow through the spool 742. A spring 747 is disposed within the chamber 745 and biases or lightly loads the spool 742 toward the ball 734. In other words, the spring 747 biases the projecting portion 744 into contact with the ball 734 so that the ball 734 contacts its seat 738. One end of the aperture 746 is closed by the ball 734 during pull-in or energizing of the coil assembly 710. During de-energization of the coil assembly 710 (i.e. during drop-out), the ball 734 will return freely, opening the aperture 746 and allowing the chamber 745 to refill rapidly so that the next pull-in can be cushioned.

The spool 742 also includes a first or supply end land 748 at one end which is slightly smaller in diameter than the passageway 728. Land 748 allows only gradual flow of fluid out of a trapped cavity between land 748 and the manifold housing 701 in passageway 728, thereby slowing pull-in velocity and reducing impact noise. The spool 742 further includes a second or element end land 749 at the other end which is fluted for free flow of fluid.

In operation, during pull-in, the ball 734 moves axially, resulting in axial movement of the spool 742. Land 748 allows only gradual flow of fluid past it out of the trapped cavity between land 748 and the manifold housing 701 in the passageway 728. This gradual flow slows the pull-in velocity of the ball 734 and related valve plunger 724 (See FIGS. 8 and 9), reducing impact noise with the valve seat 726.

During drop-out, the ball 734 returns freely allowing the chamber 745 to refill rapidly so that the next pull-in can be cushioned. Also, spring 747 will return the spool 742 so that the projecting protion 744 once again contacts ball 734 to rest the ball 734 on its seat 738. The spool 742 may be used with both normally applied and normally vented solenoid-actuated valves.

Referring to FIG. 10, a pressure sensor or switch assembly 650 is shown and is similar to pressure switches 646 and 648 of FIGS. 5A–5L. The pressure switch assembly 750 includes a circuit contact or pad 755 communicates through a bore 756 formed in the circuit housing 753. A retainer 758 secures a flexible rubber diaphragm 760 between the manifold housing 701 and the cylindrical wall of the circuit housing 753 forming the bore 756. A contact cup 762 is disposed in the bore 756 between the diaphragm 760 and cover member 702. A spring 764 is disposed between the contact cup 762 and cover member 702.

The diaphragm 760 is compressed between the circuit housing 753 and the retainer 758 to prevent excessive fluid pressure leakage while compensating for differences in dimensional stack-up. This compression, in turn, loads the face of the retainer 758 against the manifold housing 701 such that an assured, highly restrictive leak path is intentionally established to vent air from the hydraulic circuit to assure fast switch response (undamped) to solenoid action while allowing minimal fluid flow.

Additionally, the contact cup 762 has a relatively large diametrical clearance inside of the bore 756 and a large contact gap (long stroke) consistent with maintaining a system which is highly tolerant of dirt and debris. The contact side of the contact cup 762 is common with the vent reservoir 628 to avoid hydraulic damping (allowing fast response), yet protects the circuit contacts 755 from corrosion or electrical erosion (i.e. contacts remain covered by fluid).

In operation, fluid enters through apertures (not shown) in the retainer 758 from the manifold housing 701 and displaces or deflects the diaphragm 760. The diaphragm 760, in turn, displaces the contact cup 762, causing the contact cup 762 to contact the circuit contact 755 completing a circuit through the cup 762, spring 764 and cover member 702 which grounds circuit contact 755 to indicate the presence of pressure to the transmission controller 3010. When the fluid pressure is removed, the spring 764 returns the contact cup 762 out of contact with the circuit contact 755, opening the circuit and indicating an absence of pressure to the transmission controller 3010.

The present invention has been described in an illustrative manner. It is to be understood that the terminology which has been used is intended to be in the nature of words of description rather than of limitation.

Obviously, many modifications and variations are possible in light of the above teachings. Therefore, the subject invention may be practiced otherwise than as specifically described.

What is claimed is:

1. A fluid-actuated pressure switch assembly for indicating the absence or presence of a predetermined fluid pressure, said assembly comprising:
a housing having means forming a bore and abutting an opening of a fluid passageway of a transmission;
electrical contact means disposed within the housing at one end of the bore which conducts a flow of electrical current from an electrical current source upon being closed and prevent current flow upon being open;
cup means disposed within the bore between the contact means and the opening of the fluid passageway and being movable in response to a fluid pressure from a fluid pressure source in the fluid passageway of the transmission for opening and closing said contact means;

diaphragm means disposed at the other end of the bore between the housing and the opening of the fluid passageway and being flexible to deform in response to fluid pressure for moving said cup means and for preventing fluid contamination of said contact means; and including a retainer having aperture means for passing fluid therethrough disposed at the other end of the bore about the diaphragm and retaining said diaphragm to said housing to provide a leakage path to eliminate air trapped within the fluid; and biasing means disposed with the bore between the cup means and the housing for biasing the cup means away from the contact means in the absence of a predetermined fluid pressure.

2. An assembly as set forth in claim 1 wherein said cup means comprises a contact cup having a diameter less than said cavity to stop leakage of fluid when closing said contact means.

3. A fluid-actuated pressure switch assembly for indicating the absence or presence of a predetermined fluid pressure, said assembly comprising:

a housing having means forming a bore and abutting an opening of a fluid passageway in a transmission;

electrical contact means disposed within the housing at one end of the bore which conduct a flow of electrical current from an electrical current source upon being closed and prevent current flow upon being open;

a cup disposed within the bore between the contacts and the opening of the fluid passageway and being movable in response to the fluid pressure from a fluid pressure source in the fluid passageway of the transmission for opening and closing said contact means; and a diaphragm disposed at the other end of the bore and being flexible to deform in response to the presence of fluid pressure for moving said cup toward the contact means to close the contact means and for preventing fluid contamination of said contact means, said cup having a diameter less than the diameter of the bore to stop leakage of fluid when closing said contact means, including a retainer clip having aperture means for passing fluid therethrough disposed at the other end of the bore about the diaphragm and retaining said diaphragm to said housing to provide a leakage path to eliminate air trapped within the fluid; and a spring disposed within the bore between the cup and the housing for biasing the cup toward the retainer to open the contact means in the absence of a predetermined fluid pressure.

* * * * *